(12) United States Patent
Tsibulevskiy et al.

(10) Patent No.: US 11,922,712 B2
(45) Date of Patent: Mar. 5, 2024

(54) TECHNOLOGIES FOR CONTENT ANALYSIS

(71) Applicant: PATNOTATE LLC, Englewood, NJ (US)

(72) Inventors: Roman Tsibulevskiy, East Brunswick, NJ (US); Barry Greenbaum, Bergenfield, NJ (US); Alexander Ivakhnenko, Taganrog (RU)

(73) Assignee: PatNotate LLC, Englewood, NJ (US)

( * ) Notice: Subject to any disclaimer, the term of this patent is extended or adjusted under 35 U.S.C. 154(b) by 0 days.

(21) Appl. No.: 17/627,719

(22) PCT Filed: Jul. 24, 2020

(86) PCT No.: PCT/US2020/043482
§ 371 (c)(1),
(2) Date: Jan. 17, 2022

(87) PCT Pub. No.: WO2021/021624
PCT Pub. Date: Feb. 4, 2021

(65) Prior Publication Data
US 2022/0319219 A1 Oct. 6, 2022

Related U.S. Application Data

(60) Provisional application No. 62/981,763, filed on Feb. 26, 2020, provisional application No. 62/890,234, filed on Aug. 22, 2019, provisional application No. 62/878,931, filed on Jul. 26, 2019.

(51) Int. Cl.
G06Q 50/18 (2012.01)
G06F 3/0482 (2013.01)
G06F 3/0484 (2022.01)
G06F 9/451 (2018.01)
G06T 3/60 (2006.01)
G06V 30/226 (2022.01)
G06V 30/413 (2022.01)
G06V 30/416 (2022.01)
G06V 30/422 (2022.01)
G06V 30/10 (2022.01)

(52) U.S. Cl.
CPC .......... *G06V 30/422* (2022.01); *G06F 3/0482* (2013.01); *G06F 3/0484* (2013.01); *G06F 9/451* (2018.02); *G06Q 50/184* (2013.01); *G06T 3/60* (2013.01); *G06V 30/226* (2022.01); *G06V 30/413* (2022.01); *G06V 30/416* (2022.01); *G06F 2203/04803* (2013.01); *G06V 30/10* (2022.01)

(58) Field of Classification Search
CPC .. G06Q 50/184; G06V 30/422; G06V 30/413; G06V 30/416; G06F 3/0482; G06F 3/0484; G06F 9/451; G06F 2203/04803
See application file for complete search history.

(56) References Cited

U.S. PATENT DOCUMENTS

| | | | | |
|---|---|---|---|---|
| 7,134,089 B2 * | 11/2006 | Celik | ................... | G06F 3/0481 715/767 |
| 9,910,832 B2 * | 3/2018 | Lee | ........................ | G06F 40/134 |
| 2006/0015821 A1 * | 1/2006 | Jacques Parker | ..... | G06F 3/0481 715/800 |
| 2008/0005103 A1 * | 1/2008 | Ratcliffe | ................ | G06Q 10/10 707/999.005 |
| 2016/0154786 A1 * | 6/2016 | Neustel | ................. | G06F 40/295 704/9 |

* cited by examiner

Primary Examiner — Alvin H Tan

(57) ABSTRACT

Various computing technologies for content analysis.

20 Claims, 53 Drawing Sheets

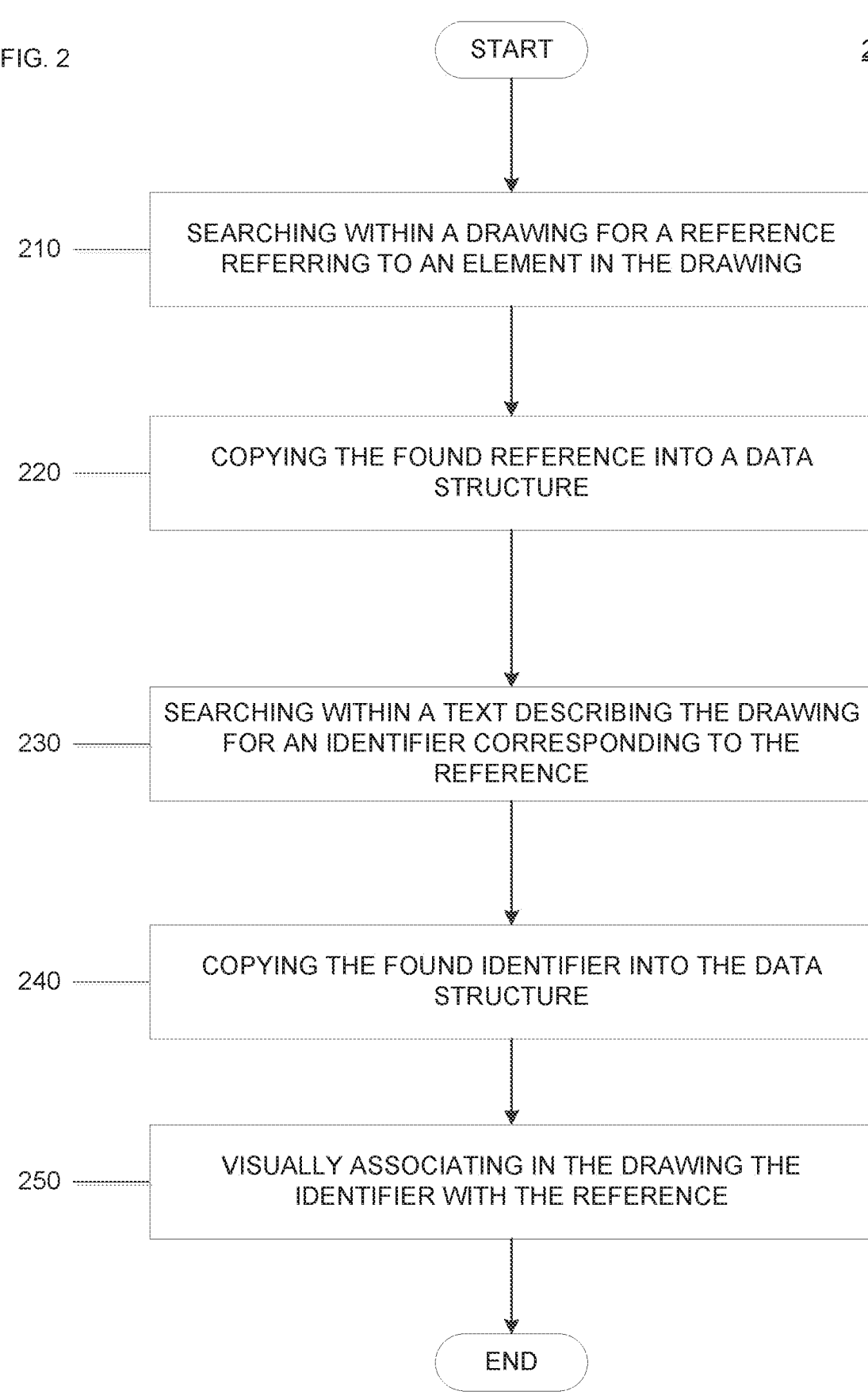

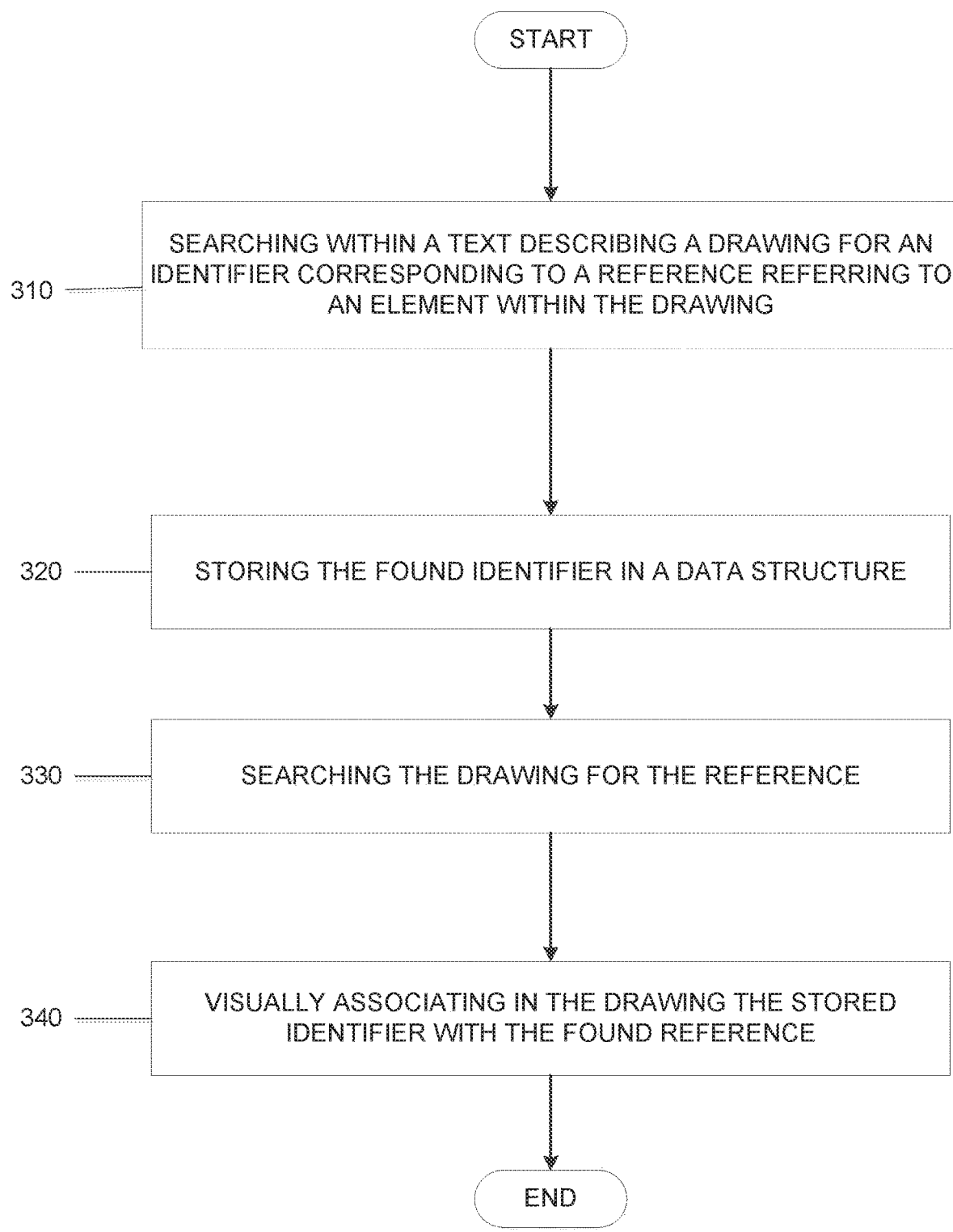

| Reference | Identifier |
|---|---|
| 10 | |
| 20 | |
| 30 | |

[0078] Shown in Fig. 31 is a diagram of a memory. Memory can be random access memory or read-only memory.

[0079] Shown in Fig. 32 is a central processing unit (CPU) 20 coupled to a first database 10 and a second database 30. CPU 20 is a single or a multicore processor. First database 10 and second database 30 store data executable by CPU 20.

[0080] Shown in Fig. 33 is an input device.

FIG. 4C

| Reference | Identifier |
|---|---|
| 10 | First database |
| 20 | CPU |
| 30 | Second database |

FIG. 4D

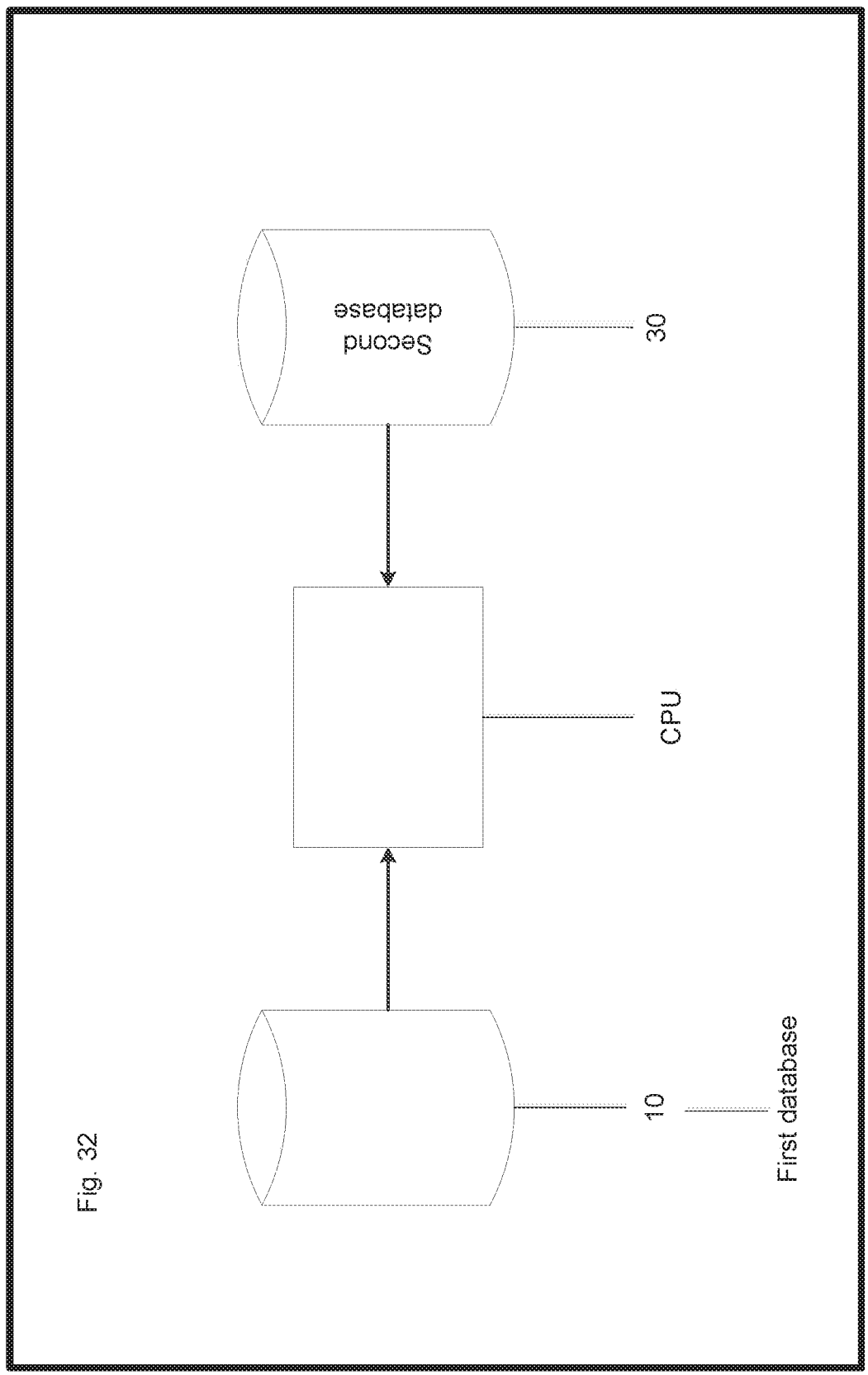

[0078] Shown in Fig. 31 is a diagram of a memory. Memory can be random access memory or read-only memory.

[0079] Shown in Fig. 32 is a central processing unit (CPU) 20 coupled to a first database 10 and a second database 30. CPU 20 is a single or a multicore processor. First database 10 and second database 30 store data executable by CPU 20.

[0080] Shown in Fig. 33 is an input device.

FIG. 5A

| Reference | Identifier |
|---|---|
| 10 | First database |
| 20 | CPU |
| 30 | Second database |

FIG. 5B

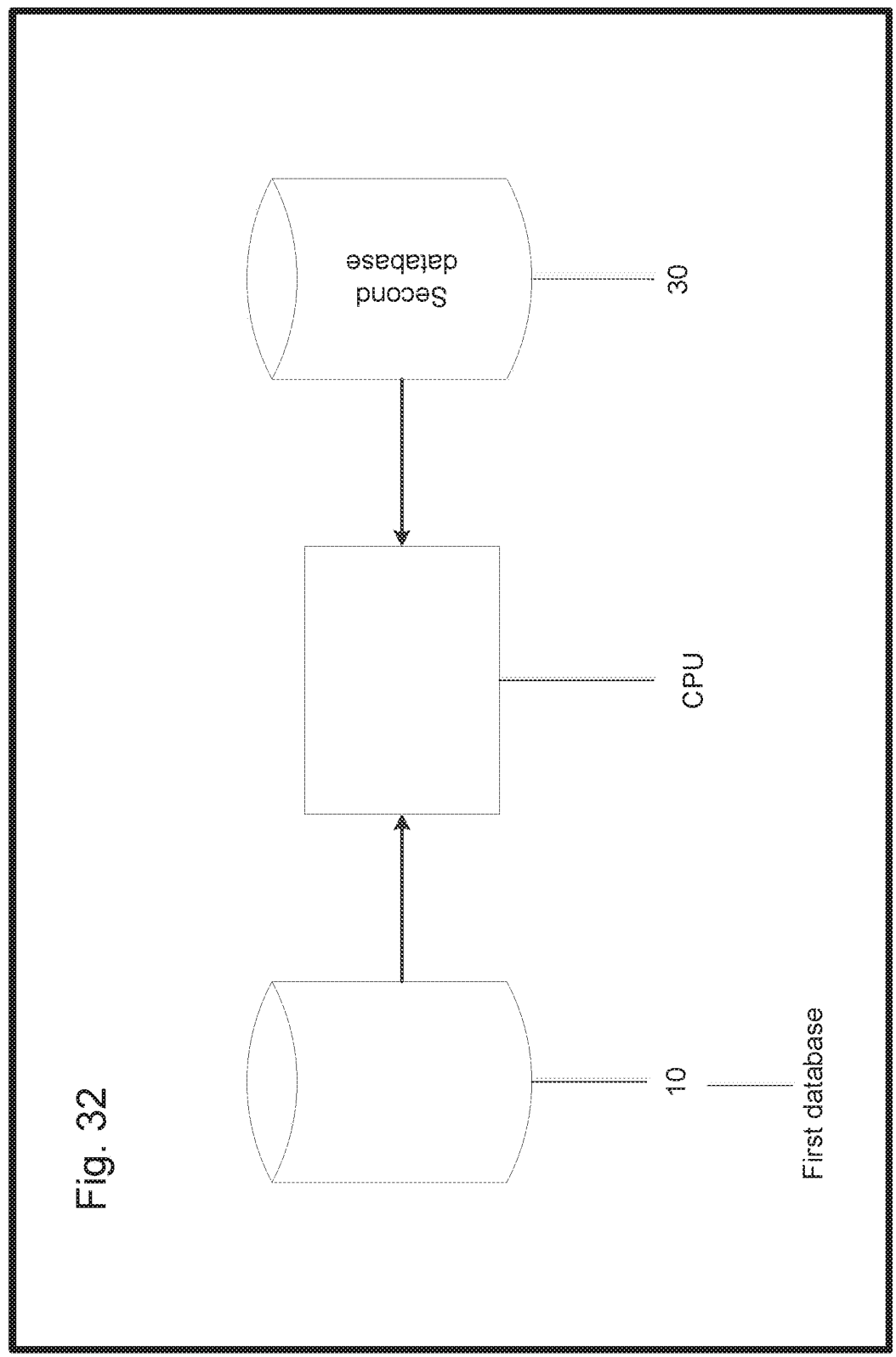

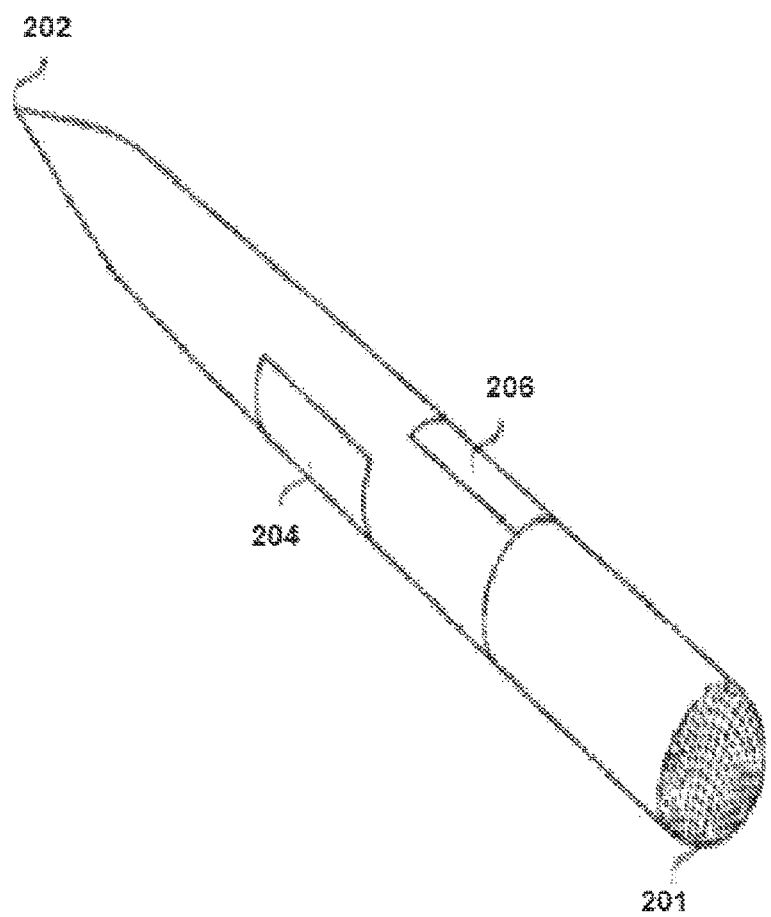

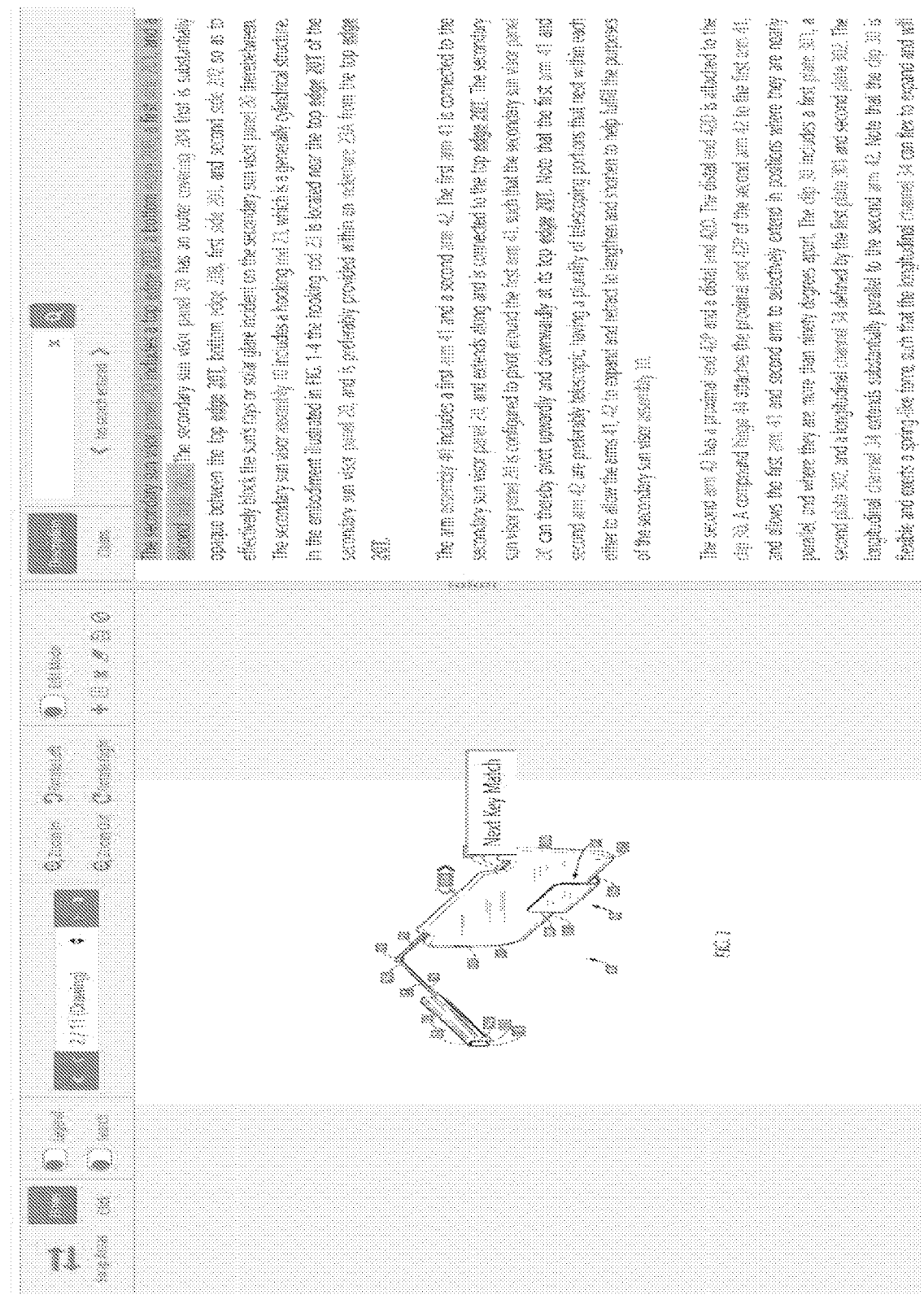

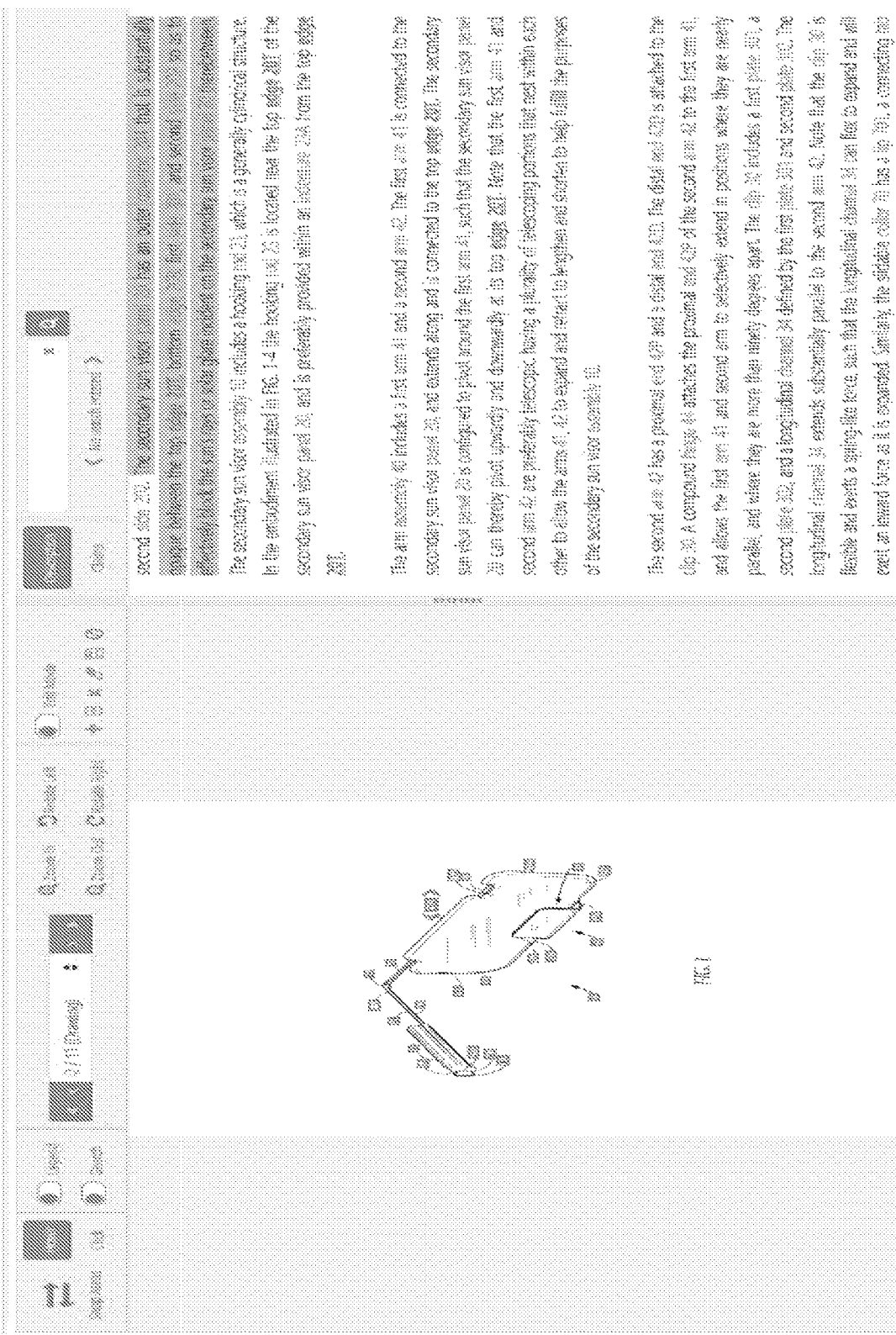

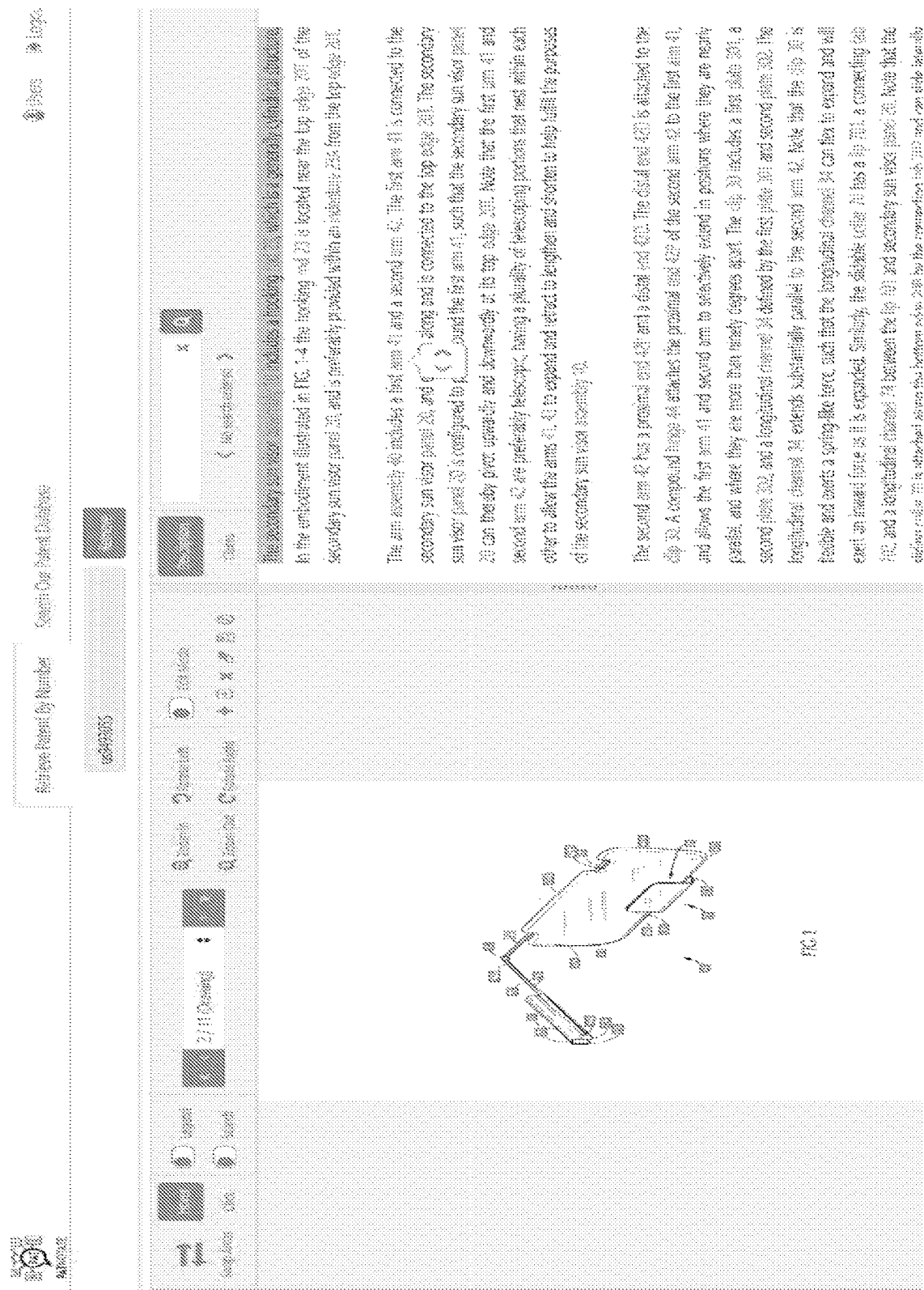

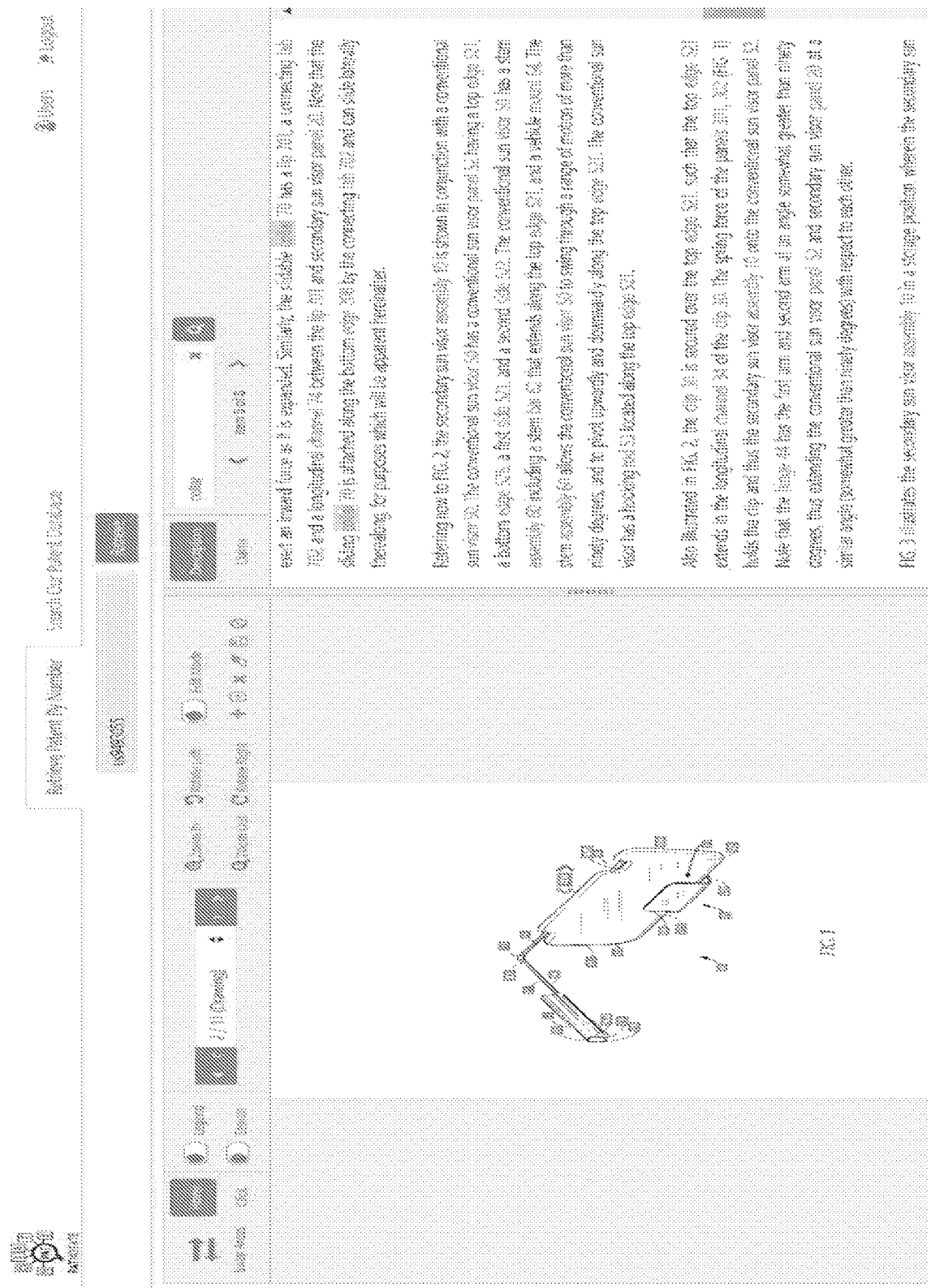

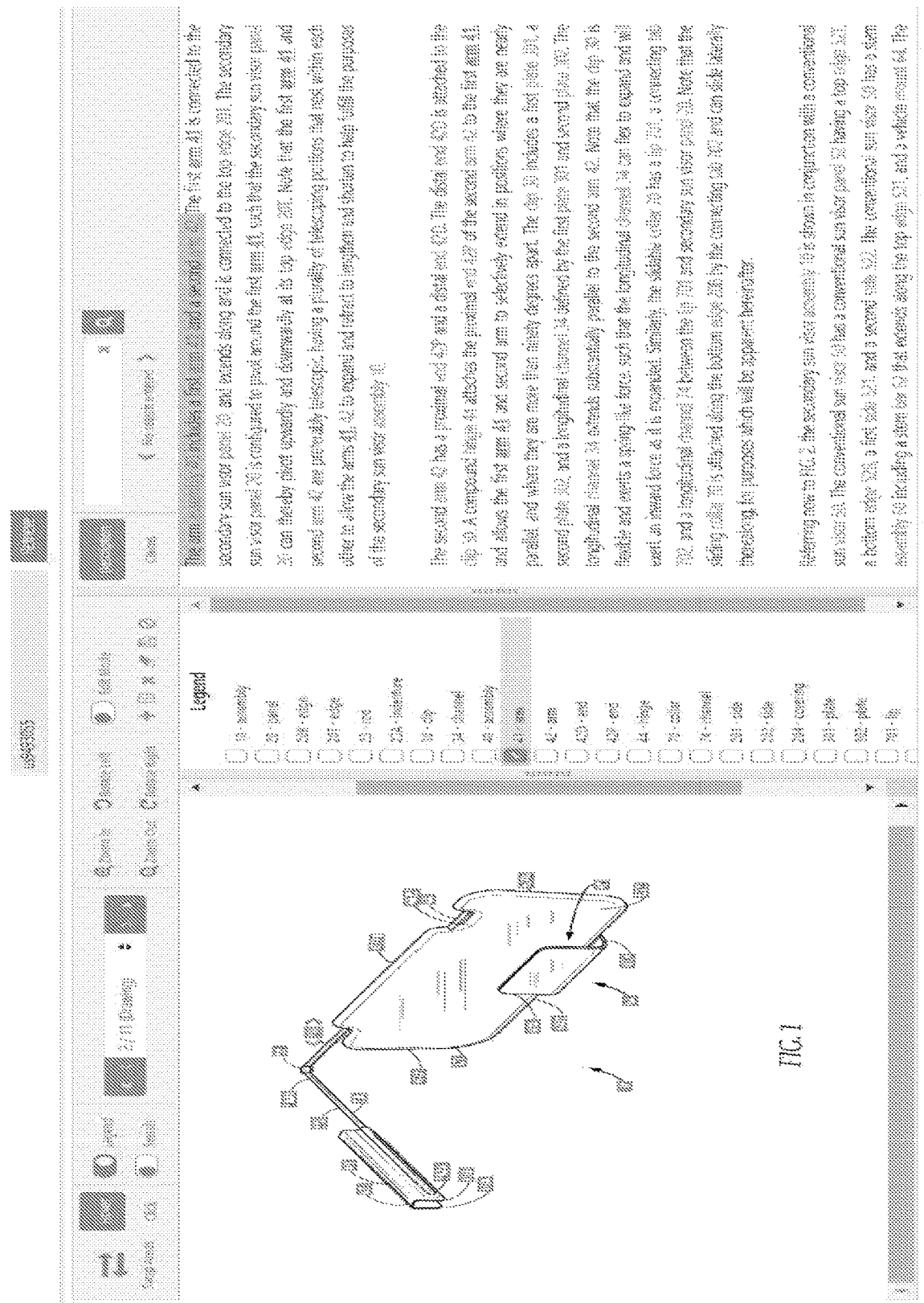

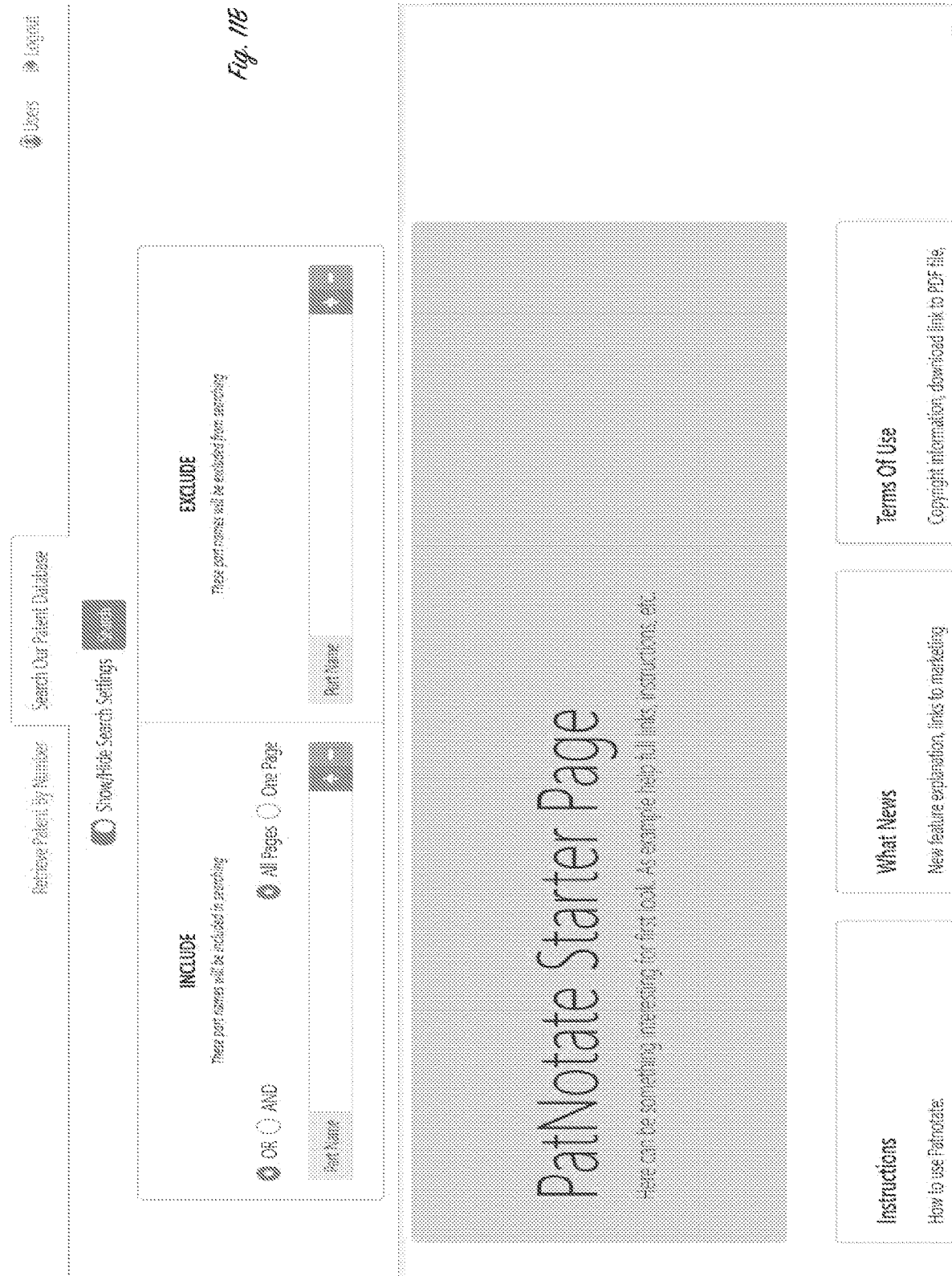

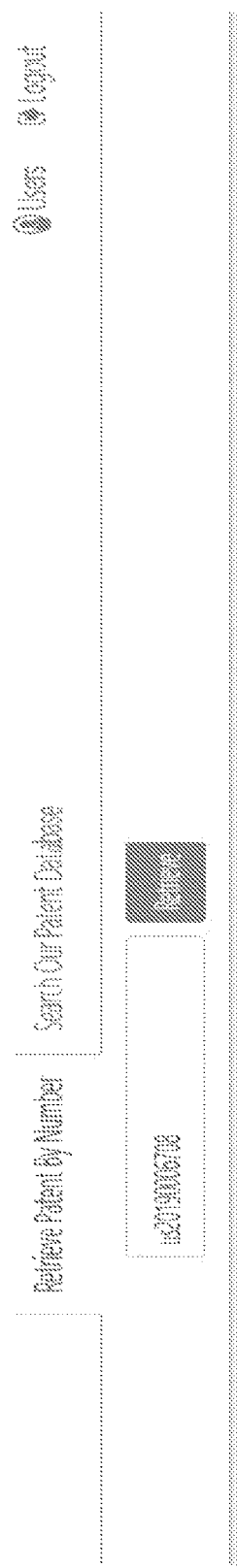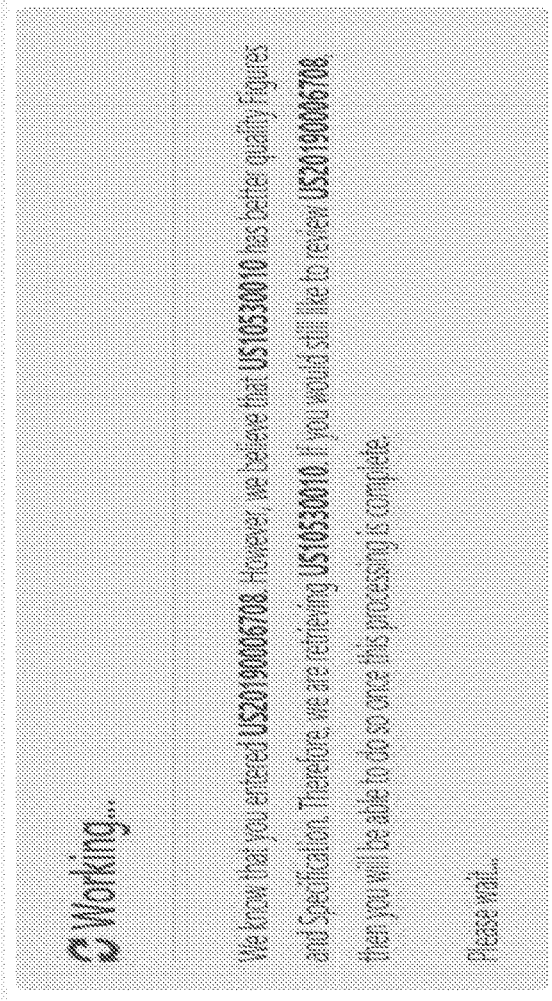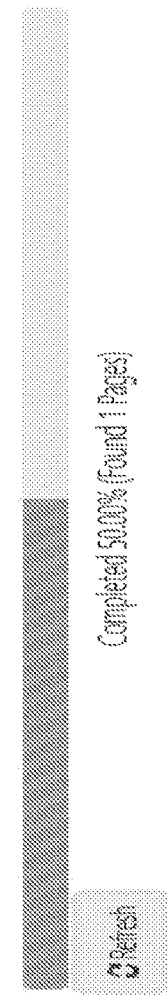
Fig. 11C

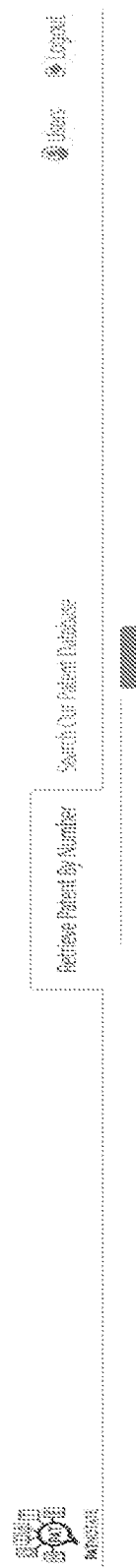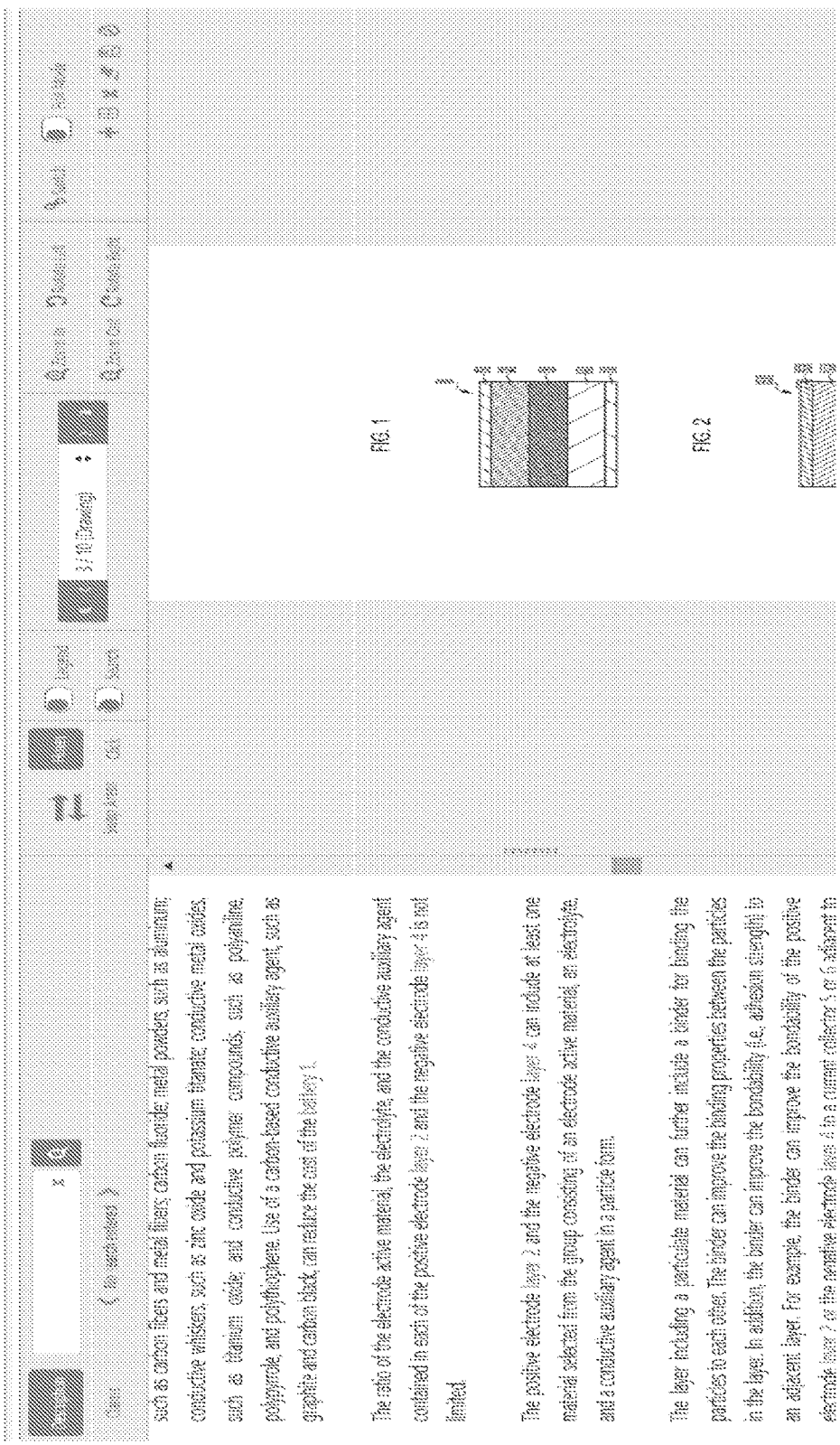
Fig. 11F

TECHNOLOGIES FOR CONTENT ANALYSIS

CROSS-REFERENCE TO RELATED PATENT APPLICATIONS

This patent application claims a benefit of priority to a PCT International Application PCT/US2020/043482 filed Jul. 24, 2020; which claims a benefit of priority to U.S. Provisional Patent Application 62/981,763 filed on Feb. 26, 2020, U.S. Provisional Patent Application 62/890,234 filed on Aug. 22, 2019, and U.S. Provisional Patent Application 62/878,931 filed on Jul. 26, 2019, each of which is incorporated by reference herein for all purposes.

BACKGROUND

In this disclosure, where a document, an act, and/or an item of knowledge is referred to and/or discussed, then such reference and/or discussion is not an admission that the document, the act, and/or the item of knowledge and/or any combination thereof was at a priority date, publicly available, known to a public, part of common general knowledge, and/or otherwise constitutes any prior art under any applicable statutory provisions; and/or is known to be relevant to any attempt to solve any problem with which this disclosure is concerned with. Further, nothing is disclaimed.

Patent annotation is technologically complicated. For example, some patent figures have fonts of various types, sizes, shapes, orientations, pitches, colors, inclinations, prints, and handwriting or cursive styles. As such, some OCR engines are thrown off by these fonts, which can lead to avoidance of patent figure segmentation, improper patent figure segmentation, inaccurate character recognition, non-recognition of characters, and other recognition issues. Moreover, if some characters are not recognized or inaccurately recognized, then end users are generally stuck with whatever results are available. Also, many annotations can be displayed over parts depicted in patent figures, which leads to reduced patent figure usability and can contribute to end user confusion or frustration. Additionally, some annotated patent figures can be plagiarized or copied, without any annotator compensation or recognition. Further, some patent figures can be difficult to understand due to patent figure color requirements. In addition, some patent figures can be difficult to understand without further context. Moreover, navigating between patent figures and patent specification can be difficult, especially when the patent figures have many part numbers or when the patent specification is technically dense. Also, understanding patent figures or patent specification can be laborious and time-consuming, especially when the patent figures have many part numbers or when the patent specification is technically dense.

DETAILED DESCRIPTION

The set of accompanying illustrative drawings shows various embodiments of this disclosure. Such drawings are not to be construed as necessarily limiting this disclosure. Like numbers and/or similar numbering scheme can refer to like and/or similar elements throughout.

This disclosure is now described more fully with reference to the set of accompanying drawings, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

Aspects of this disclosure are described with reference to flowchart illustrations and/or block diagrams of methods, apparatus (systems), and computer program products according to embodiments of the disclosure. Each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams as included herewith illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain embodiments may be combined and sub-combined in and/or with various other embodiments. Also, different aspects and/or elements of embodiments, as disclosed herein, may be combined and sub-combined in a similar manner as well. Further, some embodiments, whether individually and/or collectively, may be components of a larger system, wherein other procedures may take precedence over and/or otherwise modify their application. Additionally, a number of steps may be required before, after, and/or concurrently with embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular embodiments and is not intended to be necessarily limiting of this disclosure. As used herein, the singular forms "a," "an" and "the" are intended to include the plural forms (e.g., two, three, four, five, six, seven, eight, nine, ten, tens, hundreds, thousands, millions, or more) as well, including intermediate whole or decimal forms, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when this disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. For example, X includes A or B can mean X can include A, X can include B, and X can include A and B, unless specified otherwise or clear from context.

As used herein, the term "response" or "responsive" are intended to include a machine-sourced action or inaction, such as input (e.g., local, remote), or a user-sourced action or inaction, such as input (e.g., via user input device).

As used herein, the term "about" and/or "substantially" refers to a +/−10% variation from the nominal value/term. Such variation is always included in any given.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Hereby, all issued patents, published patent applications, and non-patent publications that are mentioned or referred to in this disclosure are herein incorporated by reference in their entirety for all purposes, to a same extent as if each individual issued patent, published patent application, or non-patent publication were specifically and individually indicated to be incorporated by reference. To be even more clear, all incorporations by reference specifically include those incorporated publications as if those specific publications are copied and pasted herein, as if originally included in this disclosure for all purposes of this disclosure. Therefore, any reference to something being disclosed herein includes all subject matter incorporated by reference, as explained above. However, if any disclosures are incorporated herein by reference and such disclosures conflict in part or in whole with this disclosure, then to an extent of the conflict or broader disclosure or broader definition of terms, this disclosure controls. If such disclosures conflict in part or in whole with one another, then to an extent of conflict, the later-dated disclosure controls.

FIG. 1 is a flowchart of an embodiment of a visual association process according to this disclosure. In particular, a process 100 includes blocks 110-120. The process 100 (or any steps thereof) can be performed, whether serially or in parallel with each other, via a single core processor or a multi-core processor, irrespective of whether these cores are local or remote to each other.

The multicore processor can include a plurality of independent cores. For example, the multicore processor is a computing component with two or more independent processing units, which are the units that read and execute program instructions, such as a front-end application, such as via multiprocessing or multithreading. The program instructions are processing instructions, such as add, move data, or branch, but the cores can run multiple instructions concurrently, thereby increasing an overall operational speed for the front-end application, which is amenable to parallel computing. The cores can process in parallel when concurrently accessing a file or any other data structure, as disclosed herein, while being compliant with atomicity, consistency, isolation, and durability (ACID) principles, which ensure that such data structure operations/transactions, such as read, write, erase, or others, are processed reliably. For example, a data structure can be accessed, such as read or written, via at least two cores concurrently without locking the data structure between such cores. For example, a figure and a text can be concurrently processed, as disclosed herein. Note that there can be at least two cores, such as two cores, three cores, four cores, five cores, six cores, seven cores, eight cores, nine cores, ten cores, twelve cores, tens of cores, hundreds of cores, thousands of cores, millions of cores, or more. The cores may or may not share caches, and the cores may or may not implement message passing or shared-memory inter-core communication methods. Common network topologies to interconnect cores include bus, ring, two-dimensional mesh, and crossbar. Homogeneous multi-core systems include only identical cores, heterogeneous multi-core systems can have cores that are not identical. The cores in multi-core systems may implement architectures, such as very long instruction word (VLIW), superscalar, vector, or multithreading. Whether additionally or alternatively, the process 100 can also be performed by a graphics card, a graphics processing unit (GPU), a programming logic controller (PLC), a tensor core unit, a tensor processing unit (TPU), an application specific integrated circuit (ASIC), or another processing circuit, whether on a stationary or mobile platform, whether in a single or distributed over a plurality of data centers or server farms. The process 100 can be a process on its own or can be a sub-process within another process, which can be a distributed process.

Note that although the process 100 is described in context of classical computing, the process 100 (or any other processes described herein) can be implemented via or supplemented via a quantum computing system (e.g., work in conjunction with classical computing). For example, the quantum computing system can a superconducting architecture (e.g., lattice, bowtie), nonlinear superconducting resonator architecture, annealing architecture, or others of any manufacturer (e.g., Google, IBM, D-Wave, Intel, Rigetti). For example, some systems and methods can be programmed for determining when and how to leverage quantum computing devices or systems when solving computational tasks (e.g., visual association, part name annotation, character recognition, image segmentation, character segmentation, part number recognition, handwriting recognition, part name identification, label shaping, label positioning, database searching, text summarization, specification summarization, independent or dependent or multiple dependent claim summarization, legend formation, part name-part number mapping for hyperlinking, artificial neural network training, deep learning). For example, some of the systems can receive computational tasks, (e.g., optimization tasks, character recognition, handwriting recognition, part number recognition, image segmentation, character segmentation, part name placement, shape positioning, text summarization, specification summarization, independent or dependent or multiple dependent claim summarization, legend formation, part name-part number mapping for hyperlinking, artificial neural network training, deep learning) to be performed. For example, some of the systems may be an optimization engine, which can be selectively started, running, stopped, or paused, that is configured to receive input data and to generate, as output, an optimal solution to an optimization task (e.g., part number recognition, image segmentation, character segmentation, part name placement, text summarization, specification summarization, independent or dependent or multiple dependent claim summarization, artificial neural network training, deep learning) based on the received input data. For example, the optimal solution can be probability-based as being most likely outcome. The received input data can include static or real-time data, which can include text, images, coordinates, sounds, patent or non-patent (e.g., technical articles, encyclopedia articles, technical manuals, product manuals, engineering blueprints, construction blueprints, building blueprints) informational documents (e.g., PDF files, HTML files, XML files, JSON data structures), or others. Some of the systems can outsource or offload computations associated with the received computational tasks to one or more local or remote external devices (e.g., cloud computing instances, hardware or virtual servers). Some of the systems may preprocess the computational tasks (e.g., preprocess patent figures, preprocess patent specification, preprocess independent or dependent or multiple dependent claims, artificial neural network training, deep learning) before outsourcing the computational tasks, which can include separating or grouping a received computational task into or with one or more sub-tasks (e.g., process patent figure segment). The external devices can include quantum computing devices (e.g., quantum annealers, quantum simulators, quantum gate computers) and classical computing devices (e.g., standard classical processors or supercomputers). Some of the systems can decide when and where to outsource various computations associated with the received computational tasks. Such task routing may be a complex problem that may be dependent on many factors. Some of the systems can be trained to learn optimal routings of received computational tasks (e.g., part number recognition, part name placement, image segmentation, character segmentation, text summarization, specification summarization, independent or dependent or multiple dependent claim summarization, legend formation, part name-part number mapping for hyperlinking, artificial neural network training, deep learning) using a set of training data (e.g., image segments, font types, character templates, text corpora, technical documents, patent literature, technical or product manuals, engineering or construction or building blueprints). The training data can include data from several sources, which may be used to generate multiple training examples.

Some or each training example can include (i) input data relating to a previous computational task, such as data specifying the task, size/complexity of the task, restrictions for solving the task, error tolerance, (ii) information relating to which computational device was used to solve the task, or (iii) metrics indicating a quality of the solution obtained using the device, (e.g., level of confidence in solution, computational time taken to generate solution, computational costs incurred). Other data may be included in the training data, including an indication of the computational resources available when processing the previous computational tasks, a number of qubits used in the quantum devices, ability of algorithms running on the quantum devices or classical devices to process the problem, costs of using the classical or quantum devices, or reliability of classical or quantum devices. Some of the systems can learn to adapt the routings of computational tasks based on traffic flow in the system, (e.g., if many computational tasks are received, then a machine learning module or a computational logic may learn to prioritize certain tasks or subtasks, or learn when more efficient to wait for a particular computational device to become available again or when more efficient to route a task to a second-choice computing device). Training can include applying conventional or proprietary or other machine learning techniques for various tasks (e.g., part number recognition, part name placement, image segmentation, character segmentation, text summarization, specification summarization, independent or dependent or multiple dependent claim summarization, legend formation, part name-part number mapping for hyperlinking, or others based on computing a loss function or backpropagating gradients, artificial neural network training, deep learning). Once the machine learning module or computational logic has been trained, then the machine learning module or computational logic may be used at runtime for inference (e.g., to receive new computational tasks to be performed and to find an improved routing of the computational tasks in order to obtain solutions to the received tasks). For example, some of such tasks can include part number recognition, part name placement, image segmentation, character segmentation, text summarization, specification summarization, part name and part number tokenization, independent or dependent or multiple dependent claim summarization, legend formation, part name-part number mapping for hyperlinking, or others.

Note that other forms of computing can be used, whether additionally or alternatively. For example, photons within neural network (tensor) processing units (e.g., TPUs) can be used for various neural network, machine learning, deep learning, or other computing tasks, as disclosed herein. For example, a photonic tensor core can be used as an integrated photonics-based tensor core unit by strategically utilizing (i) photonic parallelism via wavelength division multiplexing, (ii) high 2 peta-operations-per-second throughputs enabled by tens of picosecond-short delays from optoelectronics and compact photonic integrated circuitry, and (iii) near-zero static power-consuming novel photonic multi-state memories based on phase-change materials featuring vanishing losses in the amorphous state. Combining these physical synergies of material, function, and system, the performance of this 4-bit photonic tensor core unit can be 1 order of magnitude higher for electrical data. This photonic tensor processor enables processing of optical data, which can enable a 2-3 orders higher performance (operations per joule), as compared to an electrical tensor core unit, while featuring similar chip areas. The photonic specialized processors have the potential to augment electronic systems, whether classical or quantum, as disclosed herein, for any computing tasks disclosed herein. For example, a neuromorphic computing system (e.g., IBM TrueNorth, Intel Kapoho Bay system, Intel Pohoki Springs system, Intel Pohoiki beach, Intel Loihi architecture, a cognitive computer) can be used, which can be embodied in a datacenter rack-mounted system. For example, the neuromorphic system can be used for constraint satisfaction problems (e.g., character recognition, fuzzy-logic, part name placement, label shaping, neural network model training, learning from user edits or positioning of labels), which require evaluating a large number of potential solutions to identify the one or few that satisfy specific constraints. For example, the neuromorphic computing system can be used for searching graphs for optimal paths, such as finding the shortest route between locations (e.g., useful for label positioning) or searching for pixel or voxel patterns.

Block 110 includes matching (e.g., content, format, size, full, partial, fuzzy) a reference (e.g., alphanumeric, monospaced or proportional font content, cursive content, typewritten content, number, barcode, part number, layer name abbreviation, orientation symbol) recognized (e.g., computer vision, OpenCV, OCR, optical word recognition, Intelligent Character Recognition (ICR), Intelligent Word Recognition (IWR), barcode reading, text area detection, edge detection, segmentation, image segmentation, character segmentation, object detection, feature detection, sketch identification) in a figure (e.g., patent figure, blueprint figure, architectural figure, user device or system manual figure, medical imaging figure, engineering figure, CAD figure, anatomical figure, music sheet, image, JPG image, TIFF image, photo album, photo, social networking service image or photo) to an identifier (e.g., alphanumeric, word or words, barcode, QR code, part name, layer name, orientation name, object name, pattern identifier, metadata tag) found (e.g., text processing, natural language processing (NLP), natural language understanding, rule-based or statistical or syntax or semantic or discourse or speech processing, entity recognition, regular expressions, auto-generated text summarization) in a text (e.g., structured text, non-structured text, column, paragraph, sentence, data structure, cell, table) corresponding to the reference (e.g., one-to-one, one-to-many, many-to-one, many-to-many). For example, the figure can be on its own or included in a figure sheet or image or page. For example, the figure sheet or image or page can depict a single figure or a plurality of figures. The reference identifies the element referred to by the reference (e.g., by tokenized proximity in text, positional proximity to left or right or up or down by a preset number of tokens or positions or empty spaces or non-letter or non-number characters in text). Note that the patent figure can be of utility, design, or plant type of published patent application or issued patent, whether abandoned, maintained, pending, granted, or expired, whether of US patent format or foreign patent format (e.g., JPO, CIPO, SIPO, KIPO). For example, the US patent format can include provisional, utility, design, plant, reissue, defensive publication, statutory invention registration, additional improvement, X-patent, or others. Further, note that non-patent figure can be used as well (e.g., utility model).

For example, finding the identifier in the text can involve grammar induction, lemmatization, morphological segmentation, part-of-speech tagging, parsing (e.g., dependency, constituency), parse tree generation (e.g., probabilistic context-free grammar, stochastic grammar), sentence breaking, stemming, word segmentation, terminology extraction, lexical semantics, distributional semantics, machine translation, named entity recognition, natural language generation, natural language understanding, recognizing textual entailment, relationship extraction, sentiment analysis, topic segmentation or recognition, word sense disambiguation, automatic summarization, coreference resolution, discourse analysis, speech recognition, speech segmentation, or other techniques that run on text (e.g., files, columns, paragraphs, sentences). For example, such processing can be based on part numbers in patent text.

The reference in the figure can include an alphanumeric character (e.g., letter, number, grammar character, punctuation mark) visually tagging or labeling or referring (e.g., solid or broken or rectilinear or non-rectilinear lines or other shapes, positional proximity) to an element (e.g., object shown, subpart of object, layer of object, orientation of object, dimension of object, property of object) of the figure. One or more alphanumeric characters (e.g., 1, 26, 321f, 221-H, 533-3, car, d2!a, #g2) may be used, or even non-alphanumeric character references (e.g., barcode, QR code, symbol, graphic) may be used. For example, the reference can be or include symbols as well. The identifier can include a name or a brief description of the element or part, which is often textually described but can be non-textually described or linked to as well (e.g., barcode, QR code). Alternatively, the identifier can include a plurality of terms, a sentence, or a paragraph.

The identifier can be capped at a preset number of words or letters or characters linguistically preceding or associated with a content (e.g., alphanumeric, number) associated with or corresponding to the reference in the figure. For example, the identifier can be one, two, three, four, five or more words preceding the content associated with or corresponding to the reference in the figure. For example, the identifier can be capped based on a dictionary of words, which can be user-customized. For example, the identifier can be a single word preceding the content associated with or corresponding to the reference in the figure, unless the identifier is within the dictionary. In such case, the identifier can be more than one word (e.g., two, three, four). For example, the dictionary can include terms inclusive of member, means, element, device, system, about, verbs, adverbs, or others. For example, if the identifier is capped at one, then "a heating element 12" or "the heating element 12" may be processed as "element" or "element 12," which may be user uninformative, but if capped at two, then "heating element" or "heating element 12" can be captured. For example, the dictionary can include words in one language or more than one language (e.g., English, Russian, Hebrew, Arabic, Mandarin, Cantonese, Hindi, Dutch, Japanese, Korean, German, French). In such case, those words can be translated before, during, or after locating the identifier.

In order to locate the reference in the figure, various techniques can be performed on the figure. For example, the figure can be converted into an image (e.g., JPEG, TIFF), whether into higher or lower resolution, while maintaining or improving content quality of the image. For example, the image can be pre-processed (e.g., horizontal or vertical de-skew, noise reduction, despeckle, binarization, line removal, layout analysis/zoning, line and word detection, script recognition, character isolation/segmentation, script recognition, normalize aspect ratio or scale, or others). In some cases, a two-pass approach to character recognition can be used to recognize the reference in the image, where the second pass (e.g., adaptive recognition) uses the letter/number shapes recognized with high confidence on the first pass to recognize better the remaining letters on the second pass, which can be advantageous for unusual fonts or handwriting or cursive fonts or low-quality scans where the font is distorted (e.g., blurred or faded). In some cases, the reference, as recognized, can be stored in a data structure (e.g., JSON, ALTO format, XML schema). In some cases, the reference is more accurately increased when recognition is constrained by a lexicon or a dictionary (e.g., list of content that are allowed to occur or be found), which can be user-customized. For example, the lexicon or the dictionary can be based on the identifier(s) found in the text, which can be based on various text processing at least as described herein. For example, the lexicon or the dictionary can be some, many, most, or all words in English language or a set of numbers (e.g., 0-10000 which can include or not include whole numbers or decimal numbers or numbers separated by a grammar character or a period or a dash or underscore) or a technical lexicon for a specific field or a list of nouns or adjective-noun pairs. The identifier can be output to a plain text stream or file of characters or preserve an original layout of the figure and produce, for example, an annotated PDF or image that includes both an original image of the page and a searchable textual representation. Note that the page can include a sheet or vice versa. For example, a sheet or page can include a single figure or a plurality of figures.

Typically, the name of the element is disclosed in a description of the figure (e.g., HTML file, PDF file, MS Word file, XML file, JSON file). For example, in a patent figure a number 10, which can be the reference, can visually refer to an element of the figure, such as a chair. A word "chair" can be the identifier that is disclosed in a related patent text (e.g., same file, different file, local or remote from each other) describing the patent figure.

Block 120 includes visually associating (e.g., positioning proximity, laying over figure or object in figure, generating popup, hover over or pointer over, slide out) in the figure the identifier with the reference. Block 120 can be performed close in time (e.g., within 1 hour, within 30 minutes, within 15 minutes, within 10 minutes, within 5 minutes) or far apart in time to block 110 (e.g., several days apart). One way of visually associating (e.g., annotating) the identifier with the reference is by placing the identifier positionally adjacent to the reference over the figure or within the figure (e.g., modifying figure). Alternatively, non-adjacent visual association is possible as well where the identifier refers to the reference irrespective of where the identifier is placed on the figure (e.g., corner, several inches or pixel or voxel equivalents apart, margins). Thus, the word "chair" does not have to be positionally adjacent to the number 10 (reference). As long as there is a visual association between the word "chair" and the number 10 or a reader can perceive/believe that there is a visual association, even if the word "chair" is at a far distance from the number 10 (e.g., at corner of page or figure, at bottom center or top center of page or figure, along left or right side of page or figure, margins), a user can easily identify what the number 10 is referring to. An example of an adjacent visual association is if the number 10 in the figure visually refers to a chair, then the word "chair" is placed adjacent (e.g., within about 10, 9, 8, 7, 6, 5, 4, 3, 2, 1 inches or pixel or voxel equivalents) to the number 10 (e.g., avoid overwriting 10). Thus, a viewer of the figure (e.g., student, scientist, hobbyist, engineer, patent professional) can easily identify what the number 10 is referring to, without having to peruse the patent text to find the identifier. Visual associating the identifier with the reference corresponding thereto, even when two are not adjacent on same page or same document, is described herein. Note that although visual association is described as one example of action, other actions as described herein can also be performed, whether or not the references have been matched to the identifiers. For example, create, read, update and delete (CRUD) functionality can be enabled with annotation placements, annotation searching, specification or claim auto-summarization, or other actions described herein.

The figure or the page can be automatically, responsively, or manually rotated (e.g., less or more than inclusively within about 15 degrees, 30 degrees, 45 degrees, 60 degrees, 90 degrees, 120 degrees, 180 degrees, 270 degrees, 360 degrees, 720 degrees on Cartesian plane) before, during, or after part number recognition for recognition accuracy (e.g., pre-processing, segmentation, image segmentation, character segmentation) or for user readability. This rotation (e.g., clockwise or counterclockwise) may or may not rotate part numbers or part names. For example, when image rotation occurs and part numbers are correspondingly rotated, then at least some part names may remain not rotated to enable user readability. For example, this can occur when part names are presented based on image coordinates of part numbers that are recognized (e.g., enclosed within bounding boxes) and rotation of part numbers (or entire image) occurs while part names remain stationary or non-rotating. At least some rotation (e.g., clockwise or counterclockwise) can take place based on recognition of orientation or pitch of various part numbers in the figure (or the page) or standardized headings (e.g., sheet numbers, specific text) on the page. For example, if a part number X is recognized to be not upright (e.g., oriented or pitched to 9 o'clock or 3 o'clock), which can be relative to a figure content that is typically upright (e.g., relative to alphanumeric or barcode information on page margins, patent publication number, patent number, number of sheets) when that figure is presented in a default presentation (e.g., portrait), then the part number X or the figure can be rotated to be upright, which may make not upright the figure content that is typically upright.

Rotating the part number X to be upright but keeping the figure not upright, or rotating the figure to be upright but keeping the part number X not upright can include overwriting the figure or presenting a new upright part number (still X) over the not upright part number X or the not upright figure. For example, a technique for correcting orientation of patent figures for efficiently reviewing and analyzing a patent document (e.g., patent application, published patent document or patent) can include reading a patent image, identifying a figure page(s) in the patent image, determining which of the figure page(s) were originally prepared in a landscape orientation (e.g., based on figure identifier or figure sheet identifier and number orientation, part number orientation), and modifying or rotating those figure pages to be in a landscape orientation, thereby rotating the figure page clockwise or counterclockwise 90 degrees (or 45 degrees or 60 degrees or 180 degrees or 270 degrees or others). For example, an image can have (1) a figure identifier and corresponding number (e.g., FIG. 3, FIG. 12a) or a part number (e.g., 10, 7B) oriented in a first manner (e.g., landscape) and (2) a standardized heading (e.g., figure sheet number, standardized text) oriented in a second manner (e.g., portrait), when the image is presented in a default presentation (e.g., portrait). As such, an orientational difference can be determined between (1) the figure identifier or the corresponding number or the part number, and (2) the standardized heading, since the first manner orientationally differs from the second manner or vice versa (e.g., by about 90 degrees). Resultantly, the image can be automatically or responsively rotated (e.g., clockwise, counterclockwise) such that (1) the figure identifier or the corresponding number or the part number are oriented in the second manner, and (2) the standardized heading is oriented in the first manner or a third manner that may be different from the first manner and the second manner.

Another way that automatic or responsive image rotation can occur when the image is presented in a default presentation (e.g., portrait) can include determining if the figure identifier (e.g., Fig. or FIG) or the corresponding number (e.g., 3) or the part number are oriented not upright or in the landscape orientation or not in the portrait orientation and then automatically or responsively rotating the image such that the figure identifier or the corresponding number or the part number are upright or not in the landscape orientation or in the portrait orientation. For example, information that is typically upright in a default portrait mode (e.g., alphanumeric or barcode information on top or bottom or side page margins, patent publication number, patent number, number of sheets, patent authority name or abbreviation) can be used as a reference point from which to determine what alphanumeric content (e.g., part number, figure identifier, figure number identifier) is and what alphanumeric content (e.g., part number, figure identifier, figure number identifier) is not upright. In some embodiments, a default landscape mode can be used as well.

FIG. 2 is a flowchart of an embodiment of a visual association process according to this disclosure. In particular, a process 200 includes blocks 210-250. The process 200 (or any steps thereof) can be performed, whether serially or in parallel with each other, via a single core processor or a multi-core processor, irrespective of whether the cores are local to each other. For example, the multicore processor can include a plurality of independent cores. For example, the multicore processor is a computing component with two or more independent processing units, which are the units that read and execute program instructions, such as a front-end application, such as via multiprocessing or multithreading. The instructions are processing instructions, such as add, move data, or branch, but the cores can run multiple instructions concurrently, thereby increasing an overall operational speed for the front-end application, which is amenable to parallel computing. The cores can process in parallel when concurrently accessing a the or any other data structure, as disclosed herein, while being compliant with ACID principles, which ensure that such data structure operations/ transactions, such as read, write, erase, or others, are processed reliably. For example, a data structure can be accessed, such as read or written, via at least two cores concurrently, without locking the data structure between such cores. Note that there can be at least two cores, such as two cores, three cores, four cores, five cores, six cores, seven cores, eight cores, nine cores, ten cores, eleven twelve cores, tens of cores, hundreds of cores, thousands of cores, millions of cores, or more. The cores may or may not share caches, and the cores may or may not implement message passing or shared-memory inter-core communication methods. Common network topologies to interconnect cores include bus, ring, two-dimensional mesh, and crossbar. Homogeneous multi-core systems include only identical cores, heterogeneous multi-core systems can have cores that are not identical. The cores in multi-core systems may implement architectures, such as VLIW, superscalar, vector, or multithreading. The process 200 can also be performed by a graphics card, a GPU, a tensor core unit, a TPU, a PLC, an ASIC, or another processing circuit, whether on a stationary or mobile platform, whether in a single or distributed over a plurality of data centers. The process 200 can be a process on its own or can be a sub-process within another process, which can be a distributed process. For example, the process 200 can be a sub-process of the process 100. Note that although the process 200 is described in context of classical computing, the process 200 (or any other processes described herein) can be implemented in or supplemented by the quantum computing system, as disclosed herein.

Block 210 includes searching (e.g., text search, barcode search, graphic search, symbol search, object search) within a figure (e.g., image, TIFF, JPG, PDF, video, CAD file) for a reference (e.g., alphanumeric, part number) referring to an element (e.g., part, object) of the figure. The searching can include computer vision, OpenCV, OCR, barcode reading, edge detection, segmentation, image segmentation, character segmentation, text area detection, object detection, feature detection, sketch detection, or other image processing algorithms. The figure is searched to locate references, such as alphanumeric and non-alphanumeric characters referring to elements (e.g., parts, objects, layers, components) in the figure. Searching within the figure for the reference can be within selective geographic regions (e.g., open shape region, closed-shape region, symmetrical region, asymmetrical region, box region, rectangle region, square region, trapezoid region, circle region, oval region, triangle region, pentagon region, octagon region, non-margin region) of the figure. Some of the selective geographic regions can be selected (e.g., region drawn, box drawn, X-Y coordinates input, touch or gesture shape creation, area-to-exclude) by the user (e.g., mouse, keyboard, stylus, pen, gesture, touch-input, photo or video extraction of photo or video file, spoken language extracted from audio file, text coordinates from text or settings data structure or MS Word file). A determination can be made of which selective geographic regions of the figure can be performed automatically, via a preset rule (e.g., specific quadrant or grid element) or manually, as explained above. The figure can be searched via text searching, after computer vision, OCR, barcode reading, edge detection, segmentation, image segmentation, character segmentation, object detection, feature detection, or other image processing algorithms, or other algorithms have run on that figure.

The reference can be typewritten or handwritten (e.g., cursive) on the figure. As such, there can be a default recognition algorithm (e.g., for typed content or for handwritten content) and then the user can select another recognition algorithm, if necessary, or if the user is unhappy with some recognition results, as displayed, or as, notified, via a confidence score for recognition quality (e.g., based on how many part numbers were expected based on text analysis versus how many part numbers were actually recognized in figure). However, both recognition algorithms can be run concurrently or serially. For example, typewritten recognition algorithm can run first and then handwritten recognition algorithm or vice versa.

Block 220 includes copying (e.g., one-at-time, LIFO, FIFO, push, pull) the found references into a data structure. For example, the data structure can include a matrix, a queue, an array, a vector, a stack, a deck, a linked list, a hash, a table, a tree, a quadtree, a database, or others. For example, the database can include a relational database, a NoSQL, an in-memory database, a graphical database, an object database, a post-relational database, or others. The database can store data, whether in a raw state, a formatted state, an organized stated, or any other accessible state, and allows access to such data, whether directly and/or indirectly. For example, the reference that can be found can be is an alphanumeric character or string, such as part number 10 or 23T or 37-1 or b16 or C_130.

Block 230 includes searching (e.g., full string search, approximate string search, fuzzy string search) within the text describing the figure for the identifier corresponding to the reference. Although typically a single reference refers to a single identifier, a possibility exists of another type of correspondence (e.g., one-to-many, many-to-one, many-to-many). In such case, either an error message or not found message or not indexed message can be generated and displayed, which can be or avoid being positionally adjacent to the reference. Further, a mode computation/frequency analysis with respect to the reference or the identifier can be made from which a determination can occur as to which identifier should be displayed adjacent to the reference. For example, the mode term can be flagged and the mode term is used for any subsequent blocks. Flagging of the mode term can be used later to visually indicate potential imprecision of visual association (e.g., confidence score). For example, if the text describes a reference 23 ten times in positional proximity of the identifier cup (e.g., within preset amount of words or same sentence or same paragraph) and six times in positional proximity of the identifier glass, then since cup is more frequently used than vessel, then the reference 23 can refer to the cup.

When other than one-to-one correspondence between the reference and the identifier exists, the user can be presented with a prompt or message informative of such situation (e.g., estimation taking place based on frequency analysis). Likewise, a bounding box (or another visual marker) or shape (e.g., closed, open, symmetrical, asymmetrical) that is of a different border or fill color (or hatching) relative to the part name with the one-to-one correspondence. Note that other forms of visual or sensory distinction are possible. For example, different fonts, font sizes or colors, bounding box or visual marker sizes or colors, sounds, haptic feedback (upon user touch when touching haptic display), virtual assistant (e.g., Alexa, Cortana, Siri, Watson) notification (e.g., sound, vibration), communication (e.g., email, social network post, chat, call) or others. For example, when using the virtual assistant then a skill (e.g., Alexa style) for that assistant can be programmed to act in accordance with this disclosure (e.g., visual association). For example, when using the virtual assistant then there can be a plurality of supported devices (e.g., smart speakers, TVs and media boxes, phones and tablets, laptops and desktops, smart home, wearables and earphones, vehicles, automotive).

Searching within the text describing the figure can be done on the text as a whole or within only various portions (e.g., columns, pages, paragraphs, sentences, claims) of the text (e.g., detailed description, claims, abstract) as selected by the user, whether a human (e.g., highlighting, coloring text background or fonts, drawing shape inclusive of that text, zooming into that text, spoken commands) or a machine/software, as preprogrammed in advance. A determination of which selective portions of the description can be made automatically via a preset rule or manually. For example, the shape enclosing that text can include an open shape region, closed-shape region, symmetrical region, asymmetrical region, box region, rectangle region, square region, trapezoid region, circle region, oval region, triangle region, pentagon region, octagon region, or others. For example, such selective portion can be input via capturing a photo with that text and then having text recognition algorithms, as described herein, recognize and read that text. For example, these algorithms can include computer vision, OpenCV, OCR, barcode reading, text area detection, edge detection, segmentation, image segmentation, character segmentation, object detection, feature detection, sketch detection, NLP, regular expressions, or others. For example, a user can orally dictate in natural language which part of text should be searched based on a set of criteria (e.g., where text or column or paragraph or sentence can be found, where text or column or paragraph or sentence starts, where text or column or paragraph or sentence ends, paragraph number, paragraph range, topic, topic range).

Block 240 includes copying (e.g., LIFO, FIFO, push, pull) the found identifier into the data structure, as explained above.

Block 250 includes visually associating in the figure the identifier with the reference, as described herein.

FIG. 3 is a flowchart of an embodiment of a visual association process according to this disclosure. In particular, a process 300 includes blocks 310-340. The process 300 (or any steps thereof) can be performed, whether serially or in parallel with each other, via a single core processor or a multi-core processor, irrespective of whether the cores are local to each other. For example, the multicore processor can include a plurality of independent cores. For example, the multicore processor is a computing component with two or more independent processing units, which are the units that read and execute program instructions, such as a front-end application, such as via multiprocessing or multithreading. The instructions are processing instructions, such as add, move data, or branch, but the cores can run multiple instructions concurrently, thereby increasing an overall operational speed for the front-end application, which is amenable to parallel computing. The cores can process in parallel when concurrently accessing a file or any other data structure, as disclosed herein, while being compliant with ACID principles, which ensure that such data structure operations/transactions, such as read, write, erase, or others, are processed reliably. For example, a data structure can be accessed, such as read or written, via at least two cores concurrently without locking the data structure between such cores. Note that there can be at least two cores, such as two cores, three cores, four cores, five cores, six cores, seven cores, eight cores, nine cores, ten cores, eleven cores, twelve cores, tens of cores, hundreds of cores, thousands of cores, millions of cores, or more. The cores may or may not share caches, and the cores may or may not implement message passing or shared-memory inter-core communication methods. Common network topologies to interconnect cores include bus, ring, two-dimensional mesh, and crossbar.

Homogeneous mufti-core systems include only identical cores, heterogeneous multi-core systems can have cores that are not identical. The cores in multi-core systems may implement architectures, such as VLIW, superscalar, vector, or multithreading. The process 300 can also be performed by a graphics card, a GPU, a tensor core unit, a TPU, a PLC, an ASIC, or another processing circuit, whether on a stationary or mobile platform, whether in a single or distributed over a plurality of data centers. The process 300 can be a process on its own or can be a sub-process within another process, which can be a distributed process. For example, the process 300 can be a sub-process of the process 100. Note that although the process 300 is described in context of classical computing, the process 300 (or any other process described herein) can be implemented in or supplemented by the quantum computing system, as disclosed herein.

Block 310 includes searching within the text describing the figure the identifier corresponding to the reference referring to the element within the figure. The text searching can include various algorithms, as described above.

Block 320 includes storing the found identifier in the data structure, as described above.

Block 330 includes searching the figure for the reference (e.g., one reference at a time, multiple references at a time). The figure can be searched for the reference via creating a map of locations (e.g., data structure, hash, table, database, array, vector, list, stack, queue). For example, the map of locations can be or avoid being stored in a matrix, a queue, an array, a vector, a stack, a deck, a linked list, a hash, a table, a tree, a quadtree, a database, or others. For example, the database can include or avoid including a relational database, a post-relational database, a graphical database, an object database, a NoSQL, an in-memory database, or others. The database can store data, whether in a raw state, a formatted state, an organized stated, or any other accessible state, and allows access to such data, whether directly and/or indirectly. The map of locations includes data informative of regions where in the figure the references are located (e.g., coordinates, XY coordinates, XYZ coordinates, pixel coordinates, object coordinates, label coordinates, part coordinates). The figure can be searched for the reference via searching for a presence of just the reference, as described herein. Note that figure can be searched concurrent with text being searched as well.

Block 340 includes visually associating in the figure the stored identifier with the reference that has been found, as described herein.

FIGS. 4A-4E are various diagrams depicting various embodiments of visual associations according to this disclosure.

FIG. 4A depicts a patent figure (e.g., published US or foreign patent application, issued US or foreign patent, un-filed patent figure, technical drawing page or figure sufficient for patent filing, PowerPoint patent figure, MS Excel patent figure, MS Word patent figure, Google Drive patent figure, a file viewer patent figure, PDF patent figure, CAD patent figure, Solidworks patent figure, TIFF patent figure, JPEG patent figure, HEIC patent figure) prior to visual association. Although depicted figure is a patent figure, other types of figures (e.g., architectural, engineering, anatomical, scientific, historical, blueprints, user manual, financial, geographical landscape, medical imaging, social media photos, photo album images, aerial or satellite maps, surveillance images) having a textual description or annotation or metadata or a textual or non-textual element legend or a text or non-text data set associated with or informative of at least some content of the figures can be used as well. For example, these figures can differ in content format or presentation (e.g., fonts, parts, details, scale, color). For example, these figures can be any types of views inclusive of perspective views, side views, top views, bottom views, profile views, birds-eye views, satellite views, aerial imagery views, zoomed in or out views, exploded views, or sub-views of objects, terrain, or characters shown. Any type of content (e.g., mechanical, electrical, software, chemical, biological, geographical, financial, architectural, blueprint, user manual, surveillance, medical, aerial, satellite, social media) can be depicted in the figure. The figures can be any types of figures (e.g., object depictions, diagrams, flowcharts, tree diagrams, timing diagrams, chemical compounds). The figures can be grayscale, white/black or color, whether by figure, part, or object perimeter being of that visual type or area filled-in of that visual type. The figures can be linked or broken into a plurality of sub-figures depicting one object together, whether on a single page or distributed among many pages, whether in a single file or a plurality of files. The figures can be drawn by hand, created via a computer (e.g., CAD, graphic drawing program) or automatically drawn (e.g., based on text, image, sound, code input).

FIG. 4B depicts references stored within a data structure, as described herein. The references are obtained from computational analysis of FIG. 32 as depicted in FIG. 4A. This analysis can be performed via computer vision, OCR, or other processes, as described herein.

FIG. 4C depicts descriptive text (e.g., patent detailed description) describing elements depicted in FIG. 4A. The elements are referenced by the references shown in FIG. 4A and stored within the data structure of FIG. 4B. The descriptive text can be stored in the same file as FIG. 32 as depicted in FIG. 4A or the descriptive text can be stored in a different file, whether a same computational resource or a different computational resource, from the file containing FIG. 32 as depicted in FIG. 4A.

FIG. 4D depicts the data structure after the descriptive text depicted in FIG. 4C has been parsed (e.g., stop words, tokens, punctuation, empty space) and matched accordingly, which can occur in one or more steps/processes. As shown in FIG. 4D, paragraph [0079] has been parsed, which can be according to the references stored in the data structure and corresponding identifiers are stored in the data structure. Thus, the data structure stores the identifiers corresponding to the references based on part numbers in the figure matching part numbers in the text where the part numbers in the text are positionally proximate to the part names (e.g., within 5, 4, 3, 2, 1 words or terms). Note that although a single data structure is shown, this can vary by having a distributed data structure, where references are stored in a first data structure (e.g., table) and identifiers are stored in a second data structure (e.g., table), and there is a logical relationship between the first data structure and the second data structure. For example, the logical relationship can be a primary key or others.

FIG. 4E depicts different ways of visually associating the identifiers with the references.

The identifier "first database" is placed adjacent to the reference 10 using a line (e.g., solid, broken, black, non-black, rectilinear, non-rectilinear, curved, arcuate, zigzag, pulse-shaped, sawtooth) longitudinally extending between the identifier and the reference. The identifier can be in the same or not in the same font or font size or font color as the rest of the figure, as set automatically via a computer or manually via a user. Note that first letter can be capitalized or not capitalized, as preprogrammed in advance. The identifier, the reference or the line can be highlighted or positioned or enclosed within a shape (e.g., bounding box or others as described herein). Although a single line is shown, there can be a plurality of lines or a linear pattern extending between the identifier and the reference.

The line can also visually associate a plurality of elements (e.g., one-to-many correspondence between identifier and references). The line can be a straight line or a curved or zigzag line or others, as described herein. The line can be without any gaps or the line can be defined via a plurality of closely spaced elements, which can be iconic, symbolic, graphic, alphanumeric, or others. The line can be a plurality of aligned or non-aligned or parallel or non-parallel lines (e.g., braid). The line can be placed over other elements (e.g., objects, part numbers, part names) or avoid placement over other elements, references or identifiers.

A determination can be made as to how to properly position or place the line. For example, this determination can include whether the line can be placed or avoid to be placed over other elements, references or identifiers (e.g., based on white space, average black or non-black pixel counts per area). The user can select how to properly place the line or maneuver, drag, drag and drop, or other ways of moving the line on the figure, as user desires (e.g., cursor, stylus, finger). The line, the reference or the identifier or any of their portions can be of any color (e.g., black, white, yellow, red, orange, purple, green). The line can be colored as set manually or automatically (e.g., based on color saturation on image, color contrast, color background, too much or too little of a specific color on figure). The line can be colored to be or avoid being visually distinct from the reference, the identifier or the element or other elements, references or identifiers. The line can be or avoid being hyperlinked, whether uni-directionally or bi-directionally. Upon clicking or pointer or cursor hovering, the hyperlink can lead or avoid leading to other elements, references and identifiers whether in the present figure, other figures, the text description or other text descriptions, whether or not in the same figure or page or file. Upon clicking or pointer or cursor hovering, the hyperlink can allow or avoid allowing for tooltips, popups, hover-overs or slide-outs to disclose information (e.g., text, images, sound) relating to the element, reference or identifier or other elements, references or identifiers, whether or not in the same figure or page or file.

Visual association can be performed via placing (e.g., presenting) or avoiding placing the identifier positionally adjacent to the reference in the figure and placing or positioning a shape (e.g., rectangle, square, box, circle, oval, trapezoid, closed or open, symmetrical or asymmetrical) over the reference and the identifier on the figure, whether avoiding or non-avoiding presenting over parts or objects or part numbers shown in figure. As such, the shape can fully or partially enclose the identifier and the reference. The shape can have or avoid having a delineation or perimeter or circumference or background or foreground, or the identifier, or the reference or any of their portions to be colored (e.g., yellow, red, black, white, orange, green, purple, pink) for visual distinction from other content. The shape can be defined or avoid being defined via a single line or a plurality of lines, dots, minuses, pluses, punctuation symbols, graphics, or other visual elements, including alphanumeric characters. The shape can be or avoid being a tooltip or a bubble, whether a popup, a hover-over or slide-out. The shape can be or avoid being a callout. The shape can be or avoid being hyperlinked or not. The identifier can be or avoid being in the same font or font size or font color as the rest of the figure, as set automatically or manually (e.g., based on color saturation on image, color background, color contrast in figure, too much or too little of a specific color on figure). The identifier, the reference or the line can be or avoid being highlighted or colored or bolded or italicized or underlined from default color or color shown (e.g., based on color saturation on image, color background, too much or too little of a specific color on figure). The identifier can be or avoid being placed over other elements, references, or identifiers (e.g., based on white space, average black or non-black pixel counts per area, object detection, part detection, feature detection). The identifier can be or avoid being hyperlinked, whether uni-directionally or bi-directionally. Upon clicking or pointer or cursor hovering, the hyperlink can lead or avoid leading to other elements, references and identifiers whether in the present figure, other figures, the text description or other text descriptions, whether or not in the same figure or page or file. Upon clicking or pointer or cursor hovering, the hyperlink can allow or not allow for popups, hover-overs or slide-outs to disclose information relating to the element, reference or identifier or other elements, references or identifiers, whether or not in the same figure or page or file.

The identifier "CPU" replaces the reference 20 as depicted in FIG. 4A. The identifier can be or avoid being in the same font or font size or font color as the rest of the figure, as set automatically or manually (e.g., based on color saturation on image, color background, color contrast in figure, too much or too little of a specific color on figure). The identifier can visually associate a plurality of elements (e.g., objects, components, layers). The identifier, the reference or the line can be or avoid being highlighted or colored or bolded or italicized or underlined from default color or color shown (e.g., based on color saturation on image, color background, too much or too little of a specific color on figure). The identifier can be or avoid being placed over other elements, references, or identifiers (e.g., based on white space, average black or non-black pixel counts per area, object detection, part detection, feature detection).

A determination can be made or avoid being made as to how to properly place or position or extend or avoid placing or positioning or extending the line. For example, the determination can determine whether to place or avoid placing or positioning or extending the line over other elements, references, or identifiers (e.g., based on white space, average black or non-black pixel counts per area). The user can select how the identifier replaces the reference in the figure (e.g., presentation parameters). The identifier or any of its portions can be of any color, as manually or automatically selected (e.g., based on color saturation on image, color background, color contrast, too much or too little of a specific color on figure). The identifier can be or avoid being colored to be visually distinct from the reference, the identifier or the element or other elements, references or identifiers. The identifier can be or avoid being hyperlinked, whether uni-directionally or bi-directionally. Upon clicking or cursor or pointer hovering, the hyperlink can lead or avoid leading to other elements, references, and identifiers whether in the present figure, other figures, the text description or other text descriptions, whether or not in the same figure or page or file. Upon clicking or pointer or cursor hovering, the hyperlink can allow or not allow for tooltips, popups, hover-overs or slide-outs to disclose information relating to the element, reference, or identifier or other elements, references or identifiers, whether or not in the same figure or page or file.

The identifier "second database" is placed within the element corresponding to the reference 30. The element (e.g., location, size, shape) is identified using various computer vision algorithms (e.g., object detection, feature detection, edge detection), as known in the art and as described herein. These algorithms can refer to an element library, as publicly or privately available to that user. Such library can be locally or remotely stored. The algorithms can identify the element via determining a linguistic meaning of the identifier, as looked up in internal or external library/database, whether local or remote. For example, if the identifier is a car, then the element can be identified by the computer vision algorithms looking for a car.

The element can be or avoid being delineated or filled with color for visual distinction relative to other content in that figure. The color can be manually or automatically selected. For example, the user can use a paint tool to color the element internally (like a coloring book), whether the element is automatically detected (e.g., object detection, edge detection, feature detection) or manually drawn. A plurality of identifiers, whether identifying same or different element, can be placed within the element and can be or avoid being visually distinct from other elements, references, and identifiers. The identifier, the reference, or the line can be or avoid being highlighted. The identifier can be or avoid being in the same font or font size as the rest of the figure, as set automatically or manually, or the font or font size can be different, as set automatically or manually. The identifier can visually associate a plurality of elements. The identifier can be or avoid being placed over other elements references, or identifiers.

A determination can be made how to properly place or position or extend the line. For example, the determination can determine whether to place or position or extend or avoid placing over other elements, references, or identifiers. The user can select how the identifier replaces the reference in the figure. The identifier, the reference, or any of their portions can be or avoid being of any color. The identifier can be or avoid being colored to be visually distinct from the reference, the identifier, or the element or other elements, references or identifiers. The identifier can be or avoid being hyperlinked, whether uni-directionally or bi-directionally. Upon clicking or pointer or cursor hovering, the hyperlink can lead or avoid leading to other elements, references and identifiers whether in the present figure, other figures, the text description or other text descriptions, whether or not in the same figure or page or file. Upon clicking or pointer or cursor hovering, the hyperlink can allow or not allow for tooltips, popups, hover-overs or slide-outs to disclose information relating to the element, reference or identifier or other elements, references or identifiers, whether or not in the same figure or page or file.

Note that various ways as explained herein can be mixed and matched in any permutational way. For example, associations, colors, or sizes modalities can be mixed and matched. Likewise, how first database identifier, CPU identifier, and second database identifier are visually associated can be mixed and matched in any permutational way.

Before, during, after, or as a step of recognizing the part number in the figure or identifying the part name in the text, the figure can be resized or re-scaled or re-zoomed, whether to increase or decrease, whether commanded manually or automatically. For example, these actions can be done at, less than, or more than 0.25×, 0.3×, 0.5×, 0.7×, 1×, 2×, 3×, 4×, 5×, 6×, 7×, 8×, 9×, 10×, or any values in between inclusive of ½, ⅓, ¼, ⅕, or others inclusive of any values in between, which can improve OCR accuracy when performed on such resized or re-scaled or re-zoomed figure sheet. For example, regardless of visual association, the figure can be shrunk or compacted so as to allow for placement of the identifier or a plurality of identifiers so as to allow for readability of the identifier or identifiers. For example, the figure can be rescaled, whether decreased or increased, before recognizing the part number in the figure, which can improve OCR accuracy. For example, the figure (or any portion thereof) can be rescaled to 2×, 3×, 4×, 5×, 6×, or more, which can improve OCR accuracy. For example, font sizes or shapes within which part names are shown can be automatically increased or decreased or kept the same before, during, or after recognition of the part name.

Any method of visual association can allow for any portion (e.g., perimeter, area) of any element, identifier, reference, line, shape, character, symbol, tag, hyperlink or any other way of visual association to be of any color or any color for visual distinction and mixed and matched, as explained above. Any of these types of visual association can be automatically or manually combined in any way and any of these types of visual association can be automatically or manually be made visually distinct from other references or identifiers. For example, an automatic determination can be made as to determine how to visually associate (e.g., based on black or color pixel density within certain image zones), and such determination can mix and match different types of visual associations. Such mix and match can depend on context or content of the figure or various preset parameters or criteria (e.g., whether to write over or avoid writing over other elements, references or identifiers or how to be more or less visually distinct). One element can be visually associated with all or less than all ways of visually associating.

FIGS. 5A-5C are various diagrams depicting various embodiments of visual associations according to this disclosure.

FIG. 5A depicts descriptive text, such as a patent detailed description, describing various elements in a corresponding figure, in which the elements are referenced by references and named via identifiers, as described above.

FIG. 5B depicts a data structure after the descriptive text depicted in FIG. 5A has been parsed, matched and stored in the data structure. As shown in FIG. 5b, paragraph [0079] has been parsed and matched by the references and corresponding identifiers and stored in the data structure. Thus, the data structure stores the identifiers corresponding to the references, as described above FIG. 5C depicts different ways of visually associating the identifiers with the references. Identifier "first database" is adjacent to reference 10. Identifier "CPU" replaces the reference 20. Identifier "second database" is placed within the element corresponding to the reference 30, as described above.

Any of these types of visual association can be automatically or manually combined in any way, even with FIGS. 4A-4E, and any of these types of visual association can be automatically or responsively or manually be made visually distinct from other references or identifiers, as described above.

Figure 6B:
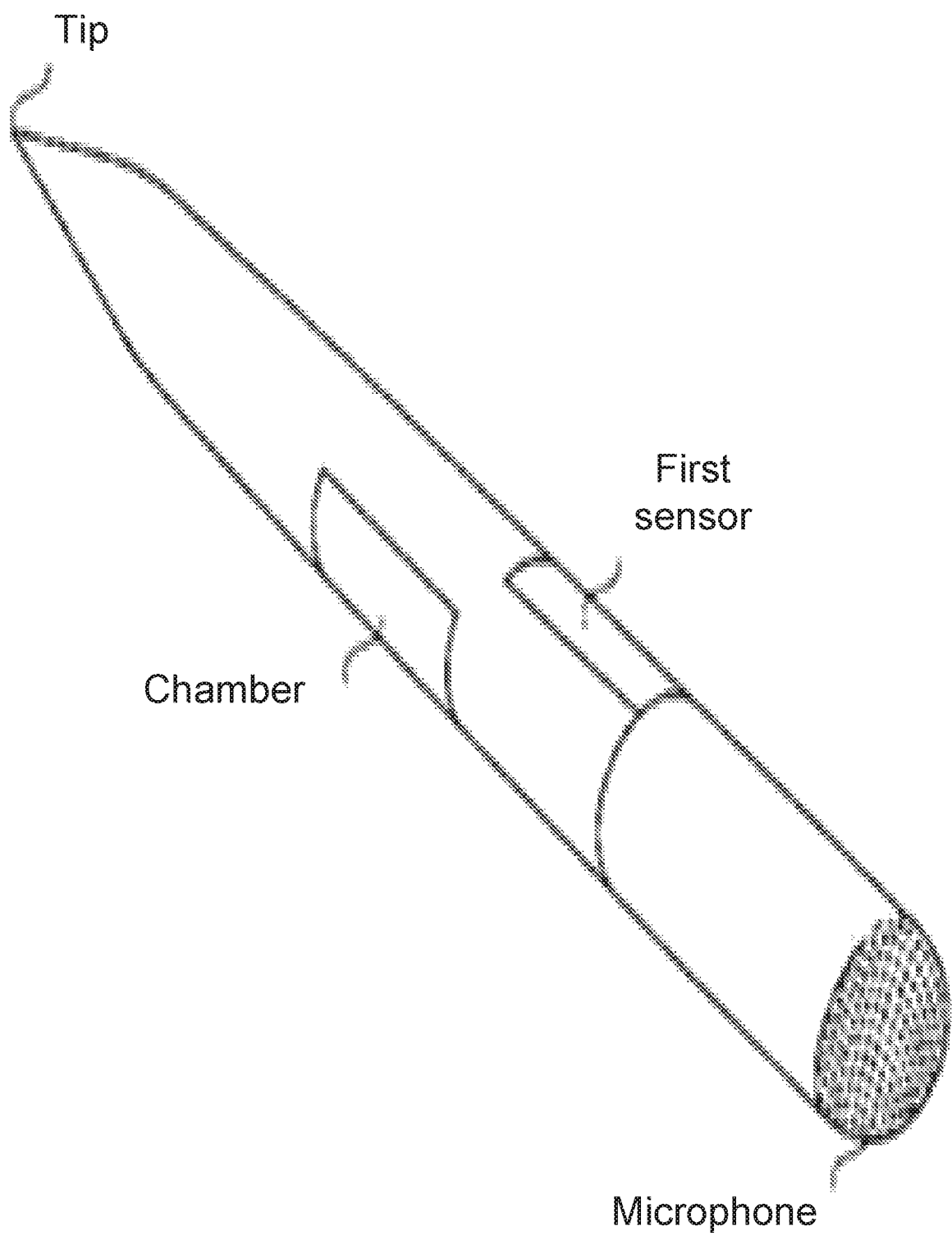

FIGS. 6A-6B show a figure before and after an embodiment of a visual association process according to this disclosure. FIG. 6A depicts a microphone pen before visual association. FIG. 6B depicts the microphone pen after visual association. The identifiers, as depicted in FIG. 6B, are visually associated with the references, as depicted in FIG. 6A, that the identifiers replaced. For example, as shown in FIG. 6B, the identifier "chamber" can be visually associated with the reference 204 using any visual association methods, as described herein. For example, the microphone pen can be associated as shown in other figures of this disclosure.

Note that this visual association process is illustrative and other forms of visual association are possible.

Figure 7:
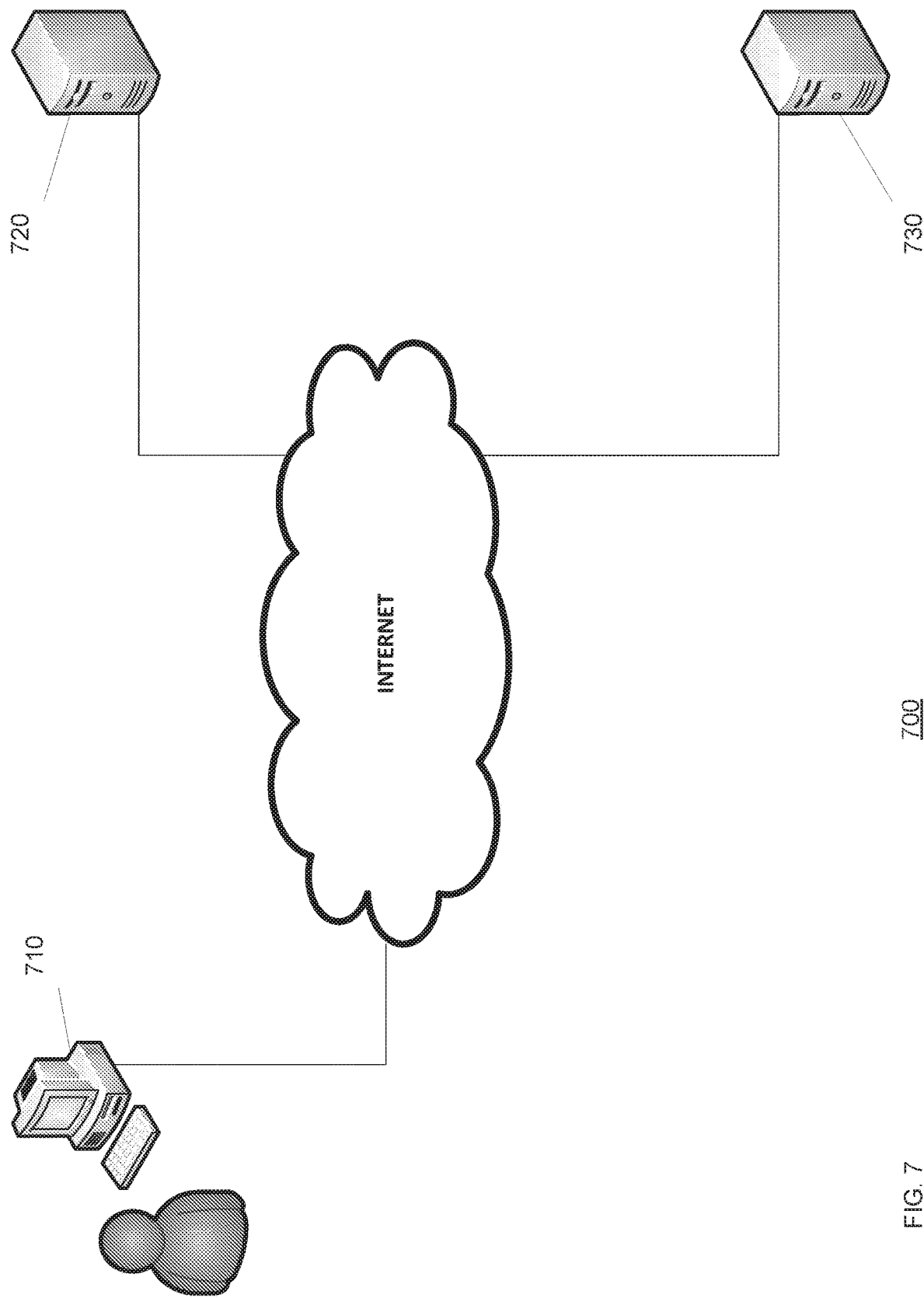

FIG. 7 is a diagram of an embodiment of a topology within which a visual association is performed according to this disclosure. In particular, a topology 700 includes a user computer 710 connected (e.g., wired, wireless, waveguide) to a network (e.g., AN, LAN, WAN, SAN, cellular, satellite). For example, the network can include Internet. A first server 720 and a second server 730 are accessible via the network. For example, the first server 720 or the second server 730 can include a hardware server, a virtual server, a web server, an application server, a database server, or others. For example, the first server 720 or the second server 730 can be included in a server farm or a cloud environment (e.g., AWS, Azure, Google Cloud), which can include a computing instance that can dynamically adjust on-demand based on load (e.g., users concurrently logged in and attempting to read or visually associate figures, OCR processing). The computing instance can also enable OCR engines to adjust computational power on-demand (e.g., request listeners). For example, more OCR engine load can allow for dynamic increase of the computing instance. The cloud environment can public or private, whether in a single data center or distributed among a plurality of data centers. Note that the first server 720 and the second server 730 can be a single server or distinct servers, whether or not being part of the same or different cloud services. For example, a computing instance or computing platform can include a cloud computing environment defined via a plurality of servers, whether hardware or virtual, where the servers operate in concert, such as via a cluster of servers, a grid of servers, a group of servers, or others, to perform a computing task, such as reading data, writing data, deleting data, collecting data, sorting data, or others. In some embodiments, the computing instance or computing platform can include a mainframe, a supercomputer, or others. The servers can be housed in a data center, a server farm or others. The computing instance or computing platform can provide a plurality of computing services on-demand, such as an infrastructure as a service (IaaS), a platform as a service (PaaS), a packaged software as a service (SaaS), or others, as disclosed herein. For example, the computing instance or computing platform can provide computing services from a plurality of data centers spread across a plurality of availability zones (AZs) in various global regions, where an AZ is a location that contains a plurality of data centers, while a region is a collection of AZs in a geographic proximity connected by a low-latency network link. For example, the computing instance or computing platform can enable a user to launch a plurality of virtual machines (VMs) and replicate data in different AZs to achieve a highly reliable infrastructure that is resistant to failures of individual servers or an entire data center, as disclosed herein. For example, the computing instance or computing platform can include AWS, Microsoft Azure, Google Cloud, IBM cloud, or others.

The user computer 710, the first server 720, or the second server 730 can run an operating system of any type (e.g., Windows, Linux kernel, Android, Linux, iOS, MacOS, Symbian, Unit, or based on or derived from any of foregoing). The user computer 710, the first server 720, or the third server 730 can be embodied as or included in any type of a computer (e.g., desktop, laptop, mainframe, cloud-computing system, cluster computing system, server cluster, smartphone (e.g., bendable, flexible, folding, rigid), tablet (e.g., bendable, flexible, folding, rigid), an electronic paper (e.g., electrophoretic, gyricon, electrowetting, electro fluidic, interferometric modulator, plasmonic, organic transistors embedded into flexible substrates), an optical head-mounted display or eyewear unit (e.g., eyeglasses, Google glass, Apple headset, Samsung headset), workstation, wearable display, smartwatch, eye lens, volumetric display, autostereoscopic display, holographic display, vehicular display, color, black/white or monochrome display), any of which can have or avoid having a display that is flexible or bendable, which may impact how figures are presented (e.g., different figures or figures and text being concurrently presented on different sides of display with bendable central hinge portion extending in-between to enable side-by-side figure/figure or text/figure presentation). For example, the first server 720 or the second server 730 may be included in a cluster of servers, such as a front-end cluster, which may include a plurality of servers, such as hundreds, thousands, or more. In such configurations, the front-end cluster may include a plurality of web servers that may represent a majority the front-end cluster and that may run a plurality of virtual machines for just-in-time compilation and that may execute programs written in various languages, such as Hack, PHP, or others. For example, when a bendable display is used, then the figure, as processed as described herein, can be resized to accommodate for a larger display when the bendable display is fully open. For example, the volumetric display can include stereograms/stereoscopes, view-sequential displays, holographic displays, electro-holographic displays, parallax "two-view" displays and parallax panorama grams (e.g., spatially multiplexed systems), re-imaging systems, and others. For example, when the figure is shown via the volumetric display, then that figure can be volumetrically displayed as the user walks around that figure or moves about relative to that figure (e.g., head movement). Note that in such instance the volumetric display can avoid following (remains as is) or follow the user walking (e.g., based on camera, sensors, motion sensor, acoustic sensor, thermal sensor, radar, lidar, load cells tracking the user) and then part numbers can move or orient or rotate or pitch to be readily visible to that user while walking. Note that a similar approach can exist when during user head movement about or relative to figure to see that figure from different angle. When the user computer 710, the first server 720, or the third server 730 is embodied as a headset unit (e.g., eyewear unit), then the headset unit may have a lens that is optically adjustable (e.g., change focus) in real-time for astigmatism, to farsightedness, and nearsightedness. In those situations, if a patent figure or patent text is presented, then that text can be correspondingly optically adjusted. For example, a part number in a patent figure is presented too small to be readily visible by a wearer, then the patent figure can be optically adjusted so that the part number can be readily visible by the wearer (e.g., zoomed in).

A mixed reality system can be used, which presentation of content, as disclosed herein (e.g., side-by-side, interactive part names or part numbers, translation of part names). This system may include a mixed reality device such as a headset, helmet, goggles, or glasses (referred to herein as a head-mounted display (HMD)) that includes a projector mechanism for projecting or displaying frames including left and right images to a user's eyes to thus provide 3D virtual views to the user. The 3D virtual views may include views of the user's environment augmented with virtual content (e.g., virtual objects, virtual tags, etc.). The mixed reality system may include world-facing sensors that collect information about the user's environment (e.g., video, depth information, lighting information, etc.), and user-facing sensors that collect information about the user (e.g., user's expressions, eye movement, hand gestures, etc.). The sensors provide the information as inputs to a controller of the mixed reality system. The controller may render frames including virtual content based at least in part on the inputs from the world and user sensors. The controller may be integrated in the HMD, or alternatively may be implemented at least in part by a device external to the HMD. The HMD may display the frames generated by the controller to provide a 3D virtual view including the virtual content and a view of the user's environment for viewing by the user. The sensors may include one or more cameras that capture high-quality views of the user's environment that may be used to provide the user with a virtual view of their real environment. The sensors may include one or more sensors that capture depth or range information for the user's environment. The sensors may include one or more sensors that may capture information about the user's position, orientation, and motion in the environment. The sensors may include one or more cameras that capture lighting information (e.g., direction, color, intensity) in the user's environment that may, for example, be used in rendering (e.g., coloring and/or lighting) content in the virtual view. The sensors may include one or more sensors that track position and movement of the user's eyes. The sensors may include one or more sensors that track position, movement, and gestures of the user's hands, fingers, and/or arms. The sensors may include one or more sensors that track expressions of the user's eyebrows/forehead. The sensors may include one or more sensors that track expressions of the user's mouth/jaw.

The mixed reality system may include a mixed reality device such as a headset, helmet, goggles, or glasses (referred to as HMD) that includes a projector mechanism for projecting or displaying frames including left and right images to a user's eyes to thus provide 3D virtual views to the user. The 3D virtual views may include views of the user's environment augmented with virtual content (e.g., virtual objects, virtual tags, etc.). The mixed reality system may also include world-facing sensors that collect information about the user's environment (e.g., video, depth information, lighting information, etc.), and user-facing sensors that collect information about the user (e.g., user's expressions, eye movement, hand gestures, etc.). The sensors may provide the collected information to a controller of the mixed reality system. The controller may render frames for display by the projector that include virtual content based at least in part on the various information obtained from the sensors. As noted above, the mixed reality system may include world-facing sensors (also referred to as world sensors), for example located on external surfaces of a mixed reality HMD, that collect various information about the user's environment. In some embodiments, the world sensors may include one or more "video see through" cameras (e.g., RGB (visible light) cameras) that capture high-quality views of the user's environment that may be used to provide the user with a virtual view of their real environment. In some embodiments, the world sensors may include one or more world mapping sensors (e.g., infrared (IR) cameras with an IR illumination source, or Light Detection and Ranging (LIDAR) emitters and receivers/detectors) that, for example, capture depth or range information for the user's environment. In some embodiments, the world sensors may include one or more "head pose" sensors (e.g., IR or RGB cameras) that may capture information about the user's position, orientation, and motion in the environment; this information may, for example, be used to augment information collected by an inertial-measurement unit (IMU) of the HMD. In some embodiments, the world sensors may include one or more light sensors (e.g., RGB cameras) that capture lighting information (e.g., color, intensity, and direction) in the user's environment that may, for example, be used in rendering lighting effects for virtual content in the virtual view.

As noted above, the mixed reality system may include user-facing sensors (also referred to as user sensors), for example located on external and internal surfaces of a mixed reality HMD, that collect information about the user (e.g., user's expressions, eye movement, etc.). In some embodiments, the user sensors may include one or more eye tracking sensors (e.g., IR cameras with IR illumination, or visible light cameras) that track position and movement of the user's eyes. In the case of visible light (RGB) cameras, the eye tracking sensors may also be used for other purposes, for example iris identification. In some embodiments, the user sensors may include one or more hand sensors (e.g., IR cameras with IR illumination) that track position, movement, and gestures of the user's hands, fingers, and/or arms. In some embodiments, the user sensors may include one or more eyebrow sensors (e.g., IR cameras with IR illumination) that track expressions of the user's eyebrows/forehead. In some embodiments, the user sensors may include one or more lower jaw tracking sensors (e.g., IR cameras with IR illumination) that track expressions of the user's mouth/jaw.

The visual association, as described herein, can be performed locally on the user computer 710 by a program installed on a hard disk (e.g., hard drive) or can be run as a module or add-on on top of or within or not within other software, such as a word processing application, a spreadsheet application, a slide presentation application, a browser, a mobile app, or others. For example, the visual association can be done via an app running on a smartphone or tablet or laptop or desktop. For example, the app can be a mobile app downloaded from Apple Store or Google Play, whether paid or unpaid or subscription based. For example, the visual association can be done via a browser via a DNS over HTTPS protocol, which may prevent eavesdropping and manipulation of DNS data for privacy of patent review. For example, the app can be running on a headset, as disclosed herein. For example, the app can be running on a phone or a tablet and then any corresponding content visual presentation can be presented (e.g., via a short range communication protocol, a Bluetooth protocol, an infrared communication protocol) on a headset, as disclosed herein.

The visual association can be performed via a website (e.g., static, dynamic) or a web portal accessible from the website. For example, the web portal can be hosted in a cloud environment (e.g., AWS, Azure, Google Cloud), which can include a computing instance that can dynamically adjust on-demand based on load (e.g., users concurrently logged in and attempting to read or visually associate figures). The computing instance can also enable OCR engines to adjust computational power on-demand. The cloud environment can public or private, whether in a single data center or distributed among a plurality of data centers.

The visual association can be performed by the first server 720. For example, the user computer 710 can access the first server 720 and request the first server 720 to perform the visual association on a selected figure or a file (e.g., uploaded by or selected by the user or retrieved from a data source or file sharing service pointed or identified by the user). The first server 720 then accesses or downloads the selected figure or the file and performs the visual association thereon or on a copy thereof or an extracted image therefrom (e.g., PDF, image, TIFF, JPEG, MS Word, MS PowerPoint, CAD). Once visually associated, that figure or file can be or avoid being saved on the first server 720. For example, the first server 720 can send that figure or file to the second server 730 for storage thereon.

The first server 720 can perform the visual association on a set files (e.g., stored in zip file, accessed from webpage via script reading or scraping webpage, accessed via client wrapper making API call) or a copy of the set of files. For example, a PDF file (or another file type or form of data structure) can be downloaded via a script (e.g., JavaScript, Python, Perl) accessing (e.g., scraping) a website (e.g., webpage) storing or providing access (e.g., button, hyperlink) to the PDF file. For example, when downloading specific documents (e.g., PDF files of patent documents) from a data source (e.g., USPTO website), then page numbering of those documents (e.g., document anchors, side pane) can be used to determine where various document sections (e.g., drawings, specification, claims) begin and end. For example, a collection of files (e.g., archive file, zip file) can be downloaded from a data source (e.g., webpage). For example, such collection of files can enable a mass document upload (e.g., PDF files, image files). For example, the user can self-upload a file or a group of files (e.g., PDF, image, US patent or published patent application, foreign patent or published patent application, technical publication, blueprint) for processing herein. For example, before, during, or after upload of a file or before, during, or after download of the file (e.g., PDF files, image files), that file can remain as is or can be processed in various ways. For example, the file can be increased or decreased in size, scale, resolution, or changed format (e.g., JPEG to TIFF, PDF to JPG or TIFF) or copied or other characteristics. For example, various operations described herein can be performed on that copy. For example, the file can be a PDF file that can be segmented into a plurality of images, each of the images corresponding to a page.

Once processed (e.g., annotated), the first server 720 can store the set of files (or copies thereof if those have been annotated) in the database on the second server 730 for subsequent access by the user computer 710 or other computers with rights to access (e.g., read, write, delete, sort, reorganize) the database or the set files (or copies thereof if those have been annotated). For example, the database can include a matrix, a queue, an array, a vector, a stack, a deck, a linked list, a hash, a table, a tree, a quadtree, a database system, or others. For example, the database system can include a relational database, a post-relational database, a NoSQL, an in-memory database, a graphical database, an object database, or others. The database can store data, whether in a raw state, a formatted state, an organized stated, or any other accessible state, and allows access to such data, whether directly and/or indirectly. Then, the user computer 710 can then access the second server 730 to access or download a selected visually associated figure or a visually associated file. This would reduce computation resources since the same figures or files are not repeatedly visually associated.

The annotated (or otherwise processed) file or the annotated (or otherwise processed) figure of the file (e.g., single or multiple pages) or a section or object or part of the annotated figure (e.g., selected via screenshotting) or a page with multiple annotated (or otherwise processed) figures can be printed (e.g., an inkjet printer, a laser printer). For example, the section or object or part can be selected by screenshotting via a Snipping Tool of MS Windows (or functional equivalent thereof in another OS) where the user can take still screenshots of an open window, rectangular areas, a free-form area, or the entire screen. Snips can then be annotated using a mouse (or another pointer device) or a tablet (or another touch screen), stored as an image file (e.g., PRIG, GIF, JPEG file) or an MHTML file, or e-mailed (or sent in other forms of personal communication). The Snipping Tool allows for basic image editing of the snapshot, with different colored pens, an eraser, and a highlighter.

This printing (e.g., 2D printing, 3D printing) can be on a storage medium (e.g., paper, plastic, wood, metal). When printing multiple visually associated figures on a single page or multiple pages on the storage medium (e.g., paper sheet), the visual association of one page or of one figure can interfere or avoid interfering with visual association of other figures on the same page or other pages. Also, the visually association can be performed according to a view of the figures, where the view is a portrait view or a landscape view or any of these views can be obtained by a manual or automatic or responsive rotation of figure, as described herein.

The visual association can be performed according to a preset rule. For example, the identifier can be placed at a certain distance (e.g., within about 10, 9, 8, 7, 6, 5, 4, 3, 2, 1 inch or pixel or voxel equivalents) from the reference. For example, the visual association can be in a way such that all identifiers fit on a single screen or a single page or a single figure sheet, which can also include avoiding visually interference (e.g., overlapping) with other figures if the single page or the single figure sheet has multiple figures, whether or not visually associated. For example, there can be a non-shown or shown line (e.g., vertical, horizontal, rectilinear, non-rectilinear, solid, broken, patterned) formed between at least two image coordinates separating the figures and annotations for each respective figure may not extend past this line to minimize user confusion. The certain distance can be manually set (e.g., virtual or physical keyboard, pointer or cursor device, camera input, sound input). The certain distance can be automatically set upon analysis of a section of the figure or the figure to determine optimal placement or method of visual association. Some criteria or parameters that can be used in this analysis include geometry, size, visual distinctness, or color of lines or part numbers or part names or parts or shapes for part names shown in figure, size of figure, viewport size or dimensions or quality on which figure is shown, user accessibility setting (e.g., legally blind), blue light filter running or not running, application type (e.g., mobile browser, desktop browser, dedicated app), network connection (e.g., speed, QoS, latency, bandwidth, wired or wireless or waveguide connection), user profile (e.g., expert, novice, amateur, average) as manually set (e.g., virtual or physical keyboard, pointer device, camera input, sound input) or automatically or responsively determined based on criteria as the user visually associates over period of time, or based on an error analysis in which errors are based on overlap or proximity to parts or part numbers or part names or characteristics or other content of the figure.

In a computer network environment, one user can perform a visual association process on a figure (or copy thereof), as described herein, such that the visually associated figure is then stored in the database and other users can be granted read access to the visually associated figure. Thus, other users can avoid repetition of the visual association process in order to improve efficiency and save computational resources. However, privacy focused configurations are possible where each or some users prevent, ban, forbid, or selectively allow other users to access the visually associated figure or other figures or pages. This can also be done without requesting user input and all visual association is specific to each user and not re-shared among users (e.g., default setting). For example, this can be enabled by user profile settings being configured for control of visual association figure access based on user names, email addresses, profile names, intra-organizational logins, social networking names, chat names, phone numbers, or others.

Note that the users can be accessing the first server 720 or the second server 730 based on different user profiles. For example, this form of access can be based on user names (e.g., user identifier, email address, social media name), passwords, biometrics (e.g., fingerprint, retina scans), or others. The different user profiles can have same or non-same computing privileges or rights to that visually associated file or visually associated figure (or other files stored) or other files as processed herein. For example, the user profiles can be grouped into a set of groups, where some user profile groups have different computing privileges or rights relative to other user profile groups. For example, there can be a user profile group programmed for editing and reading the visually associated figures or files and a user profile group programmed for reading the visually associated figures or files. For example, some of the user profiles can be editor profiles with computing rights or privileges to read, write, delete, move, or otherwise modify the visually associated files, visual associations, modalities of visual association, part numbers, part names, or settings associated with visually associated files or other files processed as described herein. For example, the editor user profiles can be enabled to correct visual association, to edit or add or delete part names or part numbers, to remove recognition artifacts remaining from OCR engine segmentation. In this embodiment, the editor user profiles can be served with a graphical user interface (GUI) that is enhanced for a set of input elements for such capability (note that non-keyboard or non-touch input is possible via microphone or camera). For example, the reader user profiles can be enabled to read the visually associated figures or files and not being able to modify the visually associated figures or files. In this embodiment, the reader user profiles can be served with a GUI that is not enhanced for the editor user profiles. For example, the reader user profile can have a basic GUI for reading the visually associated figures or files. Note that the editor user profiles can be incentivized for such actions by not charging (e.g., electronic fund transfer, electronic shopping card, cryptocurrency) those profiles with fees for editing the visually associated figures or files, unlike the reader user profiles, which can be charged with fees to read the visually associated figures or files. Further, freemium model can be used for editor profiles (e.g., no advertisements before, during, or after figure presentation while logged into user session) and reader profiles (e.g., advertisements before, during, or after figure presentation while logged into user session).

Upon matching of the references and the identifiers, a determination can be made as to which of the elements, if any, have missing references or identifiers since in this situation no matches between the references and the identifiers would have been made. The determination can result in a prompt or a message to the user informing the user of this situation. Further, the determination can be used for data mining at least for that specific visually associated figure.

The visual association can be performed on a section of a figure, a single figure, multiple figures within a file, a single figure within each of multiple files, multiple figures in multiple files, multiple figures per page, or via a directory within memory storing a plurality of files with figures. Note that any correspondence (e.g., one-to-one, one-to-many, many-to-one, many-to-many) between figure, page, and file are possible.

Even though the figure and the text can be stored in one computer file (e.g., HTML, PDF, MS Word, MS PowerPoint, TIFF, JPEG, JSON, XML) or one database record (e.g., distributed among fields), other variations are possible. For example, the figure and the text can be stored in multiple files or multiple database records, in one or multiple computers, or in one or multiple distinct locales, whether in a single data center or distributed among a plurality of data centers. Further, before, during, or after the visual association, the figure can be obtained (e.g., retrieved, downloaded) from an image capture device (e.g., camera, smartphone, tablet, laptop, desktop, unmanned land or aerial or marine vehicle, webcam, eyewear unit, scanner) and matched with the text (e.g., based on figure identifier, document identifier). Likewise, before, during, or after the visual association, the text can be automatically or responsively or manually obtained (e.g., retrieved, downloaded) from a description database (e.g., patent text database, digital textbook, document corpus) and then automatically or responsively or manually matched with the figure (e.g., based on part numbers, computer vision algorithms detecting objects in figures). Also, although a single figure and a single corresponding text are illustrated, multiple figures can be described as one figure and one figure can be described in multiple texts, and if at least some of the identifiers conflict, then a frequency analysis can be used or a preset rule can be invoked to resolve or minimize such conflict. For example, any type of correspondence between the figure and the text is possible (e.g., one-to-one, one-to-many, many-to-one, many-to-many). Moreover, if text corresponding to the figure is contained within an image, then the text within the image can be recognized via at least some OCR (or other image processing or computer vision technology described herein) and then parsed, as described herein. For example, some computer vision technology can employ OpenCV or others.

Before, during, or after the visual association, the user can select the reference, the identifier, the element, the shape, or a portion of any thereof in the figure. For example, the identifier, the element, the shape, or the portion of any thereof can be clicked or hovered over (e.g., cursor, pointer, stylus, finger) in the figure. For example, based on clicking or hovering over the reference in the figure, the user may cause to be dynamically displayed (e.g., positionally adjacent to reference or element or visually associated with reference or element) the identifier associated with the reference in the figure. As such, since some elements or portions thereof are associated with some references, then moving the pointer or the cursor from one element or reference to another element or reference in the figure enables a corresponding identifier associated with a respective element or reference to be displayed.

The user can access a published patent application (e.g., PDF, LaTeX, image, text, markup language, XML, HTML, JSON, web page) or an issued patent (e.g., PDF, LaTeX, image, text, markup language, XML, HTML, JSON, web page) and request that the published patent application or the issued patent be processed, as described herein. For example, the published patent application or the issued patent can be visually associated, as described herein, whether or not the reference, the identifier, the line, or the shape is shown in the figure. For example, the published patent application or the issued patent can be enabled for a text selection (e.g., post-OCR, text document). As such, the user can select (e.g., via pointer device, cursor device, stylus, finger, mouse, touchpad, scroll ball, keyboard, microphone, hand gestures, haptics, Braille interface) a word, a term, a phrase, a sentence, a line, or a paragraph in a claim of the published patent application or the issued patent (or background or summary or description of drawings or detailed description or abstract). If the word, the term, the phrase, the line, or the paragraph of the claim is shown in the figure, or a logical association or relationship between the reference and the identifier has been formed or made and the identifier matches (e.g., A to B or B to A) the word, the term, the phrase, the line, or the paragraph of the claim (e.g., content, format), then the reference, the identifier, the line, the shape, or the element in the figure can be made visually distinct (e.g., highlighted, color change, font change, font size change, background color change, shown in new window or callout or bubble or shape, user prompt) or some information can otherwise be presented to the user or output to the user (e.g., display, speaker, haptics) in order to inform the user of a location or an area in the figure where the word, the phrase, the line, or the paragraph of the claim, as selected, is or can be found.

This type of processing can be performed in various ways. For example, this can be performed based on parsing, tokenizing, mapping, segmenting, or otherwise linguistically processing the text into an organized dataset (e.g., parts legend, object list, part name/number table) on a per figure or per page or per file or per document basis in order to determine if the identifier relates to the reference. Note that synonyms can be incorporated into such processing (e.g., car is included if automobile is detected). If so, then a comparison (e.g., A to B or B to A) of the word, the term, the phrase, the line, or the paragraph of the claim can be made (e.g., content, format) between the organized dataset and the word, the term, the phrase, the line, or the paragraph of the claim. For example, this can also be performed based on matching (e.g., A to B or B to A) the word, the term, the phrase, the line, or the paragraph of the claim to at least some content shown in the figure, whether present originally or after processing, as described herein. For example, this can also be performed by enabling the user to select (e.g., via pointer device, cursor device, stylus, finger, mouse, touchpad, scroll ball, keyboard, microphone, hand gestures, haptics, Braille interface) at least one word, term, phrase, line, or paragraph in the claim (or background or summary or description of drawings or detailed description or abstract). If that selected word, term, phrase, line, or paragraph is shown in the figure (whether as originally present or after processing of this disclosure), then the object, the part number, the line (original or added), the identifier, or the shape in the figure can be highlighted (or otherwise made visually distinct as described herein) or shown in a new window, callout, prompt, or bubble or any other type of data display or output (e.g., sound, haptics) that informs the user of the location of that selected word, term, phrase, line, or paragraph in the figure. The selected word, term, phrase, line, or paragraph can be determined to be shown in the figure based on parsing and identification from the text and location via the reference in the figure. This allows the user to quickly find the figure or the object in the figure for further understanding of the text. Similarly, the user can perform a reverse process, whereby the user selects the object, the line (original or added), the part number, the shape, or the part name in the figure, which highlights a corresponding associated text section in the text or in the claim (e.g., noun), by showing in a new window, callout, prompt, or bubble or any other type of data display or output (e.g., sound, haptics) that informs the user of the location of the identifier in the text.

In a published patent application or a published patent grant stored in a computer accessible file or document (e.g., PDF, LaTeX, image, text, markup language, XML, HTML, JSON, web page), after some image processing operations (e.g., OCR, object detection, edge detection, feature detection) and some text processing operations (e.g., NLP, tokenization, semantic processing, syntax processing, regular expressions), then at least some visual association or other processing, as described herein, can occur. For example, some of such processing can identify filing dates, priority dates, or publication dates of the published patent application or the published patent grant based on text processing of dates of various formats (e.g., 10 Jun. 2004, Apr. 3, 2007, 4/23/1990, 19/7/04) as read (e.g., via codes, abbreviations, headings) from the published patent application or the published patent grant (e.g., from bibliographic data, file history as retrieved from patent office web portal and then processed accordingly, paragraphs in specification, first page of specification, within first seven paragraphs of specification). Further, such processing can also involve retrieving other or related copies of related published patent applications or related published patent grants and comparing those images or text to identify differences therebetween for determination of filing dates, priority dates, or others. Then, at least some objects, lines (original or new), shapes, references, or identifiers can be viewed via calendar views (e.g., callouts, on-click, on-touch, hover overs, bubbles, user prompts, visual distinction, color variations, font size or type variations, notifications, alerts). For example, at least some calendar views can present an earliest filing or priority date associated with that part number. The calendar views can be useful for a continuation-in-part patent application or patent resulting from such application where a date or dates of filing or earliest priority can be associated with objects/lines/shapes/references/identifiers to identify or make visually distinct added subject matter. Further, alerts, messages, callouts, bubbles, notifications, user prompts, popups, slide outs, sounds or other forms of output can be presented informative of conflicting or unclear references/identifiers. Moreover, information bubbles (or other user presentations as described herein) associated with references or identifiers can be presented upon respective user selection, as described herein, whether for some, most, or all of the references or identifiers, as shown in the figure. Also, manual or automatic color variances for references or identifiers can be enabled, such as user-customizable color palettes for some, most, or all of references or identifiers. For example, color variances can be selected based on some user criteria or in order for colors not to repeat in the figure.

Before, during, or after some image processing operations (e.g., OCR, object detection, edge detection, feature detection) or some text processing operations (e.g., NLP, tokenization, semantic processing, syntax processing, regular expressions), some references can be corresponded to some identifiers or vice versa. Therefore, in the figure, a listing of references and corresponding identifiers can be displayed on a side (e.g., top, bottom, left, right) of the figure or corner of the page or anywhere else away from the figure in a form of a table or any other representation of data that allows the user to easily identify which identifiers the references refer to. For example, this listing can be presented as a part legend, which can have various entries (e.g., part names, part numbers) being user selectable (e.g., via pointer device, cursor device, stylus, finger, mouse, touchpad, scroll ball, keyboard, microphone, hand gestures, haptics, Braille interface) and such selections (e.g., part names, part numbers, corresponding checkboxes, corresponding buttons) can correspondingly make more or less visually distinct (e.g., highlight, change color, change font, change font size, shape background or color) any member of the figure (e.g., reference, identifier, line, shape, object). For example, this can be done simultaneously with or alternatively to the visual association as described herein.

A figure or a page or a plurality of figures or pages can be adjusted (e.g., rotated) to have a same or similar axis of orientation to allow for convenient user review of the figure. This can be done before, during, or after visual association processing, as described herein. For example, before, during, or after character recognition of references or object recognition (or any other image processing operation) in figures, at least one figure can be automatically or responsively rotated, whether clockwise or counterclockwise, to be upright for the user when viewing (although some content in figure may now be not upright). Likewise, in one or more figures or pages, at least some references or identifiers or lines (original or added) or shapes or objects can be placed or adjusted or rotated or moved or drag-dropped to have a similar axis of orientation so as to be viewed without rotating the figure or figures or the page or the pages. Fonts or font sizes can be automatically or responsively adjusted as well.

Before, during, or after some image processing operations (e.g., OCR, object detection, edge detection, feature detection) or some text processing operations (e.g., NLP, tokenization, semantic processing, syntax processing, regular expressions), some references can be corresponded to some identifiers or vice versa. For example, in a figure or figures or a page or a plurality of pages, the user can select (e.g., via pointer device, cursor device, stylus, finger, mouse, touchpad, scroll ball, keyboard, microphone, hand gestures, haptics, Braille interface) the reference or the identifier or line (original or new) or the shape or the object to jump or lead to a first instance of corresponding reference or the identifier in the text (e.g., figure description, claims).

Before, during, or after some image processing operations (e.g., OCR, object detection, edge detection, feature detection) or some text processing operations (e.g., NLP, tokenization, semantic processing, syntax processing, regular expressions), some references can be corresponded to some identifiers or vice versa. For example, in a figure or figures or a page or a plurality of pages, upon the user selecting (e.g., via pointer device, cursor device, stylus, finger, mouse, touchpad, scroll ball, keyboard, microphone, hand gestures, haptics, Braille interface) the reference or the identifier or the line (original or new) or the shape or the object, a scrollable, zoomable, user-customizable, resizable, or expandable window (or bubble, callout, tooltip, slide out, prompt) with a description of at least a portion of the figure or a specific description of the object corresponding to the selected reference (or line or identifier) can be shown. For example, this selection can be done via clicking, hovering over, highlighting, or other selecting the reference or the identifier or the line or the shape or the object.

Before, during, or after some image processing operations (e.g., OCR, object detection, edge detection, feature detection) or some text processing operations (e.g., NLP, tokenization, semantic processing, sentiment analysis, syntax processing, regular expressions), some references can be corresponded to some identifiers or vice versa. For example, after such correspondence some identifiers or some references can be shown (e.g., written to figure, hover over, superimposed, tooltip, click, popup, slide out, within shape) in at least one figure or a section of the figure. Therefore, before, during, or after such showing, these identifiers (e.g., part names) or some references can be translated into any human language (e.g., English, German, Japanese, Russian, Mandarin, Cantonese, Korean, Hindu, Spanish, French, Italian, Urdu, Portuguese, Arabic, Hebrew), whether as user requested or automatically. The language can be user selected (e.g., via pointer device, cursor device, stylus, finger, mouse, touchpad, scroll ball, keyboard, microphone, hand gestures, haptics, Braille interface) from a menu (or another input modality as described herein) provided to a user (e.g., via or based on browser settings or extensions, IP addresses, cookies, user profile, GPS location, productivity application, MS Word, MS PowerPoint, Google Docs) or automatically or responsively detected (e.g., via or based on browser settings or extensions, IP addresses, cookies, user profile, GPS location, productivity application, MS Word, MS PowerPoint, Google Docs) via a computer, whether local or remote to the text or the figure, and then facilitate corresponding translation. For example, the user profile can be configured (e.g., profile setting, data flag) to enable translation of only some languages but not others (e.g., translate into languages other than English and Russian, only translate Japanese and German).

The translation can occur via using online translation engine, such as a real-time neural machine translation service that may use various deep learning models to deliver more accurate and more natural sounding translation than traditional statistical and rule-based translation algorithms due to continuous learning from new and expanded datasets, an API based translation service, Google Translate, AWS Translate, or locally, via locally stored translation library or using a computer's operating system (e.g., Windows, Android, Linux, Unix, MacOS, iOS, Symbian). Note that the translation can also occur via a domain specific dictionary (e.g., mechanical, software, chemical, biological, computer science, electrical, HVAC, automotive, medical, e-commerce, pharmaceuticals, adhesives, optics, invasive cardiac surgery, image processing), which can be online-based, network-based, or local. Note that the dictionary can include a thesaurus from which translations can be sourced or facilitated. The translation can occur before, during or after the placing of the identifier on the figure or vice versa or associating the identifier with the figure or the reference within the figure or vice versa. Note that translation can occur on a per word, per phrase, per sentence, or per paragraph basis, which may help with contextual text processing.

The translation can enable the identifier to be concurrently shown as translated into multiple languages (e.g., English native and translated into Russian and Hebrew to be shown simultaneously) or the user can selectively iterate (e.g., user interface element, button, link, dial, dropdown) between multiple translations (e.g., German part name gets translated to English and then user can switch to Japanese translation). Note that translation can occur on a per word, per phrase, per sentence, or per paragraph basis, which may help with contextual text processing.

Various patent codes (or other document type codes) can be used to facilitate translations. Some examples of patent codes include US patent classification (e.g., class and subclass), CPC patent classification, European patent classification, international class, field of search, Locarno classification, patent examination art units, family IDs, assignees, patent examiners, priority dates, cited references, or others. For example, if the identifier is a word "tree," then, if the patent classification (or another patent code or document type code) relates to computer science, then the computer science translation of the word "tree" can be used. However, if the patent classification (or another patent code or document type code) relates to botany, then the botanical translation of the word "tree" can be used. Note that if multiple patent codes (e.g., classifications) are used and there is none, some, most, or all overlap or conflict or do not reconcile, then some actions can be taken, whether to get a broader translation or a narrower translation or averaging of what translation more codes imply. Note that translation can occur on a per word, per phrase, per sentence, or per paragraph basis, which may help with contextual text processing.

There can be domain specific dictionaries (e.g., mechanical, software, chemical, biological, computer science, electrical, HVAC, automotive, medical, e-commerce, pharmaceuticals, adhesives, optics, invasive cardiac surgery, image processing), which can be respectively queried based on what technical field the text or the figure belongs to. Note that such dictionaries can include thesauruses from which translations can be sourced or facilitated. For example, some domain specific dictionaries can be stored local or remote to the text or the figure. For example, if the text is processed (e.g., NLP, sentiment analysis, computational linguistics, text mining, homonym analysis, semantic analysis, feature/aspect-based analysis, part of speech tagging, syntactic parsing, named entity recognition, disambiguation, clustering, coreference, regular expressions) and determined to belong to a specific technical field (e.g., mechanical, software, chemical, biological, computer science, electrical, HVAC, automotive, medical, e-commerce, pharmaceuticals, adhesives, optics, invasive cardiac surgery, image processing), then at least some identifiers can be translated based on querying that respective domain specific dictionary (or thesaurus). For example, if there are mechanical and chemical domain specific dictionaries and the text is determined to relate to mechanical engineering, then the mechanical domain specific dictionary can be used to translate at least some identifiers (and other domain specific dictionaries can be not accessed for this respective specific translation). Note that translation can occur on a per word, per phrase, per sentence, or per paragraph basis, which may help with contextual text processing.

There can be multilevel (e.g., two, three, four, five, six, seven, eight, nine, ten, eleven) translations. For example, a generic translation engine or dictionary (or thesaurus) can be queried to get a listing of possible translation candidates. For example, the listing can be embodied as a data structure, array, vector, table, list, tree, stack, que, string, image, sound file, text file, MS Word file, PDF file, or others. Then, the listing can be reorganized (e.g., sorted, recreated) based on likelihood of correct translation (e.g., most likely translation candidate moved to top or made visually distinct, next most likely translation candidate is placed below or made less or differently visually distinct) or reduced in size (e.g., remove translation candidates that are unlikely to be correct or relevant or related) based on querying a second translation engine or dictionary (or thesaurus) that is specific to some technical field or domain, as determined based on processing the text (e.g., NLP, sentiment analysis, computational linguistics, text mining, homonym analysis, semantic analysis, feature/aspect-based analysis, part of speech tagging, syntactic parsing, named entity recognition, disambiguation, clustering, coreference, regular expressions) to determine what specific technical field (e.g., mechanical, chemical, software, electrical) the text relates to. Note that translation can occur on a per word, per phrase, per sentence, or per paragraph basis, which may help with contextual text processing.

Patent classification or patent figure content (e.g., computer vision detected) or patent text content sentiment, text-summarization, topic analysis, or other form of text or figure analysis can be used for translation or OCR-dictionaries or domain-specific dictionaries can be used. Translations can be ranked or made more visually distinct based on how related those translations are to the patent classifications or figures or text. Note that the patent classification can be country specific to that translation. Further, the patent classification can be used to give context to meaning for content sentiment or topic analysis. Accordingly, various image or text processing operations can perform accordingly.

When translations recite words in plural or singular, then translations can be or can avoid being adapted accordingly. For example, if the reference has a plurality of lines extending to a plurality of objects (e.g., parts), then the reference can be translated in a plural form. Otherwise, the reference can be translated in a singular form or vice versa. However, the user can set that this processing is omitted and the translations occur without such determination. However, note that this determination can also be determined in other ways (e.g., object detection, feature detection, edge detection).

When translations conflict or multiple translations can be used, then most likely translation can be provided, but the user can be informed (e.g., display or speaker output, bubble, notice, callout, link, prompt, change of font type or size or color, background color or image) that translations conflict or multiple translations are possible. Further, when translations conflict or multiple translations are possible, then several translations can be provided, which can be ranked (e.g., automatically, user action, drag-and-drop words or lines) in various ways (e.g., vertical or horizontal positioning, font type, font size, font color, background color). Moreover, when translations conflict or multiple translations are possible, then at least some text analysis (e.g., NLP, sentiment analysis, computational linguistics, text mining, homonym analysis, semantic analysis, feature/aspect-based analysis, part of speech tagging, syntactic parsing, named entity recognition, disambiguation, clustering, coreference, regular expressions) can be performed on the text from which the identifier is sourced (e.g., word, phrase, sentence, paragraph, column, page) and then most appropriate or recommended translation can be provided based on such analysis, although as explained above, the user can be notified that other translations may be possible. Note that translation can occur on a per word, per phrase, per sentence, or per paragraph basis, which may help with contextual text processing.

In a published patent application or a published patent grant stored in a computer accessible file or document (e.g., PDF, LaTeX, image, text, markup language, XML, HTML, JSON, web page), after some image processing operations (e.g., OCR, object detection, edge detection, feature detection) and some text processing operations (e.g., NLP, tokenization, semantic processing, syntax processing, regular expressions), then at least some visual association or other processing, as described herein, can occur. For example, some of such processing can include automatic or responsively selection or the user inputting or manually selecting (e.g., via pointer device, cursor device, stylus, finger, mouse, touchpad, scroll ball, keyboard, microphone, hand gestures, haptics, Braille interface) a word or a plurality of words or a sentence or a plurality of sentences from a claim (e.g., dependent, independent, multiple dependent) in the text or automatically parse a claim (e.g., dependent, independent, multiple dependent) in the text into a plurality of terms (e.g., words, phrases, nouns, adjectives, verbs) and match (e.g., A to B, B to A) via searching of such content against at least one visually associated figure that contains or is associated with such content in another document or published patent application or another published patent grant stored in another computer accessible file or document (e.g., PDF, LaTeX, image, text, markup language, XML, HTML, JSON, web page) on a network source (e.g., server-hosted database, in-memory database, NoSQL database, relational database, post-relational, graphical database, object database). Also, any other visually associated figures in other literature (e.g., PDF documents, images, MS Word documents) or websites (e.g., HTML pages) or applications can be matched to as well. For example, if a patent claim recites "a car having a motor," then the patent claim can be parsed into "car" and "motor" and those terms can be searched against various part names associated with part numbers shown in figures (e.g., patent, manual, article, encyclopedia). Therefore, if "car" or "motor" match to any of those part names, then this technique can be used to identify an anticipation or obviousness rejection based on matched figure compliant with at least US patent law.

Figure-based searching for part names already annotated in figures or for part names associated with part numbers within figures after reference-identifier match has been made can include searching for variants of those terms (e.g., synonyms, acronyms) as well and results can indicate accordingly. For example, searching for "cup" can also retrieve "mug" and "glass," whether or not those terms are used in a corresponding textual description. These variants can automatically be searched or the user can be provided with recommendations for which variants should be searched as well.

In a published patent application or a published patent grant stored in a computer accessible file or document (e.g., PDF, LaTeX, image, text, markup language, XML, HTML, JSON, web page), after some image processing operations (e.g., OCR, object detection, edge detection, feature detection) and some text processing operations (e.g., NLP, tokenization, semantic processing, syntax processing, regular expressions), then at least some visual association or other processing, as described herein, can occur. For example, some of such processing can include automatic or responsively selection or the user manually selecting (e.g., via pointer device, cursor device, stylus, finger, mouse, touchpad, scroll ball, keyboard, microphone, hand gestures, haptics, Braille interface) a word or a plurality of words or a phrase or a plurality of phrases or a clause or a plurality of clauses from a claim (e.g., independent, dependent, multiple dependent) in the text or automatically parse a claim (e.g., dependent, independent, multiple dependent) in the text into a plurality of terms (e.g., words, phrases, nouns, adjectives, verbs) and match (e.g., A to B, B to A) via searching such content against at least one figure in the same file (or another data structure), which can be visually associated as explained herein. Then, at least temporarily hiding, such as via placing white (or other color) space or red (or other color) shape or color contrasting or putting an X (or another shape) through or over, the references or the identifiers or the lines (original or added) or the shapes or the objects in the figure that are not associated or correspond to such content. Thus, only references (or lines or shapes or objects) having identifiers associated with the claim are shown in the figure.

When the identifiers are inserted, superimposed, or positioned over the figure, the identifiers can be spaced apart from each other in the figure so as to make user readability easier while being compliant with preselected or customized margins and having a proper scale. Further, some measurements (e.g., length, width, depth, volume, diameter, radius, density, direction) can remain unlabeled or be labeled, if user requested. For example, some of such measurements can be detected by some presence of various signs, such as arrows on the figure or when the text identifies the identifiers as such (e.g., metric or British system abbreviations or words).

The user can use a device (e.g., smartphone, tablet, laptop, desktop, wearable, contact lens, eyeglass lens, eyeglasses, head-mounted or eyewear frame, Google glass) with an optical camera (e.g., still, video, CMOS, with wide-angle lens, with fisheye lens) to perform various processing, as disclosed herein (although non-optical camera can be used as well). For example, the user can point the optical camera at the figure (when printed or displayed) and perform any disclosures provided herein, without running visual association process on the file having the figure (e.g., PDF, JPEG, TIFF, MS PowerPoint, MS Word, distributed data storage system). For example, based on the optical camera imaging the figure, the device can identify which file or document or collection or corpus the figure is part of or belongs to or based on at least some identification information (e.g., published patent application publication number, issued patent number, object detection, part detection, font style, barcode, watermark) sourced (e.g., OCR, computer vision) from the figure. For example, the device can include a display (e.g., 2D, 3D, LCD, plasma, electronic paper). For example, the display can be sized at about or less than 35, 33, 31, 29, 27, 25, 23, 21, 19, 17, 15, 14, 13, 12, 11, 10, 9, 8, 6, 4, 3, 2, or 1 inch or less diagonally. For example, based on the optical camera imaging the figure, the device can relevantly interface with a server (e.g., physical, virtual, web, application, database), whether remote or local thereto. For example, based on the optical camera imaging the figure, the device can generate (e.g., locally) or access (e.g., local, remote) an augmented reality content (e.g., color, black/white) and present the content on the display in order to augment what is shown in the figure (when printed or displayed). Note that the user can manually identify which file or document or collection or corpus the figure is part of or belongs to or based on manual data entry (e.g., published patent application number, issued patent number, serial number). For example, this manual data entry can be via physical or virtual keyboard, microphone, camera, or others.

The disclosed technology can ensure that the figure complies with 37 CFR 1.83 or 1.84 (or similar statutory sections of other jurisdictions) and display warnings if the figure is not compliant. For example, if the figure has improper margins, fonts, font sizes, colors, then the disclosed technology can notify non-compliance with 37 CFR 1.83 or 1.84 (or other statutory sections).

The disclosure can be performed on one file or document, a plurality of files or documents or portions retrieved from a plurality of files, whether stored local to or remote from each other. Also, the disclosure can be performed via one or a plurality of computers or servers, whether stationary or mobile, whether local to or remote from each other. Also, the files can be stored or distributed on one computer or a plurality of computers in any way. For example, such storage can include distributed storage. Also, the disclosure can be performed locally or remotely or on one computer or a software application or mobile app or on OS or over a computer network (e.g., LAN, WAN, cellular, satellite, Internet).

Visual association (or other processes described herein) can be performed on a video (e.g., file, stream) showing at least some of the figures, as described herein. The video can be associated with the text containing the references and the identifiers. For example, the video can have some audio reading the text or the text can be subtitles within the video. The text can be internal or external to the video.

Figure 8A:
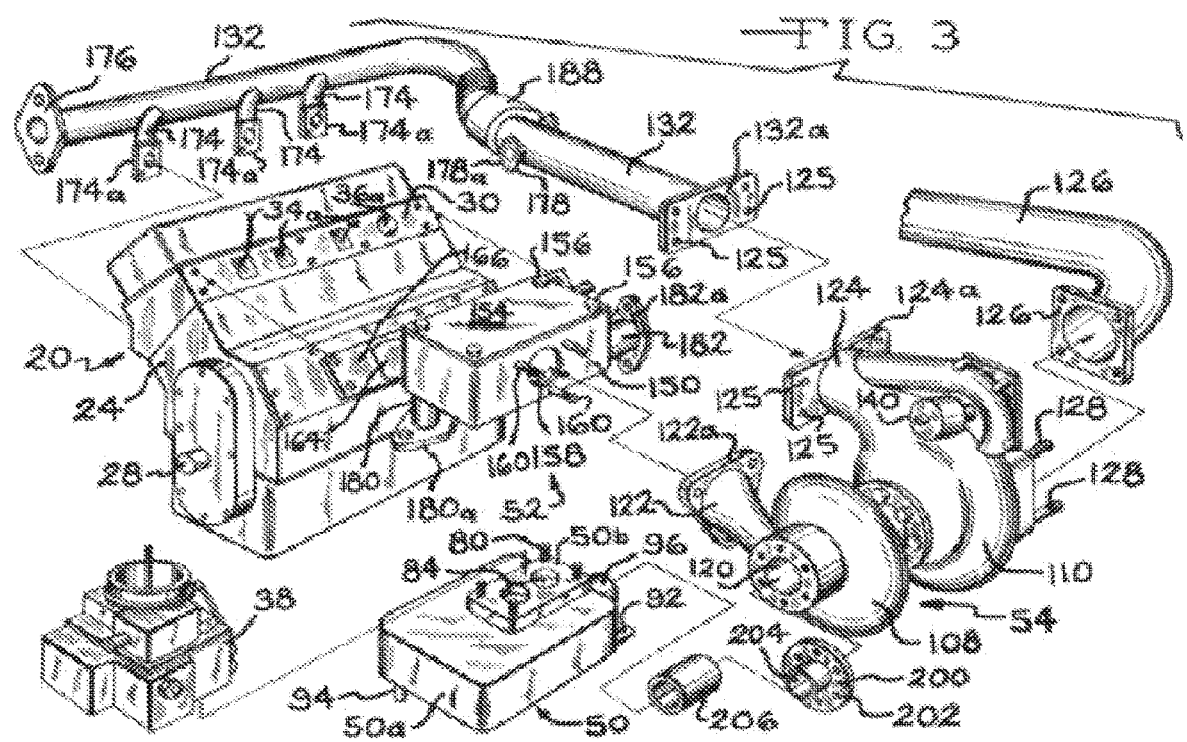
Figure 8B:
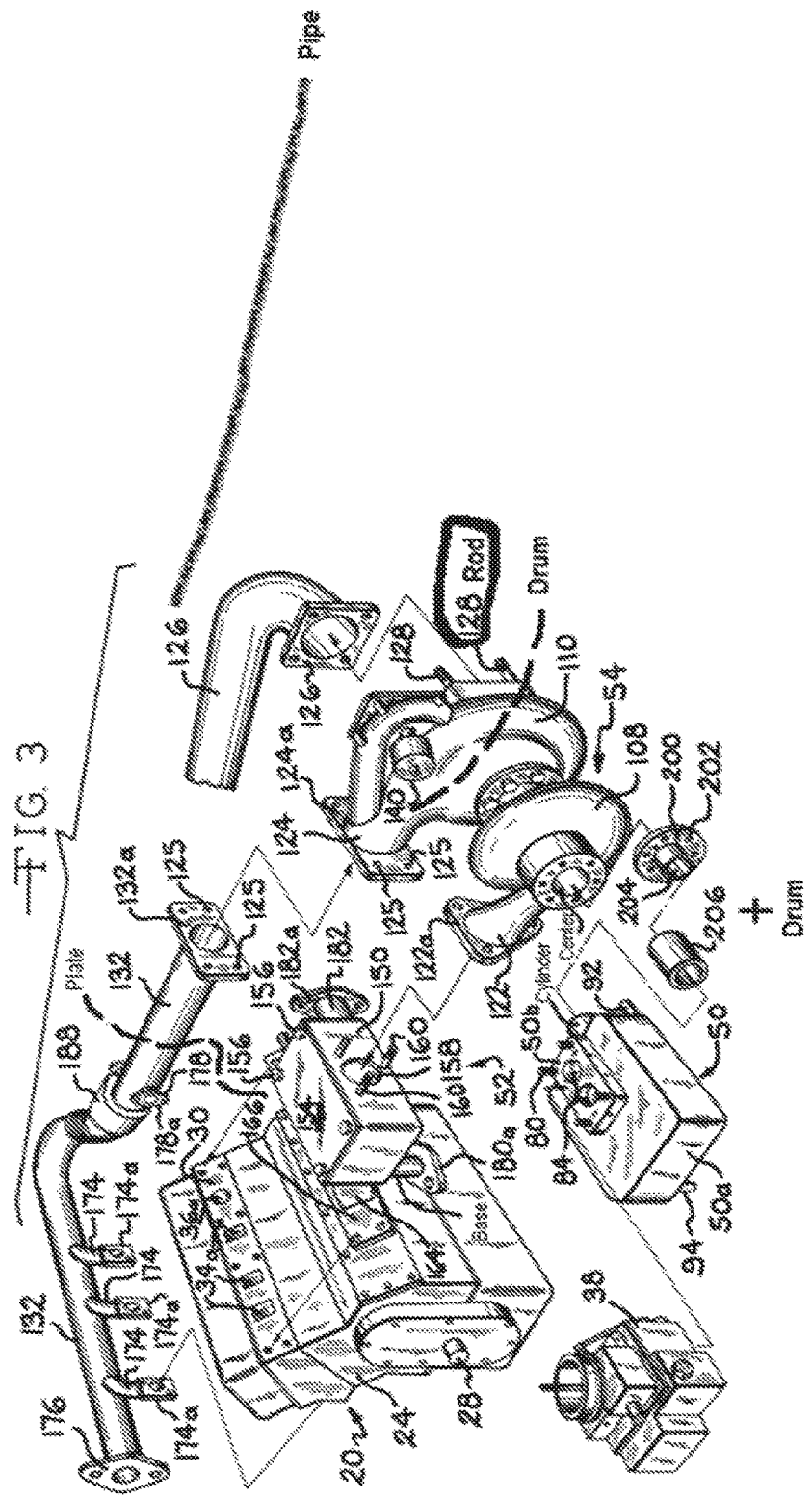

FIGS. 8A-8B are diagrams of embodiments of figures before and after visual association (and other processing) according to this disclosure. Note that any visual association methods (and other methods) can be combined in any permutational way. For example, although one figure (or page) can be visually associated (or processed) via one method of visual association (or one method of processing), that one figure (or page) can also be visually associated (or processed) via multiple methods of visual association (e.g., identifiers within shapes, identifiers without shapes, visually distinct identifiers) or other processing. When a plurality of figures (or pages) is desired to be visually associated (or processed), then all or less than all figures (or pages) can be associated (or processed) in a same way or different ways (e.g., as user selected, as automatically determined). Any objects, references, identifiers, lines (original or added) or shapes or portions of any thereof can be hyperlinked (e.g., configured for unidirectional, bidirectional, popup, notifications, alerts) or otherwise be clickable or activatable if not hyperlinked. When a computer decides which visual association method to employ, then the computer uses various image processing algorithms which look for presence of empty space (e.g., white space, non-pixel dense space) near the reference (e.g., to place identifier), possibility of reference or visual association placement over other objects, references, lines, identifiers or shapes (e.g., how much will be blocked or visually interfering), size or visual or file properties of the figure or portion of the figure, screen space, screen size, screen resolution, font size or type or color, background or object or line or shape or reference or identifier colors or type or size, speed or memory or type or QoS of computer or network connection, user confusion (as defined by a user or programmed in advance) and other similar concerns.

Note that the reference 180 (e.g., part number) within the object has been replaced with the identifier "base" (e.g., part name) within the object corresponding to the reference 180. The identifier can be colored or bolded or italicized or capitalized for visual distinction or be the same color as at least a portion of the figure. Note that the background over which the identifier is presented can be transparent, translucent, opaque, or colored or hatched for visual distinction. The user can manually select (e.g., parameter, criterion) or a computer can automatically or responsively determine as to how to most optimally visually associate (e.g., optimize new content positioning or new content visual presentation based on least visual interference with existing figure content or minimizing blocking other or preexisting figure content or maximize being most visually distinct relative to original content of figure). As such, with the reference 180, the computer automatically or responsively chose to write within the object in that location within the figure.

Note that the references 96 and 120 (e.g., part numbers) positioned outside of their objects (e.g., parts) have been replaced (e.g., written over with white boxes containing alphanumeric content) with the identifiers "cylinder" and "center" outside of their objects corresponding to the references 96 and 120. Alternatively, such replacement could be done within the objects, like done regarding the reference 180. The identifiers can be colored or bolded or italicized or capitalized for visual distinction or be the same color as at least a portion of the figure. Note that the background over which the identifier is presented can be transparent, translucent, opaque, or colored or hatched for visual distinction. The user can manually select (e.g., parameter, criterion) or a computer can automatically or responsively determine as to how to most optimally visually associate (e.g., optimize new content positioning or new content visual presentation based on least visual interference with existing figure content or minimizing blocking other or preexisting figure content or maximize being most visually distinct relative to original content of figure). As such, with the references 96 and 120, the computer automatically or responsively chose to replace the reference in that location within the figure.

Note that the reference 206 (e.g., part number) has been visually associated (e.g., annotated) via an alphanumeric character corresponding to a plus symbol. Alternatively, other alphanumeric characters (e.g., letters, numbers, punctuation marks) or non-alphanumeric characters (e.g., symbols, icons, graphics) can also be used. The character or the reference can be colored or bolded or italicized or capitalized for visual distinction or be the same color as at least a portion of the figure. Note that the background over which this is presented can be transparent, translucent, opaque, or colored or hatched for visual distinction. The user can manually select (e.g., parameter, criterion) or a computer can automatically or responsively determine as to how to most optimally visually associate (e.g., optimize new content positioning or new content visual presentation based on least visual interference with existing figure content or minimizing blocking other or preexisting figure content or maximize being most visually distinct relative to original content of figure). As such, with the reference 206, the computer automatically or responsively chose this form and this location for visual association.

Note that the reference 140 has been visually associated (e.g., annotated) via a broken line extending over at least one object. The broken line visually indicates that the identifier "drum" corresponds to the reference 140. Note that the broken line is not limiting and a solid line can be used. The broken line can be colored or bolded or italicized for visual distinction or be the same color as at least a portion of the figure. Likewise, the reference or the identifier can be colored or bolded or italicized or capitalized for visual distinction or be the same color as at least a portion of the figure. The user can manually select (e.g., parameter, criterion) or a computer can automatically or responsively determine as to how to most optimally visually associate (e.g., optimize new content positioning or new content visual presentation based on least visual interference with existing figure content or minimizing blocking other or preexisting figure content or maximize being most visually distinct relative to original content of figure). As such, with the reference 140, the computer automatically or responsively chose to use a broken line extending over at least one object in that location within the figure.

Note that the reference 128 has been visually associated (e.g., annotated) via the identifier "rod" placed near the reference 128. Further, note that a shape has been placed around or to enclose the reference 128 and the identifier "rod." The shape can be open, closed, symmetrical, asymmetrical, a rectangle, a box, a circle, an oval, a trapezoid, a pentagon, an octagon, a triangle, a U-shape, a C-shape, an O-shape, a D-shape, a Y-shape, a P-shape, or any other shape. The shape can fully or partially enclose the identifier, the reference, the line, the identifier and the reference, or the identifier and the reference and the line. The shape delineation (e.g., solid, broken) or the shape background color or foreground color can be colored or hatched for visual distinction relative to other content of the figure (original or added) or be the same color as at least a portion of the figure. Note that the shape or delineation thereof can be solid, broken, translucent, transparent, or opaque, any of which can be colored for visual distinction. Likewise, the identifier or the reference can be colored or bolded or italicized for visual distinction or be the same color as at least a portion of the figure for visual distinction. The shape and content therein can be colored differently from each other for visual distinction.

The shape can be perimetrically defined via a single line (e.g., solid, broken) or a plurality of lines (e.g., solid or broken), dots, minuses, pluses, letters, or other visual elements, including alphanumeric or non-alphanumeric characters any of which can be solid or broken. For example, the lines can be extending parallel to each other. Internally, the shape can be hatched via at least one visual element (e.g., lines, characters). The shape can enclose a watermark, as described herein. The shape can be a tooltip, a bubble, a popup, a hover-over, a slide-out, a call-out, a user prompt, a browser prompt, an OS prompt, or others. The shape can be hyperlinked (e.g., configured for unidirectional, bidirectional, popup, notifications, alerts) or otherwise be clickable or activatable if not hyperlinked. The reference or the identifier or the shape or the line (original or new) or the object can be hyperlinked (e.g., configured for unidirectional, bidirectional, popup, notifications, alerts) or otherwise be clickable or activatable if not hyperlinked.

Upon activation (e.g., clicking, selecting, speaking, gesturing, net crawling, indexing), the hyperlink (or content that can be clickable or activatable) can lead (e.g., navigably, non-navigably) to objects, references, identifiers, lines, shapes, tooltips, bubbles, pop-ups, hover-overs, slide-outs, call-outs, user prompts, browser prompts, OS prompts, portions of the text, portions of the claims, the claims, portions of the figures, the figures, other files, web pages, mobile apps, or other static or dynamic or executable content or logic whether in the present figure or page, other figures or pages in the same file or other files, the text description or other text descriptions in the present file or other files, the present data structure or page or pages or file or files or database or database record or other data structure or page or pages or file or files or database or database record. Note that other forms of data structures are possible as well (e.g., arrays, vectors, tables, trees, ques, decks, stacks), whether distributed or non-distributed among several data sources.

Upon activation (e.g., clicking, selecting, speaking, gesturing, net crawling, indexing), the hyperlink (or other content that can be clickable or activatable) can allow for tooltips, bubbles, pop-ups, hover-overs, slide-outs, call-outs, user prompts, browser prompts, OS prompts, or other forms of informational output (e.g., image, photo, visual, audio, haptic) to disclose or lead to information relating to the object, reference, identifier, line, or shape or other objects, references, identifiers, lines, or shapes. This disclosure or lead can be within the figures or within the text. The user can manually select (e.g., parameter, criterion) or a computer can automatically or responsively determine as to how to most optimally visually associate (e.g., optimize new content positioning or new content visual presentation based on least visual interference with existing figure content or minimizing blocking other or preexisting figure content or maximize being most visually distinct relative to original content of figure). As such, with the reference 128, the computer automatically or responsively chose the shaping method in that location within the figure.

Note that the reference 126 has been visually associated (e.g., annotated) with the identifier "pipe" via an unbroken line in a non-adjacent manner (e.g., distance between 126 and "pipe"). The object, the line, the reference, the identifier, or the shape or any portions of any thereof can be colored or bolded or italicized or capitalized for visual distinction or be the same color as at least a portion of the figure. The user can select (e.g., parameter, criterion) or a computer can automatically or responsively determine as to how to most optimally visually associate (e.g., optimize new content positioning or new content visual presentation based on least visual interference with existing figure content or minimizing blocking other or preexisting figure content or maximize being most visually distinct relative to original content of figure). As such, with the reference 126, the computer automatically or responsively chose the unbroken line method in that location within the figure.

Note that the reference 166 has been visually associated (e.g., annotated) with the identifier "plate" via a broken line in a non-adjacent manner (e.g., distance between 126 and the identifier "plate"). The object, the line, the reference, the identifier, or the shape or any portions of any thereof can be colored or bolded or italicized or capitalized for visual distinction or be the same color as at least a portion of the figure. The user can select (e.g., criterion, parameter) or a computer can automatically or responsively determine as to how to most optimally visually associate (e.g., optimize new content positioning or new content visual presentation based on least visual interference with existing figure content or minimizing blocking other or preexisting figure content or maximize being most visually distinct relative to original content of figure). As such, with the reference 166, the computer automatically or responsively chose the broken line method in that location within the figure and to associate over another object. Note that visual association over other objects, references, identifiers, lines, shapes, or methods of visual association or any portions thereof can also be performed.

There are embodiments when positioning content (e.g., part names, translations, analytics, warnings, notices, recommendations, search results) on figures makes those figures appear even more complicated or not user friendly. As such, in those embodiments, the user may have an option or not have the option to use the user interface as follows. The user interface may have a defined area which displays the content (e.g., part names, translations, analytics, warnings, notices, recommendations, search results) when the user interacts with the figures (e.g., hovers over part numbers, clicks part numbers, activates parts). The defined area can be resized or reshaped as selected by the user. The defined area may be fixed in size or shape. The defined area may be positionally fixed or positionally movable within the user interface. The defined area can be outside the figure or within the figure (e.g., corner, margin). The defined area can be or can avoid being simultaneously presented as the figure or the text.

Reference recognition can be performed in various ways. For example, references can be recognition by an OCR engine (e.g., Abbyy SDK, Google Vision SDK, Tesseract SDK). For example, references can be recognized by several OCR engines (e.g., two, three, four, five) running serially or concurrently on the same figure or same segments of the figure, whether having same or not same orientation, shape, size, image quality, scaling, or pre-processing, and then sharing results or verifying each other's results and then presenting a list of agreements and disagreements relative to recognition. For example, several image segments (e.g., odd quantity) of same region of a figure can be submitted to a single engine for processing, with conflict being determined based on majority results from those segment results, whether those image segments have same or not same orientation, shape, size, image quality, or pre-processing. When at least some of such results conflict, then a programmatic solution (e.g., use all agreed results but apply machine learning or figure text processing or other verification to disagreed results) can be applied. For example, when an odd number (e.g., three, five, seven) of OCR engines is employed for reference recognition in figures, then at least some results of one of those OCR engines can be used for conflict or disagreement resolution when other OCR engines present conflicting or disagreeing results (e.g., follow majority of OCR engines). For example, at least two of such engines can be of the same type but different versions (e.g., Abbyy version x and Abbyy version y) or different types or modalities (e.g., Abbyy and Google), which can operate differently (e.g., segmentation, image segmentation, character segmentation, recognition, pre-processing, post-processing). For example, a same figure sheet can be input into a plurality of OCR engines (e.g., same or different versions, same or different manufacturers, same or different modalities of operations) so that a majority result can be followed if there is a conflict. Similarly, a same patent text can be input into an odd number of NLP engines (e.g., same or different versions, same or different manufacturers, same or different modalities of operations) for text analysis (e.g., entity recognition, tokenization, part of speech), as disclosed herein, so that a majority result can be followed if there is a conflict. For example, an image can be input into an OCR engine, as described above, and the OCR engine outputs a plurality of recognized part numbers. Then, the image can remain as is or be rescaled or otherwise modified in format and then resubmitted to the OCR engine, while excluding the OCR engine from recognizing the recognized part numbers as already recognized, thereby forcing the OCR engine to recognize or guess-recognize or estimate-recognize other part numbers that are known to be present in the image but not yet recognized (e.g., as sourced from text specification). For example, an OCR engine can be a generic OCR engine (e.g., Adobe, Nuance) or an application-specific OCR engine or a trained or programmed to be an application-specific OCR engine based on various processing described herein. For example, an OCR engine can be enhanced, modified, or supplemented with a machine learning or neural network algorithm that enables a generation of a model based on training involving fonts of various types, sizes, shapes, orientations, inclinations, writing modalities (e.g., typed, handwritten), color, text area detection, object detection, object recognition, object segmentation, character segmentation, learning to avoid line segments adjacent to part numbers or arrows or arrow heads, object edge detection, image noise detection or filtering, image artifact detection or filtering, or others. For example, a plurality of font type groups can be formed based on various parameters (e.g., types, time periods of use, technology codes) and the model can be trained based on such font type groups. For example, some machine learning can employ a machine learning framework (e.g., TensorFlow, PyTorch, Microsoft Cognition) during learning and during model use. Once the model is generated or trained, the model can be used to supplement or replace OCR engines in order to detect various characters of various fonts in patent (or other) figures, which leads to more accurate OCR. For example, the model can be a generative model. However, note that any generative approach and any discriminative approach, whether supervised or not supervised. Some neural network or machine learning algorithms can employ support-vector machines for enabling supervised learning models with associated learning algorithms that analyze data used for classification (e.g., text area detection, reference recognition, image segmentation, character segmentation, font recognition, filtering line segments, learning to avoid line segments adjacent to part numbers, image noise detection or filtering, image artifact detection or filtering, identifier visualization in figures) and regression (e.g., text area detection, reference recognition, image segmentation, character segmentation, font recognition, filtering line segments, identifier visualization in figures) analysis.

Data augmentation can be used by enabling significantly increasing diversity of data (e.g., image segments, font data) available for training models (as explained above), without actually collecting new data. For example, data augmentation can include cropping, padding, horizontal flipping, or other techniques for accommodating data invariances (e.g., text area detection, fonts, lines extending into references, lines coming close to references). Some examples of neural networks that can be used include deep neural networks, multilayer perceptrons, recurrent neural network (RNN), convolutional neural networks (CNN), stateful neural networks, non-stateful neural networks, spiking neural networks (SNN), or others. For example, the model or data augmentation or neural networks or machine learning algorithms can be programmed to avoid or minimize placement or visual interference of some content (e.g., references, identifiers, shapes, lines, objects, popups, hovers, slide outs, bubbles) over other content (e.g., references, identifiers, shapes, lines, objects, popups, hovers, slide outs, bubbles), whether currently presented or can be selectively presented (e.g., objects, popups, hovers, slide outs, bubbles), by presenting content to be as least visually interfering with other content already present or would be shown (although sometimes this may be difficult due to visual nature of some figures).

In order to enhance searching (e.g., text, figures by annotations), a search engine can be employed (e.g., Lucene). The search engine can enable text indexing and searching capability, implement search engines and local, single-site searching. For example, the search engine can employ fuzzy search, fuzzy search based on distance or edit distance, or others. For example, the search engine can enable a recommendation system based on figure content (e.g., show similar figures, show similar patents) processed, as described herein. For example, 'MoreLikeThis' Class can generate recommendations for similar documents.

Some artificial neural networks or machine learning algorithms, as described herein, can be trained or further trained or updated, which can be in real-time, based on user operations, as described herein, relative to figures or text, which can be in real-time. For example, if a certain reference, part number, or object in a figure was not recognized at all, or if a certain reference, part number, or object in a figure was recognized and that recognition is not correct, or a certain identifier or label was presented in or over a figure to be visually interfering with other figure content, then the user (e.g., editor profile) may be enabled to manually correct that non-recognition or incorrect recognition or move or adjust or resize or reshape that identifier or shape or label to be non or less visually interfering. As such, the neural networks or machine learning algorithms can track those user actions, which can be in real-time, and learn from those, which can be in real-time. Then, recognition or placement algorithms (or other text or image processing algorithms) can be updated, which can be in real-time, and iteratively implemented, which can be in real-time. Therefore, modification (e.g., recognition, correction, movement, resizing, reshaping, recoloring) of content (e.g., references, identifiers, lines, shapes, labels, positioning, resizing) can be used to train some neural networks or machine learning algorithms. For example, this can enable iterative self-learning and training of the model. In order to track these learning events and subsequent processing (e.g., part number recognition, then any subsequent processing actions based on these learning events can be assigned a time/date or a version identifier, which can help with debugging. These learning events can also be unlearned or eleted if determined to cause issues with such subsequent processing.

Some neural networks or machine learning algorithms can employ an optimized distributed gradient boosting library (e.g., XGBoost) designed to be highly efficient, flexible and portable. For example, this library can implement can machine learning algorithms under a gradient boosting framework for reference recognition, font recognition, filtering line segments, identifier visualization in figures, or other purposes, as described herein. For example, this library can provide a parallel tree boosting in a fast and accurate way or can run a distributed environment (e.g., Hadoop, SGE, MPI).

Some neural networks or machine learning algorithms can employ a decision tree that uses a tree-like model of decisions and their possible consequences, including chance event outcomes, resource costs, and utility. This can be useful in decision analysis to help identify a strategy most likely to reach a goal, which can be any as described herein (e.g., character recognition, object recognition). For example, the strategy can include more accurate reference recognition, more accurate font recognition, more accurate filtering line segments, least interfering identifier visualization in figures, or other purposes, as described herein.

Before, during, or after some neural network or machine learning algorithms, as described herein, have been employed on figures for text area detection, then recognition can be performed via an OCR engine (e.g., Abbyy SDK, Google Vision SDK, Tesseract SDK) with additional post-processing (e.g., output lexicon constrainment, list of references from text processing, original layout preservation, near-neighbor analysis, language specific grammar as preset in advance or upon patent jurisdiction detection based on user submitted query format or content, Levenshtein Distance, patent rules as per MPEP or CFR, standard expressions, rich information contained in color images).

The user can manually edit (e.g., move, resize to increase or decrease, drag, drag-and-drop) at least some content (e.g., identifiers, references, shapes, lines, objects) within figures. For example, when a part name label is visually indicated on the user interface, the user can select the part name label (e.g., via left-click, middle-click, side-click, right-click, double-click, touching, dragging, gesturing, speaking, freeform selection) and move or drag or drag-and-drop the part name label within the user interface in order to move the part name label to another location within the user interface. Further, when the part name label is visually indicated on the user interface, the user can select a location or draw an area anywhere within the user interface (e.g., cursor, pointer, vocal command, gesture, freeform selection) thereby causing the part name label to be moved to that location or the area within the user interface. When the display is a touch or haptic display (e.g., phone, tablet, laptop, desktop, vehicle), the user can touch the part name label and move, drag, or drag-and-drop the part name label to another location or area by touch. Note that this can also be done automatically or responsively when employing algorithms that perform such function based on preset criteria or parameters. As disclosed herein, these manual edits can be tracked and learned from for neural network processing, as disclosed herein.

Some figures can be watermarked. For example, some figures can be watermarked with content which can be conditional or varying based on various parameters or criteria, whether user set or operator set. For example, a watermark can be readily visible or non-visible. For example, a watermark content can be based on domain name, user profile name, words, images, operator website URL or operator trade name, or others. For example, an operator of a website providing software to enable any processing herein can automatically or responsively watermark some, most, many, or all figures, which can be in real-time upon processing or upon satisfaction or non-satisfaction of various parameters or criteria, whether user set or operator set.

For example, watermarking (readily visible or invisible, including position, size, color, font, or others, or invisible watermarking based on domain name, user profile name, words, images, operator website URL or operator trade name, or others) of a figure by the user or the operator is possible. Such watermarking may be indicated on a separate layer from the images on the figure or within the same layer of the figure itself thereby modifying the original image, though the watermarking may be invisible to the naked eye. The watermarking may modify the pixels in the image, which pixels may be selected by the user. The watermarking may be positioned over the content of the figure (e.g., objects, lines, references, identifiers, shapes) or may be positioned to avoid visual interference with the content of the figure (e.g., objects, lines, references, identifiers, shapes). For example, upon watermarking a figure sheet can be made available for user downloading or user viewing (e.g., based on user profile type).

A frequency analysis (or another form of term analysis) can be run on some word or words (based, for example, on total number or a mean, medium, or mode analysis of some, most, many, or all words in the figures or in a particular figure) that describe some, many, most, or all objects appearing in the figures, and then place some results of this analysis or of a particular result on the figures or external to figures or in a particular figure in a visually distinct manner (as described herein), or display some results on the figure (e.g., within labels, outside of labels) or outside of figure in response to a hover over (or other forms of visual presentation described herein) or activation of a particular object, or display some results in a legend on the figure, or otherwise in another form of visual output. For example, if the figure displays a cellular telephone, a desktop computer, and a computer mouse, which may be computer vision object pre-detected, then a frequency analysis can be performed for terms "cellular telephone," "desktop computer," and "computer mouse" in the text (e.g., specification). If the term "cellular telephone" appears 15 times in the text, "desktop computer" appears 10 times in the text, and "computer mouse" appears 3 times in the text, then numbers "15", "10", and "3" can be placed next to the words "cellular telephone," "desktop computer," and "computer mouse," respectfully, in the figures (e.g., when hovered, activated). The frequency analysis can be limited to specific portions of the text or the text as a whole. For example, when the text is a patent text, then the frequency analysis may only analyze the detailed description section, or the frequency analysis may only analyze the claims section.

Figure 1:
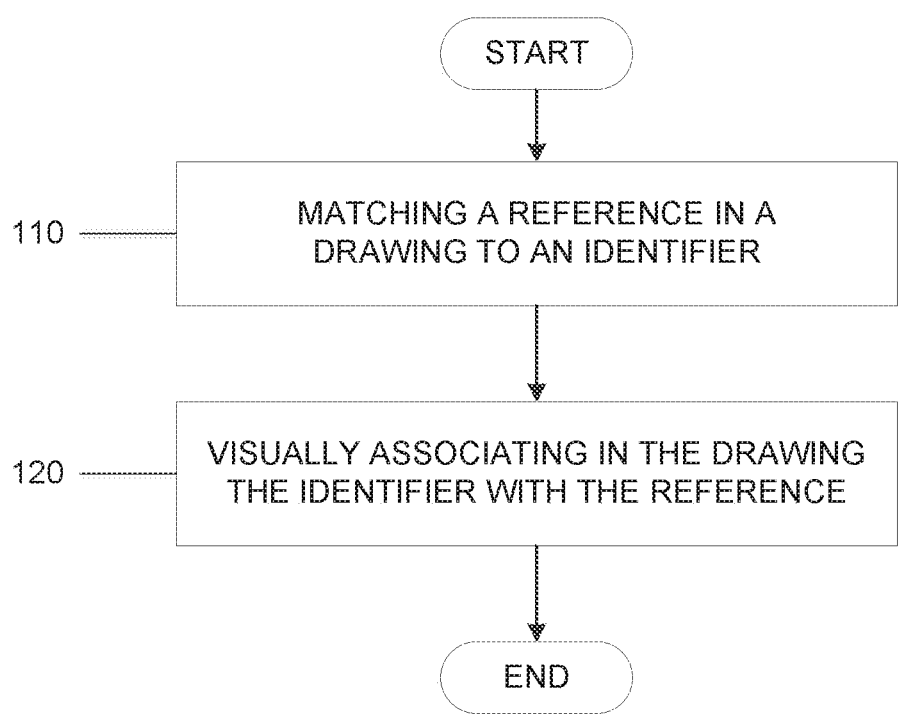
Figures 4A, 4B:
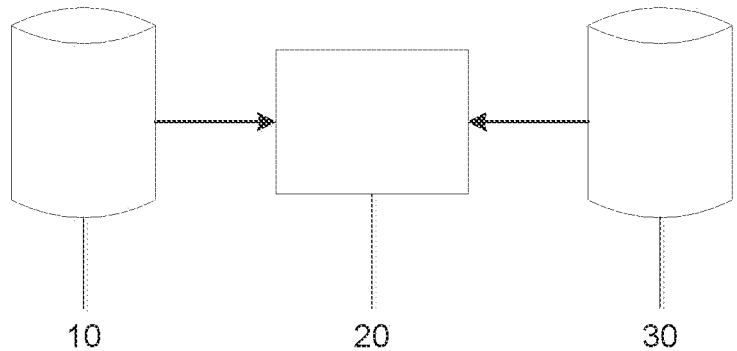

Some original or added content (as described herein) may be displayed next to some original or added content (as described herein) in some figures (e.g., upon selection as described herein, activation as described herein). For example, next to (e.g., within about 30, 25, 20, 15, 10, 9, 8, 7, 6, 5 or less inches or pixel or voxel equivalents) some, many, most, or all objects in the figure, there can be displayed some, many, most, or all of the figure numbers (e.g., FIG. 1, FIG. 3*a*, FIG. 6C) for which that same object appears, or display the figures numbers (e.g., FIGS. 12-16, FIGS. 3*a*-4D, FIGS. 1, 2, 3) in response to a hover over (or another form of visual output as described herein) or activating of a particular object (as described herein), or display the figure numbers (e.g., FIG. 6*s*, FIGS. 12, 13, 14, 15) in a legend on the figure, or it may display the number of figures. For example, if a specific object (e.g., part name "spoon") appears in each of FIGS. 1, 3, 5, and 10, then in FIG. 1, next to "spoon", is displayed, for example, "FIGS. 3, 5, and 10," or "4 Figures," or "4/10 Figures." In FIG. 5, next to that object, is displayed, for example, "FIGS. 1, 5, and 10," and similarly in FIGS. 5 and 10. Thus, the user looking at FIG. 1 will immediately know which objects appear in which other figures. Also, there may be various navigational arrows presented, as disclosed herein, in order to navigate to those figures from those part numbers or labels.

Some original or added content (as described herein) may be displayed next to some original or added content (as described herein) in some figures (e.g., upon selection as described herein, activation as described herein). For example, next to (e.g., within about 30, 25, 20, 15, 10, 9, 8, 7, 6, 5 or less inches or pixel or voxel equivalents) some, many, most, or all objects in the figure, there can be displayed some, many, most, or all of claim numbers (e.g., 1, seven, 2 only, or 1-3) or full claims (e.g., a device comprising x, y, and z) for which that same object (or variant or synonym or acronym of claim term or identifier) appears, or display some claim number (e.g., 1, 3, 10-13, four, or 12 to 20) of full claims in response to a hover over (or another form of visual output as described herein) or activating of a particular object (as described herein), or display some claim number (e.g., two, 4-8, 3) of full claims in a legend on the figure. For example, if a specific object (e.g., part name) appears in each of claims 1, 2, 3, 8, and 11, then in FIG. 1, next to that object, is displayed, for example, "Claims 1, 2, 3, 8, and 11." Thus, the user looking at FIG. 1 will immediately know which claims include or relate to which objects appearing in the figures. Similarly, next to some, many, most, or all claims the figure number (e.g., FIG. 1, FIGS. 10-80) for which each object recited in the claim appears.

Some original or added content (as described herein) may be displayed next to some original or added content (as described herein) in some figures (e.g., upon selection as described herein, activation as described herein). For example, next to (e.g., within about 30, 25, 20, 15, 10, 9, 8, 7, 6, 5 or less inches or pixel or voxel equivalents) some, many, most, or all figure numbers (e.g., FIG. 1), there can be displayed other patent publication numbers or links to such patent publications (whether prior art or not) that include some, many, most, or all of the objects shown in that particular figure (e.g., can be identified via part name or object based searching). Similarly, a hyperlink (or another activatable content) can be displayed to any published document, whether a patent publication, a blueprint, a manual, an article, a webpage, or others, that include some, many, most, or all of the objects shown in that particular figure (e.g., can be identified via part name or object-based searching). For example, some determination of which publication numbers or links to display may be based on a proximity analysis of some, many, most, or all of the objects within the text of that publication. For example, if FIG. 1 displays ten different objects (e.g., matched to part names, object detected), and another reference mentions all ten (or nine or eight or less) of those objects within 50 (or less or more) words of each other, then that publication number may be displayed (e.g., can be hyperlinked or activatable) somewhere (e.g., margins, white space, over objects, lines, shapes, references, identifiers) in FIG. 1 or next to "FIG. 1" or in response to a hover over (or other forms of visual output) or activation of phrase "FIG. 1" in the figures or an activation or hover over (or other forms of visual output) of any part of FIG. 1, or in a legend on the figure.

There can be a low quality or a poor-quality resolution warning per figure or per figures or per page or per pages or per patent or per patents or per group of documents. Likewise, there can be a high or good quality resolution warning per figure or per figures or per page or per pages or per patent or per patents or per group of documents. For example, based on various image processing, as described herein, a figure may be detected to be low or poor or high or good quality. For example, the figure may appear at low quality at a particular size desired by the user. For example, this may be detected based on number of pixels, image resolution, pixel density, contrast levels, or others. For example, if the figure is a low-resolution image, then the user may be presented with a display a text or audible warning to the user informative of such state. The user may be prompted to decide whether a further operation should be continued, such as choosing a different image size or different file or halting this particular operation. For example, character recognition may not proceed if the image is of low resolution, thereby preventing further modification of the figure.

Low or inadequate quality warning (e.g., visual, sound, haptic) can be output for poor or inadequate character recognition or identifier identification or reference-identifier matching or visual association (or other processes described herein). For example, a quality or confidence score may be assigned to a patent or a group of patents or a file or a group of files or a figure or a group of figures or a page or a group of pages based on some quality of some patent or a group of patents or a file or a group of files or a figure or a group of figures or a page or a group of pages. The quality or confidence score may be a number, a percentage, a pass/fail indication, high quality/low quality indication, or other forms of evaluation, each indicating some quality of some patent or a group of patents or a file or a group of files or a figure or a group of figures or a page or a group of pages based on an evaluation of a criteria or parameter, which can be user or operator set. Some criteria for some images may have the same weight or varying weight depending on the importance of the content within the context of a patent or a group of patents or a file or a group of files or a figure or a group of figures or a page or a group of pages. For example, some textual analysis (as described herein) may be performed on some claims to determine which of figures are associated with which claims, in particular, associated with an independent claim (or dependent claim or multiple dependent claim), and such figure(s) may be considered more important than other figures not associated with the claims. For example, the quality or confidence score may include a recall component, a precision component, an accuracy component, or others. For example, the recall component can be informative of how many areas with text from those being searched were found within figure (e.g., high recall value can mean high number was found). For example, the precision component can be informative of presence of false positive in segmented areas (e.g., high precision value can mean low probability of false positives). For example, the accuracy component can be based on the recall component and the precision component.

Some augmented reality can be enabled for some content, as described herein. For example, an augmented reality device (e.g., phone, tablet, laptop, desktop, eyewear, headset) can be programmed for various operations, as described herein. For example, the augmented reality device can include a camera. As such, when the augmented reality device is used (e.g., worn, held, oriented), then the augmented reality device can identify a published patent application or issued patent (or another document type described herein) based on camera imaging (e.g.; barcode detection and document access, published patent publication number detection and document access, issued patent number detection and document access, family ID detection and document access) the published patent application or issued patent (e.g., first page, upper margins) and then retrieve (e.g., download, read) some information about or of the published patent document or the issued patent (or another document type). Then, the augmented reality device can perform character recognition on some figures of that published patent application or issued patent to identify references. This recognition can occur locally or remotely (e.g., submission of OCR engine). Then, those references can be matched to identifiers and various visual association (or other operations described herein) can take place. For example, the augmented reality device can include a locator (e.g., indoor or outdoor signal triangulation locating algorithms, GPS chip, GLONASS chip). As such, the augmented reality device can be programmed to identify a geographic location or geographic area of the user based on locator information or based on surrounding landmarks and then allow for translation of the part names based on a language spoken within that geographic location (as associated with that location or area in advance). Note that this operation (just like any other operation described herein) can be manually overridden by the user at that time or preset not to occur in the user profile.

A webpage can be programmed to real-time track how many visual associations (or other forms of processing described herein) have been performed per figure or per figures or per page or per pages or per patent or per patents or per group of documents or per user. As such, some operation for some reference or identifier or figure or page or patent may be associated with a particular time period (e.g., 1 minute, 3 minutes, 30 minutes, 2 hours). For example, this time period may be how long an average user needs to perform that operation (e.g., manually match identifier with reference) for a category (e.g., annotate figure with part name). Therefore, the webpage can be automatically or responsively updated, in real-time, based on visual associations taking place per figure or per figures or per page or per pages or per patent or per patents or per group of documents or per user and multiplying whatever parameter is selected by the time period for the category. Therefore, the web page can automatically or responsively in real-time display how much time has been saved by visually associating (or other operations as described herein). For example, if manual annotation of a patent figure with 10 part numbers takes 30 minutes (e.g., 3 minutes per matching and annotation); then the webpage can real-time display 30 minutes saved once that patent figure has been annotated. Note that if some image processing (e.g., OCR, models, character recognition) or text processing (e.g., NLP, identifier detection, regular expressions) technology, as described herein, is improved (e.g., as user flagged or set or versioned), then some, many, most, or all preexisting annotated objects, as stored in database, may be automatically or responsively updated by modifying those objects based on a new algorithm or by re-running image or text processing on some, many, most, or all of figures, patents, files, documents, databases, collections or other forms of data. The annotated objects may also be semi-automatically updated where the user receives a prompt to initiate that update. Some criteria, parameters, or factors that may be used to determine whether this update is warranted on preexisting objects is precision, accuracy, or recall of part number recognition, confidence scores, quality scores, manual user grades of quality recognition upon figure review, or others.

Tooltips, popups, slide outs, hover overs, user prompts, balloons, notifications, alerts, callouts, or other forms of visual output may be output when activating part numbers (or part names or lines or shapes or objects) in the figures and then text paragraphs (sourced from the text) that contain that those part numbers can appear within the visual output. For example, upon activation, can focus or avoid focus on first use of that part number (or part names or lines or shapes or objects). The visual output may have visual elements (e.g., browser style) that enable navigational movement between paragraphs referencing that respective part number, without leaving the figures (e.g., next (forward) or previous (back) like browser). For example, upon navigational movement, then can focus or avoid focus on first use of that part number. When paragraphs are too large to fit within the visual output, then the user can scroll up or down to review the paragraph or the user can configure the user profile for how to display and navigate when such situation occurs. For example, the user interface may be programmed to enable some user navigation to relevant portions within the text, such as particular paragraphs within the detailed description section, to allow the user to view one or more sentences or paragraphs while continuing to view the figures (e.g., can be concurrent with viewing specification) or without leaving the figures. For example, some user input can allow for user navigation within the specification to other paragraphs that, for example, contain a discussion of the figures or of a specific part number. The relevant portions may be displayed via tooltips, popups, slide outs, hover avers, user prompts, balloons, notifications, alerts, callouts, or other forms of visual output, which may be configured to expand in size or move to different portions within the user interface.

A black/white or color-based legend (e.g., part names-part numbers) that is hyperlinked (e.g., part name, part number) or otherwise activatable (e.g., part name, part number) can lead to object or references or lines or shapes or to paragraphs in specification or claim or claim sections. For example, if a legend is displayed, then the legend may be configured to be hyperlinked (or otherwise activatable) to relevant portions within the specification, such as particular paragraphs within the detailed description section, that discuss a particular part name or part number shown or activated or hyperlinked in the legend. In addition, the legend may be presented with different colors based on the particular part name or part number or part name activated or part number activated or based on a frequency of occurrences of the part name within the specification, or may be ordered or sorted or organized (e.g., most common is on top, least common is on bottom) based on the frequency of occurrence of the part name or within a claim or set of claims.

Colors of hyperlink (or another activatable content) or font (e.g., reference, identifier) or shape (e.g., background, identifier, reference) or line (e.g., original, added) change based on part name certainty (e.g., more green means more confident that correct match between reference and identifier). For example, some visual representation (e.g., color, thickness, transparency, opaqueness, translucency) of hyperlinks (or other activatable content) or font (e.g., reference, identifier) or shape (e.g., background, identifier, reference) or line (e.g., added, original) may be varied in order to visually represent detection accuracy of the part name (e.g., confidence of correct match between reference and identifier), For example, hyperlinks (or activatable content) may be colored so that they are distinct from each other to indicate part name certainty.

There can be user promotion of visual association (or other processing described herein) on social media networking services (e.g., Facebook, LinkedIn, Twitter, Instagram) and then, upon automatic or responsive or manual confirmation of such promotion, the user can be automatically or responsively or manually credited some free visual associations (or other processing described herein) or time periods for using any processing described herein. This can be done within a browser without leaving website or portal or productivity application (e.g., MS Word local, MS Word cloud service, Google Docs) performing various processing, as described herein, based on a seamless login into a social media service profile. Further, any processing described herein can be provided up to a certain level or for a time period and then limited after the certain level has been reached or the time period expired. For example, there can be updating annotations (or other forms of visual association) based on one or more online social service networks, thereby enabling some users to collaborate to improve some accuracy of some annotations (or other forms of visual association). For example, the user may activate a social media tool to request generation of updated information for annotations (or other forms of visual association). Once some annotation is updated, then that information may be stored in the database. For example, when the user views the figure that is not entirely or correctly annotated, then that user can share this information with others via social service network.

Side-by-side presentation of the text (e.g., specification, background, summary, abstract, detailed description, claims) and the figure(s) (e.g., patent figures) can be displayed in the user interface. For example, the text can be left or right of the figures or vice versa. For example, the text can be depicted on one side of the user interface and the figure on the other side of the user interface, whether one-on-top of another in any order or lateral to each other in any order. For example, there can be intermediate user interface portions (e.g., static, dynamic, user input, content presentation) between the text and the figures, or the text and the figures can be positioned immediately adjacent to each other. For example, the text can be positioned within a box (or another shape) that can be or can avoid being user resized, user reshaped, user movable, user anchorable, user background color selectable, user text format or presentation customizable, or stationary. For example, the text can be presented to be inclusive of same specification pages or paragraphs or sentences or claims as selected part number in figure. For example, the text can be presented side-by-side with the figures based on the first time the user selected part number of the figures is mentioned in the text (e.g., synchronize active part number of figures to first time use in text) or vice versa. For example, the text can be presented side-by-side with the figures based on the part number being described in certain proximity of words (e.g., 5, 10, 15, 20, 25, 50) from the figure number (e.g., FIG. 1) of the figure being currently being viewed and the user having selected that part number in the figures or vice versa. For example, in the user interface, the specification and the figures may be depicted side-by-side, enabling the user to have a side-by-side view of the text and the figures. For example, the figures can be viewed independent of the text or vice versa. For example, the user can scroll the figures (e.g., horizontally, vertically, diagonally, carousel), while the text positionally remains as is. For example, the text can be viewed dependent on the figures or vice versa. For example, the text can move or refresh or redisplay or be inserted or be generated based on cursor activations or movements or stylus activation or movements or part number or part name or object or line or shape selection in the figure. For example, upon receiving the user input representative of user selecting, clicking, hovering over, or otherwise activating a part name or number in the specification or a part name or number or shape or line or object in the figure, the other side-by-side component (specification or figure) is programmed to responsively change in real-time and correspondingly display the related information (e.g., first time part number is used in text, part name in text within set amount of words from figure number (e.g., FIG. 1) in text currently being viewed and part name being user selected in figure) side-by-side.

If the part number in the figure is not described in the text, then, when the user selects such part number in the figure, various actions can take place. For example, the text can remain as is. For example, the user may be given a notice of such state (e.g., user prompt or popup or other form of visual output described herein). For example, the user can be provided with a recommendation or suggestion of what part name in the text may correspond to the selected part number in the figure (e.g., after computer vision on figures and text processing as described herein). For example, the user can be led to the figure number (e.g., FIG. 1) in the text (e.g., first mention of figure number, non-first mentions of figure number if other part names correspond to part numbers of figure being currently viewed and that figure corresponds to that figure number) of the figure being currently viewed. For example, the user may not be provided with a notice that the user selected part number in the figure is not described in the text. For example, the text may be moved or scrolled or refreshed or otherwise presented, as described herein, to show the part number in the text where that part number in the text is numerically close in value to the part number in the figure that is not shown and is currently user selected. For example, if the user selected part number in the figure is 10 and 10 is not described in the text, but part numbers 9 or 12 are described in the text, then the user may be led or be given an option (e.g., prompt, popup or other visual output as described herein) to be led to part numbers 9 or 12, whether those part numbers are mentioned in the text relating to the figure being currently viewed or whether those part numbers are mentioned in the text relating to some figure not being currently viewed (e.g., user may be led or given option to be led to that figure).

Sometimes various visual outputs can be opaque, translucent, or transparent. For example, some tooltips, popups, slide outs, hover avers, user prompts, balloons, notifications, alerts, callouts, or other forms of visual output or shapes can be non-opaque or transparent or translucent so the user can at least partially see therethrough. This may be useful when such visual output or shapes is or would be overlaid or superimposed or positioned over or placed over or otherwise visually interfere with some other content already shown or can be potentially shown in the figure (e.g., tooltips, popups, slide outs, hover avers, user prompts, balloons, notifications, alerts, callouts, shapes, objects, lines, references, identifiers). For example, where a popup (or other form of visual output) or shape is or would be displayed in a visually overlapping manner with an object of the figure or a line of the figure or a part number of the figure (or other content shown or would be shown), then the popup or shape can be configured to be transparent or translucent so that the popup or shape do not or would not visually interfere with a view of the figure so that the user can still at least partially see the underlying objects or lines or part numbers of the figure (or other content). Alternatively, the popup or shape (or other form of visual output) can be semi-transparent (e.g., 50/50, 30/70, 66/33, 20/80). In addition, the user can manually select a degree of transparency or translucency of the popup (or other form of visual output) or shape.

User scrolling (e.g., horizontal, vertical, diagonal, carousel) between processed figure pages or between processed text pages or between both can be continuous. For example, one manner of such continuity is via not viewing one page at a time per physical or virtual button press or gesture (or other input element activation), but by having a concurrent display of at least two portions of consecutive processed pages when scrolling (e.g., bottom or lateral end of one page and top or lateral beginning of following page) as if those pages appear stitched or as a single page or with a gap between those pages. For example, consecutive annotated figure sheets can be seen during a continuous scroll-down or up operation that brings those pages into view at, in a case of a scroll-down, a bottom of the interface window, toward the top of the interface window, and then out of the interface window. For example, the figure sheets can be continuous via end-to-end image stitching (e.g., bottom to top, side-to-side) or image merging or new image creation out of consecutive images or composite image generation. For example, during some scrolling, portions of two consecutive annotated pages can be seen, which can also update visual marker coordinates. For example, to enable a continuous and consecutive user scroll of a plurality of figure sheets, whether the user scroll is horizontal or vertical, there can be an image stitching technique employed that stiches the figure sheets to each other, whether laterally or top edge portion or bottom edge portion, which can be end-to-end.

Insertion of user comments (e.g., callouts, sidebar, side pane, comment bubbles, adjacent to part names or numbers, in objects or shapes, along lines, figure numbers) can be performed. For example, one way of such commenting is a callout tagged onto or stemming from some content of figure or page (e.g., objects, lines, part numbers, part names, shapes, figure numbers). For example, the user may click on a part number and then cause a comment to extend therefrom (e.g., stem). Some of such comments can be saved or deleted for other users, whether in the same or not the same organization or enterprise domain or accounts or sub-accounts. For example, some of such user comments can be as in MS Word 2016 or 2019 or Adobe Acrobat DC of 2019. For example, a first user may be able to insert comments into a sidebar or popup (or other forms of visual output) related to the figure at hand to assist in manually modifying, revising or otherwise improving at least some annotation, as described herein. A second user may also provide or be precluded from providing comments, User access permissions may include review/comment or review only. Other user access permissions, which can be tiered, may be possible. For example, with review/comment permission, a user can insert comments into the document or modify or delete comments within the document (e.g., own, others). With review only permission, a user can view the document, but cannot make any changes to the comment and cannot insert, modify, or delete any comments. User access permissions can be selected based on specific individuals (e.g., email, user identifier) or groups, such as internal or external to the user's organization. For example, user groups can be email domain name based. Some users access permissions can be cached in the user's applications (e.g., browsers) or accessed via cookies or stored within the document. Sometimes, the user comments can be visually associated with, tagged to or stemming from objects, lines (original or new), references, identifiers, figure numbers, or other content shown in figure or page.

Movable labels (e.g., part names, shapes, translations) or tags (e.g., part names, shapes, translations) can be enabled in figures. For example, if a label or tag overlaps or would overlap or otherwise visually interfere with other content of the figure (e.g., object, line, reference, identifier, shape) or other labels or tags, then that label or tag may be manually moved to avoid or minimize or reduce such overlap. For example, the label or tag may be moved by stylus or finger movement or dragged via a pointer or cursor or gesture. Once the label or tag has reached a satisfactory location or area, then the user may take an action, such as clicking a button of a pointer or cursor device to position or anchor the label or tag. Note that this label or tag movement can also occur automatically or responsively before, during, or after label positioning on figure (e.g., when image processing algorithm determines that label or tag currently overlaps or would overlap or otherwise visually interfere with other content in figure). Further, note that movement of the label or tag causes the label or tag to still remain visually associated or stemming from that part number. For example, if there is a tail or line from the label or tag to the part number, then the tail or line can shrink or stretch or bend or become rectilinear when the label or tag is moved.

Part name search based on figure annotations (or variations of figure annotations) can be enabled. Further, sub-search for part names within results of the part name search can be enabled as well. For example, figure-based annotation searching can occur, in which a search for part names brings up a list of documents having at least one figure displaying an object described by or associated with the part name being searched. The list of documents can be ranked based on a number of times the part name being searched appears within the figures of the documents or based on a number of figures that include that part name, or a combination of both. When the user accesses the list of documents and selects one of the documents for view, then the user may be provided with a view of the first figure of that document having the part name (e.g., FIG. 1, FIG. 6) and the user can then toggle between objects or part numbers or part names or lines or shapes within that figure containing that part name or toggle between figures or part numbers or part names or lines or shapes within that document, each of those figures having or not having or associated or not associated with that part name, or toggle between documents having that part name. Further other part name filtering (e.g., per figure, per figures, per page, per pages, per specification, per patent, per group of documents) could be done to sub-search for other part names within the annotations brought up from prior annotation searching or within the list of documents noted above. For example, if a search for "car" results in ten patent documents where "car" is annotated in some figures or associated with some part number in some figures, as explained above, then a sub-search can be done for a single figure that has "seat" and "wheel" annotated or associated with some part numbers.

In order to aid in quick visual understanding and user comprehension, there can be enabled different colors (e.g., highlight, backgrounds, fonts, part numbers, part names) when displaying figures or selecting various parts in the figures, with some, most, many, or all of those figures resulting from part name searching or sub-searching within single patent or group of patents that resulted based on part name search or sub-search. For example, some search results of a figure-based search for a part name (e.g., annotation, association) or of a figure-based search for multiple part names may result in a list of documents containing the part name or multiple part names. The list of documents may be color coded or otherwise visually distinct (e.g., shading, fonts, patterns) based on relevance of documents or to distinguish part names from each other. In addition, a figure-based search for part names within a specific document (or a group of documents or files or pages or figures) may result in a color-based distinction between part names within that search (e.g., located part name or part number for that part name can be highlighted) or a color-based distinction between part names in a figure (e.g., part names or numbers are different colors yet located part name or number is more visually distinct) so that the user can readily identify a searched part name with an object in the figure that has or does not have the same or similar color.

There can be an online market for sale or resale or leasing of visually associated figures. For example, the user can create an online social community (e.g., social networking service, social networking group, user forum) or an online marketplace (e.g., Amazon, eBay, Dell) and allow others to view or edit some annotated documents or specific annotated figures, or allow for others to purchase or lease some of such documents or figures. Alternatively, the user can allow others to view and purchase or lease some annotated documents or figures but not be able to edit the document or figures.

The user can color fill (e.g., similar to kids black and white coloring book) some regions within figures based on object or perimeter or edge or feature detection, whether manually (e.g., freeform, paint tool) or automatically (e.g., computer vision). For example, some object or perimeter or edge or feature detection in some figures can be enabled. Therefore, the user can then color fill in regions within figures based on such detection. For example, when a location or area is defined (e.g., freeform, defined shape creation) or outlined or snapped-to-fit a border of an object or a region as specified by a pointer or cursor, then some pixels which are connected to that location or area or within that location or area are changed to a predetermined color up until the perimeter or edge or feature. This can be done manually or automatically.

In order to aid for figure review (or any other content review) when a blue light filter, night mode, grayscale, or digital wellbeing (e.g., Android) mode is active, at least some figure or text (or other content) illumination, contrast, color or form or format or shape or size of presentation adjustment or accommodation can be performed (e.g., increased, decreased, changed, tweaked). This can be pre-programmed to correspond when the blue light filter, night mode, grayscale, or digital wellbeing mode is active (e.g., based on user profile settings). However, this can also be automatically or responsively detected based on browser setting or information obtained via browser (e.g., user information, cookies, applets, extensions) or prompt the user at likely times (e.g., accommodate for time zones and work day and weekends and civil holidays and religious holidays) when the blue light filter, night mode, grayscale, or digital wellbeing mode is active, with the prompt inquiring if the blue light filter, night mode, grayscale, or digital wellbeing mode is currently active. For example, when the blue light filter, night mode, grayscale, or digital wellbeing mode is active, then some objects, lines, shapes, part numbers, or part names, whether in text or figures, can be made darker, lighter, more or less contrast, brighter or darker, perimeter or internal area or font or line or object color inverse, or reversal, or others.

In order to aid in quick visual understanding and user comprehension, there can be enabled reshaping of labels or shapes within which part names are shown (e.g., can stretch square to create rectangle or shrink oval to create circle). Note that any open or closed or symmetrical or asymmetrical shape is possible. For example, sizes or shapes of labels in which part names are shown may be specified by the user prior to annotation, for example, by specifying a height-to-width ratio for some, many, most, or all labels. In addition, after annotation, the user may specify a size or shape of a specific label by dragging a corner or side of the label in order to resize the label or reshape the label (e.g., user can stretch square to create rectangle or shrink oval to create circle). In response to such resizing or reshaping, other labels in that figure or that page or that file or that document or others subsequently accessed by that user may be resized or reshaped accordingly or remain as is, without being reshaped or resized. Note that some fonts can remain the same size or proportionally adjust, whether increase or decrease. Further, text (e.g., part name, translation) may wrap if determined to be visually interfering (or can be manually user activated or disabled).

Advertisements (e.g., text, graphic, video, audio) relating to processed content (e.g., annotated patent figures, annotated blueprints) can be dynamically or statically generated or dynamically or statically served. Some advertisements can be presented concurrent with annotated figure (e.g., over figure, over figure margin, not over figure) or before or after. Some advertisements can relate to content of figures or text (e.g., descriptions, claims). For example, computer vision can be employed to figures in order to identify objects based on which related advertisement content can be dynamically or statically generated or dynamically or statically served. For example, patent classification codes can be read or NLP can be employed to the text in order to determine what patent classification or topic the text relates to and dynamically or statically generate advertisements or dynamically or statically serve advertisements. For example, some content of advertisements can relate to patent agents, patent attorneys, patent illustrators, patent translators, patent searchers, patent litigators, patent expert witnesses, patent paralegal services, invention marketing, invention promotion, invention manufacturing, venture capital, start-ups, emerging growth companies, patent brokers, litigation finance, patent insurance, or others (non-patent related content that can relate to patent figures or non-patent figures). Some advertisements can be limited to IP addresses or IP address ranges or by user profiles (e.g., to avoid legal violations). If ad-blockers (or other forms of disabling user tracking or user access control or content presentation) are detected, then none, some, most, or all processed content, as described herein, can be given user access. For example, upon detecting of an adblocker (or other forms of disabling user tracking or user access control or content presentation), then a disable adblocker (or other forms of disabling user tracking or user access control or content presentation) message can be shown or a whitelist message is shown. Note that a freemium-based model of accessing processed content, as described herein, can be enabled based on advertisements being presented. For example, some processed content can be provided with advertisements and some processed content can be provided without advertisements but with paid-subscription to such content (e.g., e-shopping cart, cryptocurrency). For example, some reduced functionality (any described herein) can be provided with advertisements and some enhanced functionality (any described herein) can be provided without advertisements but with paid-subscription to such content (e.g., e-shopping cart, cryptocurrency).

There can be timed or disappearing popups, tooltips, balloons, shapes, bubbles, slide outs, callouts, prompts, or labels (or other forms of visual output) upon activation (e.g., click, selection) thereof or hover (or some other form of activation or selection) thereover. For example, after 1, 2, 3, 4, 5, 6, 7, 8, 9, 10, 15, 20, 25, 30, 35 or more seconds, which may be started from the user click or mouseover that respective part name (or other content not original to that figure) disappears or becomes transparent or gently fades away (e.g., within about 1, 2, 3, 4, 5, 6, 7, 8, 9, 10 or more seconds. For example, some popups (or other forms of visual output) may have a timed appearance or a disappearance feature. For example, as the user moves the pointer over or away from the part name or the part number or the line or the shape or the object or the figure number or the popup (or other forms of visual output) or clicks thereon, then the popup may automatically or responsively disappear from the user interface causing a background content to appear in a foreground. The popup may appear again if the user clicks again in that location.

Some, many, most, or all processes that are described herein can be or can avoid being rerun upon various conditions, parameters, or thresholds being satisfied or not satisfied. For example, character recognition or figure annotation can be rerun on already processed figures when a new version of character recognition or figure annotation (or any part thereof or another process described herein or any part thereof) comes out or a version is updated or tweaked or modified. This rerun can be requested whether manually or automatically (e.g., can be or can avoid being rerun upon various conditions, parameters, or thresholds being satisfied or not satisfied) or on a set of files or specific pages or figures or documents or only on those files or pages or figures where certain conditions, parameters, or thresholds are met or not met or when confidence score for those files or pages or documents is below or above or satisfy or not satisfy certain thresholds (or conditions or parameters). For example, if some figures have all part numbers correctly recognized (e.g., user confirmed) and those part numbers have correct part names (e.g., user confirmed) associated therewith (whether displayed or not displayed or present in figures or not present in figures), then those figures can be flagged to be skipped for reruns, if reruns are based on various processing types (e.g., reference recognition, identifier detection, identifier annotation) that do not need to be corrected in those flagged figures. During a rerun, those users viewing the processed figures (e.g., annotated based on current or previous or prior versions of algorithm) can be presented with a message informative of such rerun or be provided with a link or email or social media post or OTT message or text message to re-access this document later or sent that newly processed document (e.g., email, social media posts, text message, OTT message) when new version finishes rerun on those figures being viewed or on some, many, most, or all documents or files or figures that need to be re-processed.

If reruns produce worse results than before, then the user can manually notify administrators (e.g., emails, social media posts, OTT, text messages) or some messages can be sent automatically to administrators (e.g., operators) upon some visual element activation (e.g., button, link, form completion) or rerun can be halted on per file or per figure or per page or per file set or per document set basis. When some features are updated or new features that do not require rerun of object detection, reference recognition, text processing, identifier detection, part name translation, or annotation (or other processes described herein) are added, then those features can be updated or added to files or figures or database records or data structures based on object detection, reference recognition, text processing, identifier detection, or annotation (or other processing described herein) data that is already pre-existing or from current or prior or previous versions of object detection, reference recognition, text processing, identifier detection, or annotation (or other processing described herein). For example, when a new or updated version of some process described herein becomes available, then some execution of this new or updated process (e.g., image processing, text processing) can be automatically or responsively performed or manually requested to be performed on some previously processed content (e.g., annotated figures) based on the new or updated version. Some users may or may not be notified of the new or updated version. The new or updated version can be rerun automatically or responsively on a set of files or figures or pages or only on those files or figures or pages where certain parameters, criteria, or thresholds are met or not met or when some confidence scores for those files or figures or pages satisfied or does not satisfy certain thresholds, parameters, or criteria. For example, only users that have downloaded such files may be notified of the new or updated version. Those new annotations will remain until another version of some process described herein (e.g., character recognition, figure annotation) is made available and that version applies to the new annotations based on various conditions, parameters, or thresholds being satisfied or not satisfied. In order to track these reruns, version control is employed for each algorithm version (e.g., figure sheet processing, text processing) and then each patent document or figure sheet or text is flagged with such version identifier (e.g., time/date stamp, version numbers).

Dropdown autocomplete from a search box or autocomplete in the search box can be enabled. For example, document numbers (e.g., published patent application number, issued patent number) being input into the search box or dropdown presented from the search box can become or are more visually distinct when referring to documents that are flagged as processed (e.g., annotated). For example, document numbers (e.g., published patent application number, issued patent number) can be more visually distinct when processed, as described herein, or less visually distinct when not processed, as described herein, or vice versa. For example, document numbers (e.g., published patent application number, issued patent number) being input in the search box or dropdown presented from the search box can become or are more or less visually distinct when referring to documents that are flagged as having a high or low processing confidence or quality score (e.g., higher score has more visual distinction and lower score has less visual distinction or vice versa). For example, the high or low processing confidence or quality score can be based on various factors, parameters, criteria, or thresholds (e.g., figure quality, figure resolution, figure contrast). For example, the high or low processing confidence or quality score can be based on annotation quality score (e.g., how part numbers recognized relative to how many parts numbers were expected). For example, the processing quality or confidence score can be presented within the dropdown or the search box. For example, during a user entry of a search query (e.g., published patent application number, issued patent number), and before the search query is completely entered in the search box, then some suggestions based on prior searched queries (user or other users) can be provided to the user, for example, in a drop-down menu so that the user can select from these suggestions. The search box can include other features, such as autocomplete, and may present suggestions in a visually distinct manner, e.g., various colors, to indicate prior annotation or annotation confidence level.

Labels or shapes or tooltips or popups (or other visual outputs described herein) can be automatically or responsively presented over figures, while avoiding or minimizing positioning over parts or callouts or other labels in order to avoid or minimize visual interference with content already present or would be present in figures. For example, this functionality can be performed by looking for and avoiding or minimizing overlap with object border lines or callouts or other labels or shapes or tooltips or popups (or other visual outputs described herein). For example, this functionality can be performed by avoiding or minimizing object border lines or callouts or other labels or shapes or tooltips or popups (or other visual outputs described herein) being positioned under labels or visually interrupted by labels. For example, this functionality can be performed by labels or shapes or tooltips or popups (or other visual outputs described herein) or other labels or shapes or tooltips or popups (or other visual outputs described herein) being shaped or reshaped (e.g., open shape, closed shape, symmetrical shape, asymmetrical shape) or sized or resized to avoid positioning over parts or callouts or labels. For example, labels or shapes or tooltips or popups (or other visual outputs described herein) can be programmed to present away from objects or callouts or other labels or shapes or tooltips or popups (or other visual outputs described herein) or towards most whitespace (or other background color) or towards margins in figure or defined area within figure. For example, labels or shapes or tooltips or popups (or other visual outputs described herein) can be programmed to present in a specific direction or avoid or minimize presentation in specific directions or areas of figure based on presence of objects or callouts or labels (e.g., based on pixel patterns, area flags or delineations, black pixel density).

In order to aid review for those users who are disabled (e.g., legally blind), then haptic or braille annotations can occur. For example, this functionality can be enabled via the user tactile feeling the identifier (or other content described herein) or the shape or the label or the tooltip containing the identifier (or other content or visual output described herein) on the figure by moving or placing finger on that area. For example, some part numbers and lines extending between part numbers and objects or between part numbers and part names or objects themselves can be similarly tactile felt as well. This haptic or braille content can be applied to any content described herein (e.g., translations, scores).

When a certain section of a figure or image or page is desired to be processed, as described herein, then that section can be user selected via a lasso or freeform shape that is user drawn or via a predetermined shape that is user drawn or dragged or moved onto or menu selected. This functionality can be browser-based (e.g., user workspace, extension) and enables the user to selectively annotate (or otherwise process) specific portion of figure or some specific file (e.g., local, remote).

Information disclosure statement (IDS) document (e.g., image PDF, form-fillable PDF, MS Word document, image, JPEG, TIFF) can be read (e.g., computer vision, OCR, text processing) and some, many, most, or all patents (e.g., US, foreign) or some, many, most, or all patent applications (e.g., US, foreign) or some, many, most, or all non-patent literature (NPL) (e.g., webpages, videos, PDF documents) can be automatically or responsively detected or identified (inclusive of their data sources or storage sources), which can be based on publication identifiers (e.g., patent number, patent publication number, URL of non-patent literature document). For example, some of such detection or identification can be based on regular expressions, keyword or hyperlink to data source or storage source mapping, search engine queries, or others. Then, documents (e.g., files, images, videos, PDF files) corresponding to this detected or identified content can be accessed (e.g., read remotely, downloaded and then read). For example, at least some processing described herein (e.g., annotation) can be performed on these documents or copies of these documents. For example, these documents can then be searched or available for searching (e.g., indexed) based on text terms or figure annotations therein, which may be available based on processing these documents as described herein. For example, the user can be provided with a user interface for such searching (e.g., Google style with various search operators). For example, in order to speed up such searching, these documents can be indexed upon access to form an index (e.g., table, hash, array, vector, data structure) with a set of corresponding links to these documents. As such, when the user interface receives a user search query, then the index can be searched and then a set of results can be provided based on the index with links to these documents. In order to save space, these documents or the index can be deleted when user requested or automatically or responsively upon completion as preprogrammed. Note that this searching can also enable output of notices when some content within these documents satisfies or does not satisfy various parameters, criteria, or thresholds. For example, if a predetermined set of words (e.g., user entered, machine generated) appears in some text or some drawings or is associated with certain drawings, whether before, during, or after processing of documents as described herein, then a user prompt (or other form of visual output as described herein) can be presented (e.g., display, speaker). For example, the predetermined set of words can be or can avoid being based on various proximity conditions, parameters, or thresholds (e.g., same figure page, within 10 words of each other).

There can be determining whether a published patent application or an issued patent for that same published patent application (e.g., associated based on published patent application number contained in issued patent, same serial number, family ID) has better quality drawings or part number recognition rate or more accurate descriptive text (e.g., specification, claims). Then, whichever one has or is expected to have higher quality drawings (e.g., image resolution, pixel density) or higher part number recognition rate (e.g., confidence score, quality score, recall or precision or accuracy component) or more accurate descriptive text, can be used (e.g., presented to user) instead of a lower quality one, whether asked for or not asked by user. For example, if the issued patent corresponds to the published patent application, then even if the user requested the published patent application, the user can be presented with the issued patent (assumption is that issued patents have better drawings that published patent applications due to substantive examination), which can be a default presentation. For example, the issued patent and the publication patent application can be processed in parallel or serially. Alternatively, the user can be provided with a recommendation to access the issued patent over the published patent application and the user can proceed with the recommendation or still access the published patent application. Further, a default can be set for some, many, most, or all users that if the published patent application and the issued patent for that same published patent application are available, then the issued patent will be served by default unless the user requests otherwise or vice versa. If the issued patent does not correspond to the published patent application (e.g., not published), then the issued patent is processed, as described herein. If the published patent application does not correspond to the issued patent, then the user can be informed that the published patent application is pending or abandoned (e.g., perform PAIR check, Google Patents check). For example, checking for higher quality drawings or higher part number recognition rate or more accurate descriptive text can be performed on database records (or other storage forms) containing the published patent application or the issued patent (e.g., USPTO database, Espacenet database). When there are priority relationships (e.g., continuations, divisionals), which can be determined in various ways (e.g., ADS processing, OCR or text processing, PAIR check, Goode Patent check), then the user can be informed of such and given an option or not given an option to use latest document associated with that patent family, whether that document is published patent application or issued patent (e.g., higher quality processing can be performed again). For example, the user may be presented with a family tree through which the user can traverse. When continuations-in-part are detected (e.g., ADS processing, OCR or text processing, PAR check, Google Patent check), then the user can be informed that there may be new content included (e.g., based on figure sheet comparisons, text comparisons). When reissue or re-exam or IPR/CBM/PGR review issued patents are detected (e.g., ADS processing, OCR or text processing, PAIR check, Google Patent check), then the user can be informed of such and given an option or not given an option to use latest document associated with that patent family.

For example, when the user searches for a patent document, then some search results may display a link to the patent document itself and a link to a corresponding patent publication or issued patent document, depending on what type of document was searched for and if that corresponding document is available. From these two documents, the document having better image quality figures (e.g., image resolution or pixel density averaged over all figures) or more high-quality drawings or a higher part number recognition rate or better text parsing may be displayed higher in the list or made more visually distinct relative to the other document. Furthermore, before running image processing, as described herein, or displaying a document, as described herein, a determination may be made as to which of two corresponding documents, (e.g., published patent application and its resulting issued patent), contain better quality drawings or a higher recognition rate. The document with the better quality or higher rate may then be displayed or may distinctively be displayed in association with the other document. The user may also be given a choice (e.g., menu, prompt, graphic, hyperlink), which document to access or there can be a default access to the issued patent unless otherwise requested. For example, there can be a button that switches between the issued patent document and the published patent application document. For example, if both documents are being serially or parallel processed, then the issued patent document may be given higher processing priority or processed first and the published patent application document may be given lower priority or processed second or vice versa. The button can be of one visual presentation (e.g., red) before the published patent application document is finished processing and the button can switch to another visual presentation (e.g., green) when the published patent application document finished processing. This switch may visually notify the user to switch between the issued patent document and the published patent application document, if the user desires to do so.

Various network-based processing described herein can occur, be caused by, or enabled via various telecommunications networks (e.g., wire, fiber-optic). For example, some of such networks can include LAN, WAN, cellular, satellite, or others. These networks (e.g., Verizon, ATT, Sprint, Comcast) can include telecommunications towers, satellites, cellular zones, cellular towers, switches, routers, hubs, antennas, modems, web servers, cache servers, domain name servers, data centers, content delivery networks, firewalls, intrusion detection systems, PLCs, CPUs, GPUs, data exchanges, or other telecommunications equipment that receives, sends, processes, inputs, outputs, broadcasts, transmits, or otherwise acts with or on or for various content or network-based processing described herein. For example, some of such networks can be wired, waveguide, wireless, or others. For example, some of such networks can be a local area network (LAN), a wide area network (WAN), a cellular network, a satellite network, a personal area network (PAN), a fiber optic network, or others. For example, some of such networks can be embodied via a plurality of radio signals, a plurality of light signals, a plurality of sound signals, a plurality of infrared signals, or others. For example, some of such networks can be based on Wi-Fi or Li-Fi technology.

Content-based user workspaces can be enabled. For example, a user or group of users can be granted access to files, as processed herein, of a certain document type (e.g., patents, published patent applications) and of a certain content type (e.g., automotive, surgical, dental, medical, chemical, electrical). This can be done based on patent classification codes (e.g., front page of patent publication). For example, a company X that designs car transmissions can be given access to files, as processed herein, where those files are only patents or published patent applications and those patents and published patent applications have patent classifications relating to car transmissions. Therefore, the company X can only access car transmissions content but not patent content related to hats. This type of access control can be subscription-based and various patent classification types can be added or removed from user profiles to enable such control. For example, some, many, most, or all annotated patent files can be provided to users based on patent classifications associated with those users based on user profiles. For example, upon user entry of patent number, there is a check for patent classification code associated with that patent number. If that patent classification code matches the user profile or is within a group of classifications within the user profile, then that patent can be annotated or enabled to be annotated, if not already stored in database.

When multiple users serially or concurrently request that multiple documents (e.g., patents, blueprints) be processed dose in time to each other (e.g., within minutes, under about 15 minutes, under about 30 minutes), as described herein, there may not be adequate computing resources to quickly process such amount of information, especially since many documents can be long or complicated in content and the user may not want to wait for days. As such, there can be a document processing queue which intakes user requests and handles accordingly. For example, an AWS Lambda function can be used to process messages in a standard Amazon SQS queue to offload tasks from one application component by sending these tasks to a queue and processing them asynchronously. For example, the AWS Lambda can run code in response to events and automatically or responsively manage the computing resources required by that code. For example, there can be a dynamic real-time scaling up or down of a computing cloud instance based on how much processing load is currently occurring or how many requests for document processing, as disclosed herein, have been currently received.

Figure 9A:
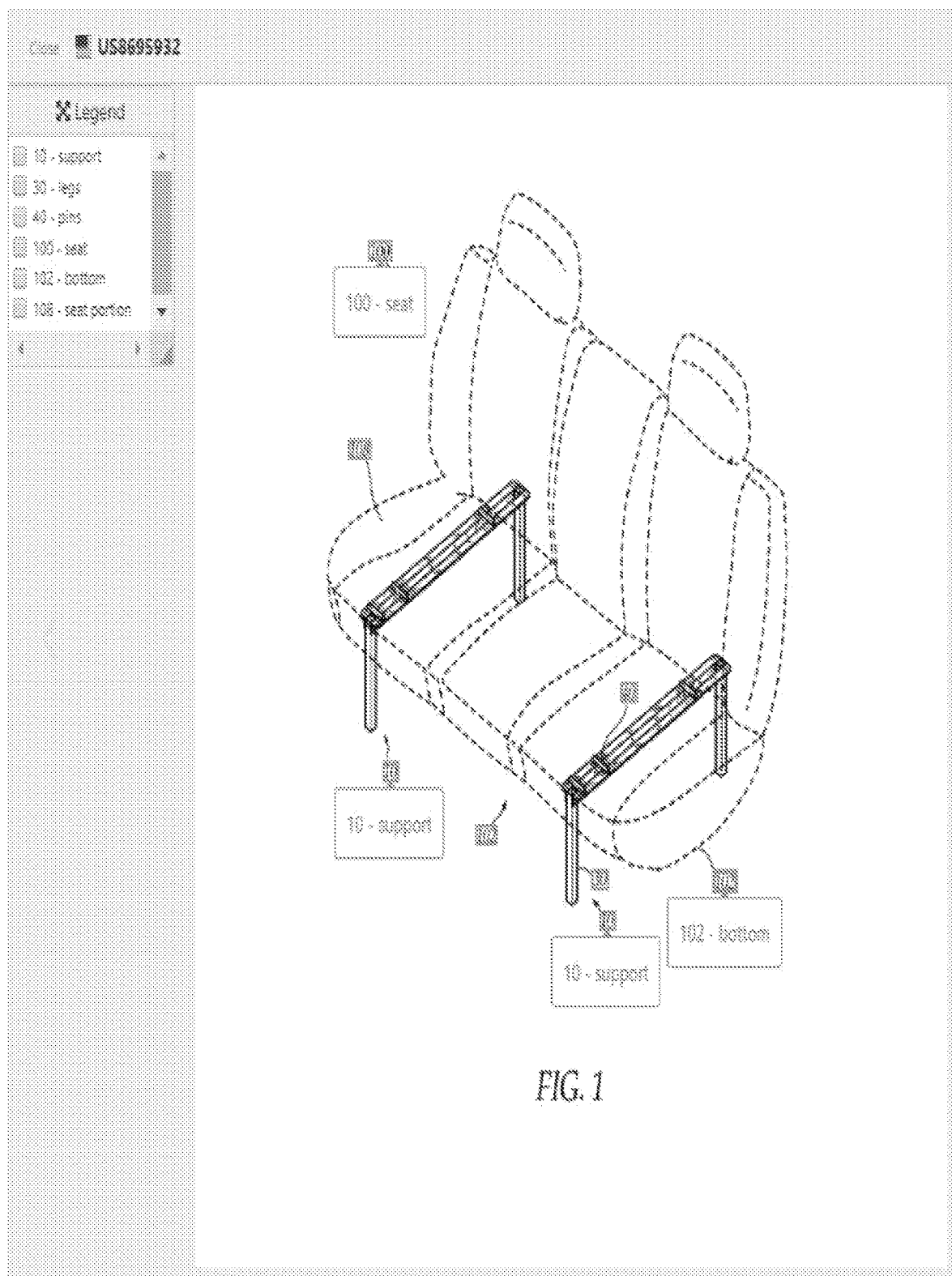

FIG. 9A is an embodiment of a presentation of an annotated figure according to this disclosure. The pre-annotated figure was obtained (e.g., extracted, copied) from FIG. 1 of U.S. Pat. No. 8,695,932. The pre-annotated figure was then ran through various processes, as described herein, which, as shown, properly recognized all reference numerals or part numbers in the pre-annotated figure. This proper recognition is indicated by various green (or other colors) bounding boxes (or other closed or open or symmetrical or asymmetrical shapes or visual markers) surrounding the reference numerals or part numbers. Note that such boxes can be not shown or not visible as well. FIG. 9A also shows an legend which displays each reference numeral or part number appearing in the figure next to its respective description or part name. For example, the legend sources its data from the part numbers that were recognized in the figure and matched to the part names identified in the specification. However, note that this can vary (e.g., data can be text based even if not all part numbers are recognized in figure or vice versa). Next to each reference numeral or part number is a checkbox, which is user selectable, as further explained below. The legend is resizable but can be fixed in size. The legend has a rectangular shape but can be reshaped or remain in the rectangular shape. The legend is movable but can be anchored or not movable. The legend is shown left of the figure but can be right or top or bottom of the figure. Note that none of the part numbers or part names or part numbers and part names have been currently user selected in the legend. Furthermore, FIG. 9A indicates that a user has manually selected (for example, by clicking or otherwise activating) four of the reference numerals or part numbers in the figure resulting in the annotated word(s) or part names displayed next to the reference numeral. This is indicated by various blue (or other colors) rectangular shapes (or other closed or open or symmetrical or asymmetrical shapes) surrounding or enclosing the reference numeral or the part number and the annotated word(s) or part names shown in red font (or another color). Note that the such shapes can be not shown or not visible as well. Further, note that such shapes are visually associated with the reference numerals or part numbers by triangular tails (or other shapes). As such, when the shapes are selectively moved, then those tails can shrink or stretch or bend or become rectilinear in order to maintain visual association throughout movement. Also, note that the shapes are positioned without overlapping the object, the lines, the reference numerals or part numbers, or other shapes based on positional optimization, as explained herein.

Figure 9B:
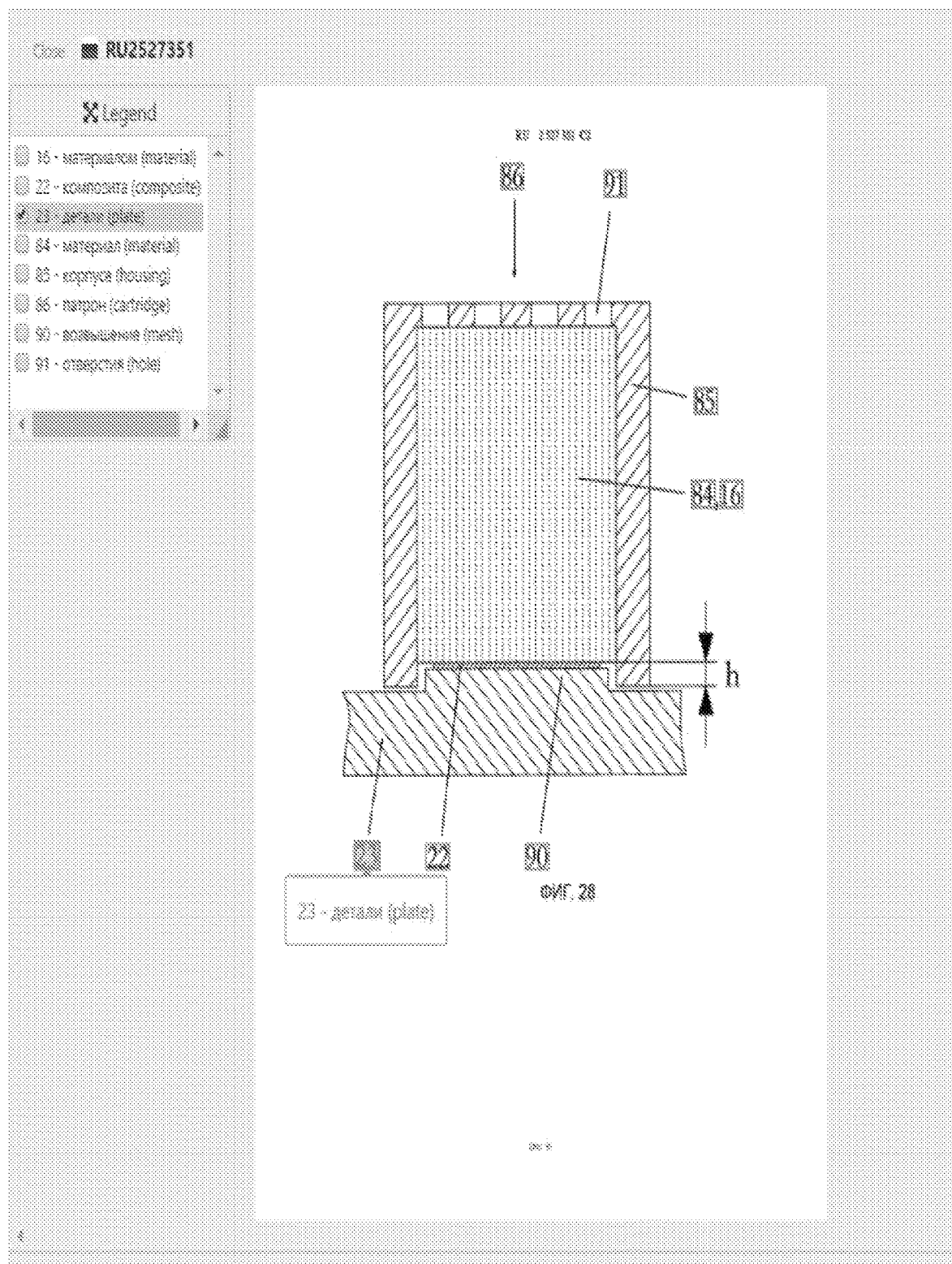

FIG. 9B is an embodiment of a presentation of a translated annotated figure with a translation legend according to this disclosure. The pre-annotated figure was obtained from Russian Patent 2527351, and was then run through various processes, as described herein, which, as shown, properly recognized all reference numerals or part numbers in the figure. This proper recognition is indicated by various green (or other colors) bounding boxes (or other closed or open or symmetrical or asymmetrical shapes) surrounding the reference numerals or part numbers. Note that such boxes can be not shown or not visible as well. FIG. 9B also shows the figure partially translated using various processes described herein. The user has manually selected (for example, by clicking or otherwise activating) one of the reference numerals or part numbers (by, for example, clicking on the reference numeral or part number "23" in the figure or in the legend, resulting in the display of the translation of the annotated word or part name into English and its original annotated word or part name in Russian and the annotation of reference numeral or part number "23." This is indicated by a blue (or other colors) rectangular shapes (or other closed or open or symmetrical or asymmetrical shapes) surrounding or enclosing the reference numeral or part number, the annotated word or part name in Russian, and its translated english description in red font or another color). FIG. 9B also shows the legend which displays the reference numerals or part numbers appearing in the figure next to its respective annotated word or part name in Russian and in English. The legend is resizable but can be fixed in size. The legend has a rectangular shape but can be reshaped or remain in the rectangular shape. The legend is movable but can be anchored or not movable. The legend is shown left of the figure but can be right or top or bottom of the figure. Furthermore, FIG. 9B indicates that the user has selected the reference numeral or part number "23" or original or translated annotated word or part name in the legend, resulting in the yellow (or other color) highlighting of the reference number within the bounding box in the figure. Similar can occur by selecting the reference number within the bounding box in the figure, resulting in the yellow (or other color) highlighting of the reference numeral or part number or original or translated annotated word or part name in the legend. For example, the legend and the bounding box can be selection synchronized (e.g., selection of one highlights other). Also, note that various processes described herein avoided recognizing the height reference. However, this can be varied, where the height reference can be identified and processed as described herein.

Figure 9C:
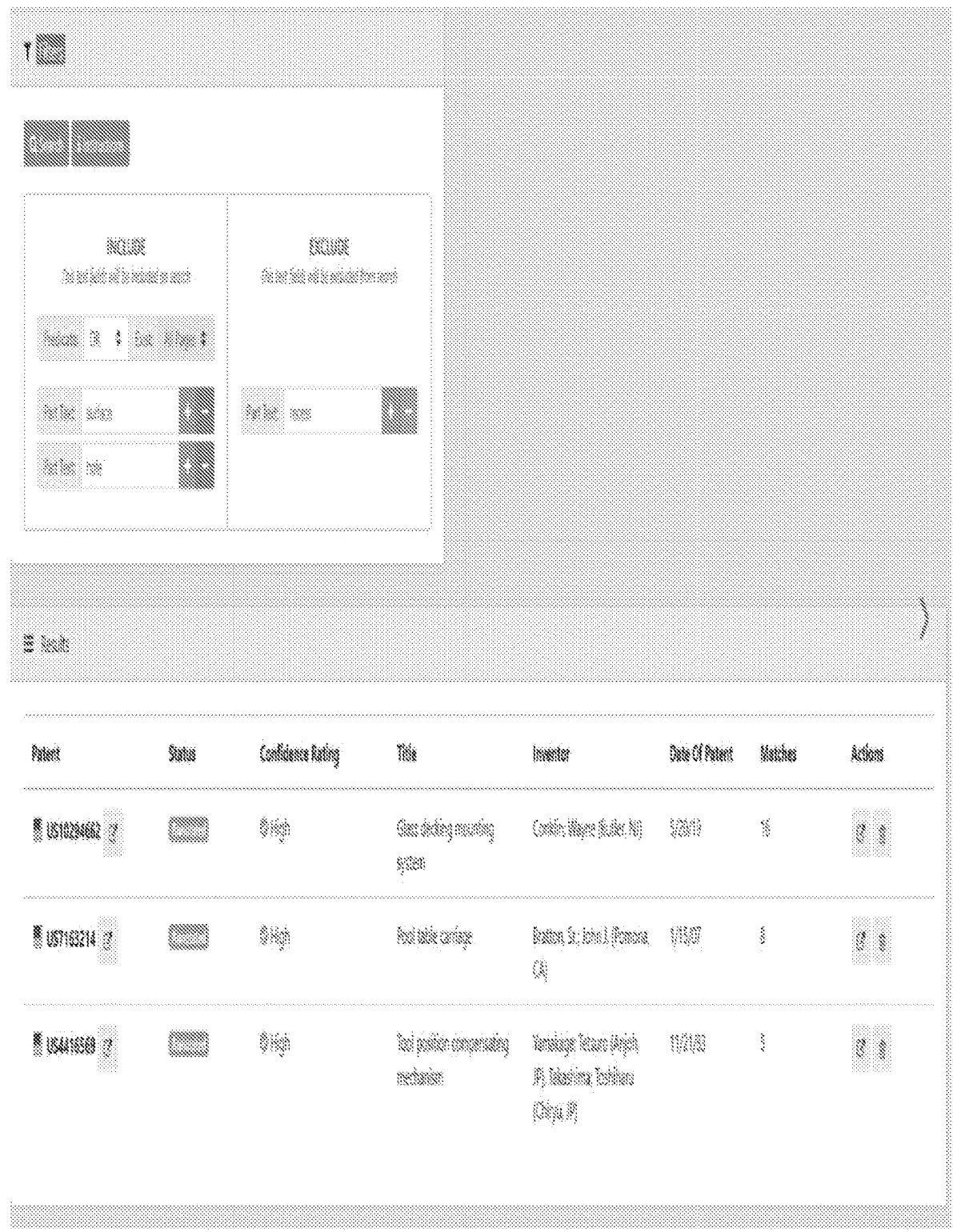

FIG. 9C is an embodiment of a presentation of a searchable database of patent figures according to this disclosure. In particular, the user can perform a search of figures and not search specification or search specification but ignore results or give less weight to results. The search of figures can be based on one or more keywords that appear in the figure after matching (e.g., A to B or B to A) the part numbers in the figures and the part names in the specification, as described herein. However, note that this search can be supplemental to the search of text. For example, the user can perform the search of figures and the search of specification. The user interface presents a list of some, many, most, or all patent documents stored in the searchable database that have figures that contain or are associated with (e.g., mapping or hash of part names in specification to part numbers in figures, part name metadata) the keywords being searched, while not searching the specification or searching the specification but disregarding or ignoring patent documents that contain the searched keyword in the text but not the figures. The list of documents may be arranged hierarchically, for example, based on the total number of matches of the searched keyword(s) in the drawings or based on the number of drawings containing the keywords. In addition, the user can also exclude words from the search so that drawings containing those words do not appear in the list of patent documents. Note that under the include search component, the search parameters include "OR" and "AND" and the include search component can search for all pages or figures under such criteria or in a single page or figure under such criteria. Although the include component and the exclude component are shown separately, there can be a single search bar that can receive various search operators, which can include the include component filters and the exclude component filters. Upon clicking the icon next to the patent number, the window of FIG. 9A or 9B can appear. The confidence rating can be binary (e.g., good or bad), tertiary (e.g., bad, medium, good), percentage numbers, bar diagrams, pie charts, or others. The confidence rating can be based on the confidence or quality score, as described herein. If the user has a personal or a group workspace, then the user can maintain the user's personal or group patent database, which can be accumulated based on the user's requests (e.g., patent numbers). As such, the user can remove (e.g., delete) some, many, most, or all patent documents from that workspace (e.g., garbage container icon). Upon such removal, that patent will not be available for searching and will have to be reprocessed for that workspace, as described herein. Alternatively, upon such removal, that patent will be removed solely from that workspace but still be available, as processed, to others outside of that workspace. The user can read that patent back to the workspace when needed and then that patent will again become searchable in the database for that workspace.

Figure 9D:
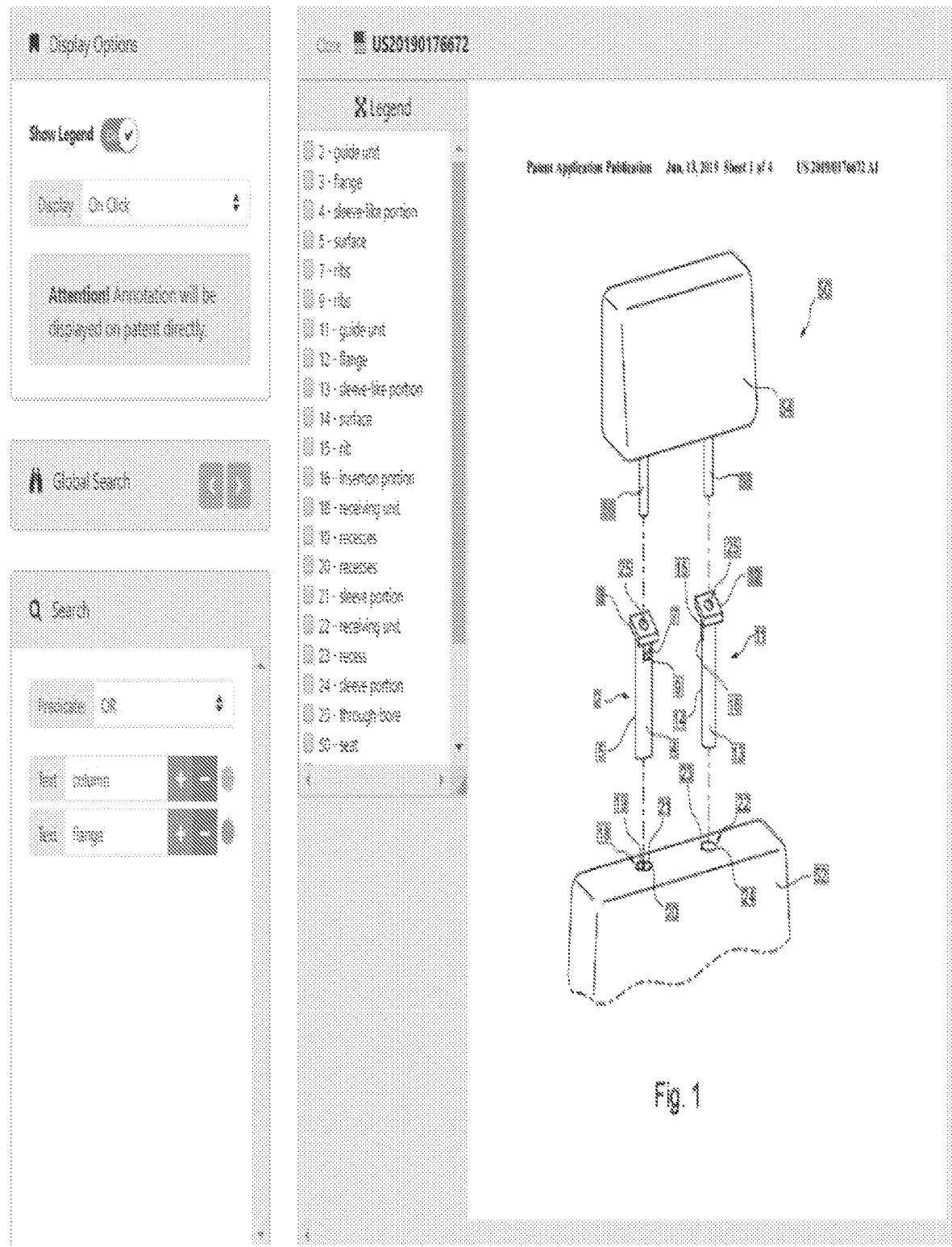

FIG. 9D is an embodiment of a color-based search technique for convenient user review according to this disclosure. For example, this search can be a sub-search. The search technique allows for keyword searching within the figures of the patent document or for part number content (e.g., mapping or hash of part names in specification to part numbers in figures, part name metadata) associated with the figures of the patent document, which can be sourced from the search results of FIG. 9C. To allow for easy finding of the searched keyword in the figure and to differentiate between multiple searched keywords, the system is configured to color-code the keywords in the search screen as well as in the figure. For example, as shown in FIG. 9D, the terms "column" and "flange" have been searched by the user within the patent document sourced from the search results from FIG. 9C. The user interface has assigned (e.g., statically, dynamically) the color blue to the term "column" (as seen to the right of the "+/−" symbol near the word "column") and the color pink to the term "flange." Note that other colors can be automatically or responsively assigned to the keywords by the user interface or the user may manually assign whatever colors the user desires (e.g., user operated color pallete) to the keywords or the user may manually assign iteratively between a group of preset colors or manually assign colors to keywords from a group of preset colors. Further, note that the colors may or may not repeat, which can be or can avoid being set or adjusted by the user. Accordingly, in the figure itself, the part numbers "12" and "3," which represent the flange, are highlighted in pink, and the numbers "56" and "58," which represent the column, are highlighted in blue. The "+/−" symbols allow a user to search as many or as few keywords as the user chooses. Moreover, note that the keywords can be searched based on various predicates (e.g., OR or AND) in a single figure. For example, this figure is shown because the keywords "flange" OR "column" are associated with this figure. Note that such predicates can be inclusive or exclusive. Also, note that since this patent document was selected from the search results of FIG. 9C and this figure was the first one that was shown when this patent document was selected in the search results of FIG. 9C because this figure contained the search keywords of the search of FIG. 9C (although this can be optional or omitted), before, during, or after sub-searching as shown in FIG. 9D, the user may iterate between other patent documents that were listed in the search results of FIG. 9C (e.g., global search right or left navigational icons). Further, the user can select an entry from the legend and that entry can be highlighted (e.g., yellow or orange or other colors) as well. Note that such selection can be or can avoid being visually distinct (e.g., different colors) from the colors corresponding to the keywords searched (e.g., pink and blue). Also, note that FIG. 9D shows the legend. Whether or not the legend is presented is up to the user (e.g., on-off icon, checkbox, button), but when the legend is presented, the user can toggle (e.g., on-off icon, checkbox, button) between displaying the legend or removing the legend from the figure. The legend is resizable but can be fixed in size. The legend has a rectangular shape but can be reshaped or remain in the rectangular shape. The legend is movable but can be anchored or not movable. The legend is shown left of the figure but can be right or top or bottom of the figure. Additionally, FIG. 9D shows the various annotation display options for user selection. FIG. 9D shows the display option of "On Click" which shows annotations (e.g., part names) only when the reference numeral is clicked by the user. Other options include hoverover (e.g., user pointer or cursor hovers over part name and part name label or tooltip responsively appears in figure), click on (e.g., user pointer or cursor clicks part name and part name label or tooltip responsively appears in figure), hoverover out (e.g., user pointer or cursor hovers over part name and part name label or tooltip responsively appears outside of figure or in some defined area internal or external to figure or page or user interface window containing figure), and click-on out (e.g., user pointer or cursor clicks part name and part name label or tooltip responsively appears outside of figure or in some defined area internal or external to figure or page or user interface window containing figure). Further, note that an informational notice corresponding to the selected user annotation option is presented in an area below the drop-down annotation display option menu. That area (or other areas internal or external to figure or page or user interface window containing figure) can be used to present part names when hoverover out or click-on out user annotation options are user selected.

Figure 9E:
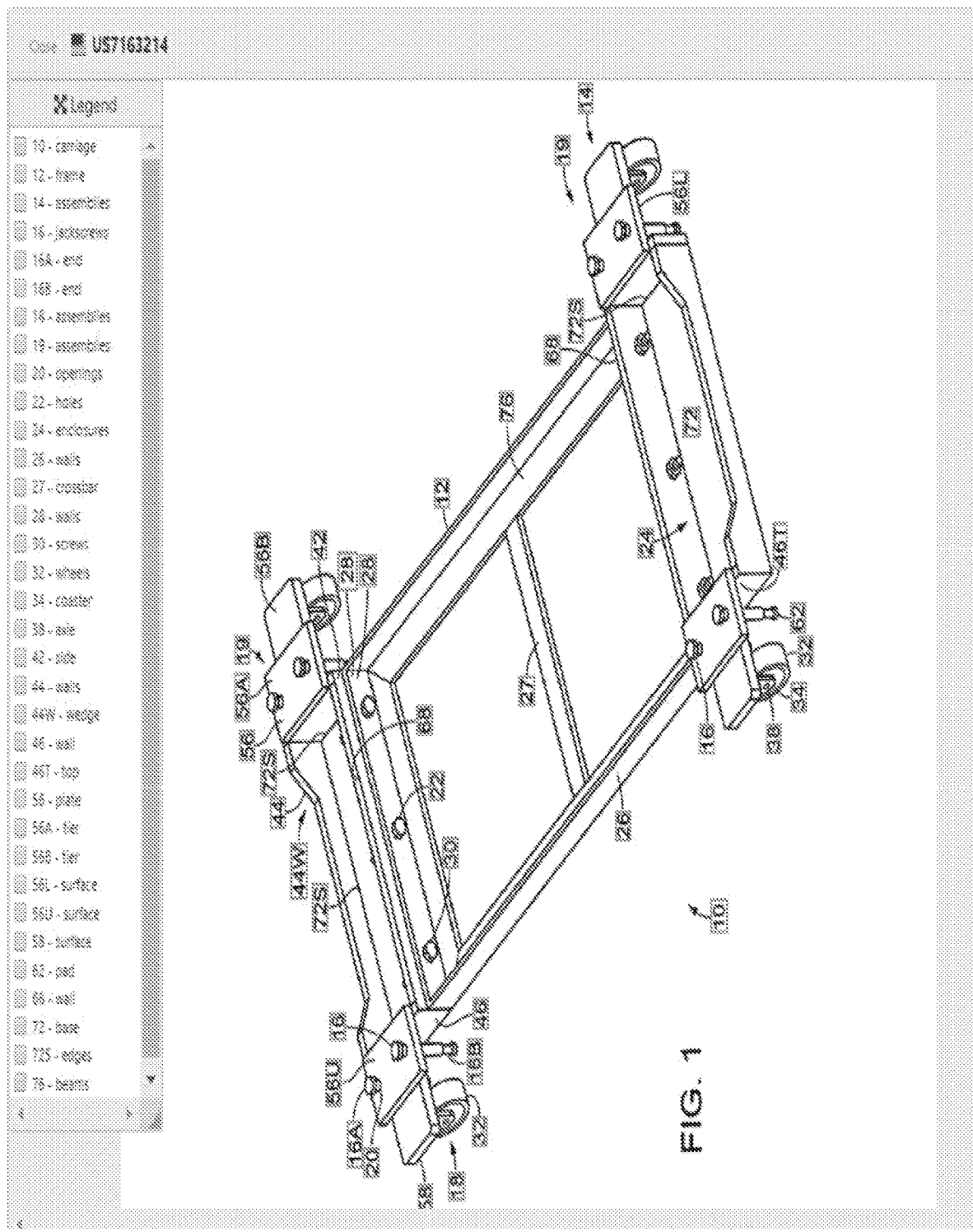

FIG. 9E is an embodiment of a presentation of a figure where all part numbers were recognized and matched to corresponding part names according to this disclosure. The presentation also shows the legend based on such recognition and correspondence. The pre-annotated figure was obtained from FIG. 1 of U.S. Pat. No. 7,163,214. The figure was then run through various processes described herein which, as shown, recognized all reference numerals or part numbers in this figure. This recognition is indicated by various green (or other colors) bounding boxes (or other closed or open or symmetrical or asymmetrical shapes) surrounding the reference numerals or part numbers. Note that such boxes can be not shown or not visible as well. Moreover, FIG. 9E laterally shows (but this can vary) the legend on the left side of the figure with reference number or part number paired with its respective part name. The legend is resizable but can be fixed in size. The legend has a rectangular shape but can be reshaped or remain in the rectangular shape. The legend is movable but can be anchored or not movable. The legend can be autosized horizontally or vertically based on content therein (e.g., autosize vertically to show all parts, autosize horizontally so all part names are visible). The legend is shown left of the figure but can be right or top or bottom of the figure. As shown in FIG. 9E, the legend has been resized relative to the legends of FIG. 9A or 9B.

Figure 9F:
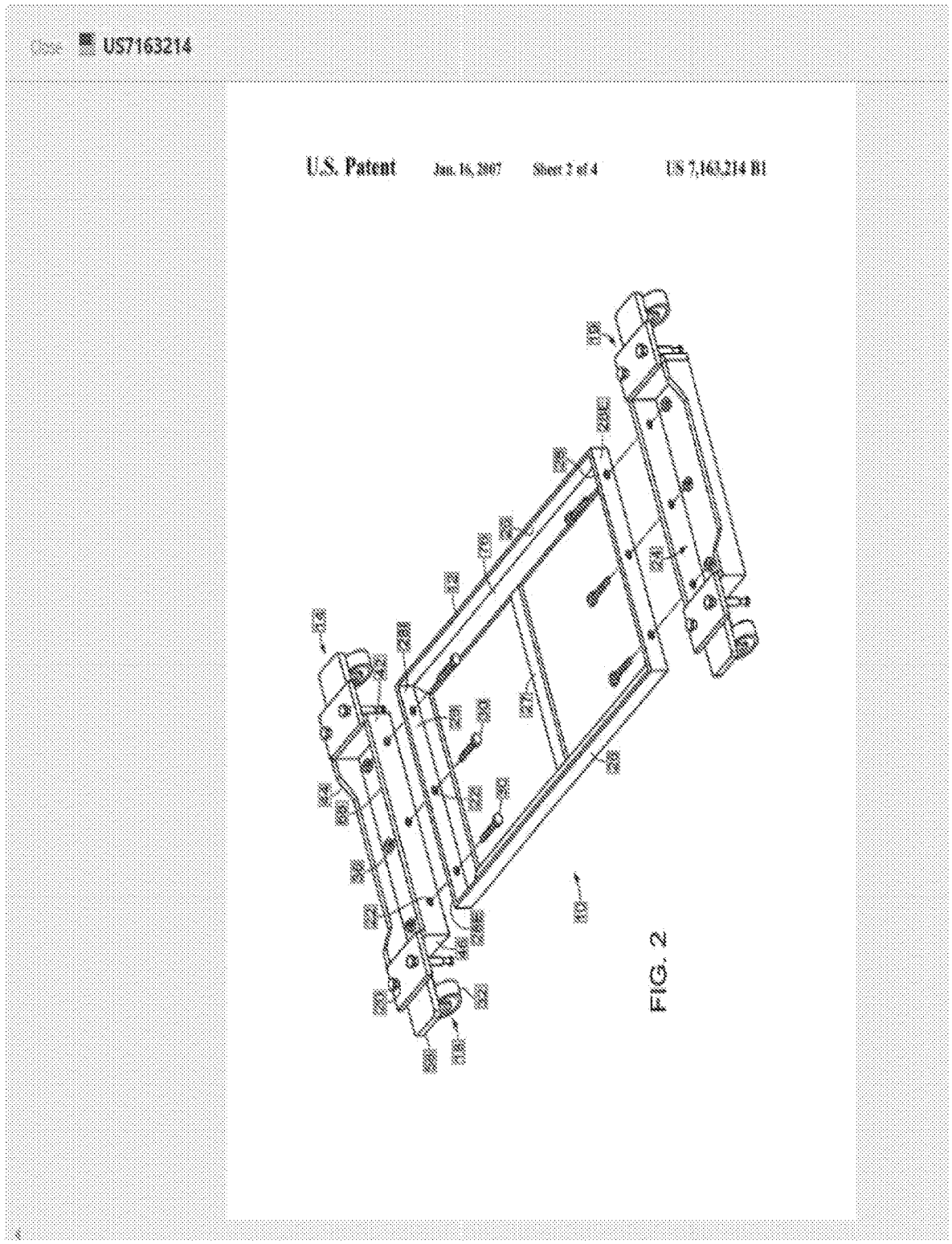

FIG. 9F is an embodiment of an annotated figure having a missing description bounding box that is colored to be visually distinct relative to other bounding boxes. The missing description bounding box, which is indicated in a red (or other colors) delineation in the figure, indicates that reference number or part number "28I" does not appear in the text of the patent document. However, as shown in FIG. 9F, other reference numerals or part numbers in this figure have been recognized and determined to correspond to part names in the specification. As such, those reference numerals or part numbers have bounding boxes that enclose those reference numerals or part numbers and are colored green (or other colors). This contrasts the reference number or part number "28I", which does not appear in the text, and is therefore surrounded by the red (or other colors) bounding box.

Note that red-green part was selected for quick visual distinction, but other color pairs can be selected (e.g., white-black, yellow-purple). Further, note that other forms of visual distinction based on missing description are possible. For example, the bounding box to enclose the missing description part number can be not shown or no bounding box enclosing the missing description part number can be user enabled or the missing description part number gets highlighted or colored, which can be visually distinct, relative to present description part numbers. For example, the missing description part number can be hidden or overwritten with white space (or other color) or the bounding box can be opaque white (or other matching background color). Note that the legend is not shown, as user manually selected or as preset. However, this can vary and the legend can be set to be always shown in certain figures.

Figure 9G:
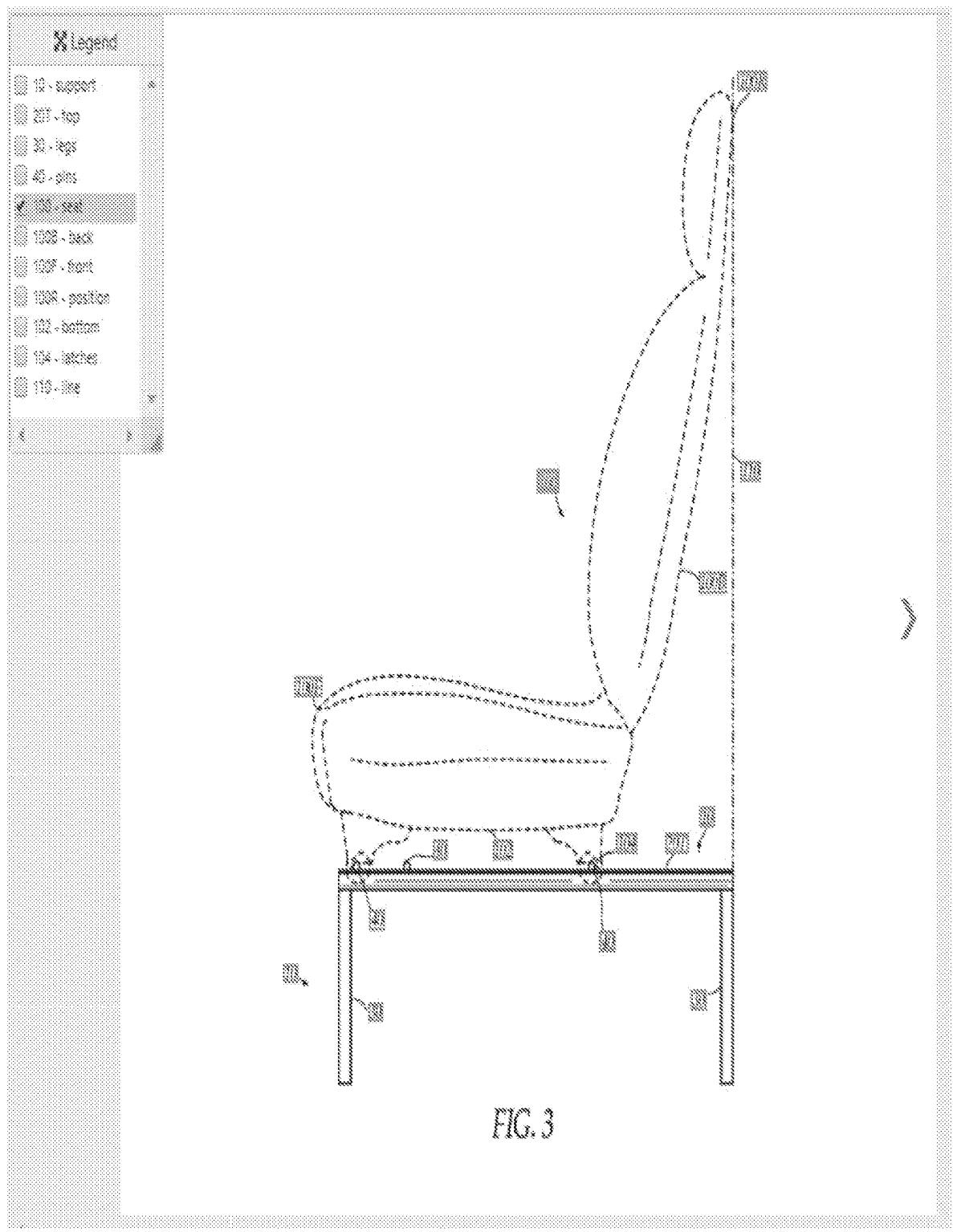

FIG. 9G is an embodiment of a presentation of a legend of an annotated figure where the reference numbers or part numbers in the legend are paired with respective annotation words or part names. As shown in FIG. 9G, the user has selected one of the part names in the legend ("100—seat") and that selection is now highlighted in yellow (or other color), resulting in an automatic or responsively corresponding highlighting of the reference number or part number "100" in the bounding box in the figure in yellow (or another color). Note that such colors can be same or different. Further, note that vice versa technique is possible where user selection of the reference number or part number in the figure results in the automatic or responsively highlighting of the part number or the part name or the part number and the part name in the legend, whether of same or different colors. Also, note that the figure has a navigational arrow (or another visual icon) present on the right side of the figure such that the object is to the left of the navigational arrow. This navigation arrow allows the user to navigate forward within the figures. However, note that the navigation arrow can also appear on the left side of the figure such that the object is to the right of the navigation arrow and this navigation arrows allows the user to navigated back within the figures. Note that such placement of the navigation arrows can vary and the navigation arrows can placed in other placed internal or external to the figure or page or user interface window containing figure. The legend is resizable but can be fixed in size. The legend has a rectangular shape but can be reshaped or remain in the rectangular shape. The legend is movable but can be anchored or not movable. The legend is shown left of the figure but can be right or top or bottom of the figure.

Figure 9H:
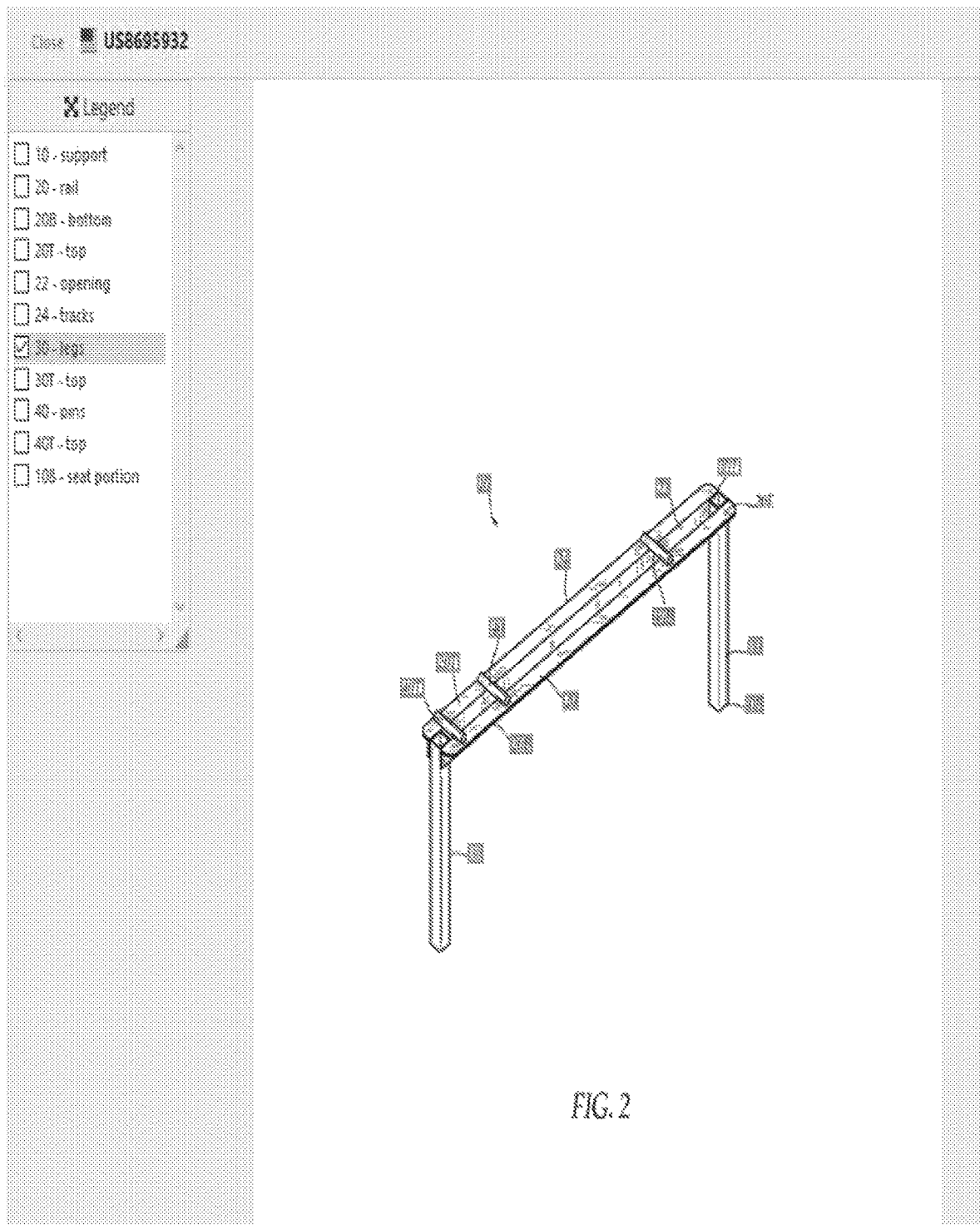

FIG. 9H is an embodiment of a presentation of an annotated figure with a missing description indication as well as a legend. As shown in FIG. 9H, most part numbers in this figure were recognized and matched to corresponding part names in the specification, as indicated by various green (or other colors) bounding boxes (or other closed or open or symmetrical or asymmetrical shapes) around most part numbers except for the part number "40B," which is enclosed by a red (or other colors) bounding box (or other closed or open or symmetrical or asymmetrical shapes). The reason for such bounding box visual distinction is that the part number "40B" does not appear in the description. FIG. 9H also shows that the user has selected one of the part numbers or part names or part numbers and part names from the legend ("30—legs"), resulting in the yellow highlighting of the reference number "30" in the figure. Further, note that vice versa technique is possible where user selection of the reference number or part number in the figure results in the automatic or responsively highlighting of the part number or the part name or the part number and the part name in the legend, whether of same or different colors. The legend is resizable but can be fixed in size. The legend has a rectangular shape but can be reshaped or remain in the rectangular shape. The legend is movable but can be anchored or not movable. The legend is shown left of the figure but can be right or top or bottom of the figure. Moreover, note that the part number "20E" does not have a bounding box shown enclosing that part number. This can be for several reasons. For example, this part number was not recognized by an OCR engine. For example, this part number was not recognized by an OCR engine because of a lead line extending into or being too close to the part number. For example, this part number was not matched to a corresponding part name in the specification. For example, this part number may have a white bounding box enclosing the part number. For example, this part number cannot be manually corrected (e.g., manual bounding box placement) by the reader profile but can be manually corrected by the editor profile. For example, this part number can be manually labeled or corrected so that a neural network or machine learning algorithm, as described herein, can learn of this manual labeling or correction and then recognize this situation next time and correctly recognize this part number or format or similar use, whether for same or different part number.

Figure 9I:
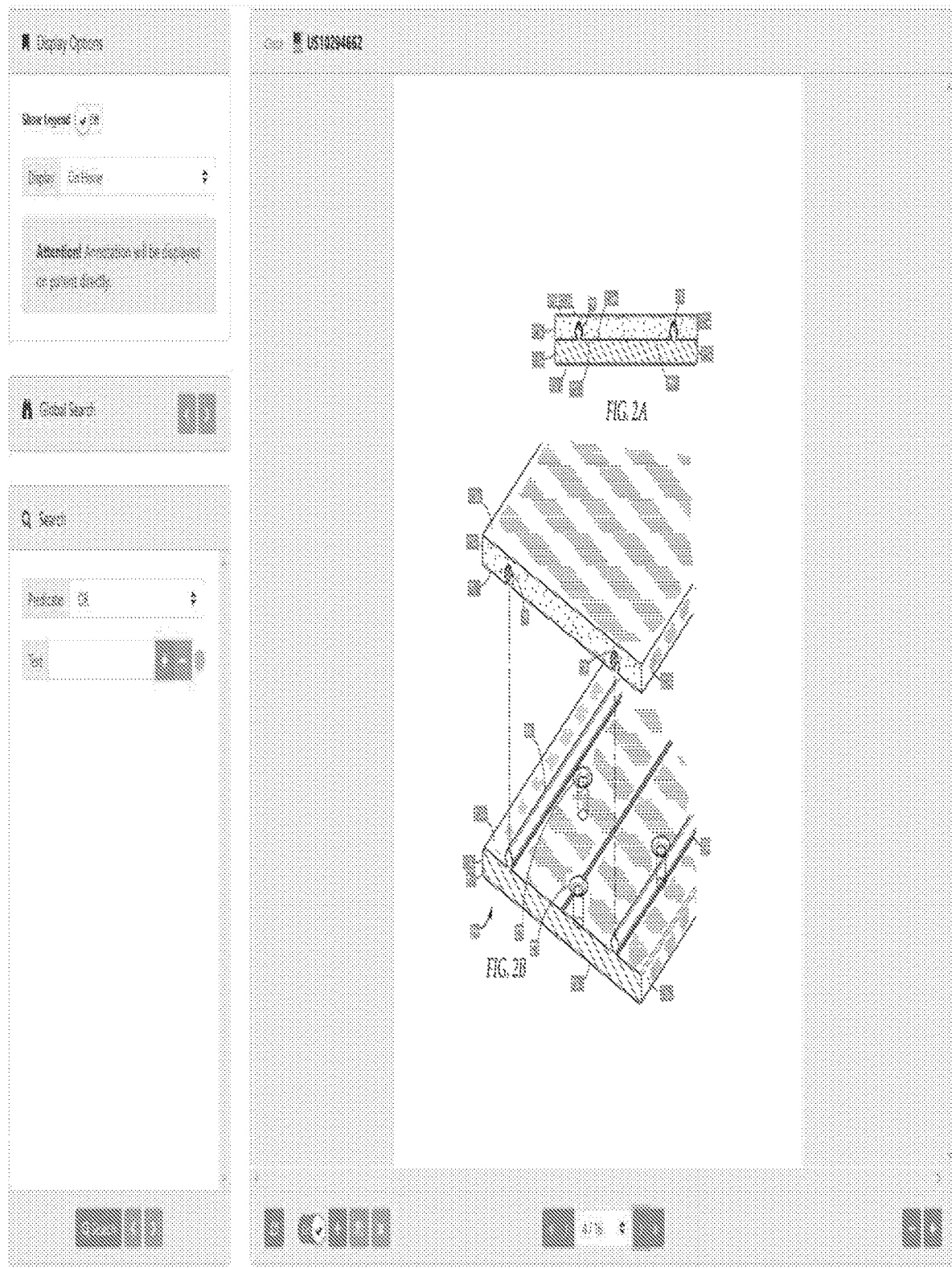

FIG. 9I is an embodiment of a presentation of an annotated figure where the user has an ability to move, resize, reshape, edit, delete, or take control of some, many, most, or all content (e.g., bounding boxes, labels, part names, translations) added to, associated with, or presented over the figure, whether presented internal or external thereto or page or user interface window containing figure. As shown in FIG. 9I, the user can edit the presentation by moving, resizing, reshaping, or deleting some, many, most, or all content (e.g., bounding boxes, labels) added to, associated with, or presented over this figure. Likewise, as shown in FIG. 9I, the user can edit the presentation by adding, removing, deleting, or editing, some, most, many, or all aspects of the some, many, most, or all content (e.g., part names, translations) added to, associated with, or presented over this figure. For example, the user can be associated with the editor profile and can thereby can move, resize, reshape, or delete some, many, most, or all content added to, associated with, or presented over this figure. For example, the user can be associated with the editor profile and can thereby add, remove, delete, or edit some, most, many, or all aspects of various bounding boxes (e.g., green, red) or labels (or other forms of visual outputs as described herein). For example, the user can be associated with the editor profile and can add, remove, delete, or edit perimeter colors or background colors or shapes or sizes of the bounding boxes. For example, the user can be associated with the editor profile and can delete or add or draw or resize or reshape the bounding boxes. For example, the user can be associated with the editor profile and can resize the bounding box to enclose more or less part number characters of part numbers. For example, the user can be associated with the editor profile and can edit text (e.g., part name, translation) of the labels or tooltips (or other forms of visual output) that are activated when the user activates (e.g., selects) the part numbers. For example, if one of the labels or tooltips (or other forms of visual output as described herein) containing the part name and/or translation covers up or blocks or overlays a segment or region of the figure (e.g., object, line, part number, other label), then the user (e.g., editor profile) can be associated with the editor profile and can move the label or tootip (or other forms of visual output as described herein) to another section or region of the figure or the user interface that does not cover up or block or over the figure.

Note that the user can also resize or reshape the label or the tooltip (or other form of visual output as described herein) to avoid cover up or block or overlay over the figure or otherwise visually interfering with original content of the figure or new content associated with the figure. Also, note that the legend is toggled off and therefore not presented, but can be selectively user activated by toggling on (or other user form of presenting or hiding content). Further, note that the part name display or label or tooltip activation is manually user set to on hover where the user pointer or cursor can hover over the part name and the part name label or tooltip responsively appears in figure. However, this can be varied, as described herein. Moreover, note that the editor user interface presents various icons (or other visual input elements) below the figure. These icons can enable user editing, as described herein. For example, these icons can enable various editing functions, such as (from left to right) refresh figure, selective user toggling between the editor mode and the reader mode, adding bounding box (or other closed or open or symmetrical or asymmetrical shapes) to the figure, save edits, delete bounding box, or others. These icons are presented below the figure but this positioning can vary, whether internal to the figure or external to the figure or page or user interface window containing figure, whether over or not over the object or other original or new content of the figure, side pane, or others. The user interface also shows navigational icons to navigate between figures or text or both and zooming icons for zooming in and out relative to the figures or text or both.

Figure 9J:
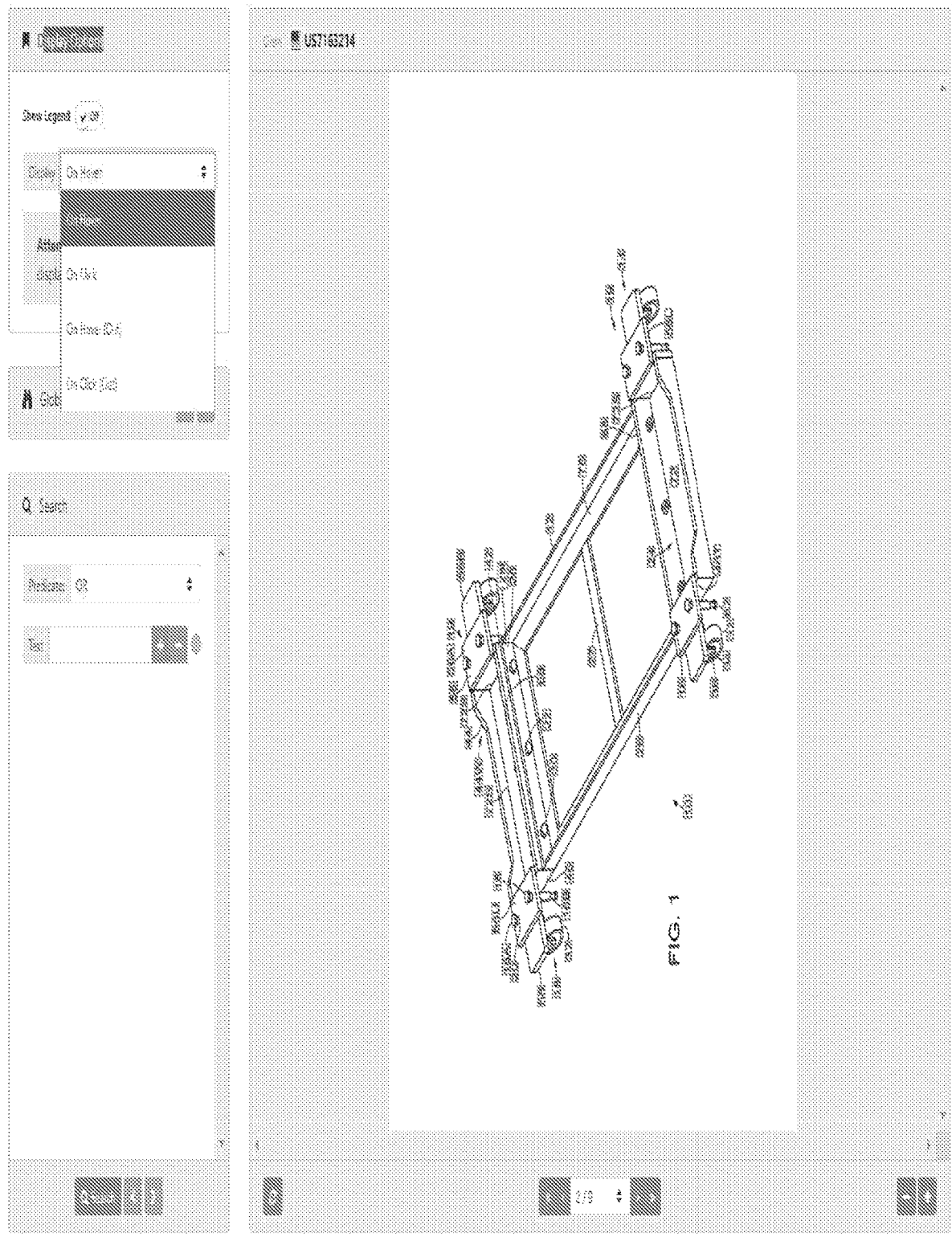

FIG. 9J is an embodiment of a presentation of various annotation options for variously annotating the figure according to this disclosure. As shown in the upper left portion of the user interface (although this dropdown menu or another user selection visual input element can be presented in other locations internal or external to the figure or page or user interface window containing figure or manually user set in the user profile), these options include: On Hover, On Click, On Hover (Out), and On Click (Out). The On Hover option works by displaying the annotation (e.g., part name, translation) near the reference numeral (e.g., part number) when the reference numeral or part number, or an area immediately surrounding the reference numeral or part number, is hovered over by the cursor or pointer icon (e.g., mouse, touchpad, scrollball). The On Click options works by displaying the annotation (e.g., part name, translation) near the reference numeral or part number when the reference numeral or part number, or an area immediately surrounding the reference numeral or part number, is selected or otherwise activated by a cursor or pointer icon (e.g., mouse, touchpad, scrollball). The On Hover (Out) option works by displaying the annotation (along with its associated reference numeral or translation) in an area of the user interface away from the figure (but can be within the figure) when the reference numeral or part number, or an area immediately surrounding the reference numeral or part number, is hovered over by the cursor or pointer icon (see FIG. 9K). The On Hover (Out) can display a translation of the annotation, if the annotation is in a foreign language, in the area of the display away from the figure (but can be within the figure). The On Click (Out) option works by displaying the annotation (along with its associated reference numeral or translation) in an area of the user interface away from the figure when the reference numeral or part number, or an area immediately surrounding the reference numeral or part number, is selected or otherwise activated by a cursor or pointer icon (e.g., mouse, touchpad, scrollball) (see FIG. 9K). The On Click (Out) option can display a translation of the annotation, if the annotation is in a foreign language, in the area of the display away from the figure (but can be within the figure). Note that the user interface is in the reader mode associated with the user profile as various editing icons are not shown or hidden.

Figure 9K:
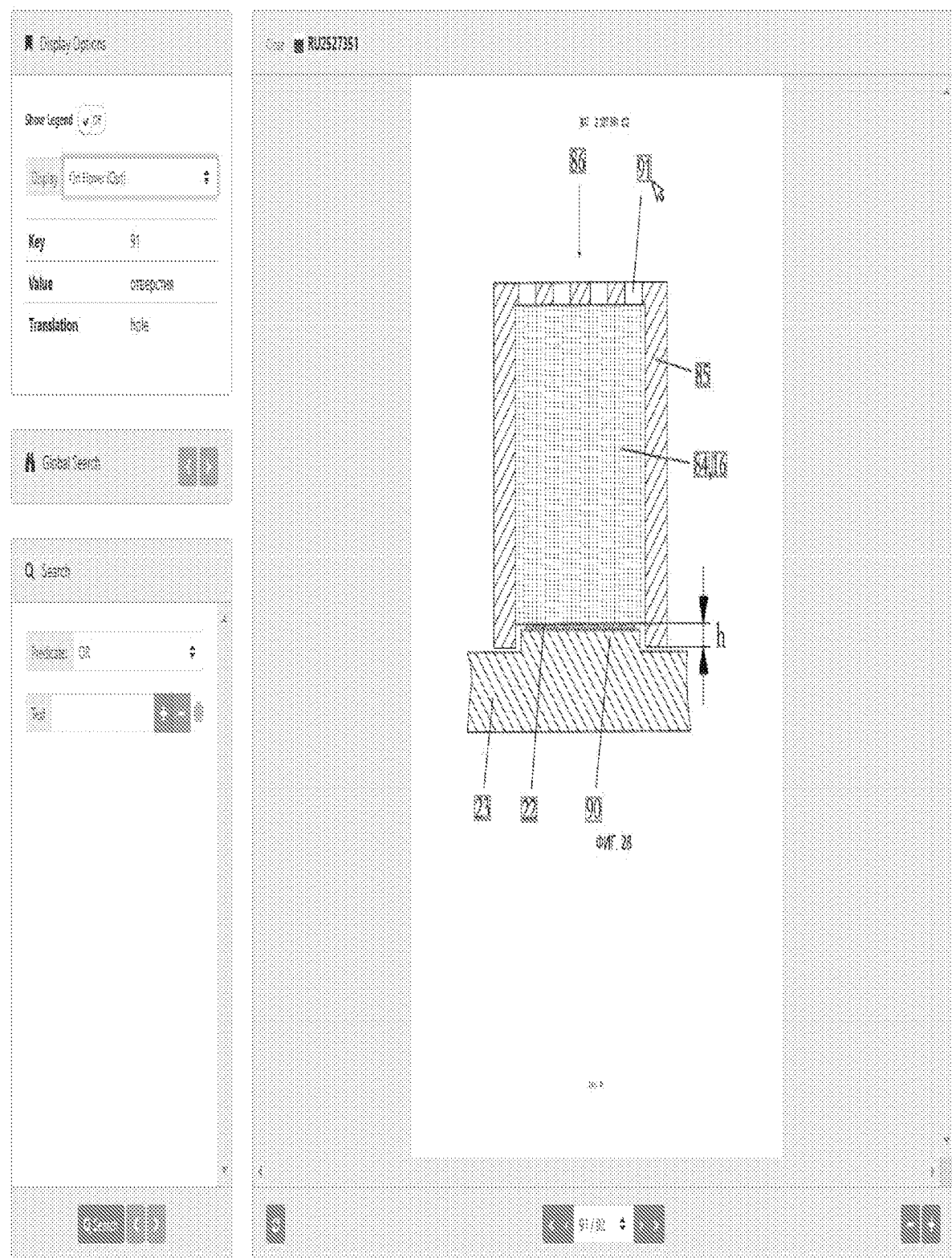

FIG. 9K is an embodiment of a presentation of an On Hover (Out) annotation option for annotating the figure according to this disclosure. In particular, FIG. 9K shows an example of the On Hover (Out) option selected from a dropdown menu positioned external to the figure or page or user interface window containing figure or page. However, note that the dropdown menu can be another visual element (e.g., button, radio button, dial, slider, checkbox) or the dropdown menu can be positioned internal to the figure or page. The On Hover (Out) option works by displaying a defined area at a predetermined location internal or external to the figure or page or user interface window containing figure or page. The defined area can be resized or reshaped or moved or anchored or be positionally stationary. The defined area can have a set or user selectable background color or hatching or image or other related characteristics. The defined area can have a set or user selectable perimeter color or delineation line type or no delineation at all or other related characteristics. The defined area can have a set or user selectable font type or size or italicization or capitalization or font characteristics.

As shown in FIG. 9K, the defined area has a key line, a value line, and a translation line. Note that this form of presentation can vary and this content or format can be mixed or matched or positionally reorganized or positionally reranked (e.g., all on same line, original part name and translation on same line). As such, when the user hovers the pointer or the cursor over the bounding box (e.g., over bounding box boundary, over white space or part number enclosed within bounding box) or a defined area external (e.g., 1 inch or less or pixel or voxel equivalents) to the bounding box that is immediately adjacent to the bounding box, then the key line presents the part number associated with the bounding box. In this instance, the user cursor or pointer is positioned over the part number 91 in the figure and the key line responsively in real-time presents the part number 91 as sourced from the text being processed as described herein. Further, when the user hovers the pointer or the cursor over the bounding box (e.g., over bounding box boundary, over white space or part number enclosed within bounding box) or a defined area external (e.g., 1 inch or less or pixel or voxel equivalents) to the bounding box that is immediately adjacent to the bounding box, then the value line presents the original content (e.g., text, part name). In this instance, the user cursor or pointer is positioned over the part number 91 in the figure and the value line responsively in real-time presents the original part name (" отверстия") as sourced from the text being processed as described herein. Also, when the user hovers the pointer or the cursor over the bounding box (e.g., over bounding box boundary, over white space or part number enclosed within bounding box) or a defined area external (e.g., 1 inch or less or pixel or voxel equivalents) to the bounding box that is immediately adjacent to the bounding box, then the translation line presents the translated content (e.g., text, part name). In this instance, the user cursor or pointer is positioned over the part number 91 in the figure and the value line responsively in real-time presents the translated part name ("holes") as sourced from a translation logic, as described herein. Note that the On Click (Out) option can work in a similar manner. Also, note that the user interface is in the reader mode associated with the user profile as various editing icons are not shown or hidden. Additionally, note that the legend is toggled off and therefore not presented, but can be selectively user activated by toggling on (or other user form of presenting or hiding content).

Figure 9L:
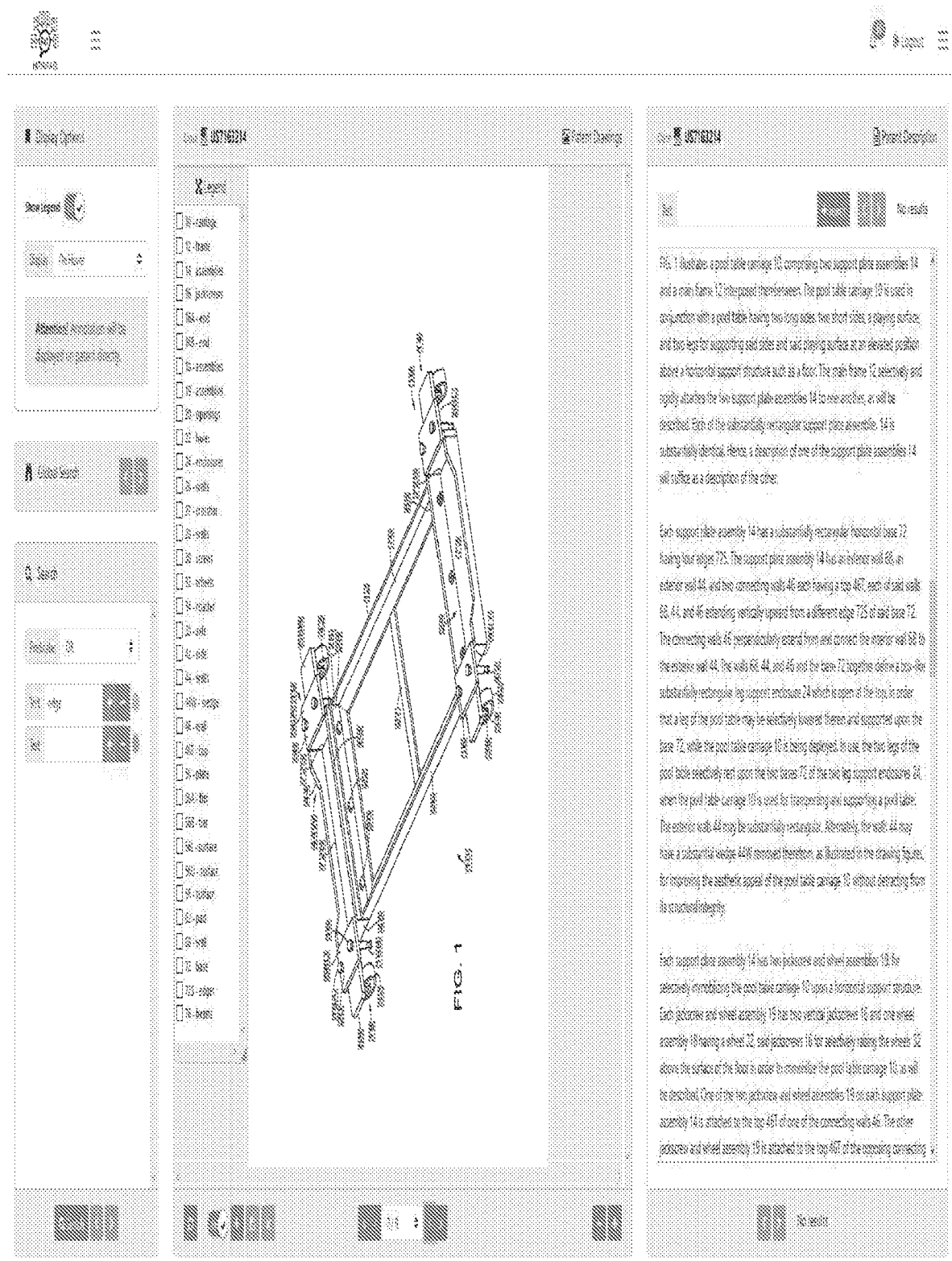

FIG. 9L shows an embodiment of a side-by-side view of a patent figure and a patent text according to this disclosure. In particular, a user interface presents a text pane, a figure pane, a display options pane, a global search pane, and a sub-search pane, each of which is positionally fixed, but can be user movable (e.g., based on user template definition, drag-and-drop) or user resizable (e.g., by corner, by sides). For example, such panes can be user movable or user resizable similar to a tiled interface where tiles can be user movable or user resizable, where panes can conceptually correspond to tiles. The text pane contains a patent text and a search function. The text pane is configured to have the patent text to be user scrollable and user selectable for copying. The search function searches the patent text in the text pane.

The text in the text pane can be in a native patent language (e.g., English, Russian, Hebrew, Mandarin, Cantonese, Japanese, German, Arabic, Hindi, Urdu, Farsi, French, Spanish, Italian, Portuguese, Korean) or the text can be machine-translatable between languages in real-time (e.g., upon activating visual user input element, selecting part numbers or labels or objects or lines in patent figures, selecting part numbers in patent text, hovering over words, selecting phrases or sentences or paragraphs within patent text). This translation can be user selected (e.g., translate to language X, translate from language A to language B) or browser (or another application) can inform the server (or processor) of current language settings and then this translation can occur to another language other than the language that has been detected from the browser (or another application). Note that geolocation or network addressing can be used to aid in detecting what language is currently being in use at browser (or another application).

The search function includes a search bar for a search term entry, a search submit button, a next forward button for locating a next forward found term entry in the patent text, a next backward button for locating a next backward found term entry in the patent text, and an indicator for which found term entry is the user currently at against a total number of found search terms in the patent text (e.g., ⅒, 3 out of 15, 1 of 1, two out of sixteen).

The figure pane is positioned immediately adjacent to the text pane and shows a patent figure corresponding to the patent text. Note that the figure patent can also be positioned non-immediately adjacent to the text pane. For example, there are can be at least one intermediate pane between the text pane and the figure pane. For example, the intermediate pane can be the display options pane, the global search pane, the sub-search pane or another pane. Moreover, such side-by-side presentation can include one pane on above (e.g., figure pane, text pane) and one pane (e.g., figure pane, text pane) on bottom or one pane is diagonal to another pane (e.g., figure pane, text pane).

The text pane is individually closeable or can be closed together with the figure pane based on user activating close link (or button or another visual user input element). The figure pane is individually closeable or can be closed together with the figure pane based on user activating close link (or button or another visual user input element).

The display options pane, the global search pane, or the sub-search pane can be present or be hidden based on a corresponding visual user input element, which can be hosted via the figure pane above the figure (or another location within the figure pane) or via the text pane above the text (or another location within the text pane) or in a white (or another color) header between a logo and a notification icon. Further, the display options pane, the global search pane, or the sub-search pane can be presented in a window (similar to the legend window) that can be toggled on/off based on a user input. This toggle can be hosted via the figure pane above the figure (or another location within the figure pane) or via the text pane above the text (or another location within the text pane) or in a white (or another color) header between a logo and a notification icon.

The notification icon can notify the user when a document (e.g., patent) has been processed and when activated can provide a list (e.g., line-by-line list of a predefined number of most recently processed documents). When a specific entry in the list is activated, then the user can be taken to that specific document. The list can also display time and date of completion of processing, confidence level, and a processing status (e.g., binary status, gradual status). The specific entries in the list can be marked as read or unread.

Figure 9M:
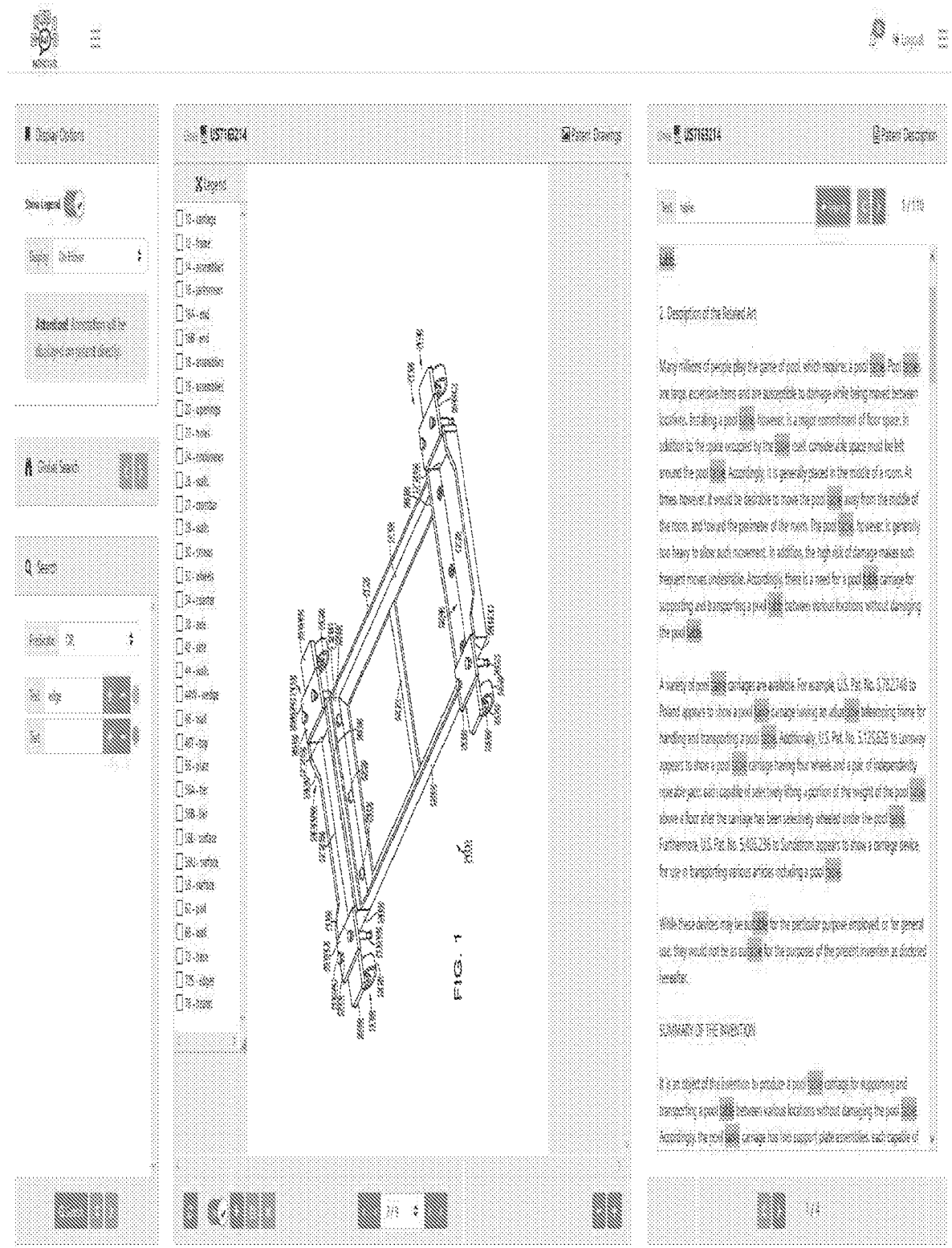

FIG. 9M shows an embodiment of a text search of a text pane according to this disclosure. In particular, the text pane is configured to have the patent text to be user scrollable and user selectable for copying. The search function searches the patent text in the text pane.

The search function includes a search bar for a search term entry, a search submit button, a next forward button for locating a next forward found term entry in the patent text, a next backward button for locating a next backward found term entry in the patent text, and an indicator for which found term entry is the user currently at against a total number of found search terms in the patent text (e.g., ⅒, 3 out of 15, 1 of 1, two out of sixteen).

As currently shown, for a search term "table," there are 110 entries and the user is currently at a first one. Note that the search picks up various uses of the search term "table" including "table" and "suitable." This function can be adjusted based on highlighting, matching case, whole words, and other text functions. Further, although all appearances of the search term is highlighted, this can be disabled and only the search term at which the user is currently at can be highlighted. Moreover, although the highlighting is shown as blue, other colors can be used (e.g., yellow, orange, green, red, purple, pink). The user can be allowed to select this highlighting color from a set of colors or a color pallette. Alternatively, the user can be precluded from selecting a customized highlighting color and the highlighting color is preset. Further, the text pane has a scrollbar which can visually indicate where in the patent text that search term entry appears (e.g., yellow or other color bars corresponding to part names positioned vertically within scrollbar).

Figure 9N:
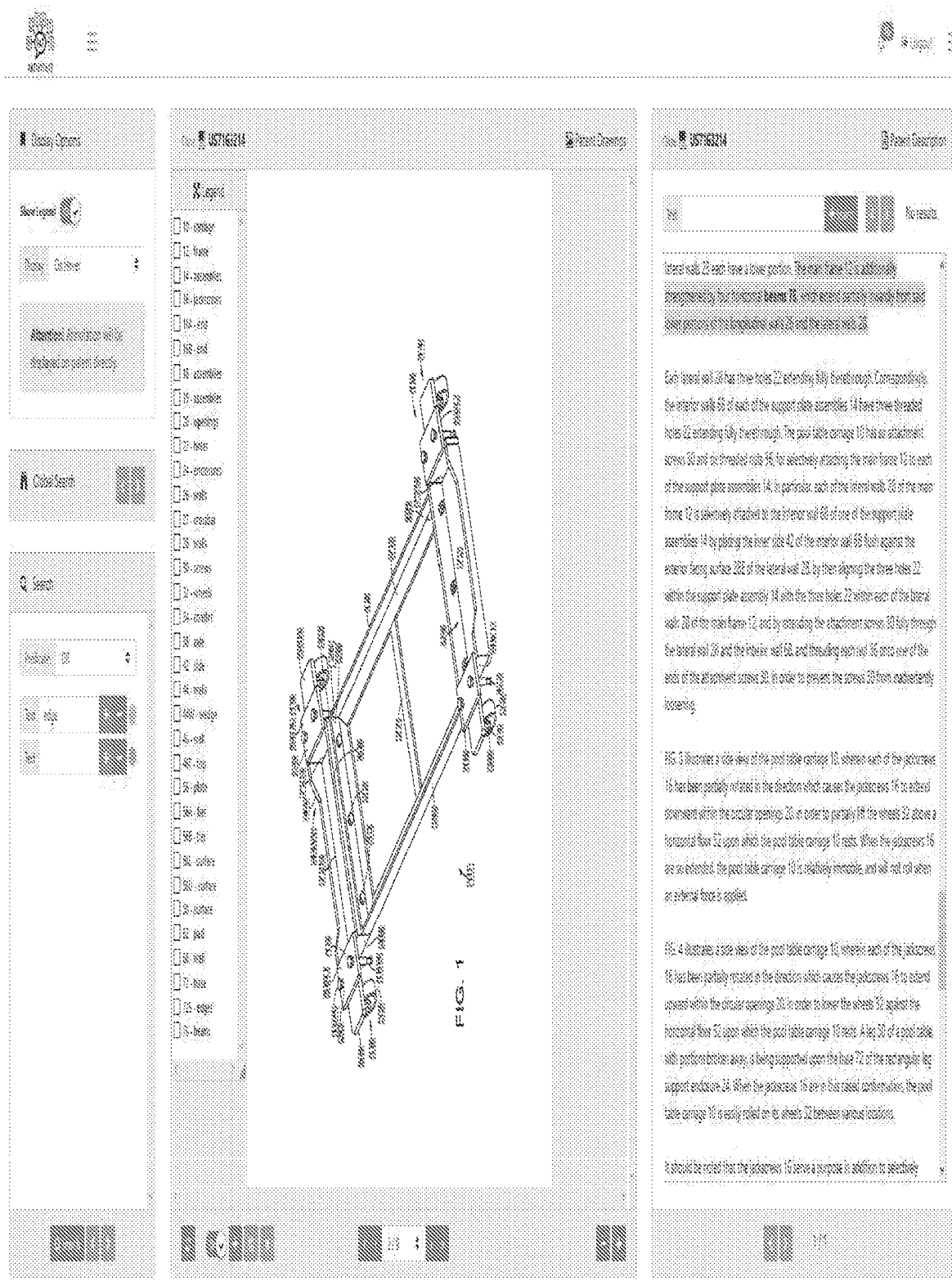

FIG. 9N shows an embodiment of a pane synchronization according to this disclosure. In particular, the text pane and the figure pane can be operated independent of each other (e.g., non-synchronized) or dependent on each other (e.g., synchronized). For example, the patent text presented in the text pane can be scrolled or searched independent of the figure pane. For example, the figure pane can be master to the text pane or vice versa. For example, the patent figure in the patent figure pane can be master to the patent text in the text pane or vice versa.

As shown, if the user selects (e.g., clicks, hovers, touches) the part number (e.g., 76) in the patent figure presented in the figure pane, then the patent text in the text pane correspondingly moves or adjusts or refreshes to a section(s) in the patent text where the part number is mentioned. Such move or adjustment or refresh can also enable the section(s) to be highlighted (e.g., yellow, orange, green, blue, red) or otherwise visually distinct relative other patent text in the text pane, whether such highlighting or visual distinction is made on user selection or automatically or responsively. Further, such move or adjustment or refresh can also enable the part number or the part name to be bolded (or italicized or underlined or capitalized or re-fonted) or otherwise made visually district relative to the patent text or the section in the patent text or other part names or part numbers in the section in the patent text.

As shown, the part number 76 is only used once in this patent text and therefore there is an indicator of such status (1/1). Note that this indicator can present this status in other ways (e.g., 1/10, 3 out of 15, 1 of 1, two out of sixteen). Further, the text pane has a scrollbar which can visually indicate where in the patent text that term appears (e.g., yellow or other color bars corresponding to part names positioned vertically within scrollbar). Moreover, the section can be automatically or responsively translated in real-time, as explained above, when the section is highlighted or made visually distinct, while rest of the patent text remains in an original patent language.

Although the patent text is presented in the context of the patent specification, the patent text can also include claims. As such, if the user selects (e.g., clicks, hovers, touches) the part number (e.g., 76) in the patent figure presented in the figure pane, then the patent text in the text pane correspondingly moves or adjusts or refreshes to a section(s) of a patent claim where the part number is mentioned, or where the part number is not mentioned but the part name is associated with the part number as used in the patent specification and currently user selected in the patent figure. Such move or adjustment or refresh can also enable the section(s) of the patent claim to be highlighted (e.g., yellow, orange, green, blue, red) or otherwise visually distinct relative other patent text or claim text in the text pane, whether such highlighting or visual distinction is made on user selection or automatically or responsively. If the user selected claim term is not mentioned in the specification or not associated with a part number, then that selected claim term can be made visually distinct (e.g., bolded, italicized, underlined, highlighted, capitalized, re-fonted).

Figure 9O:
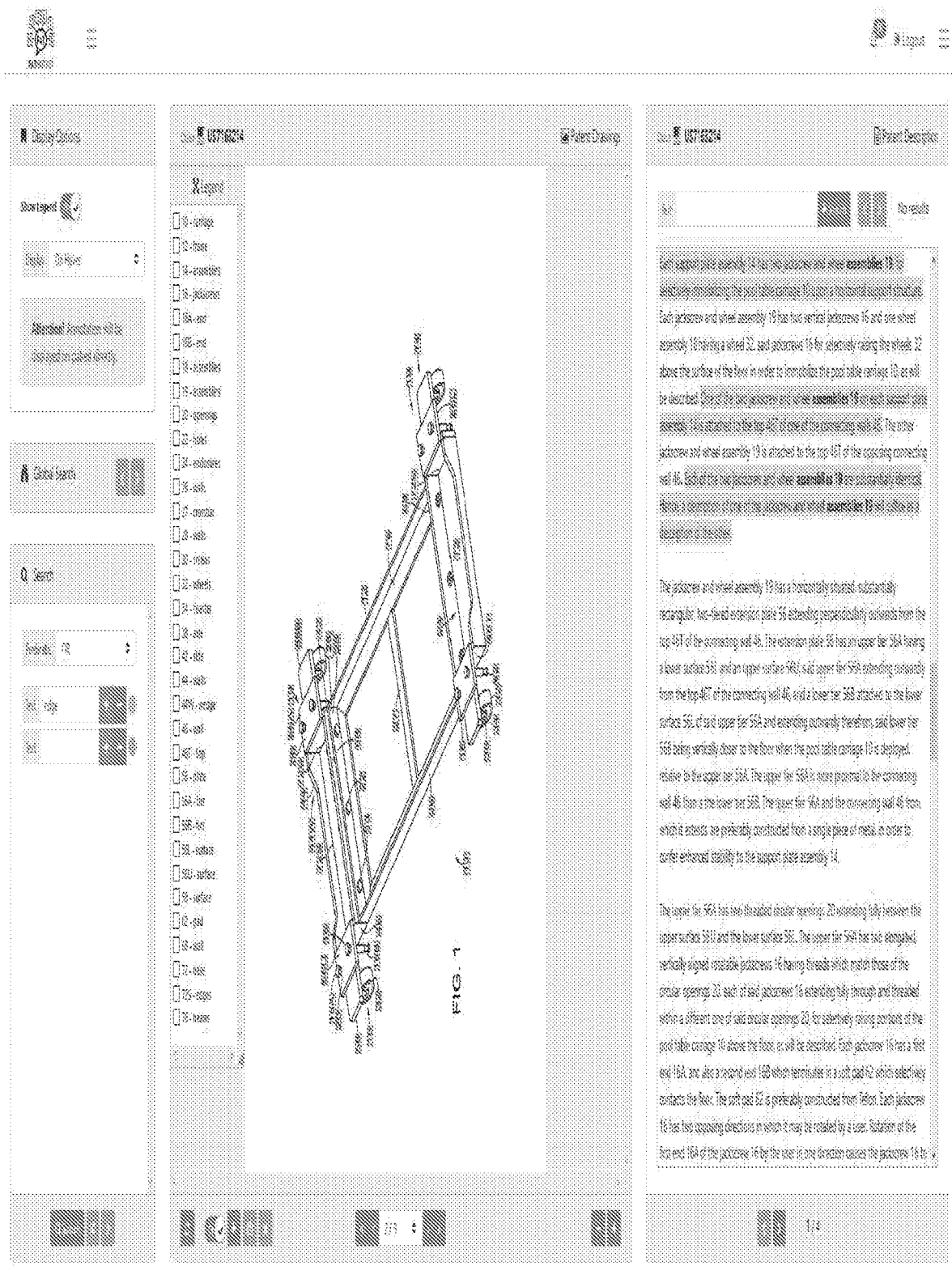

FIG. 9O shows a text pane being synchronized to a figure pane according to this disclosure. In particular, the user has activated (e.g., click, hover, touch) the part number (e.g., 19) in the patent figure presented in the figure pane. Responsive to such user activation, the text pane presents various sections in the patent text containing the part number and the part name. These various sections are highlighted (or otherwise made visually distinct) relative to other patent text in the text pane.

Within the various sections, the part number or the part name can be bolded (or italicized or underlined or capitalized or re-fonted) or otherwise made visually distinct relative to other patent text in the various sections or remaining patent text external to the various sections. Further, the text pane can move the first of the various sections to the top of the text pane so that focuses the user's attention. However, this can vary and the text pane can not move the first of the various sections to the top of the text pane (e.g., user then scrolls) or move the first of the various sections to non-top of the text pane (e.g., middle, bottom, between middle and top, between middle and bottom).

The text pane presents a forward section button (or another visual user input element) and a backward section button (or another visual user input element). The forward section button moves or adjusts or refreshes the patent text within the text pane to a next forward iteration of the section having the part number and the part name, which can bring that next forward iteration to the top of the text pane, although non-top positioning is possible, as explained above. Likewise, the backward section button moves or adjusts or refreshes the patent text within the text pane to a next backward iteration of the section having the part number and the part name, which can bring that next backward iteration to the top of the text pane, although non-top positioning is possible, as explained above.

Note that although the text pane is synchronized to the figure pane, a vice versa configuration is possible as well, where the figure pane is synchronized to the text pane. For example, upon the user activating (e.g., click, hover, touch) the part number or the part name associated with the part number (e.g., by proximity) in the patent text within the text pane, then the figure pane can move or adjust or refresh to present the first figure having the part number corresponding to what the user has activated in the patent text within the text pane. That part number can be highlighted (e.g., yellow, orange, red, green, blue) or bounded by a box or otherwise made visually distinct or remain as is. Likewise, there can be a forward part number button (or another visual user input element) and a backward part number button (or another visual user input element). The forward part number button moves or adjusts or refreshes the patent figure within the figure pane to a next forward iteration of the figure having the part number, as explained above. Likewise, the backward part number button moves or adjusts or refreshes the patent figure within the figure pane to a next backward iteration of the figure having the part number, as explained above.

Although the patent text is presented in the context of the patent specification, the patent text can also include claims. As such, the figure pane being synchronized to the text pane can be adjusted accordingly, as explained above. For example, if the user selects (e.g., clicks, hovers, touches) the part name or the part number (e.g., 76) in the patent claim presented in the text pane, then the patent figure in the figure pane correspondingly moves or adjusts or refreshes to a patent figure where the part number is mentioned, or which figure is likely to contain an object associated with the part name or part number in the claim. This likely determination can be based on various text processing, as explained above. For example, this text processing can include sentiment analysis, synonym analysis, or others. For example, if the claim within the patent text in the text pane recites "a car" then if "car" is not associated with a part number within the patent text within the text pane, but "automobile" or "vehicle" are recited in the patent text within the text pane then the figure pane can move or adjust or refresh to those figures associated with "automobile" or "vehicle" based on text processing based on part numbers or object recognition of a concept corresponding to "car" which is "automobile" or "vehicle" shown in some patent figures in the figure pane. Such move or adjustment or refresh can also enable the part numbers or the parts themselves to be highlighted (e.g., yellow, orange, green, blue, red) or otherwise visually distinct relative other part numbers or content in the figure pane, whether such highlighting or visual distinction is made on user selection or automatically or responsively. If the user selected claim term is not mentioned in the specification or not associated with a part number, then that selected claim term can be made visually distinct (e.g., bolded, italicized, underlined, highlighted, capitalized, re-fonted).

Since different users may have different figure and text review preferences, the user interface may present a visual element (e.g., button, toggle, switch, dial, dropdown menu, radiobutton, checkbox, knob) that is configured for a user input. As such, responsive to the user input, the patent figure in the figure pane and the patent text in the text pane can switch places such that the previous figure pane is now the new text pane containing the patent text and the previous text pane is now the new figure pane containing the patent figure. Note that if there are other content relevant visual elements corresponding to the text pane or the figure pane, then those relevant visual elements can switch as well. Moreover, the user can save the user's desired pane configuration or positioning in the user's profile if the default pane presentation is not adequate. Alternatively, the user may be precluded from repositioning the text pane or the figure pane.

Figure 9P:
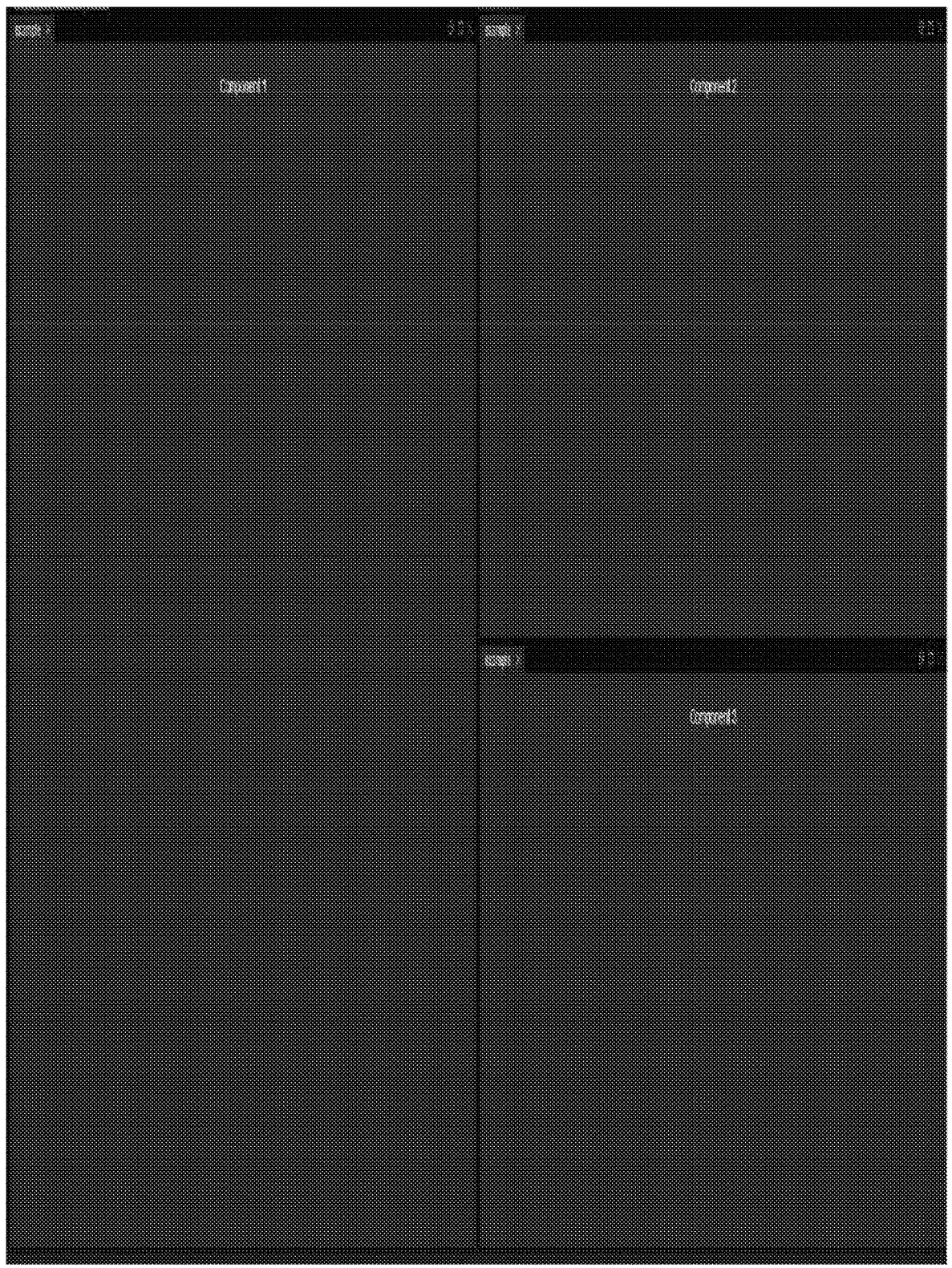

FIG. 9P presents a user movable or a user resizable panes or tiles in a user interface according to this disclosure. In particular, the user interface presents three user movable or user resizable panes or tiles, although less than three (e.g., two or one) or more than three (e.g., four, five, six) are possible. Any of such panes or tiles can contain image (e.g., still image, PDF, video) or text content (e.g., raw, formatted, hyperlinked). For example, a pane or tile 1 (leftmost) can present the patent figure, a pane or tile 2 (right upper corner) can present the patent specification, and a pane or tile 3 (right lower corner) can present the patent claims. However, this form of presentation is illustrative and can vary where the pane or tile 1 can present the patent specification or the patent claims, the pane or tile 2 can present the patent figure or the patent claims, or the pane or tile 3 can present the patent figure or the patent specification. Note that this form of presentation can enable concurrent presentation of multiple patents (e.g., when comparison analysis is needed). Such presentation can be of only figures, only text, some figures of some patents, some text of some patents, or other permutations thereof, including non-patent information or patent analytic information (e.g., classification, patent families, prosecution histories, litigation documents).

Note that side-by-side includes at least two viewing tiles or panes (e.g., left/right, top/bottom, diagonal). For example, there can be two, three, four, five, or more tiles or viewing tiles or panes, whether same or different size, shape, area, delineation colors, delineation type, background color, viewing properties, or other characteristics. Figures and text can be presented in any tile or pane. For example, the figures can be presented in a left viewing pane and the text can be presented in the right viewing pane. The user can activate (e.g., click, hover, touch) visual input element (e.g., button, toggle, dial, dropdown) to switch positioning, size, or content between tiles or panes, as desired. Panes or tiles can be resized independent of each other (e.g., one resized and one not resized) or dependent on each other (e.g., resizing one viewing pane automatically or responsively resizes other resizes pane).

There can be a bar (e.g., vertical, horizontal, diagonal) between panes or tiles where movement of the bar (e.g., horizontal plane, vertical plane, diagonal plane) correspondingly adjusts pane or tile sizes (e.g., one becomes larger in visual area and one becomes smaller in visual area). For example, when the bar is moved (e.g., user dragging) left or right, then such movement can automatically or responsively readjust shaping or size of viewing panes. Likewise, such movement can automatically or responsively readjust content in viewing panes. For example, when a viewing pane presenting a figure is readjusted in shape or size, then the figure is automatically or responsively adjusted to accommodate for such readjustment in shape or size. For example, the figure can automatically or responsively rescale, resize, reshape, expand, contract, rotate, or other properties. Likewise, the text can wrap or unwrap among lines or change in font size or other properties.

When a user display is detected to be in a portrait mode or a landscape mode or switched between the portrait mode and the landscape mode while viewing the panes or tiles, then the panes or tiles can be automatically or responsively reorganized or reshaped or resized or rezoomed based on the landscape mode or the portrait mode in order to maximally or more efficiently use viewport or display size.

In side-by-side mode (or other text or figure presentation modes), when presenting issued patents (or other suitable documents), since the issued patents may not have citation coordinates (e.g., paragraph number, column/line number) recited in the patent text, then there can be a presentation of (1) a corresponding text column/line from a corresponding issued patent grant file or (2) a paragraph number from a corresponding published patent application file. This presentation can be adjacent to or visually associated with text (e.g., when patent text is presented, when patent text is scrolled) or when user activating (e.g., clicking, hovering, touching, selecting) a specific patent text section. For example, when the user selects, clicks, or hovers over a specific section of the patent text, then there can be an automated or responsive presentation of the corresponding column/line number sourced from the patent text (e.g., issued patent grant file) corresponding to the specific section, which can be in a preset format (e.g., legal format) or a user defined format. For example, when the user selects, clicks, or hovers over a specific section of the patent text, then there can be an automated or responsive presentation of the paragraph number sourced from the patent text (e.g., published patent application file) corresponding to the specific section, which can be in a preset format (e.g., legal format) or a user defined format.

This can be accomplished in various technological ways. For example, this can be accomplished by extracting the patent text from the issued patents (e.g., images, PDFs, APIs, web page scraping), tracking columns and lines from the issued patents that source the extracted text (e.g., first word or phrase and last word or phase per column, first word or phrase and last word or phrase per line, paragraph column-line mapping and corresponding tracking, reading line numbers in specific areas of images, reading column numbers in specific areas of images) and then associating the tracked columns and lines with the extracted text. This information can be stored in the database and presented when the user is reviewing the issued patents. For example, this can also be accomplished by tracking patent text for issued patent grant files against corresponding published patent application files and noting which sentences correspond to which paragraphs, which can include tracking grammatical characters involving paragraph numbering (e.g., brackets, parenthesis, [ ], ( )).

Upon user activation (e.g., clicking, hovering, selecting) of part numbers in the patent figures, then the user interface can present which claim features these part numbers relate to based on text presentation in the text pane, as described above. The user can select only for independent claims or dependent claims or multiple dependent claims or all claims. For example, user selection of "car" in the patent specification within the text pane can enable the user interface to state whether "car" is claimed or not and which claim and where in that claim this feature is recited. When user activating (e.g., clicking, hover, highlighting, selecting) limitation of a claim in the text pane, then the figure pane can present patent figures in the figure pane to first instance of that limitation in figures. Note that the figure pane can be configured to present figures only or figures and text as well. Likewise, the text pane can be configured to present text only or text and figures as well.

Server can be programmed for editor control or administrator control of how many annotations performed by a specific reader (e.g., 10 annotations) or by specific time period (e.g., 20 annotations per week or 500 annotations per year) or unlimited amount of annotations. Annotations can be on a per figure basis or per page basis or per patent publication basis or per document basis. For example, the specific reader can only be allowed to perform 10 figure page annotations even if a specific patent has 50 figure pages. For example, the specific reader can only be allowed to perform 10 patent annotations per month or per year.

The user interface can present a visual user input element (e.g., button, toggle, switch, checkbox) to submit a specific patent publication (whether currently viewed or not currently viewed) for further analysis (or reanalysis) or training, which can be based on user edits or box movements, as explained above. In some embodiments, depending on user profile, the user may not submit any patent publications for processing but instead can only search the database of already annotated patent publications.

The patent figure can present labels which may contain analytics or be visually distinct based on various analytics associated with that label, as described above. For example, some of such analytics can include whether that part name is recited in a claim, how many times that part number or part name is mentioned in the patent specification or claims, or others.

Figure 10A:
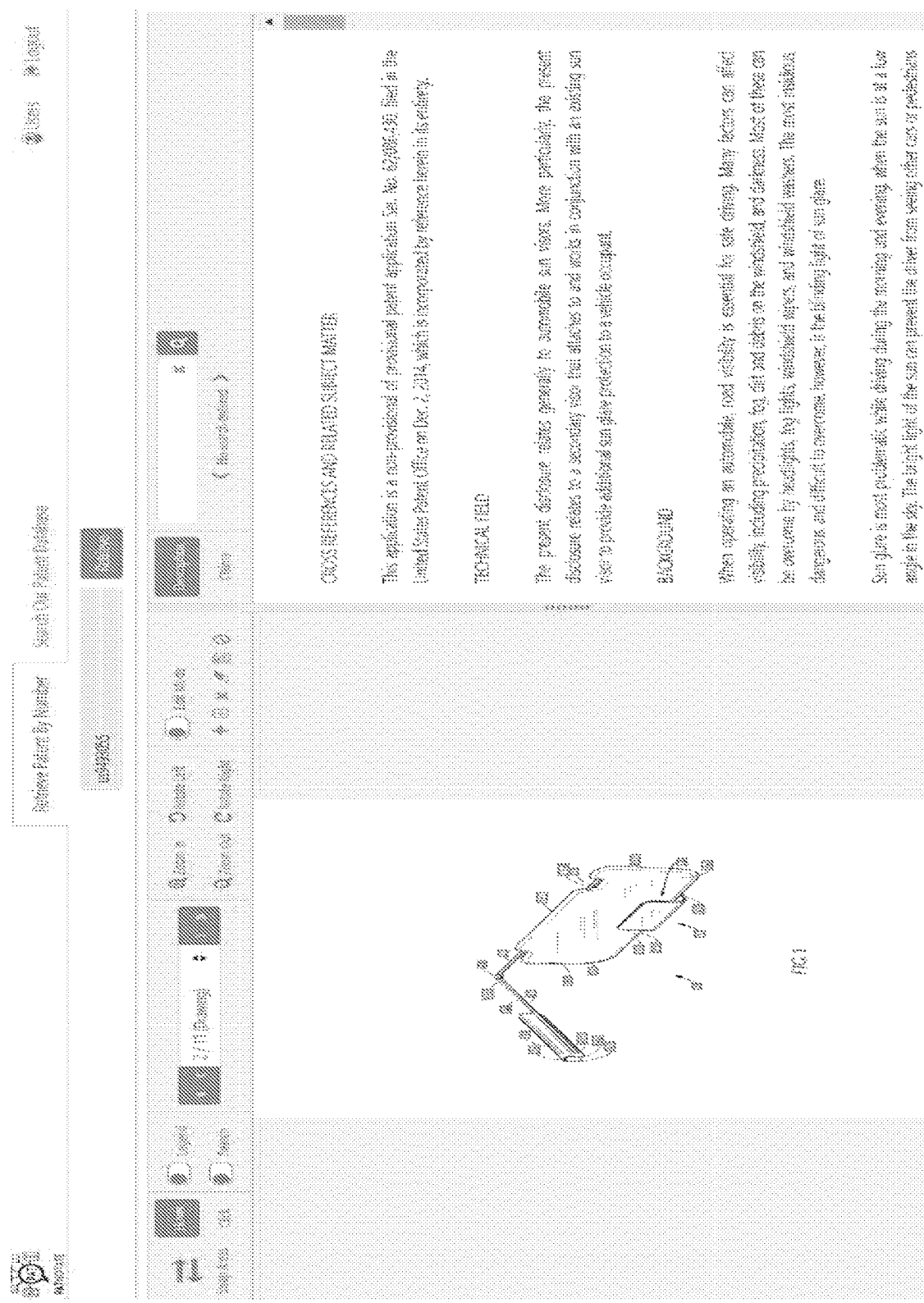

FIG. 10A illustrates an embodiment of a user interface according to this disclosure. In particular, the user interface utilizes at least two viewing panes (or viewing portions or viewing areas) to present data (e.g., from at least one database, related to a figure and a text). As shown in FIG. 10A, a patent figure and a patent description are presented side-by-side in the two viewing panes. While FIG. 10A presents a patent figure side-by-side with a patent text (e.g., description), any figure and text (so long as they are related or not related) can be presented, whether electronic, printed, or otherwise. In addition to the viewing panes, other information (e.g., text, images, graphics, PDFs, static, dynamic) and user interface elements (e.g., buttons, toggles, dials, dropdown menus, static, dynamic) may be presented, for example, above or below or lateral to the two viewing panes. These may include a "swap areas" button (or toggle or another user interface element), "hover" and "click" buttons (or toggles or other user interface elements), which can be operationally exclusive or inclusive to each other, "legend" toggle (or button or another user interface element), "search" (within drawings) toggle (or button or another user interface element), navigation within pages/sections of document button (or dropdown menu or dials or sliding scale or exclusive checkboxes or radio buttons or another user interface element), "zoom" in and out buttons (or dropdown menus or other user interface elements), "rotate" left and right buttons (or knob or another user interface element), "edit mode" toggle (or button or another user interface element), "description" and "claims" buttons (or toggles or other user interface elements), "search" (within text) box (or other query entry user interface elements), and "search" (within text) button (or checkbox or another user interface element). To be clear, while a button or a toggle may be used, other types of user interface elements can be interchangeably used depending on context or need (e.g., hover menus, links, toggle-button, pop-up control, drop down menu, tab, arrow).

The user interface includes, but can avoid, a plurality of regions, defined by a plurality of vertical partitions, distributively containing the "swap areas" button, the "hover" and "click" buttons (or toggles or other user interface elements), the "legend" toggle, the "search" (within drawings) toggle, the navigation within pages/sections of document button, the "zoom" in and out buttons, the "rotate" left and right buttons, and the "edit mode" toggle in various functionality groups. As such, these groups can vary or be absent. For example, the "edit mode" toggle and various icons contained in that group can be presented to all user or only to some based on user profile settings or user profile types of user profile groups. For example, the "edit mode" can be presented to editor profiles but not presented to reader profiles. Similar functionality can apply to description button, claims, button, search (within text) button, and search (within text) button.

Some, many, most, or all of the "swap areas" button, the "hover" and "click" buttons (or toggles or other user interface elements), the "legend" toggle, the "search" (within drawings) toggle, the navigation within pages/sections of document button, the "zoom" in and out buttons, the "rotate" left and right buttons, and the "edit mode" toggle have a functionality that can be persistent going forward for at least a current user session until user or system changed otherwise (in current user sessions or subsequent user sessions), or can automatically or responsively revert back to a default state for some, many, most, or all figures. For example, upon content swapping (or content moving), the presentation of figures and the text remains in their respective viewing panes (persistency) until reversed or changed by the user (by again activating the "swap areas" button) or automatically or responsively (e.g., satisfaction or non-satisfaction of semaphore, flag, or threshold) or until next the figure where the presentation may revert back to a default figure and text viewing pane presentation (e.g., text in left viewing pane and figure in right viewing pane or vice versa). For example, upon content swapping (or content moving), when the figures are presented on a single page-by-single page basis, the presentation of the figures and the text can persist as swapped (or moved) for the current patent content and for some, many, most, or all patent content going forward at least during the current user session or can be programmed or user set to be for some, many, most, or all patent content going forward to all subsequent user sessions unless changed otherwise. Note that if multiple types of content are presented (e.g., patent and technical manual), then this functionality can adjust accordingly. For example, some patent content can be viewed in a certain figure/text content-pane mapping or viewing setting and some blueprint content can be viewed in a certain figure/text content-pane mapping or viewing setting, any of which can be identical or different from each other in any presentation characteristic (e.g., pane size, hyperlinking). For example, when user activated, some of such toggles can persist or can avoid persisting as active until user deactivation occurs (or some preprogrammed criterion is met or not met or threshold satisfied or not satisfied or semaphore triggered or not triggered), whether such persistence is on a per figure, per set of figures, per document, per set of documents, per user session, per user sessions, or always. Similar functionality can apply to description button, claims, button, search (within text) button, and search (within text) button.

"Swap areas" button is programmed to activate swapping of content between the two viewing panes when the "swap areas" button is activated (e.g., clicking, touching). For example, such programming can enable the figure and the description to be moved into other areas of the user interface from a default setting so that, for example, the figure can be presented on the right side of the user interface, while the text is presented on the left side of the user interface, in contrast as to what is shown in FIG. 10A. Also, the legend and/or search box, which are described further below, (and other elements in the display), can also be moved into other locations from a default setting. For example, the legend and/or search boxes can be positionally swapped between the two viewing panes.

When more than two viewing panes are concurrently presented, then the "swap areas" button can enable swapping or moving of content carousel style (e.g., content consecutively moves clockwise or counterclockwise). Alternatively, the user can select which of the viewing panes are subject to swapping or moving and then the swapping or moving can occur between those selected viewing panes.

Upon swapping, the viewing panes can remain the same in terms of the viewing shape or size (e.g., perimeter, area) or can be automatically or responsively reshaped or resized based on a prior size for that content. For example, if the viewing pane presenting the text is smaller in size than the viewing pane presenting the figure, then, upon swapping, the pane currently presenting the text can be reshaped or resized (e.g., smaller) to match the shape or the size of the pane previously presenting the text and the pane currently presenting the figure can be reshaped or resized (e.g., larger) to match the size of the pane previously presenting the figure. For example, when the viewing pane presenting the figure is readjusted in shape or size, then the figure is automatically or responsively adjusted to accommodate for such readjustment in shape or size. For example, the figure can automatically or responsively rescale, resize, reshape, expand, contract, rotate, or other properties. Likewise, the text can wrap or unwrap among lines or change in font size or other properties. However, note that the size of the viewing panes or the presentation properties of the content within the viewing panes can also remain the same upon swapping. Similar functionality can apply to description button, claims, button, search (within text) button, and search (within text) button.

When reshaping or resizing of the viewing panes occurs, there is a partition bar (e.g., rectilinear, arcuate, sinusoidal, non-rectilinear, solid, broken) vertically extending between the viewing panes (although horizontal or diagonal extension is possible). In some embodiments, this partition bar can define at least one side of the viewing panes. As such, the reshaping or resizing of the viewing panes can be based on the partition bar being horizontally moved to the left or to the right in order to reshape or resize the viewing panes, whether this movement is manual or automatic or responsive based on preset criteria (e.g., swap areas button activation, initial presentation of figure and text). For example, FIG. 10A shows the viewing panes as both being rectangular. However, when the resizing occurs, the viewing panes can be reshaped as well and the viewing panes can both be square. Likewise, the user may be allowed to reshape or rotate (e.g., 360 degrees or less) the viewing panes as the user desires. For example, the viewing pane presenting the text can be reshaped to be triangular (e.g., acute, isosceles, right) and the viewing pane presenting the figure can be kept as rectangular (or other open or closed or symmetrical or asymmetrical shapes). Additionally, the viewing panes may have certain preset or user-selected/customized or system-customized-for-user viewing settings (e.g., viewing properties or content format properties based on user profile or user computing device or user location or user language or user network connection) or backgrounds (e.g., color, hatching, graphics) or the content within the panes may be presented in certain formatting (e.g., bolding, hyperlinking, coloring, fonts types or sizes). As such, upon swapping or moving of the content (e.g., figures, text) between the viewing panes or between other portions of the user interface, the viewing settings or the backgrounds or the content in the certain formatting may be automatically or responsively swapped or moved accordingly. For example, when the viewing pane presenting the figure is readjusted in shape or size, then the figure is automatically or responsively adjusted to accommodate for such readjustment in shape or size. For example, the figure can automatically or responsively rescale, resize, reshape, expand, contract, rotate, or other properties. Likewise, the text can wrap or unwrap among lines or change in font size or other properties.

Note that the any of the "swap areas" button, the "hover" and "click" buttons (or toggles or other user interface elements), the "legend" toggle, the "search" (within drawings) toggle, the navigation within pages/sections of document button, the "zoom" in and out buttons, the "rotate" left and right buttons, or the "edit mode" toggle or any icon or user input element groups, which can include any of such icons or user input elements, can be operably tied to a specific viewing pane, which can be presenting figures or text. As such, upon swapping or moving of the content (e.g., figures, text) between the viewing panes or between other portions of the user interface, as described herein, then any of the "swap areas" button, the "hover" and "click" buttons (or toggles or other user interface elements), the "legend"

toggle, the "search" (within drawings) toggle, the navigation within pages/sections of document button, the "zoom" in and out buttons, the "rotate" left and right buttons, or the "edit mode" toggle or any icon or user input element groups can swap or move accordingly to remain positioned above or next to that specific viewing pane to which these user input elements are operably tied (e.g., figure, text).

Note that similar functionality applies to text related user input elements presented above a viewing pane presenting text. For example, a description button, a claims button, a search (within text) bar, and a search (within text) button (or other text related graphics or user input elements) can be operably tied to a viewing pane presenting text. Therefore, upon swapping or moving of content between the viewing panes, as described herein, the description button, the claims button, the search bar, and the search button can swap together as a group accordingly and follow to be presented above the viewing pane presenting text. Resultantly, the user interface can present different groups of graphics or user input elements that are operably tied to different forms of content (e.g., figures, text) presented in different viewing panes. As such, these groups can swap or move accordingly within the user interface based on swapping or movement of such forms of content between the viewing panes.

"Hover" and "click" buttons are programmed to activate/deactivate a clicking functionality or a hover over functionality, whether inclusive or exclusive to each other, when a figure or text item (e.g., bounding box, part number, part name, label) presented in any of the viewing panes is activated via clicking or hovering over in order to enable for interactive user interfaces, in which, when the user hovers or clicks on one area of the user interface (for example, the figure in one pane), there is an automatic or responsive change of the presentation of another area of the interface (for example, the text in another pane) in response to the user's action (e.g., hovering, clicking). The user may then respond to the revised presentation, by for example, hovering or clicking on one area of the revised presentation (for example, the text in one pane), thereby causing an automatic or responsive change the presentation of another area of the user interface (for example, the figure in another pane) in response to the user's action. This results in an "interactive" flow of back and forth between various parts of the interface (e.g., clicking, hovering). While these examples relate to the interactions between the text and the figure, hovering or clicking on other parts of the user interface (e.g., legend toggle, search toggle) can result in a similar interactive flow. In some embodiments, the hover and click buttons can be a single button, providing exclusive hover or click functionality, depending on how programmed (e.g., default is hover, default is click).

"Legend" toggle is programmed to activate/deactivate (e.g., show/hide) a presentation of a part legend, as described herein, for some figures, for a dynamically or statically selected set of figures (e.g., based on criteria or parameters), or for each figure of a patent content (or another form of content as described herein). The part legend can be presented within at least one of the viewing panes or as a separate viewing pane (e.g., third viewing pane), whether between the viewing panes or not between the viewing panes, whether side-by-side or not side-by-side. The part legend can be swappable or movable, as described herein. For example, the user can show/hide the legend when activating/deactivating the legend toggle (or by clicking an "x" box for example on the upper right side of legend), or move the legend to other parts of the user interface (e.g., drag-and-drop). For example, the legend toggle can visually change between an activation state and a deactivation state (e.g., color, hatching, size, or shape of background, font, icon, or graphic) in order to inform the user of what state the legend toggle is currently in. Although the parts legend toggle is binary in terms of states (activate and deactivate), this configuration can vary and more states (e.g., icon stations) can be added (e.g., three, four, five), which can control a degree of the part legend or a degree of presentation of the part legend (e.g., show names only, show numbers only, show name and numbers). For example, each station within the part legend toggle can add or remove features to the parts legend. For example, when user activated, this toggle can persist or can avoid persisting as active until user deactivation occurs (or some preprogrammed criterion is met or not met or threshold satisfied or not satisfied or semaphore triggered or not triggered), whether such persistence is on a per figure, per set of figures, per document, per set of documents, per user session, per user sessions, or always.

The legend can be a user interactive legend, where, when a particular line or part name or part number is selected, activated, clicked, touched, gestured, typed, voice commanded, or hovered over, then a corresponding part name or part number or figure label in a corresponding figure or text is responsively highlighted or visually distinguished via color, bolding, underlining, italicizing, changing font or background, or otherwise made visually distinct (e.g., adding graphics). The user can select, activate, click, touch, gesture, or hover over the particular line or part name or part number within the user interactive legend for responsive simultaneous highlighting or responsive visual distinction of the corresponding part name or part number or figure label in the text or the figure. Furthermore, the text (or figure) may responsively move or update or refresh within that respective viewing pane (or another pane) to a location in the text (or figure) within that respective viewing pane (or another pane) containing that part name or part number, if the text (or figure) is not currently presenting such part name or part number within that respective viewing pane (or another pane) or if there is a preferred location (e.g., internal or external to viewing panes) of the part name or part number other than what is currently showing in the user interface. Although the legend is presented as a vertical legend, note that a horizontal legend (e.g., horizontal pane) or a columnar legend (e.g., multiple parallel or non-parallel columns) or a diagonal legend is possible (e.g., diagonal pane).

"Search" (within drawings) toggle is programmed to activate/deactivate (e.g., show/hide) a presentation of a search user interface, as described herein, to search for part names, as described herein, within some figures, within a dynamically or statically selected set of figures (e.g., based on criteria or parameters), or within each figure of a patent content (or another form of content as described herein). The search user interface can be presented within at least one of the viewing panes or as a separate viewing pane (e.g., third viewing pane), whether between the viewing panes or not between the viewing panes, whether side-by-side or not side-by-side. For example, the search user interface and the parts legend can appear one-over-another within one viewing pane or side-by-side to each other within adjacent viewing panes. For example, when the search user interface and the parts legend appear one-over-another within one viewing pane, then there can be a partition bar that horizontally extends therebetween, with the partition bar being vertically movable to enable the user to set sizing of the search user interface and the parts legend. The search user interface can be swappable or movable, as described herein.

The user can show or hide the search user interface when activating or deactivating the search toggle (or by clicking an "x" box for example on the upper right side of search user interface), or move the search user interface to other parts of the user interface (e.g., drag-and-drop). For example, the search user interface toggle can visually change between an activation state and a deactivation state (e.g., color, hatching, size, or shape of background, font, icon, or graphic) in order to inform the user of what state the search user interface toggle is currently in. Although the search user interface toggle is binary in terms of states (activate and deactivate), this configuration can vary and more states (e.g., icon stations) can be added (e.g., three, four, five), which can control a degree of the search user interface or a degree of presentation of the search user interface (e.g., show names only, show numbers only, show name and numbers). For example, each station within the search user interface toggle can add or remove features to the search user interface. For example, when user activated, this toggle can persist or can avoid persisting as active until user deactivation occurs (or some preprogrammed criterion is met or not met or threshold satisfied or not satisfied or semaphore triggered or not triggered), whether such persistence is on a per figure, per set of figures, per document, per set of documents, per user session, per user sessions, or always.

The search user interface enables an interactive search, which, when a particular part name is entered (e.g., virtual or physical keyboard, microphone, camera, gesture) into a search box and subsequently searched (e.g., immediately upon text entry or upon activating search button), then a corresponding part name or part number or label in a figure is responsively highlighted or visually distinguished via color, bolding, underlining, italicizing, changing font or background, or otherwise made visually distinct (e.g., adding graphics). The user can simultaneously search for multiple part names for simultaneous responsive highlighting or visual distinction via color, bolding, underlining, italicizing, changing font or background, or other form of visual distinction (e.g., adding graphics) of corresponding part names or part numbers or labels in the figure or text. Furthermore, the figure (or text) may automatically or responsively move or update or refresh within that respective viewing pane (or another pane) to a location in the figure (or text) within that respective viewing pane (or another pane) containing that part name or part number, if the figure (or text) is not currently presenting such part name or part number within that respective viewing pane (or another pane), or if there is a preferred location (e.g., external or internal to viewing panes) of the part name or part number other than what is currently showing in the user interface.

Note that the search user interface can include a search term entry box, which may responsively provide a list of autosuggestions dropping down when the user begins or is actively inputting a search term or a part name. The list of autosuggestions can be sourced from a generic dictionary, a dictionary for a specific technical field (e.g., based on patent classification, art units, references cited, NLP text processing, user tags, figure image processing), a dictionary formed based on processing the text and forming a list of part name and part number pairs, a generic thesaurus, a custom thesaurus (e.g., technology specific thesaurus based on patent classification, art units, references cited, NLP text processing, user tags, figure image processing), or a popularity data structure, which can be updated in real-time based on what the user or other users are entering into their respective search term entry boxes. The list of autosuggestions can include a set of lines, each having an autosuggest content (e.g., text) and being user selectable such that the autosuggest content automatically or responsively populates the search term entry box.

Navigation between pages/sections of document buttons are programmed to allow for movement or flipping action or scrolling up/down or left/right between pages/sections of a document either consecutively or at intervals by skipping pages/sections with that respective viewing pane or several panes. There is a dropdown menu (or another page/section selection user input element) that allows the user to select which page/section to currently view in that respective pane, whether text or images. Each page may be labeled as drawings or text or with some other designation to identify an associated page without having to view or open that page. Note that the scrolling up/down can occur on a page-by-page or section-by-section basis or via a smooth scroll up/down. For example, when multiple images are stitched end-to-end (e.g., top end portion, bottom end portion, lateral end portions), then the user can consecutively scroll the images (e.g., cursor device, mouse, touchpad, touchscreen) based on such stitching. Note that a current sheet presentation area (e.g., $2/11$ drawings area) between a plurality of navigation buttons can be programmed to provide a first page identifier (e.g., text, graphic) or a last page identifier (e.g., text, graphic) or a figure identifier (e.g., text, graphic). For example, the first page identifier can be a letter F and the last page identifier can be a letter L, where the letter F appears in the current sheet presentation area between the navigational buttons when a sheet $2/11$ is presented or when sheet $8/11$ is presented. This way a user can quickly know where that navigation is within a patent document.

Whether additional or alternative to the navigation between pages/sections of document buttons or the dropdown menu, there can be a set of navigational user input elements (e.g., buttons, hyperlinks) presented within a viewing pane that presents a figure sheet. The set of navigational user input elements can enable the user to navigate between the figure sheets from the viewing pane and avoid moving the cursor to the navigation between pages/sections of document buttons or the dropdown menu. For example, there can be a back button (e.g., left, up) or a forward button (e.g., right, down) presented within the viewing pane presenting the figure sheet. For example, the back button can be a rectangular (or other shape) button that is vertically elongated and the forward button can be a rectangular (or other shape) button that is vertically elongated, with the figure sheet extending therebetween or the back button or the forward button extend away from margins or edges of the figure sheet or over the margins of the figure sheet. The back button or the forward button can be not shown or can be hidden by default and can be presented when the cursor is positioned over a defined back area (e.g., left margin of figure sheet, top margin of figure sheet, left viewing area outside of figure sheet but inside viewing pane, top viewing area outside of figure sheet but inside viewing pane) or a defined forward area (e.g., right margin of figure sheet, bottom margin of figure sheet, right viewing area outside of figure sheet but inside viewing pane, bottom viewing area outside of figure sheet but inside viewing pane).

The defined back area or the defined forward area can be rectangular, but this shaping can vary (e.g., square, circular, semi-circular, oval, semi-oval, triangular, symmetrical, asymmetrical, open-shape, closed-shape). The defined back area or the defined forward area can be transparent, translucent, or opaque. The defined back area or the defined forward area can include graphics or text. The defined back area and the defined forward area can be identical or different from each other in size, shape, perimeter, area, volume, degree of translucency, modality of visual presentation, modality of positioning, or other characteristics.

The back button or the forward button can be respectively presented over the defined back area or the defined forward area. The defined back area or the defined forward area can respectively be the back button or the forward button. The back button or the forward button can respectively be sized less than the defined back area or the defined forward area, equal in size to the defined back area or the defined forward area, or greater in size than the defined back area or the defined forward area. The back button or the forward button can include graphics or text. For example, the defined back area or the defined forward area can appear as opaque or translucent within the viewing pane, the back button or the forward button can respectively have a left or up arrow graphic or a right or down arrow graphic, and the back button or the forward button can respectively appear within the defined back area or the defined forward area internal to the viewing pane, whether over the figure sheet or not over the figure sheet. As such, the user can navigate between the figure sheets from the viewing pane and avoid moving the cursor to the navigation between pages/sections of document buttons or the dropdown menu.

Although the back button or the forward button can be not shown or can be hidden by default and can be presented when the cursor is respectively positioned over the defined back area or the defined forward area, this configuration can vary. For example, the back button or the forward button can be shown or can be not hidden by default. Further, since the viewing pane has a plurality of side borders (e.g., edges), then the borders can include the back button or the forward button. For example, if the viewing pane has a left border, a top border, a right border, and a bottom border, then the left border or the top border can host the back button or the right border or the bottom border can host the forward button. For example, the defined back area can be the left border or the top border. For example, the defined forward area can be the right border or the bottom border.

"Zoom" in and out buttons are programmed to allow for individual viewing panes (e.g., specific viewing pane) to be zoomed in or out (e.g., figures). Some, many, most, or all of the viewing panes may be programmed to allow panning up and down or side to side by pointing a cursor (e.g., mouse, touchpad, touchscreen) to a perimeter of a figure shown in a specific viewing pane and pulling along the perimeter. Note that autozoom is possible when figures are initially presented and the user can then adjust as needed by using the zoom in and out buttons. For example, the autozoom can be based on OCR processing of a figure and various parameters of a viewport presenting the figure (e.g., window size, maximize or minimize window setting).

"Rotate" left and right button are programmed to allow for rotation (e.g., clockwise, counterclockwise, preset rotation angle) of a figure within a viewing pane, upon activation of the buttons. This may be useful as individual figures may be uploaded or loaded or presented in different directions (e.g., 90 degrees rotated counterclockwise or clockwise) making the figure not user friendly for a user to view. While there can be an automatic recognition of an orientation of a figure (or another image) and an automatic rotation of the figure to be in a correct rotation (e.g., upright relative to viewport orientation whether in landscape or portrait mode), the "rotate" left and right buttons may allow for rotation of the figure based on the user's preferences, on-demand.

"Edit mode" toggle is programmed to activate/deactivate (e.g., show/hide icons, change editing icons, change icon colors or background colors or font type or font sizes, modify active/not active icon status) in order to allow/disallow various user input element functionality, as described herein. The edit toggle is selectively available based on user profiles (e.g., profile groups, profile types), but can be available to all user profiles (e.g., profile group or profile type or profile parameter agnostic). For example, the edit toggle can be shown on user interfaces to some, many, most, or all editor profiles, but can be not shown on user interfaces to some, many, most, or all reader profiles, where the editor profiles and the reader profiles vary from each other at least in terms of access (e.g., write, delete) relative to text or figures, but both have reading access to figures and text. For example, this functionality can be for some figures, for a dynamically or statically selected set of figures (e.g., based on criteria or parameters), or for each figure of a patent content (or another form of content as described herein) or current document or dynamically or statically selected set of documents or current user session or all user sessions.

The edit toggle can visually change between an activation state and a deactivation state (e.g., color, hatching, size, or shape of background, font, icon, or graphic) in order to inform the user of what state the edit toggle is currently in. Although the edit toggle is binary in terms of states (activate and deactivate), this configuration can vary and more states (e.g., icon stations) can be added (e.g., three, four, five), which can control a degree of the edit icons or a degree of presentation of the edit icons (e.g., activate some editing icons and keep some editing icons inactive) or a degree of editing functionality (e.g., stations incrementally activating or deactivating editing icons). For example, each station within the edit toggle can add or remove features to editing functionality. For example, when user activated, this toggle can persist or can avoid persisting as active until user deactivation occurs (or some preprogrammed criterion is met or not met or threshold satisfied or not satisfied or semaphore triggered or not triggered), whether such persistence is on a per figure, per set of figures, per document, per set of documents, per user session, per user sessions, per time or date period basis, or always.

Once user activated, the edit toggle remains active until user deactivation (or some preprogrammed criterion is met or not met or threshold satisfied or not satisfied or semaphore triggered or not triggered). The edit toggle can remain active on a per figure basis, per set of figures basis, per document basis, per set of documents basis, per user session basis, per user sessions basis, per time or date period basis, or other situations. For example, the edit toggle can be not active as a default setting (e.g., for editor profile), but can be programmed to be active as a default setting (e.g., for editor profile). For example, once user activated, the edit toggle can remain active on a per document basis and become inactive when a new document is presented (to be selectively user activated again if desired) or can remain active when a new document is presented or can remain active until the user logs off or deactivates the edit toggle. In some embodiments, the edit toggle can be absent and the user can edit without selectively activating the edit toggle (or another user input element).

The edit toggle can enable part number labeling of non-recognized part numbers in figures, correction of incorrectly recognized part numbers in figures, correction of mappings between part names and part numbers (or vice versa), and other functionality. There can be a machine learning algorithm or a neural network algorithm, as explained above, that can track (e.g., real-time) various user editing activities relative to figures (or text), when the edit toggle is activated or responsive to the edit toggle being activated (or when or responsive to part number labeling of non-recognitions of part numbers in figures or correction of incorrect recognitions of part numbers in figures or editing non-mappings between part names and part numbers or correcting incorrect mappings between part names and part numbers is occurring or save actions of any editing activities), such that when the user labels, corrects, or edits non-recognized part numbers in figures or incorrectly recognized part numbers in figures or incorrect mappings between part names or part numbers or moves or resizes or reshapes labels in figures or corrects or edits part name-part number pairs in text, then the machine learning algorithm or the neural network algorithm can actively learn in real-time (or not real-time) from such activities and update in real-time (or not real-time) its relevant machine learning or neural network data (e.g., character recognition models, part number recognition models, image segmentation model, object detection model, pattern or character avoidance or skipping model, input-output example pairs) for subsequent or future recognitions, mappings, labeling, or other activities relative to figures or text, as described herein, whether for new patent documents (or other document types) or for already stored patent documents (or other document types). For example, this relevant machine learning or neural network data can be programmed for image operations, text operations, object classification, label shaping, label sizing, line extension, line orientation, visual association, visual interference recognition, visual interference avoidance, part name annotation, part name presentation, character recognition, image segmentation, character segmentation, part number recognition, handwriting recognition, part name identification, database searching, text summarization, specification summarization, independent or dependent or multiple dependent claim summarization, legend formation, part name-part number mapping for hyperlinking, or other data tasks.

The edit toggle allows/disallows various figure editing operations via an add a single bounding box button, an add multiple bounding boxes button, a remove selected bounding button, a remove erroneous bounding box button, a save button, and a go back to a default bounding box state button. Note that although these are described as user interface buttons, such configuration can vary and other user input elements (e.g., sliders, dials, dropdown menus, lassos, free-form sketchers, checkboxes) can be used, whether additionally or alternatively.

Upon a user activation (e.g., clicking, touching, speaking) of the add a single bounding box button, there is an automatic or responsive presentation of a new bounding box (or another suitable shape) within a viewing pane (e.g., default presentation). This presentation can be over a figure or page within the viewing pane or not over the figure or page within the viewing pane. Likewise, this presentation can be within a specific area of the viewing pane (e.g., corner, center) or this presentation can be over a specific area of the figure or page (e.g., corner, center, margin). Similarly, this presentation can be within a random area of the viewing pane (e.g., corner, center) or this presentation can be over a random area of the figure or page (e.g., corner, center, margin). Note that the figure can be presented alone on a page or a sheet or there can be multiple figures presented on the page or the sheet. As such, the bounding box can be presented, whether in the specific area or the random area of the page or sheet as well, whether over the figure or not over the figure.

Once the bounding box is presented, the bounding box can be user moved or edited within the viewing pane, as described herein. For example, once the bounding box is presented, the bounding box can be dragged or drag-and-dropped within the page presented within the viewing pane. If the bounding box is presented within the viewing pane, whether over the figure or not over the figure, and then the figure and the text are swapped or moved between the viewing panes, as explained herein, then the bounding box follows the figure and is presented in a same position within a new viewing pane as the bounding box was presented in a previous viewing pane. However, note that this can vary and the bounding box can be presented in a random or default position within the new viewing pane. In some embodiments, the bounding box can be moved from one viewing pane to another viewing pane. In some embodiments, the bounding box can be edited external to the viewing pane.

The bounding box can be optional. Therefore, other visual elements, shapes, characters, symbols, graphics, images, photos, objects, or other suitable visual content or visual markers can be used, whether additionally or alternatively (and same bounding box properties or functionality can apply). For example, there can be a pair of alphanumeric characters or symbols, whether left-right pair or top-bottom pair or a lower-diagonal and upper-diagonal pair. For example, these alphanumeric characters or symbols can include brackets (e.g., [ ], { }), parentheses (e.g., ( )), mathematical or grammatical signs (e.g., < >, + −, = =, * *, ^ ^, $ $, @ @, ! !, − −, / /, + +, ~ ~), colon or semi-colon (e.g., : , ;), letters (e.g., L, S, D, C, U, I, O, P, H and inverted or reversed or mirrored or flipped same or different case or font letter counterpart), numbers (e.g., 0 0, 8 8), or others. For example, the pair of brackets (or other forms of pairs described herein) can be presented as spaced apart from each other based on a preset pixel count or linear distance therebetween and then user moved together within the viewing pane as a pair while maintaining that pixel count or linear distance, which can be user adjusted later, whether increased or decreased, or each member of the pair can be moved independent of the other member of that pair. For example, the pair of parentheses (or other forms of pairs described above) can be user adjusted in terms of spacing therebetween. For example, one parenthesis is stationary while the other parenthesis is moved, whether toward or away from the parenthesis that is stationary, along a same plane (e.g., X-axis, Y-axis) such that a content (e.g., part number) can be enclosed therebetween, although moving not along the same plane is possible (e.g., orthogonal plane, diagonal plane). Although these pairs employ same content (e.g., pair of < > or pair of ++), this configuration is optional. For example, there can be a pair formed by a letter (e.g., L) and a mathematical sign (e.g., =). As such, the user can move or adjust size, line properties, backgrounds, in-between spacing, or other visual properties, of a pair as a whole or individually, for each member of the pair, as described herein. Likewise, for example, whether additionally or alternative to the pairs described above, there can be an underscore (or another single element, shape, character, symbol, graphic, image, photo, or object presented) and similar functionality can apply.

The bounding box is rectangular, but can be of any polygonal shape (e.g., square, trapezoid, triangle, pentagon, hexagon, octagon, heptagon), whether open or closed, whether symmetrical or asymmetrical. For example, the bounding box can be circular, oval, or other suitable shapes. The bounding box can be changed in shape after being presented. For example, the bounding box can be presented as a rectangle and the user can change such shaping to an oval, whether via a manual reshaping, redrawing, or resculpting, or via activating a preset command (e.g., from bounding box properties menu presented upon right clicking of bounding box) or when the bounding box is activated (e.g., clicked touched), as described herein.

The bounding box has a default perimeter color (e.g., red), but this color scheme can be changed (e.g., green), whether before or after presenting the bounding box. The default perimeter is delineated via a solid line, but such delineation can vary (e.g., broken line, dashed line, parallel lines). The bounding box has a default background color (e.g., white), but this color scheme can be changed, whether before or after presenting the bounding box. In some embodiments, the bounding box does not have the default perimeter and the bounding box is defined via the default background, which can be of any color (e.g., green, yellow, orange, red, violet).

The bounding box is opaque in a default state, but this property can be changed to transparent or translucent, where any degree (e.g., translucency) thereof can be user adjusted, whether before or after presenting the bounding box. The bounding box is internally empty in terms of part numbers in a default state, but this can be changed (e.g., show part number randomly, show only part number that is suspected to be illustrated in currently viewed figure, show lowest or highest part number, show non-matched part number), whether before or after presenting the bounding box. The bounding box can be reshaped, resized, or moved within the viewing pane, whether manually by the user (e.g., cursor, voice commands, macros), or automatically or responsively based on a detected potential visual interference or overlapping with other bounding boxes or content original to that figure (e.g., part numbers, lead lines, objects, information in margins). For example, the bounding box can be dragged, drag-and-dropped, or otherwise moved over the figure (or past the figure) within the viewing pane.

Upon activating the bounding box (e.g., clicking, double clicking, right clicking, touching, gesturing), there can be a list of part name-part number mappings that becomes user operable. For example, a key 12 (part number) can be mapped onto a word "pump" (part name) or vice versa, where this list is formed based on linguistically processing the patent text, as described herein. Note that the key can be of any alphanumerical format (e.g., 13, 432A, 24$, DB122, -end_11) and the part name can be of any alphanumerical format (e.g., bolt, solenoid valve, heating_element_4, driver F). If multiple part names correspond to a single part number, then a frequency analysis can be performed for the multiple part-names relative to the single part number and a most frequently used part name (e.g., mode analysis) can be mapped to the single part number or vice versa. However, if the most frequently used part name is mapped to the part number or vice versa, then there can be or can avoid being a visual indication (e.g., specific coloring or highlighting or bolding or font type or font size) of such state of being presented external or internal to the list (e.g., highlighted row reciting part number-part name mapping, graphic on row reciting part number-part name mapping, part number-part name mapping are visually distinct based on color or background or font type or font size). The visual indication can enable the user to see what other part names have been used for that part number and allow the user to remap that part number-part name mapping, if desired.

This list can be presented as a dropdown menu, a vertically or horizontally scrollable list, an autocomplete text box, a checkbox pattern, a carousel, a table with a part number column and a part name column, or another suitable visual form of presenting various part name-part number mappings. For example, a part name-part number mapping can be recited on a single row or line. For example, the part name-part number mapping can be sorted by part numbers (e.g., numerically increasing or numerically decreasing or as found in text order) or part names (e.g., alphabetical or reverse alphabetical). As such, the user can select a desired part name-part number mapping to associate with the bounding box. Upon such selection, the user can manually save this selection or this selection can be automatically or responsively saved. When the list does not include a desired part name-part number mapping, then the user can manually type a part name (or a part number) and a part number (or a part name) to manually form such mapping (e.g., automatic mapping detection and format conversion) and then save such mapping, as described herein. After such saving of such mapping, when the user clicks or hovers over the bounding box, which has been adjusted, as explained herein, then there can be a part name presented or other functionality can activate, as explained herein.

Selecting part name-part number mapping can occur when a part number has not been recognized or incorrectly recognized. For example, when the part number has not been recognized in the figure, then the user can cause a new bounding box (or another visual marker) to be presented over the figure and then the user can drag, drag-and-drop or otherwise move the bounding box over the part number that has not been recognized such that the part number is positioned within the bounding box (can include resizing or reshaping of the bounding box) and select an appropriate part name-part number mapping, which can be saved, as explained herein. The dropdown menu (or another visual element presenting the part name-part number pairs) can present some, most, many, or all part name-part number mappings, whether simultaneously or via scrolling, which can be sorted by part numbers (e.g., numerically increasing or numerically decreasing or as found in text order) or part names (e.g., alphabetical or reverse alphabetical).

The dropdown menu (or another visual element presenting the part name-part number pairs) can be specific to a figure or a page currently presented in a viewing pane. For example, such specificity can be formed based on linguistically processing the patent text, as described herein, and forming part number-part name mappings specific to figures (e.g., defined proximity to "fig" or "figure" keywords, part numbers appearing between "fig" or "figure" keywords). Upon such selection, the bounding box can perimetrically or internally change color (e.g., red to green) or another visual characteristic (e.g., hatching), which can indicate presence of the part name within the patent text by color-coding, since default coloring or visual characteristic scheme of the bounding box can indicate absence (or non-assignment) of the part name (e.g., red). However, this order can vary where the user can associate the bounding box with the part number and then drag, drag-and-drop, or otherwise move the bounding box over the part number in the figure or page such that the part number is positioned within the bounding box, as explained herein. After such saving of such mapping, as explained herein, when the user clicks or hovers over the bounding box, which has been adjusted, as explained herein, then there can be a part name presented or other functionality can activate, as explained herein.

When the part number has been incorrectly recognized, then the user can activate the bounding box already present over the part number that is not correctly recognized (e.g., 0 is recognized as 8) and then select a correct part the name-part number mapping, which can be saved, as explained herein. For example, when the part number has been incorrectly recognized, then the user can activate the bounding box already present over the part number and then remap the part number to another part number, which would then correspondingly remap the part name. After saving of such mapping, as explained herein, when the user clicks or hovers over the bounding box, which has been adjusted, as explained herein, then there can be a part name presented or other functionality can activate, as explained herein.

When the part number is not recognized in the figure or incorrectly recognized in the figure, then by activating the bounding box, whether the bounding box is or is not already positioned over the part number that is not recognized or incorrectly recognized, there can be a dropdown menu that appears, which lists some, many, most, or all of the part name-part number pairs that occur throughout the patent text in a numerical or alphabetical order or as found in text order. For example, the dropdown menu (or another visual element presenting the part name-part number pairs) can present some, most, many, or all part name-part number mappings, which can be sorted by part numbers (e.g., numerically increasing or numerically decreasing or as found in text order) or part names (e.g., alphabetical or reverse alphabetical). For example, the dropdown menu (or another visual element presenting the part name-part number pairs) can be specific to a figure or page currently presented in a viewing pane. For example, such specificity can be formed based on linguistically processing the patent text, as described herein, and forming part number-part name mappings specific to figures or pages (e.g., defined proximity to "fig" or "figure" keywords, part numbers appearing between "fig" or "figure" keywords). The user can select one of the listed part name-part number pairs to associate with the bounding box or modify an existing part name-part number pair associated with the bounding box by typing in a new part name or part number, thereby automatically or responsively selecting the new part name-part number pair to be associated with the bounding box. Once the user has selected a desired part name-part number pair, then this selection can be saved, whether manually or automatically or responsively, and the part name-part number is now changed. After such saving, when the user clicks or hovers over the bounding box, which has been adjusted, as explained herein, then there can be a part name presented or other functionality can activate, as explained herein.

Upon a user activation (e.g., clicking, touching, speaking) of the add multiple bounding boxes button, the user can select a plurality of locations on the figure or the page (e.g., clicking, touching) and each of such selections automatically or responsively adds a bounding box at that specific location (or a default location), with the bounding box having a predefined shape, coloring scheme, and size, as explained herein, and where the bounding box can then be adjusted in any visual properties thereof, as explained herein. This functionality contrasts with the add a single bounding box button because, where a plurality of part numbers has not been recognized (e.g., 2, 3, 4, 5, 6, or more) in a figure or page, then these user selections provide a quick way of adding multiple bounding boxes. This button remains active until user deactivated. Then, upon deactivation of the add multiple bounding boxes button, each of the bounding boxes can be dragged, drag-and-dropped, or otherwise moved over a specific part number that has not been recognized and then the user can activate the bounding box and select an appropriate part number-part name mapping, as described herein. Alternatively, the user can activate at least one of the bounding boxes, select an appropriate part number-part name mapping, and then drag, drag-and-drop, or move that bounding box over a part number that has not been recognized such that the part number is positioned within the bounding box, as described herein. Note that when the figures or page, and the text are swapped between the viewing panes, as described herein, then bounding boxes can be swapped as well, whether before or after these bounding boxes have been properly positioned and correctly mapped.

The user can select (e.g., click, touch, speak) a specific bounding box presented within a viewing pane, whether before or after the specific bounding box has been properly positioned and correctly mapped. Upon a user activation (e.g., clicking, touching, speaking) of the remove selected bounding button, the specific bounding box can be deleted from the viewing pane. Alternatively, the user can select (e.g., click, touch, speak) the specific bounding box presented within the viewing pane, whether before or after the specific bounding box has been properly positioned and correctly mapped, and press a "delete" button on a keyboard (e.g., physical keyboard), which deletes the specific bounding box from the viewing pane.

There are embodiments when some OCR algorithms (or some computer vision algorithms) can erroneously detect or recognize non-part numbers (e.g., object portions, hatchings, lead lines) as part numbers (or other figure reference forms). For example, a number I or 1 can be detected or recognized as a lead line. As such, this detection or recognition can present a plurality of artifacts manifested via a plurality of bounding boxes, as described herein, even though some artifact filtering is employed. When these non-part numbers are detected or recognized as part numbers that are mapped to part names, as described herein, then various bounding boxes can appear in a specific coloring scheme (e.g., green perimeter) and these bounding boxes can be manually deleted, as described herein. However, when these non-part numbers are detected or recognized as part numbers that are not mapped to part names or are not described at all in the patent text, then various bounding boxes can appear in a specific coloring scheme (e.g., red perimeter) and then can be manually removed or deleted, as described herein. If there are many of such bounding boxes (e.g., red perimeter), then this removal or deletion process can be time-consuming and laborious, if done manually. As such, upon a user activation (e.g., clicking, touching, speaking) of the remove erroneous bounding box button, there can be an automatic or responsive removal or deletion of all bounding boxes (e.g., red perimeter) resulting from non-part numbers being detected or recognized as part numbers, yet these part numbers are not mapped to part names or are not described at all in the patent text. Note that in embodiments when non-part numbers are detected or recognized as part numbers that are not mapped to part names or are not described at all in the patent text, then the bounding boxes can appear in a specific coloring scheme (e.g., red perimeter) and can present a default message informative of such status (e.g., unindexed) when activated (e.g., clicking, hovering), as described herein.

Whether additionally or alternatively, the user interface can present an add deletion area button (or another user input element) and a delete button (or the remove erroneous bounding box button or another user input element) over the viewing area presenting the figure sheet. Upon activation (e.g., clicking, touching) of the add deletion area button, the user can add (e.g., preset shape) or draw (e.g., freeform) a shape (e.g., rectangle, triangle, circle, oval, pentagon, octagon, symmetrical, asymmetrical, open, closed) via a cursor or a user touch or drag the shape over the figure sheet such that a plurality of bounding boxes (or visual markers) presented over the figure sheet are enclosed within the shape. Then, the user can activate (e.g., press, click, touch) a delete key on a user keyboard (e.g. hardware, virtual) or activate (e.g., click, touch) the delete button on the user interface such that the bounding boxes presented over the figure sheet and enclosed within the shape are removed. The removal can be for all of the bounding boxes enclosed within the shape or certain type of bounding boxes enclosed within the shape (e.g., only green perimeter or only red perimeter). For example, the certain type of bounding boxes can include all of the bounding boxes (e.g., red perimeter) resulting from non-part numbers being detected or recognized as part numbers, yet these part numbers are not mapped to part names or are not described at all in the patent text. For example, the certain type of bounding boxes can include all of the bounding recognized as numbers but not as part numbers identified in the patent text.

Upon a user activation (e.g., clicking, touching, speaking) of the save button, then some, many, most, or all user edits relative to some, many, most, or all bounding boxes (e.g., positioning, shaping, mapping) for a page or figure currently presented in a viewing pane, as described herein, can be saved.

If the user moves, resizes, reshapes, recolors, remaps, or otherwise visually adjusts or edits the bounding boxes, as described herein, then there are embodiments when the user can make mistakes with respect to at least one of the bounding boxes. For example, the user can remove or delete all bounding boxes (e.g., red perimeter) resulting from non-part numbers being detected or recognized as part numbers, where these part numbers are not mapped to part names or are not described at all in the patent text. With such removal or deletion, the user can also accidentally remove or delete some bounding boxes that are correctly recognized and not described or mapped to part names. As such, in order for the user to back to a default bounding box state of that page or figure presented in a viewing pane (e.g., in order to restart editing), whether before or after saving, upon a user activation (e.g., clicking, touching, speaking) of the go back to a default bounding box state button, there is a presentation of a default bounding box arrangement, as when this page or figure was loaded into the viewing pane. For example, a page or figure can be loaded into a viewing pane in a default state with a bounding box presented and the user can make some edits to the bounding box within the figure or the page presented within the pane, as described herein. If the user makes a mistake, then in order for the user to back to a default bounding box state of that page or figure presented in the viewing pane, before the page or the figure is saved, upon the user activation (e.g., clicking, touching, speaking) of the go back to a default bounding box state button, there is a presentation of the default bounding box arrangement, as when this page or figure was originally loaded into the viewing pane.

The user interface presents the description button and the claims button positioned immediately adjacent to each other, as one above another. However, this button positioning can vary (e.g., not immediately adjacent to each other, not one above another, laterally side-by-side). Although the description button and the claims button are presented as buttons, this can vary. As such, other user input elements can be used (e.g., radio buttons, checkboxes, hyperlinks, dropdown menus, binary or multi-station toggles, binary or multi-station rotary knobs). There can be two (or more) user input elements of a same user input modality or different user input modalities. For example, there can be two buttons or there can be one multi-stage toggle where at least two consecutive or non-consecutive stations correspond to the two buttons or there can be a checkbox corresponding to one of the buttons and a knob corresponding to the other of the buttons.

The description button and the claims button allow exclusive selective user switching therebetween, and correspondingly exclusively presenting either, the description (sourced from the patent text or API or web page scrape) or the claims (sourced from the patent text or API or web page scrape) in the viewing pane upon corresponding button activation, where the viewing pane is currently operably associated with text. In response to the user exclusively activating (e.g., clicking, touching, speaking) one of these buttons, the button corresponding text content may be presented in the viewing pane associated with that type of content (e.g., text). For not patent documents, as described herein, other relevant text sections can be correspondingly user selectively switched and presented. Upon swapping or moving of the text to another viewing pane, as described herein, the button selection can persist to the new viewing pane (e.g., text content type selection persists) or the button selection can revert to a default button selection (e.g., description, claims), as preprogrammed or as user customized (e.g., profile setting).

Although the description and the claims are exclusively presented via their corresponding presentation activation buttons, this form of presentation is not limiting and these or other sections or parts of a patent document (or non-patent document) can be sourced and a corresponding button may be presented, whether exclusively or non-exclusively. For example, there can be a priority button (or another user input element) causing a presentation of a priority text (sourced from the patent text or API or web page scrape) in the viewing pane (e.g., text) upon activation, a patent family tree button (or another user input element) causing a presentation of a patent family tree (sourced from the patent text or API or web page scrape) in the viewing pane (e.g., text) upon activation where each member of the family tree can be processed, as described herein, for navigation therethrough (e.g., by member selection), as described herein, an inventor button (or another user input element) causing a presentation of a list of inventor information (sourced from the patent text or API or web page scrape) in the viewing pane (e.g., text) upon activation, an assignee button (or another user input element) causing a presentation of an assignee information (sourced from the patent text or API or web page scrape) in the viewing pane (e.g., text) upon activation, an abstract button (or another user input element) causing a presentation of an abstract (sourced from the patent text or API or web page scrape) in the viewing pane (e.g., text) upon activation, or others (e.g., title, background, summary, description of figures, detailed description, patent examiner, art unit, references cited, cited by).

Although the description button and the claims button are programmed for causing the exclusive presentation of the corresponding text type content (e.g., only description or only claims but not both) within the viewing pane, this form of presentation within the viewing pane can vary. For example, the description button and the claims button can be programmed for causing a non-exclusive presentation of the corresponding text type content (e.g., simultaneous presentation). For example, upon the corresponding button activation, the viewing pane presenting the text can be further broken down into a plurality of sub-viewing panes, where each of such sub-viewing panes can be presenting a distinct text content, as described herein. For example, one of such sub-viewing panes can present claims and one of such sub-viewing panes can present description, where both of these sub-viewing panes are simultaneously presented, whether immediately or not immediately adjacent to each other. For example, some, many, most, or all of these sub-viewing panes can be resized within that viewing pane, reshaped within that viewing pane, re-arranged within that viewing pane, recolor-coded within that viewing pane, or otherwise modified or edited for any visual parameter thereof. For example, one sub-viewing pane can present claims, one sub-viewing pane can present description, one sub-viewing pane can present priority, one sub-viewing pane can present references cited, and one sub-viewing pane can present other text content, as described herein, which can be simultaneously presented with another viewing pane presenting pages or figures or legend, as described herein. Some, many, most, or all of these sub-viewing panes can be button activated/deactivated, whether exclusively or non-exclusively, when the user interface presents such buttons (or other user input elements), as explained herein. Further, some, many, most, or all of these sub-viewing panes can be tiled or presented vertically, horizontally, diagonally, jigsaw puzzle mode, tic-tac-toe mode, parallel boxes mode, or others, whether of same or different shapes, sizes, backgrounds, borders, font types, font sizes, font colors, text presentation modalities, or other visual forms. Note that upon swapping or moving of the text to another viewing pane, as described herein, these sub-viewing panes can persist to the new viewing pane or revert back to a default presentation (e.g., disappear), as preprogrammed or user customized (e.g., user profile).

The user interface presents the search (within text) box and the search (within text) button. The search (within text) box is programmed to receive a text query (e.g., alphanumeric content) from a user input device (e.g., keyboard, microphone). The search (within text) box has an X button (or another user input element), which can clear the search box upon activation. Upon such receipt, there can be a search that is automatically performed on the patent text presented within the viewing pane, without pressing the search (within text) button. The search is based on the text query. However, if the search (within text) button is pressed after the search (within text) box received the text query, then there can be a search that is automatically performed on the patent text presented within the viewing pane. The search (within text) box and the search (within text) button are presented above the viewing pane presenting the patent text. As such, the search (within text) box and the search (within text) button can be operably tied to that viewing pane. Therefore, upon swapping or moving of content, as described herein, the search (within text) box and the search (within text) button can swap or move accordingly.

The search produces various search results (e.g., text snippets) that can be highlighted accordingly. Below the search (within text) box, there is a navigational interface (e.g., back user input element and forward user input element) that allows the user to navigate through the search results (e.g., next back search result, next forward search result).

During such navigation, the patent text correspondingly moves within the viewing pane to present the search results. The search results can end navigation when the user reaches the last search result and the user can go back in terms of navigating through the search results, or the search results can endlessly iterate when the user reaches the last search result. For example, the search box can enable an interactive search where a particular part name or part number can be searched, then a corresponding part name or part number in the text (or figure) can be highlighted via color, bolding, underlining, italicizing, changing font type, changing font size, or other forms of visual distinction. For example, the user can search for multiple part name or part numbers for simultaneous highlighting of corresponding part name/numbers in the text or the figures. Furthermore, the text or the figures may automatically move to a location containing that part name or part number, if the text or the figure is not currently presenting such part name or part number, or if there is a preferred location of the part name or part number other than what is showing in the current presentation. The user can resize or reshape the search (within text) box (e.g., dragging) or move the search (within text) box to other areas of the user interface (e.g., dragging).

As further explained in context of FIGS. 10B-10N, there are various navigational arrows (or other navigational user input elements) presented in the figures, the text, or the legend. These arrows enable various interactive ways for navigating forward or backward based on part numbers within the figures as requested from within the text or within the text as requested from within the figures or within the text or the figures as requested from within the legend. These forms of navigation can be in an iterative manner based on matching part numbers (e.g., iterate through figures based on matching part number in text, iterate through text based on matching part number in figure, iterate through text or figures based on matching part number in legend).

For example, there can be a plurality of part numbers recognized within a figure. For each of these part numbers, there can be a back arrow (left arrow or another graphical user input element) and a forward arrow (right arrow or another graphical user input element) presented in proximity of that respective part number within the figure and operably associated therewith. The back arrow and the forward arrow within the figure can be presented adjacent to or visually associated with that part number within the figure upon hovering over or clicking that part number within the figure. Upon activating (e.g., clicking, touching) the back arrow or the forward arrow in the figure, the user is automatically or responsively redirected or updated or refreshed or moved to a segment of the text that includes that part number, which can be in an iterative manner based on part numbers, which can be endless or looping. For example, this can involve a find text function using a forward next function call (responsive to forward arrow activation) or a back next function call (responsive to back arrow activation) involving a part number (e.g., 86) or a part name (e.g., pump) and a part number (e.g., 12). For example, this can involve creating an index (e.g., during initial text processing) listing a part number or a part name and a part number with a respective start location within the text and a respective end location within the text (e.g., car 86 @ 240-247; 301-308), where a forward arrow activation or a back arrow activation can iterate within the text based on these character segments. The segment of the text may be a relevant or most relevant location in the text with respect to the figure or that part number. The segment of the text may be a first or last location within the text that mentions the figure or that part number. The segment of the text may be a next location (e.g., back next, forward next) within the text that mentions the figure or that part number. The segment or the part number within the segment or a sentence within the segment or a paragraph within the segment can be made visually distinct (e.g., highlighted, bolded, italicized, underlined, change font size, change font type). As such, figure-to-text selective navigation (e.g., forward, back) within the text based on user interaction with the part numbers within the figures is possible. Note that text-to-figure selective navigation (e.g., forward, back) within the figures based on user interaction with the part numbers within the text can be similarly possible as well.

For example, a method can include: in a first step, in response to a user hovering (e.g., cursor) or clicking (e.g., cursor) or touching (e.g., finger, stylus) on or near a part number in a figure (e.g., bounding box, within bounding box, part name, shape containing part name, within shape containing part name), there is a presentation of a navigational user input element (e.g., forward button, back button) within the figure in proximity to the part number for navigating to textual descriptions of the part number or to the textual descriptions containing the part number. The textual descriptions may appear side-by-side with the figure. The textual descriptions may also present a navigational user input element (e.g., forward button, back button) in response to the user hovering (e.g., cursor) or clicking (e.g., cursor) or touching (e.g., finger, stylus) on or near a part name or the part number in the textual description, where this navigation element can be programmed for navigating among figures based on the part number from the text. In a second step, in response to the user activating (e.g., touching) the navigational user input element in the figure, a text containing the textual descriptions is automatically or responsively redirected or refreshed or updated or moved to a first or last location or a forward next or back next location in the text where the part number appears (e.g., textual description containing that part number), where that location can be made visually distinct (e.g., highlighted). In a third step, when the first or last location or the forward next or back next location in the text is presented, and in response to the user hovering (e.g., cursor) or clicking (e.g., cursor) or touching (e.g., finger, stylus) on or near the part name or the part number in that text location, the navigational user input element is presented within the text in proximity to the part name or the part number for navigating to related figures that contain the part number via activating the navigational user input element in that text location. In a fourth step, in response to the user activating (e.g., clicking, touching) on the navigational user input element in that text location, then the figure can be redirected or refreshed or updated or moved to a first or last location or a back next or forward next location in the figures where that part number appears (e.g., previous figure, following figure), When that part number is present in the figure that is currently presented, then that part number in that figure can be made visually distinct (e.g., highlighted). Steps one to four can be repeated as often as user desired. In this way, back-and-forth navigation among various instances of part numbers from the text within the figures and from the figures within the text is possible in order to present various relevant portions in the text and the figures. By allowing the user to navigate using the navigational user input elements in the figures and the text, the user may navigate between the figures and the text in an expeditious manner to obtain whatever part number relevant information being sought.

Navigational user input elements in the text enable various interactive ways for navigating forward or backward within the figures as requested from the text, which can be iterative based on part matching part numbers. For example, a part name or a part number in a text can have a back arrow (or another navigational user input element) and a forward arrow (or another navigational user input element) visually associated therewith, which can be presented adjacent to the part name or the part number within the text upon the user hovering over (e.g., cursor) or selecting (e.g., clicking, touching) the part name or the part number. Upon activating (e.g., clicking) the navigational user input element (e.g., back arrow, forward arrow) within the text, the figure can be redirected or updated or refreshed or moved to a first or last location or a back next or forward next location in the figures, which can be a page (or figure) different from what is currently presented, which may be a relevant or most relevant location in the figures with respect to that portion of the text or the part name or the part number, or the first or last location within the figures that mentions the figure or the part name or the part number.

This functionality can be implemented in various ways. For example, a figure sheet can be tagged, linked, related, or associated with a plurality of part numbers recognized therein and a plurality of corresponding image coordinates for the part numbers (e.g., one part number to one or many image coordinates). As such, when the user activates a navigational user input element associated with a part number within the text, then a determination is made whether a current figure sheet or a subsequent (or previous) figure sheet is tagged, linked, related, or associated with the part number within the text. If the current figure sheet, then a corresponding image coordinate for the part number is responsively read for the current figure sheet and a visual marker (e.g., bounding box) within the current figure sheet is then highlighted or made visually distinct, as described herein. If the subsequent figure sheet, then the viewing pane is responsively updated or refreshed to present the subsequent figure sheet. Then, a corresponding image coordinate for the part number is responsively read for the subsequent figure sheet and a visual marker (e.g., bounding box) within the subsequent figure sheet is then highlighted or made visually distinct, as described herein.

For example, a method may include: in a first step, in response to a user hovering (e.g., cursor) or clicking (e.g., cursor) or touching (e.g., finger, stylus) on or near a part name or a part number in a textual description, there is a presentation of a navigational user input element (e.g., back button, forward button) in proximity of or visual associated with the part name or the part number within the text for navigating from within the text to related figures that include the part number. The figures may appear side-by-side with the textual description. The figures may also present a navigational user input element (e.g., back button, forward button) in proximity of or visual association with a part number within a figure upon hovering (e.g., cursor) or clicking (e.g., cursor) or touching (e.g., finger, stylus) on or near the part number in the figure, where this navigational element is programmed for navigation from within the figure to related text based on the part number from the figure. In a second step, in response to the user activating (e.g., clicking, touching) on the navigational element in the textual description, the figure can be automatically or responsively redirected or updated or refreshed or moved to a first or last location or a back next or forward next location in the figures, which can include a page (or figure) different from what is currently presented, where the part number appears. In a third step, when the first or last location or the back next or forward next location in the figures is presented, and in response to the user hovering (e.g., cursor) or clicking (e.g., cursor) or touching (e.g., finger, stylus) on or near the part number in the figure, the navigational user input element is presented within the figure in proximity to the part number, where this navigational user input element is programmed to enable navigation from within the figure to related textual descriptions that contain the part name or number from the figure. In a fourth step, in response to the user activating (e.g., clicking, touching) on the navigational element in the figure, the textual description is redirected or refreshed or updated or moved to a first or last location or a back next or forward next location in the textual description where the part name or the part number appears or related to the part name or the part number. Steps one to four can be repeated as often as is necessary. In this way, back-and-forth navigation among various instances of part numbers from the text within the figures and from the figures within the text is possible in order to present various relevant portions in the text and the figures. By allowing the user to navigate using the navigational user input elements in the figures and the text, the user may navigate between the figures and the text in an expeditious manner to obtain whatever part number relevant information being sought.

Figure 10B:
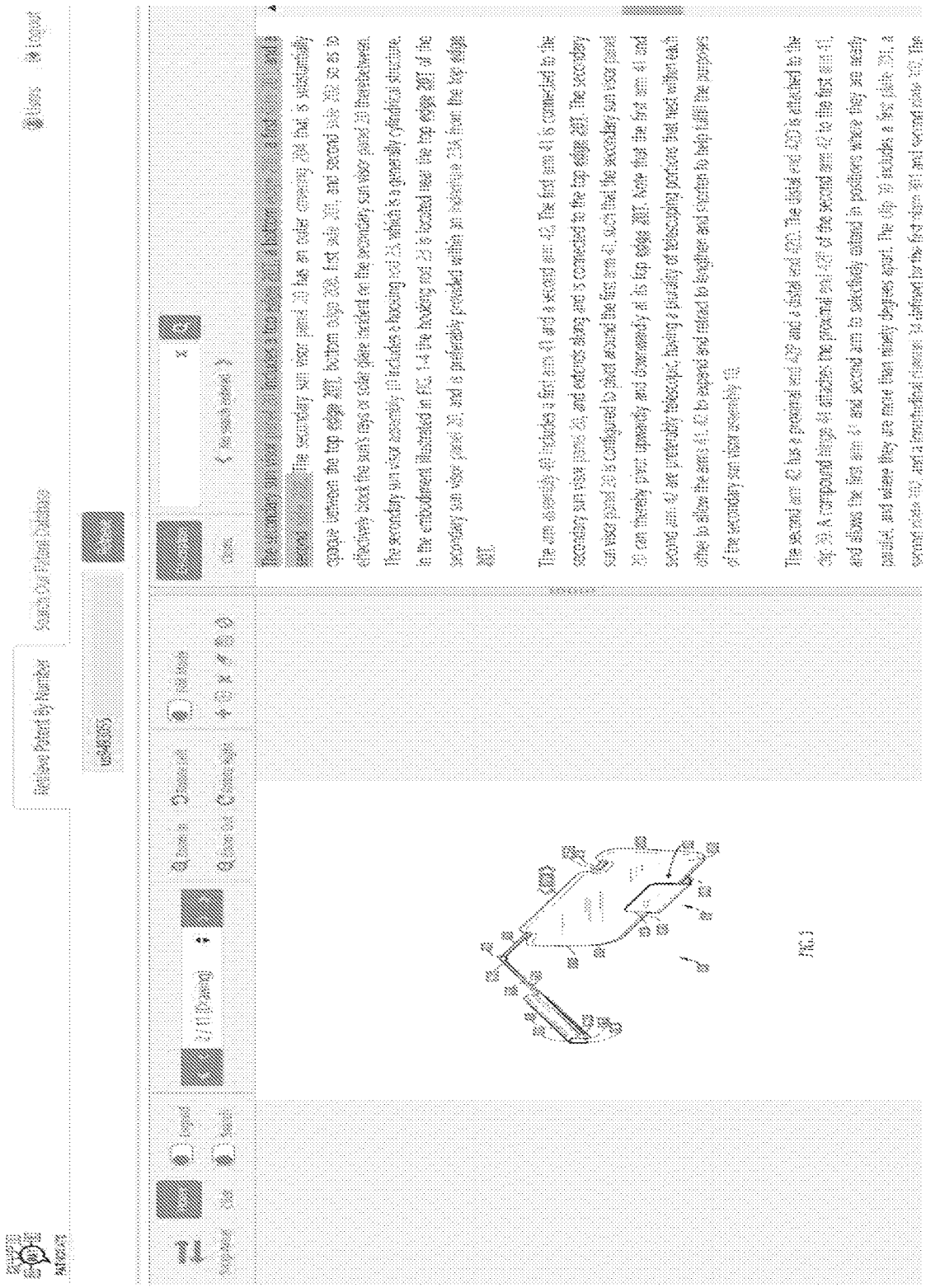

FIG. 10B illustrates an embodiment of a user interface for enabling navigation from figure-to-text according to this disclosure. This navigation can occur by hovering (e.g., cursor) or clicking (e.g., cursor) or touching (e.g., finger, stylus) a part number or a bounding box or within a bounding box or a part name in the figure, which results in the text automatically or responsively moving or refreshing or updating or redirecting to show in green (or another color) highlight (or another form of visual distinction) a sentence (or a paragraph or a phrase) within the text that mentions (e.g., first, last, back next, forward next) the part number, and highlighting (or another form of visual distinction) the part name and the part number within the sentence. Also shown is a left (back) arrow (or another graphical user input element) and a right (forward) arrow (or another graphical user input element) in the figure, which when selected, causes automatic or responsive movement or refreshing or updating or redirecting the text to a first or last location or a previous or next location in the text that contains that the part name or the part number. This form of navigation can be iterative based on matching part numbers.

The left arrow and the right arrow are presented on opposing sides (left and right) of the bounding box, outside of the bounding box, with the part number being positioned therebetween. However, this presentation can vary in many ways. For example, the left arrow and the right arrow can be presented inside the bounding box, with the part number being positioned therebetween. For example, the left arrow and the right arrow can appear on a top side of the bounding box and a bottom side of the bounding box, with the part number being positioned therebetween. For example, the left arrow and the right arrow can appear on a top diagonal side of the bounding box and a bottom diagonal side of the bounding box, with the part number being positioned therebetween. For example, the left arrow can be a left side (or a top side or a bottom side) of the bounding box and the right arrow can be a right side (or a top side or a bottom side) of the bounding box, with the part number being positioned therebetween. For example, the left arrow and the right arrow can appear on a same side (e.g., left, right, top, bottom, diagonal) of the bounding box, where the left arrow can be positioned between the part number and the right arrow, or the right arrow can be positioned between the part number and the left arrow, or the left arrow and the right arrow are positioned along a first plane and the part number is positioned along a second plane where the first plane and the second plane are parallel to each other. For example, the left arrow and the right arrow can be positioned on the top side or the top diagonal side of the bounding box or the bottom side or the bottom diagonal side of the bounding box. In embodiments where the bounding box is absent, then the left arrow and the right arrow can appear such that the part number is positioned therebetween, or the left arrow and the right arrow can appear on a same side of the part number (e.g., top, bottom, right, left, diagonal). In some embodiments, the left arrow and the right arrow can appear when the part name appears (e.g., clicking, hovering, speaking), whether the part name appears within a shape (e.g., rectangle, square, circle, oval, triangle, trapezoid, pentagon, hexagon, open-shape, closed-shape, symmetrical shape, asymmetrical shape) or not within a shape. As such, the left arrow and the right arrow can appear such that the part name or the shape is positioned therebetween or in other ways relative to the part name or the shape, as described in this paragraph or herein. Although the bounding box is rectangular, note that such shaping can vary (e.g., square, circle, oval, triangle, trapezoid, pentagon, hexagon, open-shape, closed-shape, symmetrical shape, asymmetrical shape). When another visual marker is used instead of the bounding box, then similar functionality can apply.

As shown in FIGS. 10B-10D, a part number "20T" in the figure or a bounding box enclosing the part number "20T" in the figure may be selected by, for example, hovering a cursor icon over the part number "20T" in the figure or the bounding box enclosing the part number "20T," in the figure or by clicking (or touching) the part number "20T" in the figure or the bounding box enclosing the part number "20T" in the figure. As a result of this selection, two arrows (a left arrow and a right arrow) appear next to part number "20T," outside of the bounding box enclosing the part number "20T," although this configuration can vary, as explained herein. In the example shown, the left arrow appears to the left of part number "20T," outside of the bounding box, and the right arrow appears to the right of part number "20T," outside of the bounding box. Note that while arrows are shown in this example, other visual indicators (e.g., letters, numbers, symbols, graphics) may be used, and the arrows can be displayed in other locations in the figure. The function of these arrows is further explained herein.

Responsive to the right arrow or the left arrow being activated (e.g., clicking, hovering, touching) in the figure sheet, the text is automatically or responsively moved or updated or refreshed or directed to a segment (e.g., phrase, sentence, paragraph) within the text where the part number "20T" is mentioned (e.g., first time, last time, back next, forward next). This form of navigation can be iterative based on matching part numbers. For example, the right arrow can cause movement of the text forward among the segments containing the part number "20T," where on an initial selection of the right arrow an initial segment containing the part number "20T" is presented and then, upon further activations of the right arrow, a next segment containing the part number "20T" can be presented, which can be iterated based on matching part numbers. This form of navigation can occur until a last segment containing the part number "20T" is reached (or can be endless or looping). Then, a next activation of the right arrow can return the text to the initial segment containing the part number "20T." Alternatively, upon reaching the last segment containing the part number "20T," the right arrow can become disabled or inactive or hidden or visually distinct relative to its previous visual state. Similar functionality can apply to the left arrow.

When the segment is presented, the segment can be highlighted (or otherwise made visually distinct) to a different shade from all other segments in that text area. The part number "20T" along with its part name (in the example shown, part name "edge") can be bolded and underlined (or otherwise made further visually distinct). While in the example shown, color highlighting and bolding/underlining are used, other visual indicators to differentiate the segment or the part name or the part number may be used.

Although the segment in the text is presented at a top edge portion of the text pane in order to provide more focus the user, this can vary. For example, the segment in the text can be presented lower than the top edge portion of the text pane, which can occur when a word, phrase, sentence or paragraph before the segment in the text is brought to the top portion, which can also be highlighted or made visually distinct as the segment of the text or be highlighted or made visually distinct different from the segment of the text or not highlighted or made visually distinct at all. For example, the paragraph containing the segment of the text can be presented at the top edge portion such that the paragraph begins at the top edge portion. This may be useful when the user desires to see some text before the text segment for contextual purposes and may minimize scrolling up to see some textual context before the segment in the text. For example, there may be a default setting of presenting the segment (e.g., the segment of the text is presented at the top edge portion or a sentence before the segment of the text is presented at the top edge portion or a first sentence of the paragraph containing the segment of the text is presented at the top edge portion) and the user may change the default setting to another setting (e.g., the segment of the text is presented at the top edge portion or a sentence before the segment of the text is presented at the top edge portion or a first sentence of the paragraph containing the segment of the text is presented at the top edge portion), if the user desires.

The arrows (right arrow and left arrow) that appear next to the part number "20T" in the example can also appear for other part numbers that can be selected in the figure sheet, and displayed either alternately or simultaneously. These arrows, upon hovering or clicking or touching, can automatically or responsively move or update or refresh or direct the text to a first or last location or a previous or next (depending on which arrow is selected) location in the text containing the part number "20T." Therefore, the user who is selecting the part number in the figure can easily navigate through the text or the segments in the text containing the part number, while the figure is presented, without having to use other search functions to find that part number or part name in the text. For example, the user does not have to type "20T" or "edge" in the search (within text) box (or use a browser search function) to find "20T" or "edge" in the text as that can be navigable from the figure.

FIG. 10C illustrates an embodiment of a user interface according to this disclosure. This user interface is programmed to show an indication that the left arrow or the right arrow in the figure has been selected and that the text is being automatically or responsively moved or refreshed or updated or directed to a previous location or a next location in the text that contains that part name or the part number. Similar functionality can apply to the left arrow.

FIG. 10D illustrates an embodiment of a user interface according to this disclosure. The user interface is programmed to show a result of activating (e.g., clicking, touching) of the right arrow in the figure sheet which automatically or responsively moves or updates or refreshes or directs the text currently presenting the part name and the part number (green highlighted sentence of FIG. 10C) to a next forward location that contains that part name or the part number (green highlighted sentence of FIG. 10D).

As shown in FIG. 10D, in contrast to FIG. 10C, after the user has activated (e.g., clicked, touched) the right arrow (forward next) presented next to the part number "20T" in the figure, the text is automatically or responsively moved or updated or refreshed or directed to a next sentence in the text where the part number "20T" is mentioned. As shown in FIG. 10D, in addition to bringing up a next text location, the segment (e.g., phrase, sentence, paragraph) is also highlighted (or otherwise made visually distinct) a different shade from other sentences in the segment, and the part number "20T" along with its part name (in the example shown, part name "edge") is bolded and underlined (or otherwise made visually distinct). This process can be repeated in a forward direction or in a reverse direction to see earlier text segments that mention the part number "20T" or the part name "edge" or any other part number or part name that is desired, Similar functionality can apply to the left arrow.

Figure 10E:
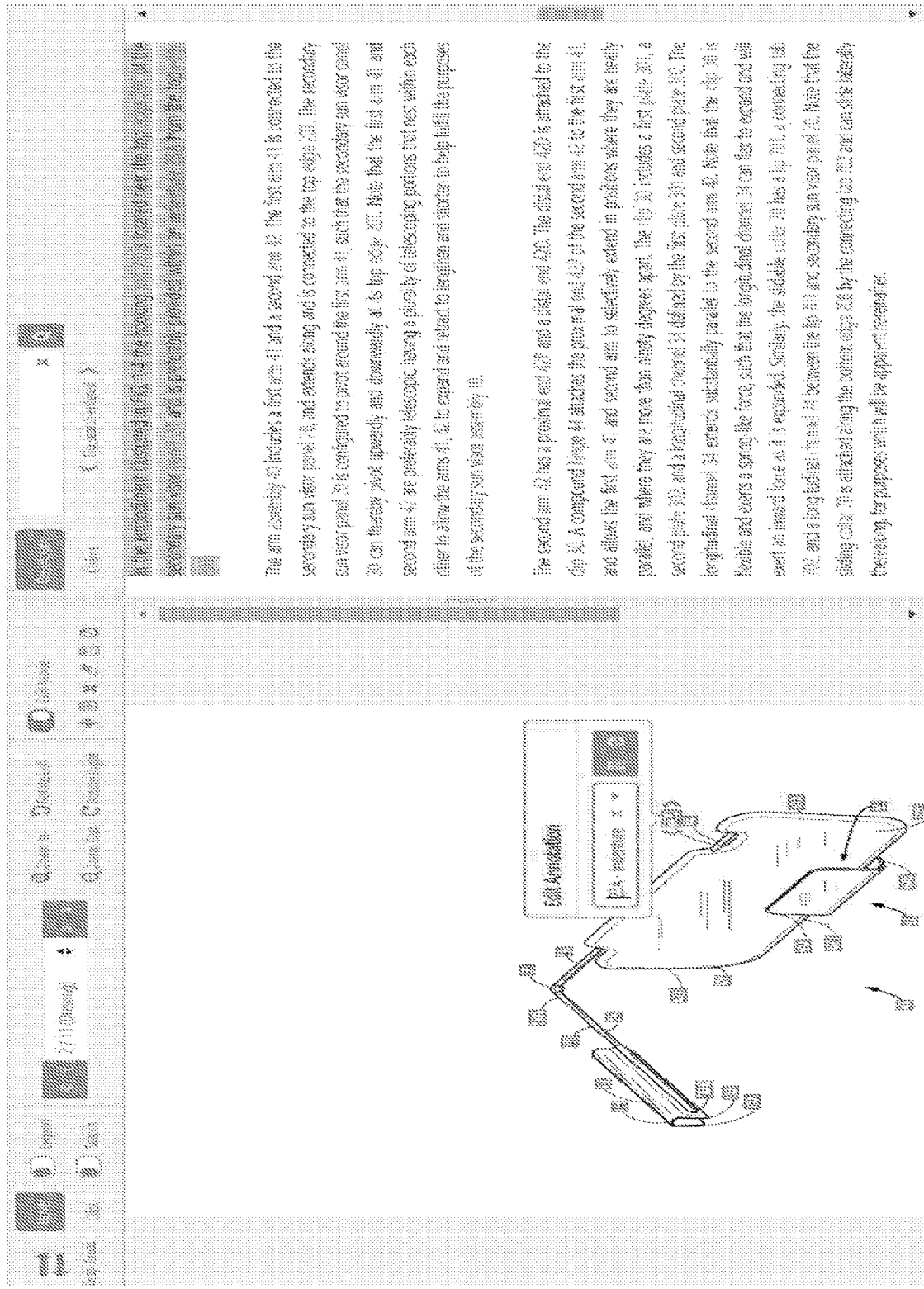

FIG. 10E illustrates an embodiment of a user interface according to this disclosure, where the user interface is programmed to enable an edit annotation feature, which allows the user to edit or to add part a name-part number mapping, when the part number is incorrectly recognized or not recognized.

As shown in FIG. 10E, an editor box is displayed as a pop-up (although any other displayed mechanism may be employed), which automatically shows the part name and the part number that has been selected (e.g., double clicking or touching bounding box or within bounding box), If the editor desires to add, edit, change, or delete the part name, the part number, or a mapping between the part name and the part number, then the editor may do so via the editor box.

As shown in FIG. 10E, the editor box includes a clear icon ("x") within a dropdown box. The clear icon allows a user to manipulate information displayed by clearing the part name and the part number mapping, or a portion of the part name or the part number, and thereby manually editing that selection. The dropdown icon displays a plurality of mappings of identified part numbers and identifier part names (or vice versa) in a relationship manner that occur throughout the text. The mappings may be displayed in an alphabetical order or a numerical order, allowing the editor to review some, many, most, or all of the part names and the part number mappings or quickly find the part name the part number mapping to replace a mapping that is currently associated with that bounding box. For example, the editor can change the mapping by editing the part name or the part number. For example, the editor can delete the mapping. For example, the editor can add a new mapping. These tools may be used, for example, where the editor detects an incorrect part name or part number, or a misspelled part name, or an incorrect part name-part number mapping or an absence of any part name-part number mapping. Once the editor is finished editing the part name-part number mapping, the drop down menu may disappear or remain present (e.g., refocused) with a newly selected or edited part name-part number mapping, or the editor can select a save button (or another user input element) to save that change. Note that the editor box can disappear when a close button is pressed. The close button is adjacent to the save button but can be positioned in another area of the editor box (e.g., right or left corner).

The editor box may also be programmed for adding, editing, or deleting other aspects of the figure (or the page), For example, if the editor wants to add a new part name-part number mapping to the figure (e.g., non-recognized part number), or to add an identification content or a hyperlink or a note or a comment or a barcode or a graphic to the figure (or the page), then the editor can select a respective add button (or another user input element) to do so, which may be presented on the editor box. For example, if the editor is planning to share the figure (or the page) with another user (e.g., editor, reader), whether such sharing is internal or external to a web portal providing such functionality, and would like that user to see certain comments or questions, then the editor may add those comments or questions to the figure (or the page) via the editor box. If the editor wants to delete any part of the figure (e.g., lines, text, objects, annotations, bounding boxes), whether original to the figure (or the page) or added to the figure (or the page), then the editor can do so. For example, the editor may select an eraser button and drag an eraser tool to erase a portion of the figure (or the page), whether the portion was original to the figure (or the page) or added via an annotation process, as described herein.

Figure 10F:
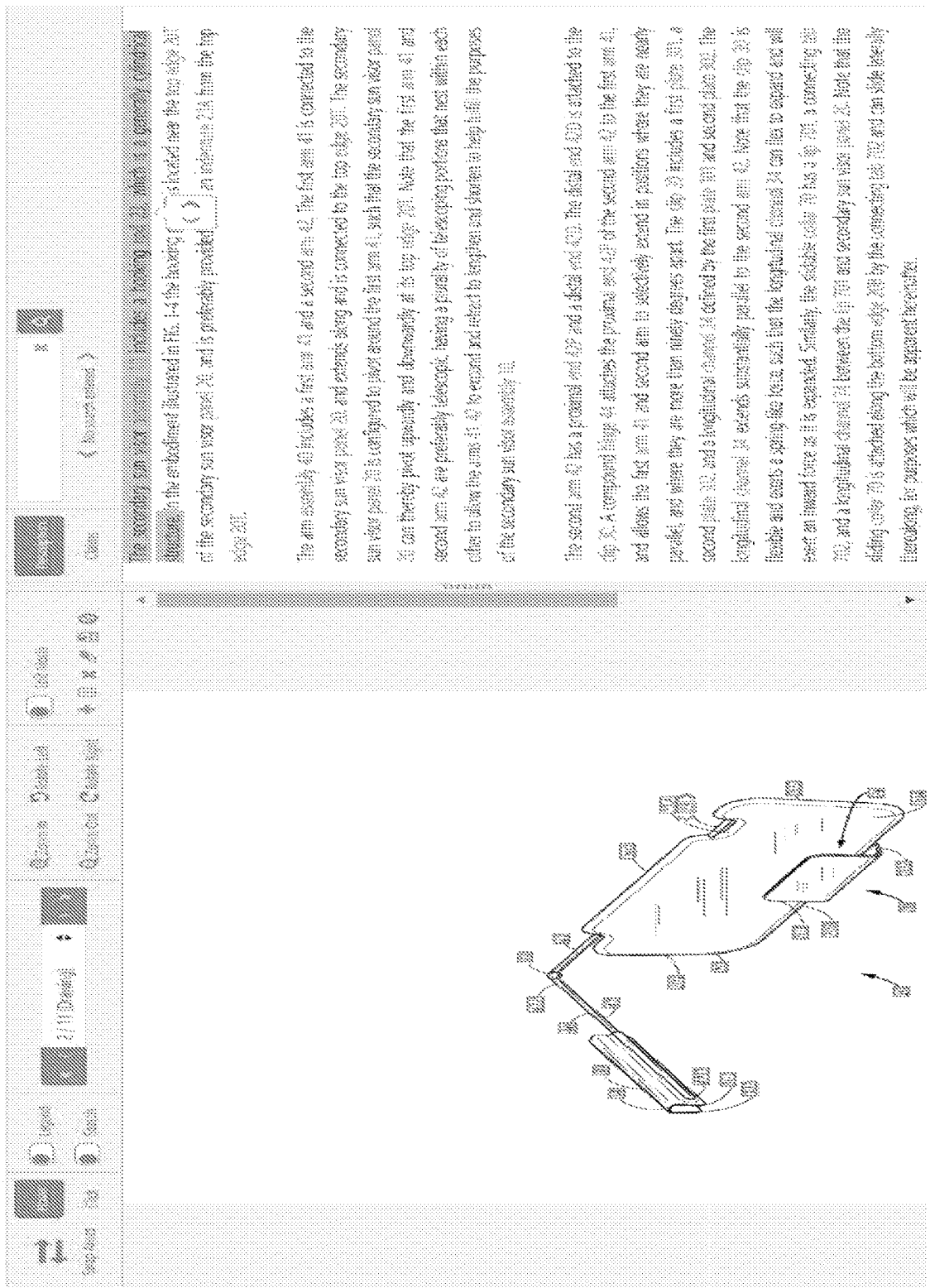

FIG. 10F illustrates an embodiment of a user interface according to this disclosure, where there is highlighting of navigation from text-to-figure. In particular, this highlighting can occur by hovering (e.g., cursor) or activating (e.g., clicking, touching) on the part name in the text or the part number in the text. Any of these actions can automatically or responsively result in a display of a left navigational arrow or a right navigational arrow in the text visually associated with the part name or the part number. The left navigational arrow or the right navigational arrow, when selected, automatically or responsively causes moving or updating or refreshing or directing the figure to a first or last location or a next (e.g., back next, forward next) location in the figures that contains that the part number.

Figure 10G:
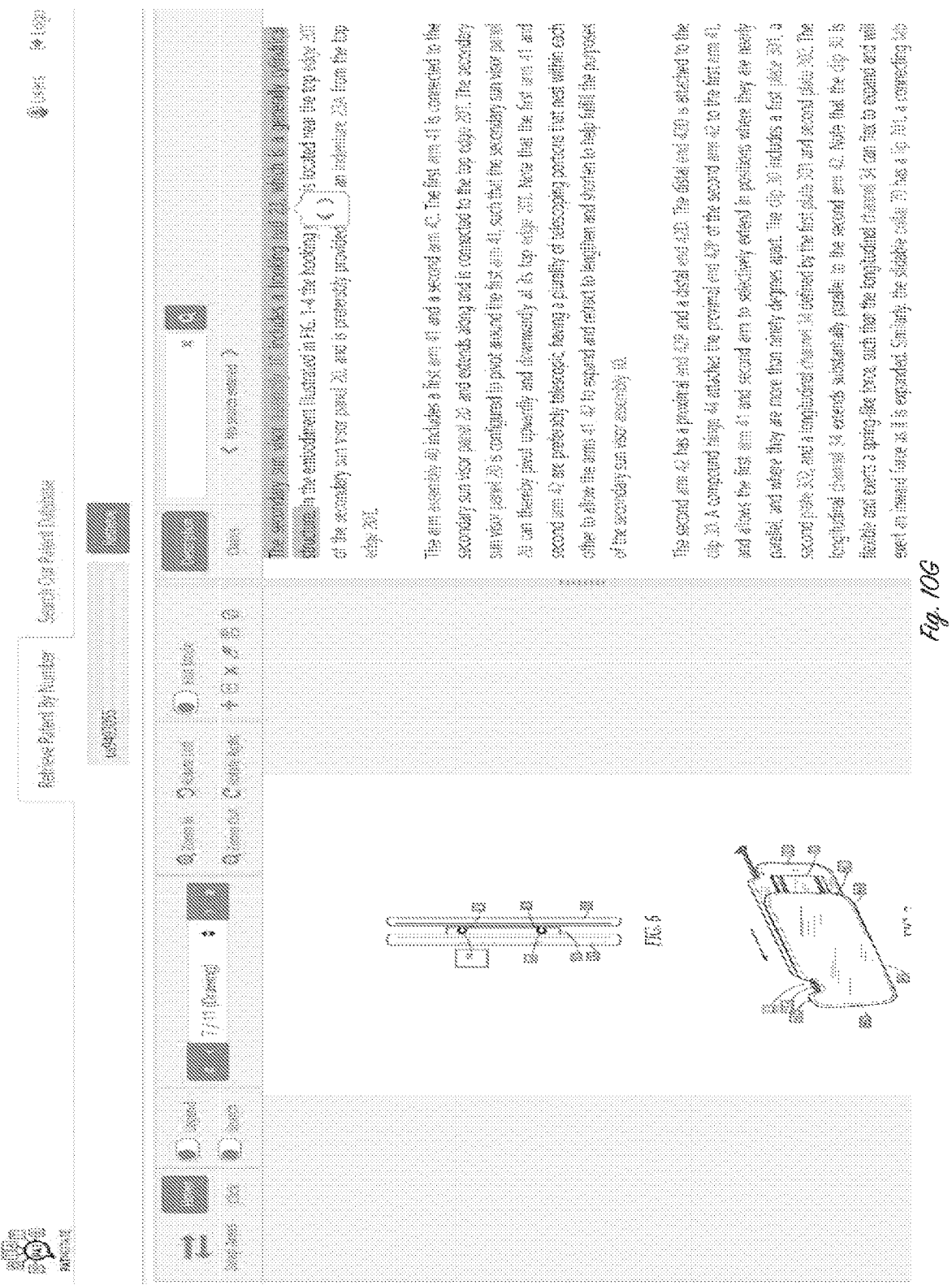

As shown in FIGS. 10F-10H, a part name "rod" in the text or a part number "23" in the text may be selected by, for example, hovering a cursor over the part name "rod" in the text or the part number "23" in the text or by clicking (or touching) the part name "rod" in the text or the part number "23" in the text. Based on any of such actions, there may be a graphic automatically or responsively presented over the text such that the graphic is visually associated with the part name "rod" in the text or the part number "23" in the text. The graphic can include a navigational user input element. For example, the graphic can have two navigational arrows (a left navigational arrow and a right navigational arrow) that appear visually associated with the part name "rod" in the text or the part number "23" in the text.

As shown in FIG. 10F, the graphic with the left navigational arrow and the right navigational arrow appears below the part number "23" over the text, but can appear below the part name "rod" over the text or above the part name "rod" over the text or the part number "23" over the text. For example, there can be a balloon stemming from the part name "rod" and the part number "23," whether the balloon is presented above or below the part name "rod" and the part number "23."

navigational arrows are shown in this example, other visual indicators may be used or the arrows may be displayed in other locations in the text. Note that that the graphic can be avoided or there can be other ways to present the navigational arrows (or other navigational user input elements). For example, the navigational arrows can be embedded in the text (e.g., hyperlinked character symbols) and be visually associated with the part name "rod" in the text or the part number "23" in the text. For example, the part name "rod" in the text or the part number "23" in the text can be positioned in the text between the navigational arrows within the text, where there can be an insertion of arrow graphics or characters (e.g., < >, { }, <= =>) into text when relevant part name or part number is selected in text. For example, the part name or the part number or the part name and the part name in the text can be visually emphasized (e.g., highlighted, bolded, italicized, change font type, change font size) with such visual emphasis having these navigational arrows. For example, the part name and the part number "car 12" can be shown in a bounding box within the text where the left side of the bounding box shows the back navigational arrow and the right side of the bounding box shows the forward navigational arrow, or the back navigational arrow can be internal or external to the bounding box but adjacent to the left side and the forward navigational arrow can be internal or external to the bounding box but adjacent to the right side. For example, such visual emphasis can be programmed to avoid or to minimize blocking or visually interfering with adjacent or overlying or underlying text.

Based on selecting (e.g.; clicking, touching) the part number "23" in the text or the part name "rod" in the text, the figure sheets may be automatically or responsively moved or refreshed or updated or directed to show the figure sheet where the part number "23" is first or last mentioned in the figure sheets (e.g.; based on previously performed OCR of those figures) or next (e.g., back next, forward next) mentioned in the figure sheets (e.g., based on previously performed OCR of those figures). This form of navigation can be iterative (or endless or looping) based on matching part numbers. In addition to presenting this figure, the bounding box enclosing the part number "23" in the figure can be highlighted a different shade from other bounding boxes in the figure.

Although color highlighting is used, other visual indicators to differentiate that bounding box may be used. For example, other ways of making that bounding box visually distinct are possible. For example, that bounding box can be bolded or resized or reshaped (e.g., rectangle to oval). For example, edges of that bounding box can be changed in line type between rectilinear or non-rectilinear or solid and broken (in either direction). For example, when that bounding box has corners, then those corners can change between pointed corners and rounded corners (in either direction). For example; that bounding box has a transparent background or no background, but the bounding box can present a background or change in background type (e.g., opaque, translucent, colored).

As shown in FIG. 10F, two navigational arrows (a left navigational arrow and a right navigational arrow) may appear next to the part number "23" in the figure (e.g., left/right of bounding box, top/bottom of bounding box, external to bounding box, internal to bounding box, bounding box lines or edges or corners are arrows). In this example, the left arrow appears to the left of the part number "23" and the right arrow appears to the right of the part number "23."

The graphic in the text shows the left navigational arrow to be colored differently or navigationally disabled (or can be not shown or be hidden) relative to the right navigational arrow. This form of visual distinction (or other forms of visual distinction) or navigational distinction can occur when the figure being currently presented is a first mention of a part number selected in the text. Similar approach, but vice versa, can occur if the right navigational arrow is shown to be colored differently or navigationally disabled (or can be not shown or be hidden) relative to the left navigational arrow (e.g., figure shows last mention of that part number).

Note that other navigational approaches are possible. For example, if continuous iteration (e.g., endless loop) of the part numbers in the figures is possible, then the left arrow or the right arrow can be not colored differently or can be not navigationally disabled relative the other arrow. In addition, note that similar approaches can be applied when navigation occurs from figures-to-text or figure-to-text, for part numbers in text or in figures, as described herein.

The arrows that appear visually associated to the part name "rod" in the text or the part number "23" in the text, as described herein, can also appear for some, many, most, or all part names in the text or some, many, most, or all part numbers in the text that can be selected in the text based on part name-part number mapping, as described herein, and presented either alternately or simultaneously (as shown in FIGS. 10F-10H). These arrows (e.g., upon hovering, clicking) can similarly cause the viewing pane presenting the figure to be updated, refreshed, or directed to a back next or a forward next (depending on which arrow is selected) location in the figures, which can be a page different what is currently presented, containing the part number that is selected (or corresponding to the part name that is selected). Similar approach applies to part numbers recognized in figure sheets. In this way, the user who is selecting the part name or the part number in the text can easily navigate through the figures, without having to manually search for the part number in the figure or use other search functions to find that part number in the figure.

FIG. 10G illustrates an embodiment of a user interface according to this disclosure, where there is a showing of a result responsive to activating (e.g., clicking, touching) the right arrow in the text shown in FIG. 10F. Resultantly, the viewing pane presenting the figure is updated to present a next figure (or page) having the part number that is associated with the part name in the text or the part number in the text, as activated.

For example, as shown in FIG. 10G, after the user has activated the forward arrow next to part name "rod" in the text or the part number "23" in the text, then the viewing pane presenting the figure is updated to the next figure where the part number "23" has been recognized. As shown in FIG. 10G, in addition to bringing up that location in that figure, the bounding box (or visual marker) enclosing the part number "23" in the figure is also highlighted, as described herein. This process can be repeated in a forward direction or in a reverse direction to see previous or upcoming figures that mention the part number "20T" or any other part number that is desired.

As shown in FIG. 10G, the graphic in the text shows the right navigational arrow to be colored differently or navigationally disabled (or can be not shown or be hidden) relative to the left navigational arrow. This form of visual distinction (or other forms of visual distinction) or navigational distinction can occur when the figure being currently presented is a last mention of a part number selected in the text. Similar approach, but vice versa, can occur if the left navigational arrow is shown to be colored differently or navigationally disabled (or can be not shown or be hidden) relative to the right navigational arrow (e.g., figure shows first mention of that part number).

Note that other navigational approaches are possible. For example, if continuous iteration (e.g., endless loop) of the part numbers in the figures is possible, then the left arrow or the right arrow can be not colored differently or can be not navigationally disabled relative the other arrow. In addition, note that similar approaches can be applied when navigation occurs from figures-to-text or figure-to-text, for part numbers in text or in figures, as described herein.

FIG. 10H illustrates an embodiment of a user interface according to this disclosure, where the part name "rod" in the text or the part number "23" in the text have been highlighted (green) in the text based on the activation (e.g., clicking, hovering, touching) of the part number "23" in the figure, as described herein. After such highlighting, the user can activate (e.g., clicking, hovering, touching) the part name "arm" in the text or the part number "41" in the text such that the bounding box enclosing the part number "41" in the figure can be highlighted relative to other bounding boxes in the figure, as described herein.

Note that a graphic with a left navigational arrow and a right navigational arrow is now presented to be visually associated with the part name "arm" or the part number "41" to enable navigation from the text through the figures based on the part number "41," as described herein. This processing can repeat for other part names in the text or part numbers in the text and navigation through the figures based on matching part numbers as requested from the text can occur, as described herein. Likewise, this processing can repeat for other part numbers in the figure and navigation through the text based on matching part numbers as requested from the figures can occur, as described herein.

FIG. 10I illustrates an embodiment of a user interface according to this disclosure, where the search (within text) bar is active based on the text query (e.g., collar) having being entered thereinto, where the text query can include any alphanumeric content. Resultantly, there are highlighted words in the text that match the text query. The search (within text) box is shown above the text and enables the user to search the text for any alphanumeric content in the text.

The user may enter a word or number in the search (within text) box, automatically or responsively resulting in that word or number being located and highlighted in the text. By clicking on the search (within text) button, the text query can be searched against the text. Activation of arrows presented below the search (within text) box enables the text to iteratively move (e.g., vertically) between locations matching the text query within search results. In addition, below the search box is an indicator of the total occurrences of the text query within the text (e.g., 8) as well as the current selection number within the total occurrences that is being displayed (e.g., 5 out of 8). In some embodiments, synonyms or related concepts of searched terms may also be highlighted and found via the search icon or the arrows. This option can be provided as default or be selectively user-enabled (e.g., checkbox in user interface, profile setting). For example, if the text query entered is "car," then various synonyms of the "car" can be highlighted (e.g., automobile, vehicle) when this functionality is user-enabled.

FIG. 10J illustrates an embodiment of a user interface according to this disclosure, where there is highlighting within the legend and interactive navigation from within the legend through the figure or through the text. When the legend is presented, as described herein, and the part name within the legend or the part number within the legend or the row within the legend is selected (e.g., clicking, touching), then that part name within the legend or the part number within the legend or the row within the legend may be highlighted (or bolded or italicized or underlined or capitalized or change font type or change font color or change font size or change background or change text color or boxed or bracketed or otherwise made visually distinct relative to other rows or part names or part numbers within legend). Note that such selection can be exclusive (e.g., only one row or part number or part name allowed to be selected whether one-after-another serially or in parallel) or inclusive (e.g., multiple rows or part numbers or part names can be selected whether one-after-another serially or in parallel). In response or not in response to such selection, various events or actions can occur.

In response to such selection or not in response to such selection, a corresponding (e.g., based on part number) bounding box (or visual marker) within the figure or the part number within the figure may be highlighted (or bolded or reshaped or resized or colored or otherwise made visually distinct relative to other bounding boxes or part numbers within that figure). Note that multiple bounding boxes or part numbers within the figure can be simultaneously highlighted based on multiple selections within the legend, as described herein.

Likewise, in response to such selection or not in response to such selection, the left navigational arrow and the right navigational arrow can be presented to be visually associated with the bounding box within the figure or the part number within the figure, as described herein, Note that multiple groups of navigational arrows within the figure can be simultaneously presented based on multiple selections within the legend, as described herein.

Similarly, in response to such selection or not in response to such selection, the text may be scrolled to a segment (e.g., paragraph, sentence, phrase) within the text containing the part name or the part number (e.g., based on part number). The segment can be highlighted (or bolded or italicized or underlined or capitalized or change font type or change font color or boxed or bracketed or change font size or change background or otherwise made visually distinct relative to other part names or part numbers within text). Note that when multiple selections of part names or part numbers or rows are made based on multiple selections within the legend, as described herein, then the text can follow what was selected last or most current or latest.

Whether in response to such selection or not in response to such selection, the part number within the text or the part name within the text can also present the graphic with the left navigational arrow and the right navigational arrow, as described above. Note that when multiple selections of part names or part numbers or rows are made based on multiple selections within the legend, as described herein, then the multiple graphics can be presented within the text.

These forms of navigation enable the user to quickly and easily find a desired part number within the figure or a desired part name or a desired part number within the text from within the legend. In embodiments when the figure, as currently presented, or the text, as currently presented, do not include that part name or that part number, then the figure or text are automatically or responsively moved or updated or refreshed or directed to a next location (e.g., back next, forward next) where the part name or the part number are mentioned.

For example, as shown in FIG. 10J, if the part name "arm" within the legend or the part number "41" within the legend or the row containing the part name "arm" or the part number "41" within the legend is selected by, for example, hovering a cursor over the part name "arm" within the legend or the part number "41" within the legend or the row containing the part name "arm" or the part number "41" within the legend, or by activating (e.g., clicking, touching) the part name "arm" within the legend or the part number "41" within the legend or the row containing the part name "arm" and the part number "41" within the legend, then various events or actions can occur.

For example, the text can be automatically or responsively moved or updated or refreshed or directed or kept same to indicate the segment within the text where the part name "arm" or the part number "41" is mentioned in the text (e.g., first, last, back next, forward next, current). In addition to bringing up this segment within the text, the segment can be also highlighted (or bolded or italicized or capitalized or change font type or change font color or boxed or bracketed or change font size or change background or otherwise made visually distinct relative to other part names or part numbers or other alphanumeric content within text) a different shade from some, many, most, or all other segments within the text, or the part name "arm" or the part number "41" within the text is bolded or underlined (or italicized or capitalized or change font type or change font color or boxed or bracketed or change font size or change background or otherwise made visually distinct relative to other part names or part numbers within text).

For example, the figure can be automatically or responsively moved or updated or refreshed or directed or kept same to show the figure where the part number "41" is recognized among the figures (e.g., first, last, back next, forward next, current). In addition to bringing up the figure where this part number has been previously recognized, a bounding box corresponding to the part number in the figure or the part number within the figure can be also highlighted a different shade (or bolded or reshaped or resized or change color or change background or otherwise made visually distinct relative to other bounding boxes or part numbers within that figure).

For example, two navigational arrows (a left navigational arrow and a right navigational arrow) may appear visually associated with or next to the part name "arm" within the legend or the part number "41" within the legend or the row can present these navigational arrows in visual association with or proximity to the part name "arm" or the part number "41" within the row of the legend. The navigational arrows that appear visually associated with or next to or in proximity of the part name "arm" within the legend or the part number "41" within the legend can also appear for other part names within the legend or part numbers within the legend or rows within the legend are user-selectable within the legend. These navigational arrows within the legend can be activated (e.g., hovering, clicking), In response or not in response, there may be automatic or responsive movement or refreshing or updating or directing of the figure or the text to the first or last respective location therein or the back next or forward next respective location therein (depending on which arrow in which pane is selected) based on containing the part number or the part number that is selected, as described above relative to similar forms of navigation.

In this way, the user who is selecting the part name within the legend or the part number within the legend or the row with the part number or the part name within the legend can easily navigate from the legend through the figures or the text without having to manually search for the part number or the part number in the figure or the text or use other search functions to find that part number or the part number in the figure or the text.

Figure 10K:
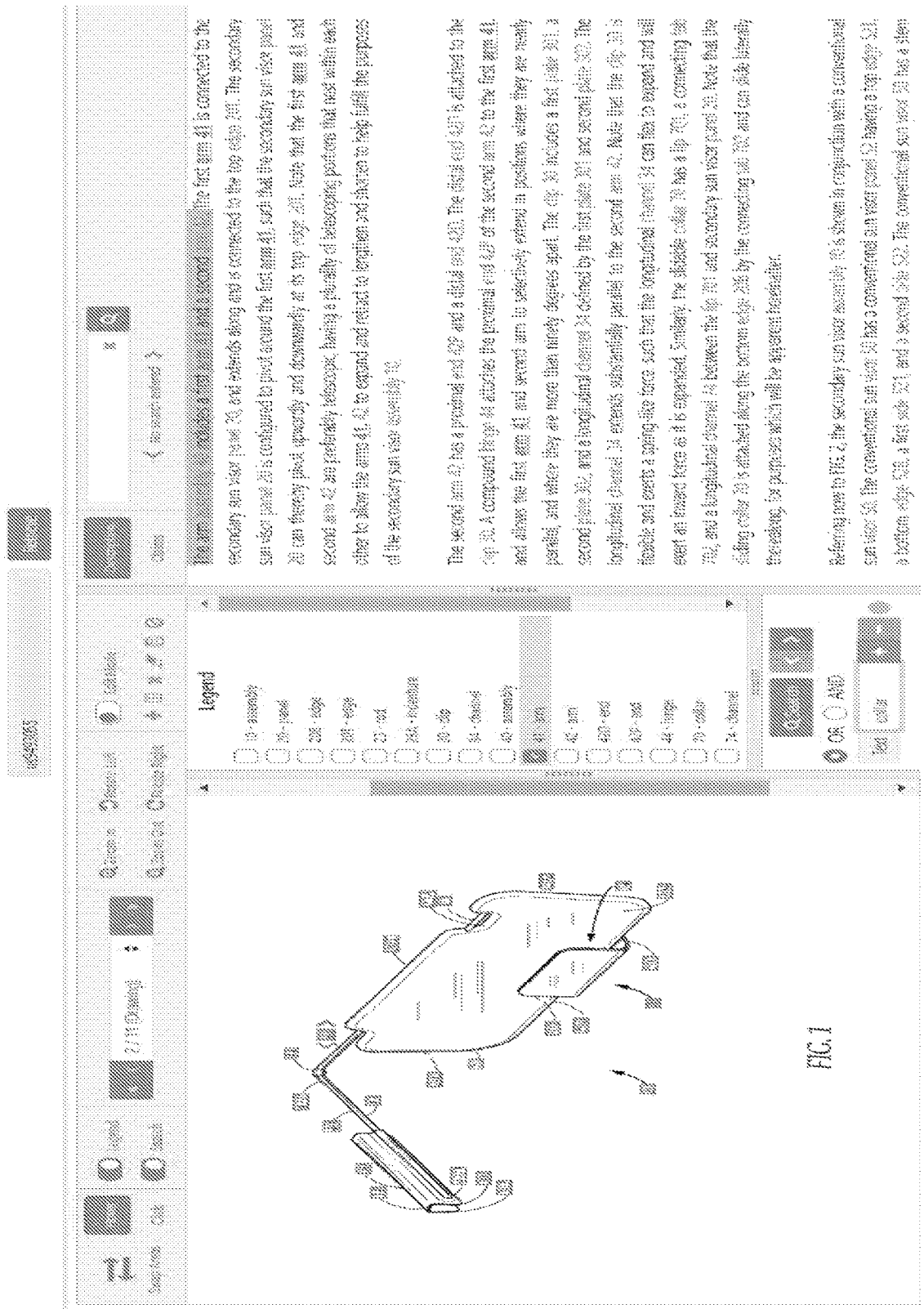

FIG. 10K illustrates an embodiment of a user interface according to this disclosure, where a search (within figure) by a part name is enabled alongside the legend and interactive navigation from within the legend through the figure or the text. The search (within figure) box, as described herein, is shown below the legend and between the figure (or corresponding viewing pane) and the text (or corresponding viewing pane). However, note that the search (within figure) box can be shown in other locations within the user interface (e.g., above legend, rightmost or leftmost viewing pane, ribbon, over figure or sheet or page, over text).

The search (within figure) box enables the user to search for the figure among the figures or the figure being currently presented based on a part name associated with the part number recognized within the figure among the figures or the figure being currently presented. The user may enter (e.g., physical or virtual keyboard, microphone, camera) the part name into the search (within figure) box. Once this search is activated, then various events or actions can occur. For example, this search can result in a bounding box enclosing the part number associated with the part name being searched to be highlighted (or otherwise made visually distinct relative to other figure content), as described herein. For example, this search can result in an area enclosed by the bounding box enclosing the part number associated with the part name being searched to be highlighted (or otherwise made visually distinct relative to other figure content), as described herein. For example, this search can result in the part number associated with the part name being searched to be highlighted (or otherwise made visually distinct relative to other figure content), as described herein. Note that this search functionality can be additional or alternative to searching the text, as described herein.

This functionality can be implemented in many different ways. For example, one technical approach includes having a map forming an association between a plurality of part numbers recognized within a figure sheet, whether the figure sheet has a single figure or a plurality of figures, as described herein, and a plurality of part names identified within a text associated with the figure sheet, as described herein. The map can be embodied in different ways (e.g., data structure, table, array, vector, hash, list, stack, queue, deck, linked list, tree). For example, the map can be implemented in a JSON format.

Within the map, each of the part numbers is associated with a set of location coordinates for the figure sheet (e.g., from performing OCR on that figure sheet). The set of coordinates informs where that respective part number is locatable within the figure sheet (e.g., via figure sheet identifier), If there is more than one figure sheet associated with the text within a document, then the map can be for some, many, most, or all figure sheets within the document or there can be a set of maps associated with a set of figure sheets (e.g., one-to-one correspondence) within the document.

For example, the map for all figure sheets within the document can have the association of a part name "table" associated with a part number 12 present in figure sheets 1, 6, and 7, where the part number 12 is locatable at X1/Y1 in figure sheet 1, X6/Y6 in figure sheet 6, and X7/Y7 in figure sheet 7, whether each of the figure sheet 1, 6, or 7 has a single figure or a plurality of figures. As such, the part name from the search (within figure) box can be searched against the part names within the map and in response a corresponding figure sheet can be identified, a corresponding set of location coordinates for the corresponding figure sheet can be identified, and (a) the bounding box enclosing the part number associated with the part name being searched can be highlighted, as described herein, (b) the area enclosed by the bounding box enclosing the part number associated with the part name being searched can be highlighted, as described herein, (c) the part number associated with the part name being searched can be highlighted, as described herein, or another action can take place (e.g., indexing).

Likewise, for example, a map 1 can be associated with a figure sheet 1, where the map 1 can have an association of a part name "table" associated with a part name 12 locatable at X1/Y1 in figure sheet 1, and a map 2 can be associated with a figure sheet 2, where the map 2 can have an associated of a part name "table" associated with a part number 12 locatable at X2/Y2 in figure sheet 2, As such, the part name from the search (within figure) box can be searched against the part names within the map 1 and the map 2 and in response a corresponding figure sheet can be identified, a corresponding set of location coordinates for the corresponding figure sheet can be identified, and (a) the bounding box enclosing the part number associated with the part name being searched can be highlighted, as described herein, (b) the area enclosed by the bounding box enclosing the part number associated with the part name being searched can be highlighted, as described herein, (c) the part number associated with the part name being searched can be highlighted, as described herein, or another action can take place (e.g., indexing).

Another technical approach, whether inclusive or exclusive to other technical approaches described herein, can include tagging, relating, or associating a figure sheet with a set of tags or a set of metadata tags corresponding to a set of part names for a set of part numbers recognized within the figure sheet, as described herein. Resultantly, searching for a part name can occur based on searching the set of tags or the set of metadata tags, as described herein.

If another bounding box or another part number is already selected (or subsequently selected) in that figure from within the legend or via a user selection from within that figure, then there can be visual distinction (e.g., color, shape, size) between (1) the bounding box enclosing the part number associated with the part name being searched or the area enclosed by the bounding box enclosing the part number associated with the part name being searched or the part number associated with the part name being searched and (2) the another bounding box or the another part number already selected (or subsequently selected) in that figure from within the legend or via the user selection from within that figure.

As shown in FIG. 10k, this visual distinction is by color where (1) the bounding box enclosing the part number associated with the part name being searched or the area enclosed by the bounding box enclosing the part number associated with the part name being searched or the part number associated with the part name being searched is highlighted blue (or another color) in the figure resulting from the search (within figure) box and (2) the another bounding box or the another part number already selected (or subsequently selected) in that figure from within the legend or via the user selection from within that figure is highlighted yellow (or another color).

The search (within figure) box is positioned within a viewing pane having a submit search button (or another user input element), a left navigational arrow (or another user input element), a right navigational arrow (or another user input element), an OR option button (or another user input element), an AND option button (or another user input element), a plus button (or another user input element), a minus button (or another user input element), and a color (or hatching or shape or size) palette graphic or icon (or another user input element). The viewing pane is shown below the legend and between the figure (or corresponding viewing pane) and the text (or corresponding viewing pane). However, note that this viewing pane can be positioned in other parts of the user interface (e.g., leftmost or rightmost viewing pane).

When the submit search button is activated, the submit search button causes searching of the part name entered into the search (within figure) box in order to identify the part number in the figure or the bounding box associated with the part number in the figure corresponding to the part name matching the part name being searched. However, the submit search button can be omitted and this searching can be caused by tapping an enter keyboard button (physical or virtual) or automatically or responsively, in real-time, without any user input other than the part name or alphanumeric characters into the search box, as this search input is being entered.

The left navigational arrow and the right navigational arrow respectively correspond to a figure sheet navigation for a back next match of the part name entered into the search (within figures) box and to a figure sheet navigation for a forward next match of the part name entered into the search (within figures box). For example, if the part name entered into the search (within figures) box matches the part name associated with the part number recognized in figure sheet 2 and 7, then interaction with the left navigational arrow or the right navigation can iterate among those figure sheets. Responsive to such iteration, the bounding box enclosing the part number associated with the part name being searched or the area enclosed by the bounding box enclosing the part number associated with the part name being searched or the part number associated with the part name being searched can be highlighted, as described herein. Note that the left navigational arrow or the right navigational arrow can respectively become inactive or hidden if first or last iteration has been reached. However, in continuous iteration (e.g., endless loop) the left navigational arrow or the right navigational arrow can avoid becoming inactive or hidden.

The plus button and the minus button respectively allow for addition or removal of search (within figures) boxes (fields) within the viewing pane. Correspondingly, the OR option button and the AND option button respectively allow for various Boolean type searches (within figures) based on AND or OR operators (or other Boolean operators) relative to the search (within figures) boxes. As such, the search (within figures) box is a first search box and the user can select the plus button such that a second search box appears or becomes active within the viewing pane.

For example, the second search box can appear below the first search box. Then, the user can enter a first part name into the first search box and a second part name into the second search box, where the first part name is associated with a first part number and the second part name is associated with a second part number. Depending on whether the AND option button or the OR option button is exclusively selected, the figure sheets can then be searched for the part names based on AND operator or OR operator (or another Boolean operator). For example, the user can select the AND option button such that the figure sheets are searched for any figure sheet that has the first part number associated with the first part name from the first search box and the second part number associated with the second part name from the second search box, whether that figure sheet has a single figure or a plurality of figures. For example, the user can select the OR option button such that the figure sheets are searched for any figure sheet that has the first part number associated with the first part name from the first search box or the second part number associated with the second part name from the second search box, whether that figure sheet has a single figure or a plurality of figures.

When the first search box and the second search box are present and the first part name and the second part name is respectively being searched, there can be user confusion as to what part number in figure sheets corresponds to what part name being searched. This can become more confusing if other bounding boxes or part numbers have been or will be selected within figure sheets, whether from within the legend or by user selection, and especially if those selections can be automatically or responsively highlighted, as described herein. Further, since some bounding boxes within figure sheets (or part numbers within figure sheets) can be colored (or otherwise highlighted) based on corresponding part names being identified in the text (e.g., green color) and based on corresponding part names not being identified in the text (e.g., red color), then such bounding box (or part number) presentation within figure sheets can increase user confusion. As such, for at least one of the search boxes or each of the search boxes, there can be the color (or hatching or shape or size) palette graphic or icon presented, which is positioned laterally to that respective search (within figures) box (or in other user interface locations relative to respective search box).

Upon activating the color (or hatching or shape or size) palette graphic or icon, there can be a color (or hatching or shape or size) palette presented over the viewing pane or other viewing panes or other areas of the user interface (e.g., ribbon, viewing pane borders, separate viewing pane). The color (or hatching or shape or size) palette is programmed to allow the user to select (e.g., cursor, touch, microphone, camera) a desired color (or hatching or shape or size) to be associated with that searched part name. That color selection is shown as the color (or hatching or shape or size) palette graphic or icon.

For example, the user can select blue color within the palette for the first search box, which is shown as a first color (or hatching or shape or size) palette graphic or icon, and orange color within the palette for the second search box, which is shown as a second color (or hatching or shape or size) palette graphic or icon. As such, within the figure sheet, the bounding box enclosing the first part number associated with the first part name being searched or the area enclosed by the bounding box enclosing the first part number associated with the first part name being searched or the first part number associated with the first part name being searched can be highlighted blue, as described herein. Likewise, within the figure sheet, the bounding box enclosing the second part number associated with the second part name being searched or the area enclosed by the bounding box enclosing the second part number associated with the second part name being searched or the second part number associated with the second part name being searched can be highlighted orange, as described herein.

At least one of the search boxes or each of the search boxes can be automatically or responsively associated with a distinct color (or hatching or shape or size) upon presentation (e.g., palette graphic or icon). This configuration avoids repetition of colors (or hatching or shapes or sizes) within the figure sheet in order to aid in visual distinction relative to each respective searched part names or highlighting from within the legend or via user selection within the figure sheet, as described herein. Note that opacity can be used as well. For example, matching bounding boxes can remain presented (e.g., colored) as is, where as non-matching bounding boxes can be hidden or presented translucent or less opaque (e.g., in same color) than those bounding boxes that are matching, which can aid in user focus, especially in complex figures.

Whether additional to or alternative to the color (or hatching or shape or size) palette graphic or icon, the part name text or the background within the search box can be automatically or responsively correspondingly colored (or be made visually distinct) when the part name is entered into that respective search box. Whether additional or alternative to the search (within figure) boxes, there can be a single search box where a search query containing the first part name and the second part name can be entered.

There can be synonym or related concept searching or knowledge discovery, as described herein. For example, the part name within the text can be "car" and the part number within the figure sheet can be "12," where the part name is associated with the part number, as described herein. As such, if the user enters the part name "automobile" into the search box, as described herein, whether or not the "automobile" is actually mentioned in the text, then the bounding box enclosing the part number "12" associated with the part name "car" or the area enclosed by the bounding box enclosing the part number "12" associated with the part name "car" or the part number "12" associated with the part name "car" can be highlighted, as described herein. This form of synonym or related concept searching or knowledge discovery can be enabled in various ways. For example, one of such technical approaches involves usage of a thesaurus (e.g., local, remote), whether general or technology specific (e.g., automatically or responsively selected based on patent classification, figure image analysis, figure object analysis, text analysis, claim analysis, abstract analysis, summary analysis, text summarization). For example, there can be a botany thesaurus and a computer science thesaurus and the computer science thesaurus can be automatically or responsively selected based on patent classification associated with that patent text or presence of certain keywords within that patent text. The part names can be looked-up in a respective preset or automatically or responsively selected thesaurus (if more than one is available) and various synonyms can be identified. If desired, then these synonyms can be filtered based on patent classification, figure image analysis, figure object analysis, text analysis, claim analysis, abstract analysis, summary analysis, text summarization, or other document related content, metadata, or tags, as described herein. Once filtered, then the remaining synonyms can be associated with corresponding part names. The part names can be primary relative to the synonyms.

Figure 10L:
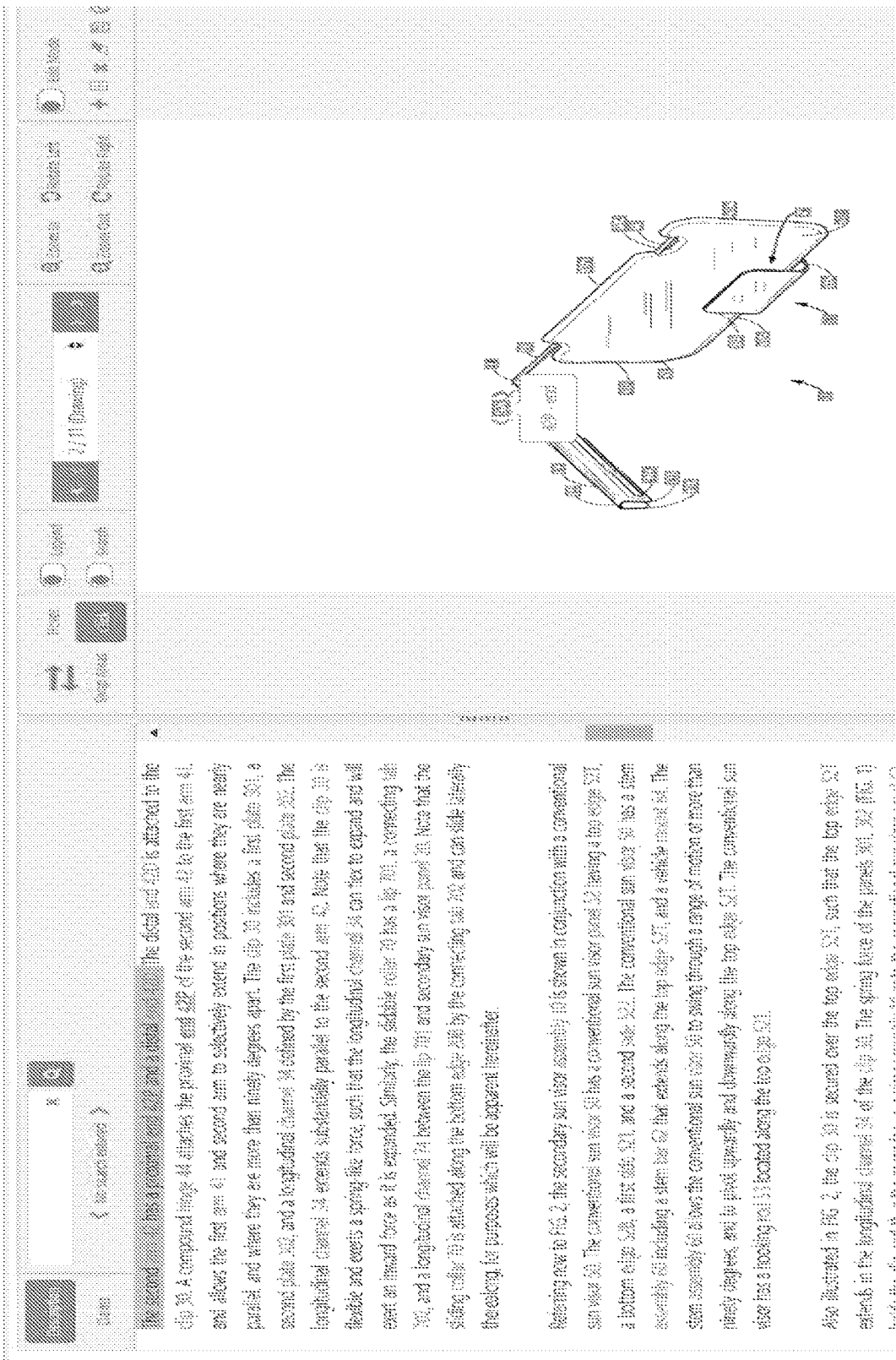

FIG. 10L illustrates an embodiment of a user interface according to this disclosure, where swapping of content between the viewing panes occurs based on activating the "swap areas" button in the user interface, as described herein. As such, in contrast to FIG. 10K, where the figure was presented on the left side of the user interface and the text was presented on the right side of the user interface, FIG. 10L presents the figure on the right side of the user interface and the text on the left side of the user interface. Note that various content-related user input elements (e.g., buttons, toggles, dropdowns, search box) presented above the figure and the text also swapped as well. Likewise, note that bounding box or part number highlighting in the figure or highlighting of the text can persist during such swaps.

Figure 10M:
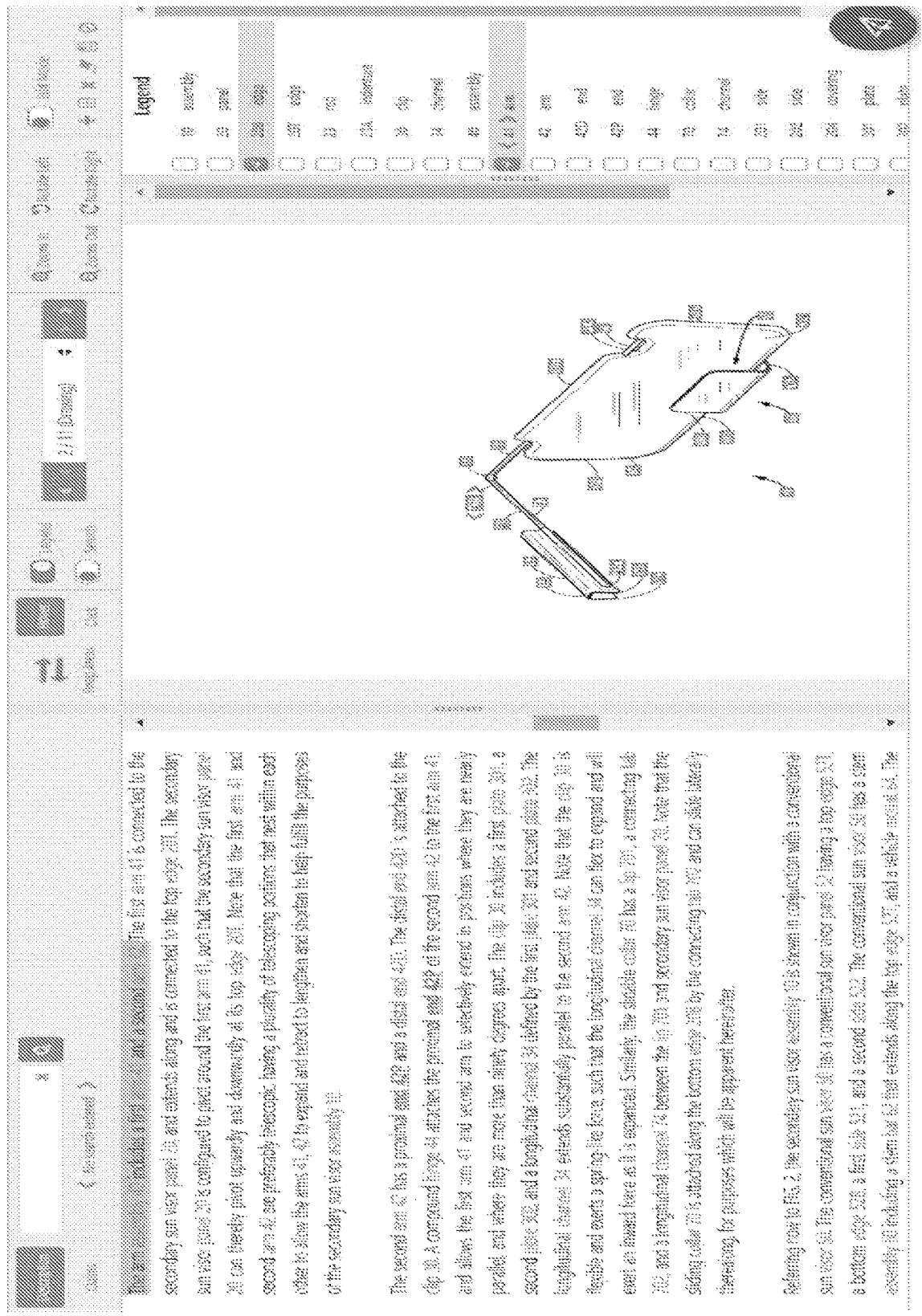
Figure 10N:
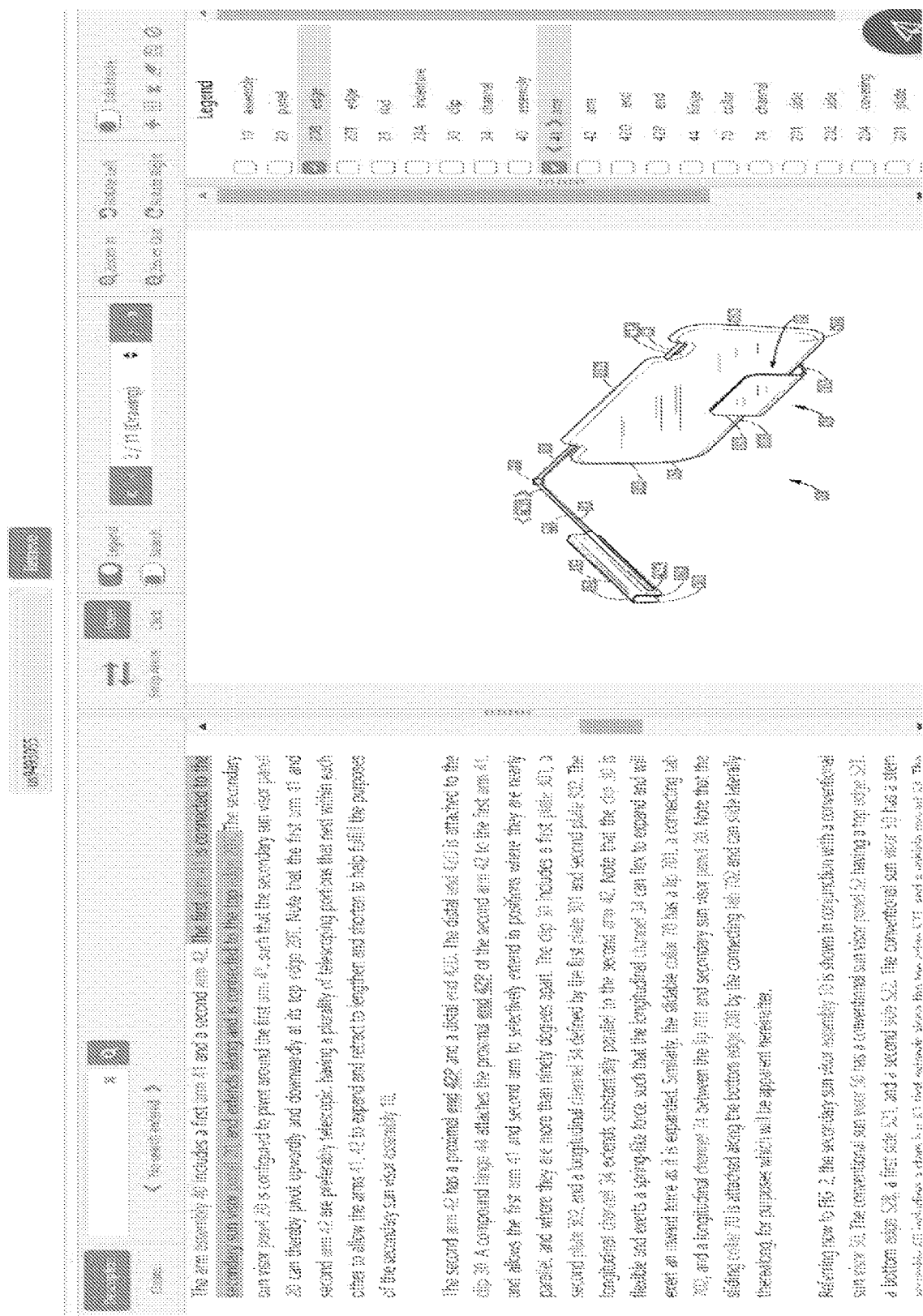

FIGS. 10M, 10N illustrate an embodiment of a user interface having the legend being laterally positioned according to this disclosure. Although the legend is presented to right of the figure pane, this presentation can vary and the legend can be present to left of the figure pane or the text pane or to right of the figure pane or text pane for any embodiments disclosed herein.

The legend enables the user to easily maneuver back and forth among the legend, the text, and the figure sheets, as described herein. The legend contains a plurality of rows, each of the rows hosting a checkbox (or another user input element), a left navigational arrow button (or another navigational user input element), a part number, a right navigational arrow button (or another navigational user input element), and a part name, all presented in a columnar manner (although non-columnar manner, grid manner, tabular manner, or other manners are possible).

The left navigational arrow button and the right navigational arrow button are hidden or are not shown by default until a respective row (or part number or part name) is selected, as described herein, although this configuration can vary. For example, the left navigational arrow button and the right navigational arrow button are not hidden or are shown by default.

The part number is positioned between the left navigational arrow button and the right navigational arrow button. However, note that this row order can vary. For example, the checkbox can be omitted or the part number can be not positioned between the left navigational arrow button and the right navigational arrow button or the part name can be positioned between the left navigational arrow button and the right navigational arrow button or the part number and the part name can be positioned between the left navigational arrow button and the right navigational arrow button or the checkbox can be positioned between the left navigational arrow button and the right navigational arrow button or the part name and the part number and the checkbox are not positioned between the left navigational arrow button and the right navigational arrow button. Although the legend contains the rows presenting the part names and the part numbers, the legend can present the part names and the part numbers in other ways. For example, the legend can be a carousel with a plurality of slots, where each of the slots corresponds to the part name or the part number. For example, the slots can correspond to the rows.

The legend is populated based on a figure sheet that is currently presented, whether the figure sheet depicts a single figure or a plurality of figures. As such, the legend lists the part numbers that are recognized in the figure sheet, as described herein. Correspondingly, the legend lists the part names associated with those part numbers, as described herein. Therefore, when another figure sheet is navigably presented, then the legend can be automatically or responsively updated or refreshed for that figure sheet to present same or different part numbers (and part names). However, note that this configuration can vary. For example, the legend can be populated based on a plurality of figure sheets. As such, as figure sheet navigation occurs, some part numbers (and part names) can be automatically or responsively shown (e.g., not hidden) or not shown (e.g., hidden) within the legend based on what figure sheet is being currently presented. For example, if the legend lists all part numbers recognized within all figure sheets, as described herein, then navigation through the text or the figure sheets can be requested from within the legend, where the user can select whether the text can be navigable from within the legend or the figure sheets can be navigable from within the legend.

At least two figure sheets can be simultaneously presented within a viewing pane, whether side-by-side or one-after-another, whether partially or wholly. As such, various actions or events can happen when this occurs. For example, at least two figure sheets can be simultaneously presented within the viewing pane when vertical or horizontal scrolling through the figure sheets is enabled (e.g., based on image stitching via top side or bottom side or lateral sides). As such, the legend can be automatically or responsively updated to show the part names or the part numbers that are currently visible within that respective viewing pane, whether for one or both of the figure sheets. For example, if a first figure sheet has a set of recognized part numbers 10, 12, and 14, a second figure sheet has a set of recognized part numbers 12, 16, and 18, a portion of the first figure sheet has a recognized part number 14, and a portion of a second figure sheet has a recognized part number 16, then the legend is dynamically updated or refreshed to simultaneously show those part numbers (or part names) that are presented within the viewing pane when the first portion and the second portion are simultaneously presented within the viewing pane.

The rows within the legend can be activated or selected. Such activation or selection can occur via hovering, clicking, or touching the checkbox, the part number, the part name, or the row (or another user input element within the user interface). As shown in FIGS. 10M, 10N, the legend has a first row (edge 208) of the rows and a second row (arm 41) of the rows activated or selected and the second row is currently activated or selected because the left navigational arrow button and the right navigational arrow button are presented. Upon such activation or selection, the first row and the second row can be highlighted (or otherwise made visually distinct) within the legend, as described herein, Such highlighting is of identical modality within the legend, but such modalities can differ (e.g., first row is highlighted differently than second row). Note that this functionality can vary. For example, whether additional or alternative to the first row or the second row being highlighted, the part name or the part number can be highlighted (or made visually distinct) within the legend, as described herein.

When the first row is activated or selected within the legend, then the bounding box enclosing the first part number (208) associated with the first part name (edge) or the area enclosed by the bounding box enclosing the first part number (208) associated with the first part name (edge) or the first part number (208) associated with the first part name (edge) can be automatically or responsively highlighted within the figure sheet, as described herein. Further, when the first row is activated or selected within the legend, the text can be automatically or responsively directed to the segment (e.g., paragraph, sentence, phrase) containing the first part number (208) or the first part name (edge), as described herein. For example, the text can be automatically or responsively directed to a first segment (e.g., paragraph, sentence, phrase) within the text containing the first part number (20B) or the first part name (edge), as described herein, whether the first segment is or is not associated with any figure depicted on a figure sheet that is currently presented. The segment of the text can be highlighted, as described herein. For example, a sentence containing the first part name (edge) and the first part number (20B) can be highlighted relative to other sentences within the text, as described herein, and the first part name (edge) and the first part number (20B) can be highlighted within the sentence relative to other words within the sentence, as described herein.

The left navigational arrow button of the first row and the right navigational arrow button of the first row can be selectively activated in order to navigate through various mentions of the first part name (edge) or the first part number (20B) within the text from within the legend. When first or last mentions within the text are reached, then the left navigational arrow button or the right navigational arrow button can respectively become disabled or inactive or hidden or visually distinct relative to its previous visual state. However, if endless looping through mentions within the text is enabled, then the left navigational arrow button or the right navigational arrow button can avoid respectively becoming disabled or inactive or hidden or visually distinct relative to their previous visual state.

After the first row is activated or selected within the legend, then the second row can be activated or selected within the legend, as described herein. Since the first row and the second row are simultaneously activated or selected within the legend, then the first row and the second row can be simultaneously highlighted within the legend, as described herein. Although the first row and the second row are highlighted in a similar manner, this configuration can vary. For example, the first row can be highlighted different from the second row. Note that this functionality can similarly apply to other rows within the legend.

When the second row is activated or selected within the legend, then the bounding box enclosing the second part number (41) associated with the second part name (arm) or the area enclosed by the bounding box enclosing the second part number (41) associated with the second part name (arm) or the second part number (41) associated with the second part name (arm) can be automatically or responsively highlighted within the figure sheet, as described herein. This highlighting can be of same modality as the first part number already highlighted within the figure sheet. However, this configuration can vary and this highlighting modality can differ from the first part number already highlighted within the figure sheet. For example, the bounding box enclosing the first part number 20B in the figure sheet is highlighted differently from the bounding box enclosing the second part number 41 in the figure sheet. Note that if the first row and the second row are highlighted in different colors (or other highlighting techniques), then same modality of different highlighting may or may not be applied to the figure sheet (e.g., bounding boxes, part numbers).

When the second row is activated or selected within the legend, the text can be automatically or responsively directed to the segment (e.g., paragraph, sentence, phrase) containing the second part number (41) or the second part name (arm), as described herein. For example, the text can be automatically or responsively directed to a first segment (e.g., paragraph, sentence, phrase) within the text containing the second part number (41) or the second part name (arm), as described herein, whether the first segment is or is not associated with any figure depicted on a figure sheet that is currently presented. The segment of the text can be highlighted, as described herein. For example, a sentence containing the second part name (arm) and the second part number (41) can be highlighted relative to other sentences within the text, as described herein, and the second part name (arm) and the second part number (41) can be highlighted within the sentence relative to other words within the sentence, as described herein.

The left navigational arrow button of the second row and the right navigational arrow button of the second row can be selectively activated in order to navigate through various mentions of the second part name (arm) or the second part number (41) within the text from within the legend. When first or last mentions within the text are reached, then the left navigational arrow button or the right navigational arrow button can respectively become disabled or inactive or hidden or visually distinct relative to its previous visual state. However, if endless looping through mentions within the text is enabled, then the left navigational arrow button or the right navigational arrow button can avoid respectively becoming disabled or inactive or hidden or visually distinct relative to their previous visual state.

Although the left navigational arrow button or the right navigational arrow button are selectively presented based on a respective row that is last user selected or currently active, this configuration can vary. For example, the left navigational arrow button and the right navigational arrow button can be presented when the respective row is not last user selected or is not currently active or not within a row of the legend.

Note that a back navigational user input element (e.g., back next button) and a forward navigational user input element (e.g., forward next button) can be used in many technical contexts for content navigation, whether for content analysis purposes, content comparison purposes, more detailed content inquiry purposes, or other purposes. Various technologies described herein can thus be adapted for such technical contexts, as described herein.

In particular, as described herein, there can be a first content item and a plurality of second content items. The first content item can include a pixel or voxel image, a still image, a medical imaging image, a photo, a computer aided design (CAD) drawing, a video, a pattern within an image, a feature within an image, a detected object within an image, a human face within an image, a human body part or bone or organ within an image, an animate or inanimate or stationary or movable physical structure (e.g., animal, building, land vehicle, marine vehicle, aerial vehicle) within an image, a human facial landmark within image, a terrestrial landmark or object within an image, a set of alphanumeric text within an image or text data, a text phrase within an image or text data, a text word within an image or text data, a set of source code or mark-up code within an image or text data, a graph or diagram within an image or text data, a set of metadata within an image or text data, or others. Each of the second content items can include a pixel or voxel image, a still image, a medical imaging image, a photo, a computer aided design (CAD) drawing, a video, a pattern within an image, a feature within an image, a detected object within an image, a human face within an image, a human body part or bone or organ within an image, an animate or inanimate or stationary or movable physical structure (e.g., animal, building, land vehicle, marine vehicle, aerial vehicle) within an image, a human facial landmark within image, a terrestrial landmark or object within an image, a set of alphanumeric text within an image or text data, a text phrase within an image or text data, a text word within an image or text data, a set of source code or mark-up code within an image or text data, a graph or diagram within an image or text data, a set of metadata within an image or text data, or others. With respect to each other, the second content items can be of same data format or data type (e.g., all detected objects within same or different images) or the second content items can be of different data format or data type (e.g., some are human faces within same or different images and some are inanimate stationary physical structures within same or different images). With respect to each other, the first content item and the second content items can be of same data format or data type (e.g., first content item is detected object within image and second content items are detected objects within same or different images) or the first content and the second content items can be of different data format or data type (e.g., first content item is human face within image and second content items are inanimate stationary physical structures within same or different images).

The first content item can be alone or be a member of a plurality of first content items. Each of the first content items can include a pixel or voxel image, a still image, a medical imaging image, a photo, a computer aided design (CAD) drawing, a video, a pattern within an image, a feature within an image, a detected object within an image, a human face within an image, a human body part or bone or organ within an image, an animate or inanimate or stationary or movable physical structure (e.g., animal, building, land vehicle, marine vehicle, aerial vehicle) within an image, a human facial landmark within image, a terrestrial landmark or object within an image, a set of alphanumeric text within an image or text data, a text phrase within an image or text data, a text word within an image or text data, a set of source code or mark-up code within an image or text data, a graph or diagram within an image or text data, a set of metadata within an image or text data, or others. With respect to each other, the first content items can be of same data format or data type (e.g., all detected objects within same or different images) or the first content items can be of different data format or data type (e.g., some are human faces within same or different images and some are inanimate stationary physical structures within same or different images).

The first content item can be stored in or distributed among a first data container (e.g., data structure, data file, database record, record field) or a plurality of first data containers (e.g., data structures, data files, database records, record fields). The second content items can be stored in or distributed among a plurality of second data containers (e.g., data structures, data files, database records, record fields) or a second data container (e.g., data structure, data file, database record, record field). The first content item and at least one of the second content items can be or can avoid being stored within a same data container.

The first content item and the second content items can be associated with each other in various ways. For example, the first content item can have a one-to-many correspondence with respect to the second content items (e.g., human face corresponds to many human faces). For example, at least one of the second content items can have a one-to-many correspondence with respect to the first item (e.g., inanimate physical structure corresponds to many inanimate physical structures). However, note that these forms of correspondence can vary. For example, there can be a one-to-one correspondence or a many-to-many correspondence between the first item and the second content items.

The first content item can be computationally identified (e.g., computer vision, NLP) or user selected (e.g., freeform drawing, text highlighting, data labeling, bounding box placement), as described herein. Each of the second content items can be computationally identified (e.g., computer vision, NLP) or user selected (e.g., freeform drawing, text highlighting, data labeling, bounding box placement), as described herein. Then, the second content items are searched in order to determine if any of the second content items match the first content item, as described herein.

This form of matching can be based on content item similarity (or dissimilarity) based on various content attributes or data container attributes. For example, this form of matching can include matching a human face (first content item) in a photo to a plurality of human faces (second content items) in a plurality of photos based on facial similarity therebetween. For example, this form of matching can include matching a detected object (first content item) in a video to a plurality of detected objects (second content item) in a plurality of photos based on object similarity therebetween. For example, this form of matching can include matching a human body part or bone or organ (first content item) in a medical imaging scan image to a plurality of human body parts or bones or organs (second content item) in a plurality of medical imaging scan images based on human body part or bone or organ similarity therebetween. For example, this form of matching can include matching a text segment (first content item) in a document to a plurality of text segments (second content item) in a corpus of documents.

Once such matches are determined, a user interface can simultaneously present a first viewing portion (e.g., viewing pane or viewing area) and a second viewing portion (e.g., viewing pane or viewing area), as described herein. The first viewing portion can present the first content item, which can be highlighted, as described herein. Within the first viewing portion, the first content item can be visually marked with a first visual marker, as described herein. For example, the first visual marker can be a bounding box presented over the first content item and enclosing the first content item, as described herein, Within the first viewing portion, the first visual marker can be presented in visual association with the first content item, as described herein. The first visual marker can have a back navigational user input element (e.g., back next button) and a forward navigational user input element (e.g., forward next button) visually associated therewith, as described herein. The second viewing portion can present at least one of the second content items, which can be highlighted, as described herein. As such, the user can navigably iterate through the second content items presented within the second viewing portion via the back navigational user input element or the forward navigational user input element of the first content item presented within the first viewing portion, from within the first viewing portion, while simultaneously observing the first content item while this navigable iteration occurs, as described herein. However, note that the visual marker can also be omitted. For example, within the first viewing portion, the first content item can be positioned between the back navigational user input element and the forward navigational user input element, without the bounding box being presented for the first content item.

When presented within the second viewing portion, each of the second content items may be marked with a second visual marker visually associated with that respective second content item, as described herein. For example, the second visual marker can be a bounding box presented over that respective second content item and enclosing that respective second content item, as described herein. The second visual marker may have a back navigational user input element (e.g., back next button) and a forward navigational user input element (e.g., forward next button) visually associated therewith, as described herein. Therefore, if the first content item is the member of the first content items, then the user can navigably iterate through the first content items presentable within the first viewing portion via the back navigational user input element or the forward navigational user input element of that respective second item presented within the second viewing portion, from within the second viewing portion, while simultaneously observing that respective second content item while this navigable iteration occurs, as described herein.

For example, a social networking service user profile (e.g., Facebook profile) may have a plurality of images (e.g., photos, memes). The images can be user uploaded to the social networking service user profile or the images can be user associated with the social networking service user profile (e.g., attributed, hyperlinked). The images can include a first image depicting a first human face (or other content), a second image depicting a second human face (or other content), and a third image depicting a third human face (or other content). As such, the first image, the second image, and the third image can be computationally analyzed and the first human face, the second human face, and the third human face can be respectively detected within the first image, the second image, and the third image. The first human face, the second human face, and the third human face can be matched to each other based on similarity (or dissimilarity) and a corresponding mapping or index between the first human face, the second human face, and the third human face can be formed, as described herein, (or the first image, the second image, and the third image can be tagged, related, or associated with metadata informative of such matching content, as described herein). The corresponding mapping or index can be stored internal or external to the social networking service user profile. Therefore, if the first image is subsequently presented within a social networking service user interface (e.g., with multiple viewing panes or viewing areas) and the first human face (first content item) in the first image has been previously respectively mapped or indexed to the second human face and the third human face (second content items) in the second image and the third image (e.g., one-to-many correspondence), as described herein, then a first visual marker can be presented over the first human face (first content item) in the first image within the social networking service user interface, as described herein. For example, the first visual marker can be a bounding box presented over the first human face in the first image within the social networking service user interface and enclosing the first human face in the first image within the social networking service user interface, as described herein. The first visual marker can be presented in visual association with the first human face over the first image within the social networking service user interface, as described herein. The first visual marker can have a back navigational user input element (e.g., back next button) and a forward navigational user input element (e.g., forward next button) visually associated therewith over the first image within the social networking service user interface, as described herein. Therefore, the user can interactively interface with the back navigational user input element or the forward navigational user input element of the first human face (first content item) of the first image, while the first image is presented within the social networking service user interface (e.g., within first viewing pane or viewing area), to navigably iterate through the second human face of the second image and the third human face of the third image (second content items) within the social networking service user interface (e.g., within second viewing pane or viewing area), while simultaneously observing the first human face (first content item) of the first image, while this navigable iteration occurs, as described herein.

Similar form of navigable iteration can occur from the second human face of the second image or the third human face of the third image. For example, interactively interfacing with the back navigational user input element or the forward navigational user input element of the second human face (first content item) of the second image, while the second image is presented within the social networking service user interface (e.g., second viewing pane or viewing area), can allow navigable iteration through the first human face of the first image and the third human face of the third image (second content items) within the social networking service user interface (e.g., first viewing pane or viewing area), while simultaneously observing the second human face (first content item) of the second image, while this navigable iteration occurs, as described herein.

In addition to content navigation within the social networking service user profile, as described herein, note that the second image or the third image can be of other social networking service user profiles, whether inclusively or exclusively, depending on social networking service profile permissioning configuration. Therefore, when the social networking service user profile has read access to other social networking service user profiles (e.g., social networking service connection, public social networking service profile), then the user can interactively interface with the back navigational user input element or the forward navigational user input element of the first human face (first content item) of the first image within the social networking service user interface (e.g., first viewing pane) to navigably iterate through the second human face of the second image and the third human face of the third image (second content items) of the other social networking service user profiles within the social networking service user interface (e.g., second viewing pane), while simultaneously observing the first human face (first content item) of the first image while this navigable iteration occurs, as described herein. When the second image and the third image are stored external to the social networking service, then similar functionality is applicable and the user can interactively interface with the back navigational user input element or the forward navigational user input element of the first human face (first content item) of the first image within the social networking service user interface (e.g., first viewing pane or viewing area) to navigably iterate through the second human face of the second image and the third human face of the third image (second content items) within the social networking service user interface (e.g., second viewing pane or viewing area), while simultaneously observing the first human face (first content item) of the first image while this navigable iteration occurs, as described herein.

Similar iterative content navigation approach can be used in context of other software applications or web services. Some examples of such applications include a photo album software application (e.g., Google Photos or Apple Photos for tracking photo image features like faces, garments, landmarks, or objects), a law enforcement or intelligence or military software application (e.g., for tracking or comparing suspects by images or video), a medical imaging software application (e.g., for tracking or comparing X-ray scans or MRI scans), a satellite or aerial surveillance or street view software application (e.g., Google Earth, Google Maps, Zillow, NASA Earthdata, Landviewer for tracking vehicles or transportation hubs or roads or buildings or landmarks), a reverse image search (e.g., Google reverse image search for comparing images or patterns or objects within images), a plagiarism (e.g., text, image) detection application, a deep fake (e.g., image, video) detection application, a web forum (e.g., text, image) monitoring application, a source code integrated development environment (IDE) to compare source code, a video sharing service (e.g., YouTube, Vimeo, Netflix for comparing images or videos or video frames for patterns or objects or people or landmarks or faces), an e-commerce webpage or app (e.g., for tracking or comparing texts or images or videos for patterns or objects or people or landmarks or faces or goods), a productivity suite application (e.g., MS Word, MS Excel, MS PowerPoint, Adobe Creative Suite, Adobe Acrobat, Google Docs for comparing text or images or patterns or objects or people or faces), an IP infringement match application that compares potentially infringing images (e.g., infringing goods) against an IP image or text (e.g., AppDetex) and other technical fields, whether monitoring based on text or images.

For example, a software application or web service may have a plurality of images (e.g., personal camera photos, smartphone photos, tablet photos, surveillance videos, surveillance photos, medical scan images, overhead land imagery, marine imagery, web photos, text documents). The images can be user uploaded to the software application or web service or the images can be user associated with the software application or web service (e.g., attributed, hyperlinked), The images include a first image depicting a first content item (and potentially other content items), a second image depicting a second content item (and potentially other content items), and a third image depicting a third content item (and potentially other content items). For example, the first content item, the second content item, the third content item, or other content items can include a pixel or voxel image, a still image, a medical imaging image, a photo, a computer aided design (CAD) drawing, a video, a pattern within an image, a feature within an image, a detected object within an image, a human face within an image, a human body part or bone or organ within an image, an animate or inanimate or stationary or movable physical structure (e.g., animal, building, land vehicle, marine vehicle, aerial vehicle) within an image, a human facial landmark within image, a terrestrial landmark or object within an image, a set of alphanumeric text within an image or text data, a text phrase within an image or text data, a text word within an image or text data, a set of source code or mark-up code within an image or text data, a graph or diagram within an image or text data, a set of metadata within an image or text data, or others. As such, the first image, the second image, and the third image can be computationally analyzed and the first content item, the second content item, and the third content item can be respectively detected within the first image, the second image, and the third image. The first content item, the second content item, and the third content item can be matched to each other based on similarity (or dissimilarity) and a corresponding mapping or index between the first content item, the second content item, and the third content item can be formed, as described herein (or the first content item, the second content item, and the third content item can be tagged, related, or associated with metadata informative of such matching content, as described herein). The corresponding mapping or index can be stored internal or external to the software application or web service. Therefore, if the first image is subsequently presented within a software application or web service user interface (e.g., with multiple viewing panes or viewing areas) and the first content item (first content item) in the first image has been previously respectively mapped or indexed to the second content item and the third content item (second content items) in the second image and the third image (e.g., one-to-many correspondence), as described herein, then a first visual marker can be presented over the first content item (first content item) in the first image within the software application or web service user interface, as described herein. For example, the first visual marker can be a bounding box presented over the first content item in the first image within the software application or web service user interface and enclosing the first content item in the first image within the software application or web service user interface, as described herein. The first visual marker can be presented in visual association with the first content item over the first image within the software application or web service user interface, as described herein. The first visual marker can have a back navigational user input element (e.g., back next button) and a forward navigational user input element (e.g., forward next button) visually associated therewith over the first image within the software application or web service user interface, as described herein. Therefore, the user can interactively interface with the back navigational user input element or the forward navigational user input element of the first content item (first content item) of the first image, while the first image is presented within the software application or web service user interface (e.g., within first viewing pane or viewing area), to navigably iterate through the second content item of the second image and the third content item of the third image (second content items) within the software application or web service user interface (e.g., within second viewing pane or viewing area), while simultaneously observing the first content item (first content item) of the first image, while this navigable iteration occurs, as described herein. However, note that the visual marker can also be omitted. For example, within the first viewing portion, the first content item can be positioned between the back navigational user input element and the forward navigational user input element, without the bounding box being presented for the first content item.

Similar form of navigable iteration can occur from the second content item of the second image or the third content item of the third image. For example, interactively interfacing with the back navigational user input element or the forward navigational user input element of the second content item (first content item) of the second image, while the second image is presented within the software application or web service user interface (e.g., second viewing pane or viewing area), can allow navigable iteration through the first content item of the first image and the third content item of the third image (second content items) within the software application or web service user interface (e.g., first viewing pane or viewing area), while simultaneously observing the second content item (first content item) of the second image, while this navigable iteration occurs, as described herein.

The second image or the third image can be of other software application or web service user profiles, whether inclusively or exclusively. Therefore, when the software application or web service user profile has read access to other software application or web service user profiles, then the user can interactively interface with the back navigational user input element or the forward navigational user input element of the first content item (first content item) of the first image within the software application or web service user interface (e.g., first viewing pane or viewing area) to navigably iterate through the second content item of the second image and the third content item of the third image (second content items) within the software application or web service user interface (e.g., second viewing pane or viewing area), while simultaneously observing the first content item (first content item) of the first image while this navigable iteration occurs, as described herein. When the second image and the third image are stored external to the software application or web service, then similar functionality is applicable and the user can interactively interface with the back navigational user input element or the forward navigational user input element of the first content item (first content item) of the first image within the software application or web service user interface (e.g., first viewing pane or viewing area) to navigably iterate through the second content item of the second image and the third content item of the third image (second content items) within the software application or web service user interface (e.g., second viewing pane or viewing area), while simultaneously observing the first content item (first content item) of the first image while this navigable iteration occurs, as described herein.

As described herein, this form of iterative navigation can be used in architectural blueprints, engineering blueprints, MS Word (or other word processing application) documents, MS PowerPoint (or other presentation application) documents, MS Excel (or other spreadsheet application) documents, web browsing, PDF files, photo albums, medical imaging or any other technical context where one piece of content (e.g., object, feature, pattern, face, text) corresponds in any way (e.g., one-to-one, one-to-many, many-to-one, many-to-many) to another piece of content (e.g., object, feature, pattern, face, text) and navigation user input elements of one content keep iterating through another piece of content or vice versa, whether these pieces of content are of same or not same type or format. For example, this form of iterative navigation may include medical diagnostics and imaging, trademark image searching and identification, facial or fingerprint or other biometric recognition, surveillance, satellite or aerial imaging, academic research, or others.

Figure 11A:
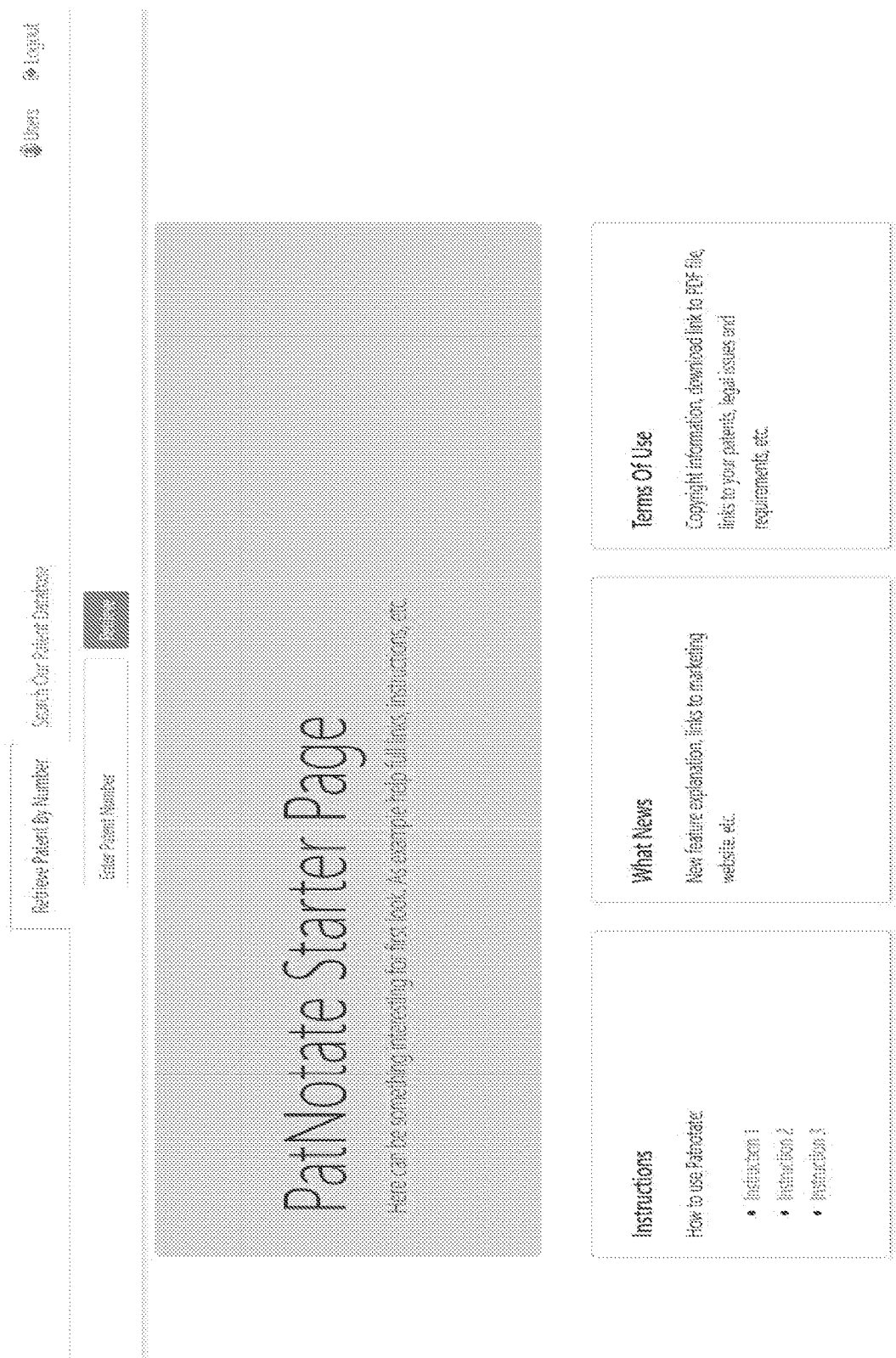

FIG. 11A illustrates an embodiment of a user interface with a tabbed configuration formed via a retrieve tab and a search database tab according to this disclosure. The tabbed configuration allows the user to easily switch between retrieving a patent document file (or another form of content document) functionality and searching a patent database (or another form of database content) functionality. The retrieve tab causes a presentation of a user interface that allows the user to retrieve a patent document that has previously been processed, as described herein, or if the patent document has not previously been processed, then to initiate such processing. The search database tab allows the user to search the database for patent documents that match a search query (e.g., part name), as described herein. FIG. 11A shows the user interface for the retrieve tab and FIG. 11B shows the user interface for the search database tab where the user can search the database using "and" or "or" searches to narrow down a part name search, as described herein.

Figure 11C:
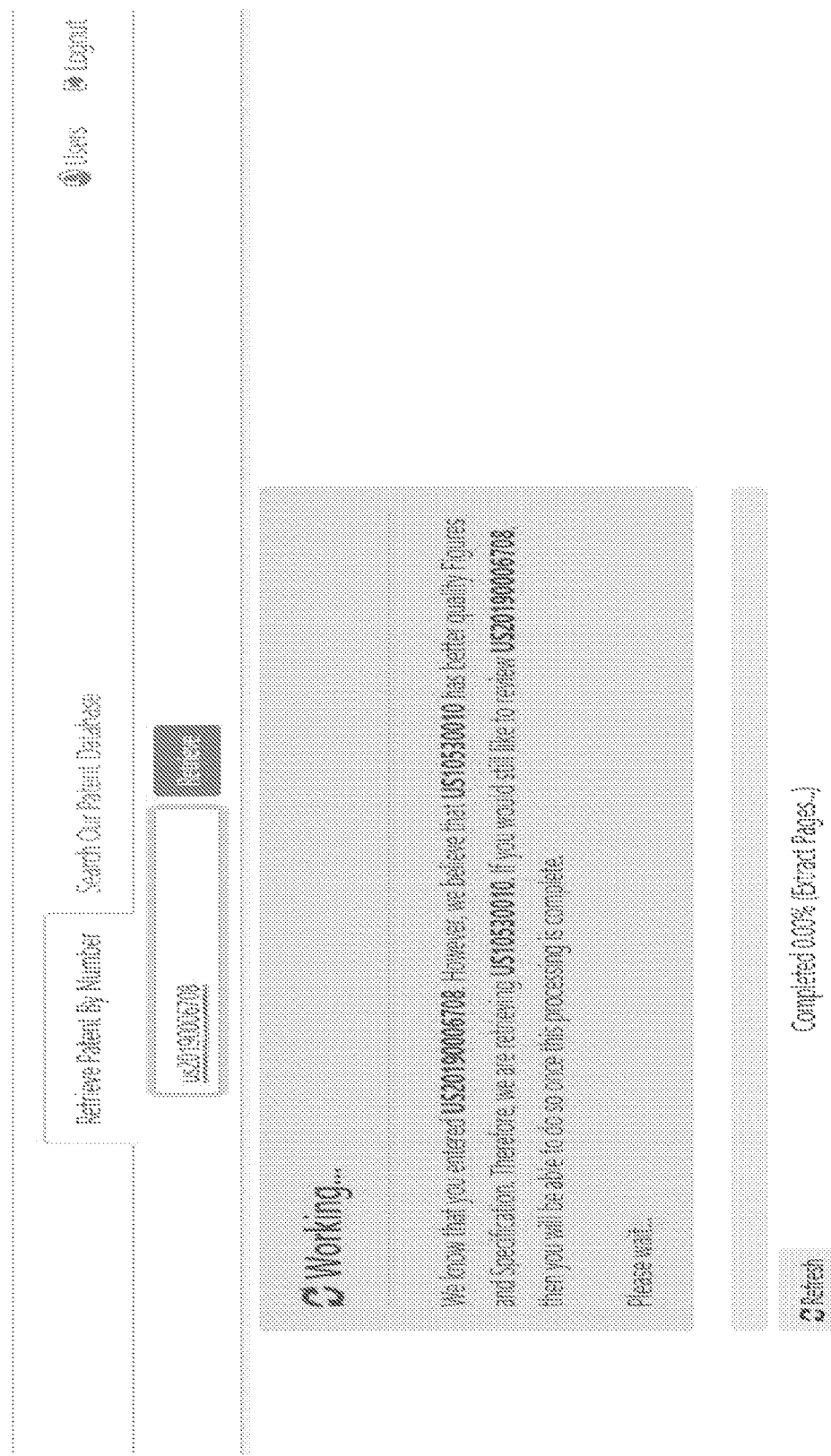

FIG. 11C illustrates a message that may be presented in response to the user retrieving a patent document by a patent application publication number instead of by an issued patent grant number according to this disclosure. The message is in response to a determination that an issued patent grant file corresponding to the patent application publication number exists and then determining that at least one figure in the issued patent grant file is of higher quality based on various figure sheet parameters (e.g., image noise, print type versus handwritten part numbers) than at least one, most, or all figure sheets in a corresponding patent application publication file. Therefore, the issued patent grant file may be retrieved and processed, as described herein, before or concurrent to the patent application publication file. For example, the issued patent grant file can be processed, as described herein, instead of the patent application publication file and the corresponding published patent application publication file will also be processed, albeit after or during processing of the issued patent grant file is completed. For example, during this wait time, there can be advertisements presented (e.g., text, image, sound, GIF, JPEG), where these advertisements, whether static or dynamic, can be presented statically or dynamically, as disclosed herein. These advertisements can be targeted based on user information (e.g., email, login, computing system) or patent classification codes or patent text or patent images, as disclosed herein. These advertisements can be presented in various ways and can be adjusted based on dark mode or blue light modes, as disclosed herein. These advertisements can be present to left or right or on top of or under a wait message or a progress bar, as shown in FIG. 11C.

FIG. 11D illustrates a progress bar of a user interface according to this disclosure. The progress bar informs the user of a processing progress for a patent document file, whether an issued patent grant file or a published patent application file. The progress bar is presented when the retrieve tab is operative and a specific patent document number has been entered and submitted for processing. Whether additional or alternative to the progress bar, there can be an estimated remaining time visual element (e.g., label, digital clock, analog clock) presented informing the user how much time is left until completion of retrieval and processing. For example, the estimated remaining time can be based on an average figure sheet time. Although the patent document file (e.g., figure sheet) is not available for the user to view while this retrieval and processing is taking place this configuration can vary. For example, the patent document file (e.g., figure sheets) can be made available in real-time on a per sheet basis during processing upon a particular sheet being completed and there can be a visual indicator of what particular figure sheet is completed and can guide the user thereto.

Note that an advertisement (e.g., text, image, video, GIF) can be presented during FIGS. 11C-11D, as disclosed herein. For example, the advertisement can be identified based on a patent classification code or a patent text analysis or a patent figure analysis (e.g., chemical classification code leads to chemistry related advertisement). The patent classification code or the paten text analysis or the patent figure analysis are performed on a patent document that has been requested by the user for annotation, as disclosed herein. For example, there can be advertisements associated with life science patent documents, software patent documents, mechanical patent documents, consumer products patent documents, automotive patent documents, or other patent or non-patent documents that may be retrieved, as disclosed herein. For example, the advertisements (e.g., text, graphic, video, audio) relating to processed content (e.g., annotated patent figures, annotated blueprints) can be dynamically or statically generated or dynamically or statically served, Some advertisements can be presented concurrent with annotated figure (e.g., over figure, over figure margin, not over figure) or before or after. Some advertisements can relate to content of figures or text (e.g., descriptions, claims), For example, computer vision can be employed to figures in order to identify objects based on which related advertisement content can be dynamically or statically generated or dynamically or statically served. For example, patent classification codes can be read or NLP can be employed to the text in order to determine what patent classification or topic the text relates to and dynamically or statically generate advertisements or dynamically or statically serve advertisements. For example, some content of advertisements can relate to patent agents, patent attorneys, patent illustrators, patent translators, patent searchers, patent litigators, patent expert witnesses, patent paralegal services, invention marketing, invention promotion, invention manufacturing, venture capital, start-ups, emerging growth companies, patent brokers, litigation finance, patent insurance, or others (non-patent related content that can relate to patent figures or non-patent figures). Some advertisements can be limited to IP addresses or IP address ranges or by user profiles (e.g., to avoid legal violations), If ad-blockers (or other forms of disabling user tracking or user access control or content presentation) are detected, then none, some, most, or all processed content, as described herein, can be given user access. For example, upon detecting of an adblocker (or other forms of disabling user tracking or user access control or content presentation), then a disable adblocker (or other forms of disabling user tracking or user access control or content presentation) message can be shown or a whitelist message is shown. Note that a freemium-based model of accessing processed content, as described herein, can be enabled based on advertisements being presented. For example, some processed content can be provided with advertisements and some processed content can be provided without advertisements but with paid-subscription to such content (e.g., e-shopping cart, cryptocurrency). For example, some reduced functionality (any described herein) can be provided with advertisements and some enhanced functionality (any described herein) can be provided without advertisements but with paid-subscription to such content (e.g., e-shopping cart, cryptocurrency).

Figure 11E:
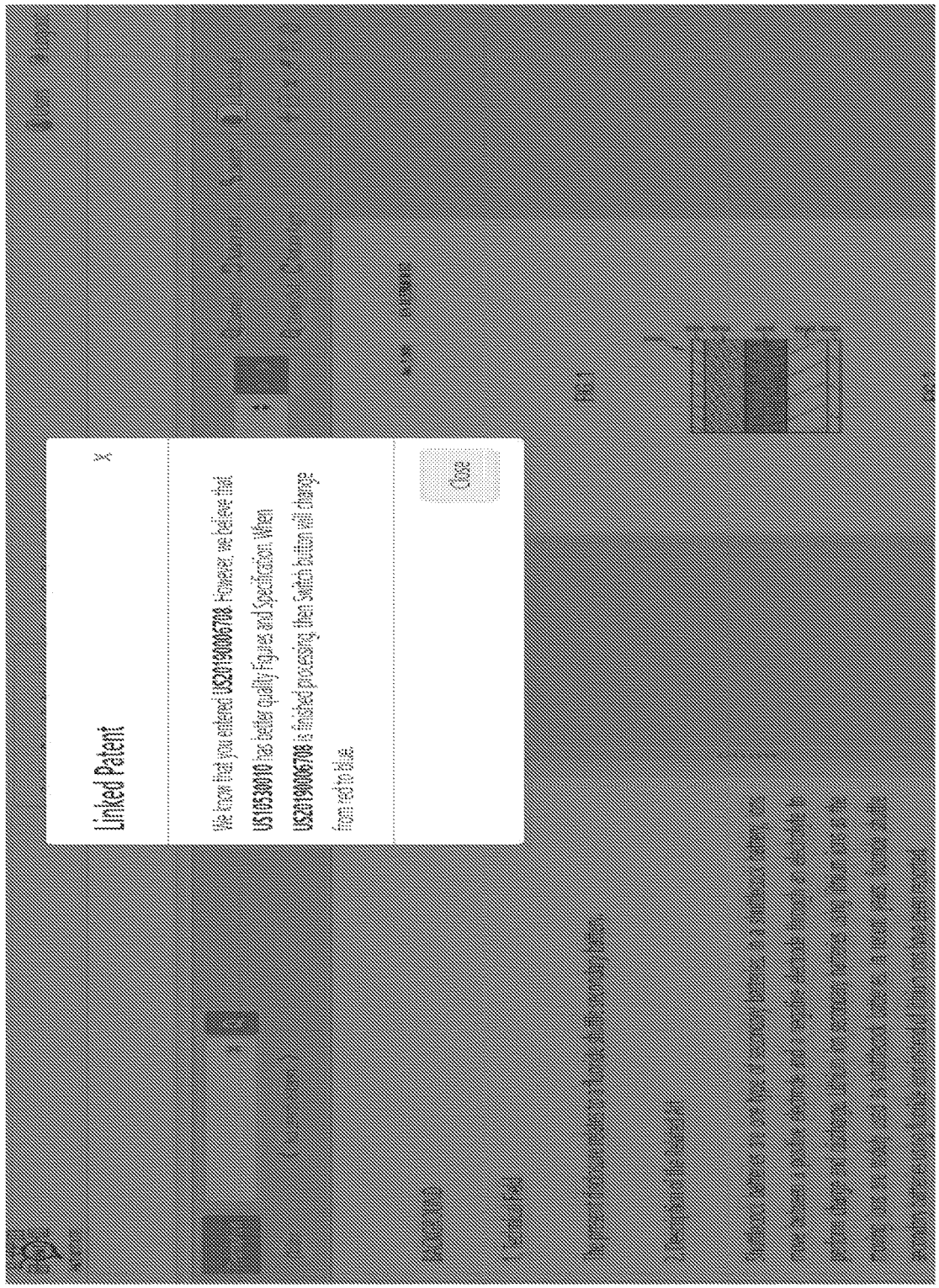

FIG. 11E illustrates a message that may be presented upon completion of processing of an issued patent grant file to inform the user that a corresponding patent application publication file is still undergoing processing according to this disclosure. As indicated in the message, and shown on the user interface, a "switch" button is in red font (or another color or form of visual distinction) during such processing of the corresponding patent application publication file and will turn blue (or another color or form of visual distinction) upon completion of processing of the corresponding patent application publication file. Note that the "switch" button can be manifested in other visual ways. For example, instead of the "switch" button, there can be a "switch" toggle or checkbox or radio button or another user input element.

FIG. 11F illustrates a user interface presenting an issued patent grant file according to this disclosure. The issued patent grant file is presented, rather than a corresponding patent application publication file, even though the corresponding patent application publication file was requested for by the user, as shown entered in a retrieve bar. As seen in FIG. 11F, the "switch" button is in blue font since processing of the corresponding patent application publication has been completed and the user can switch to view the corresponding patent application publication upon pressing the "switch" button.

Figure 11G:
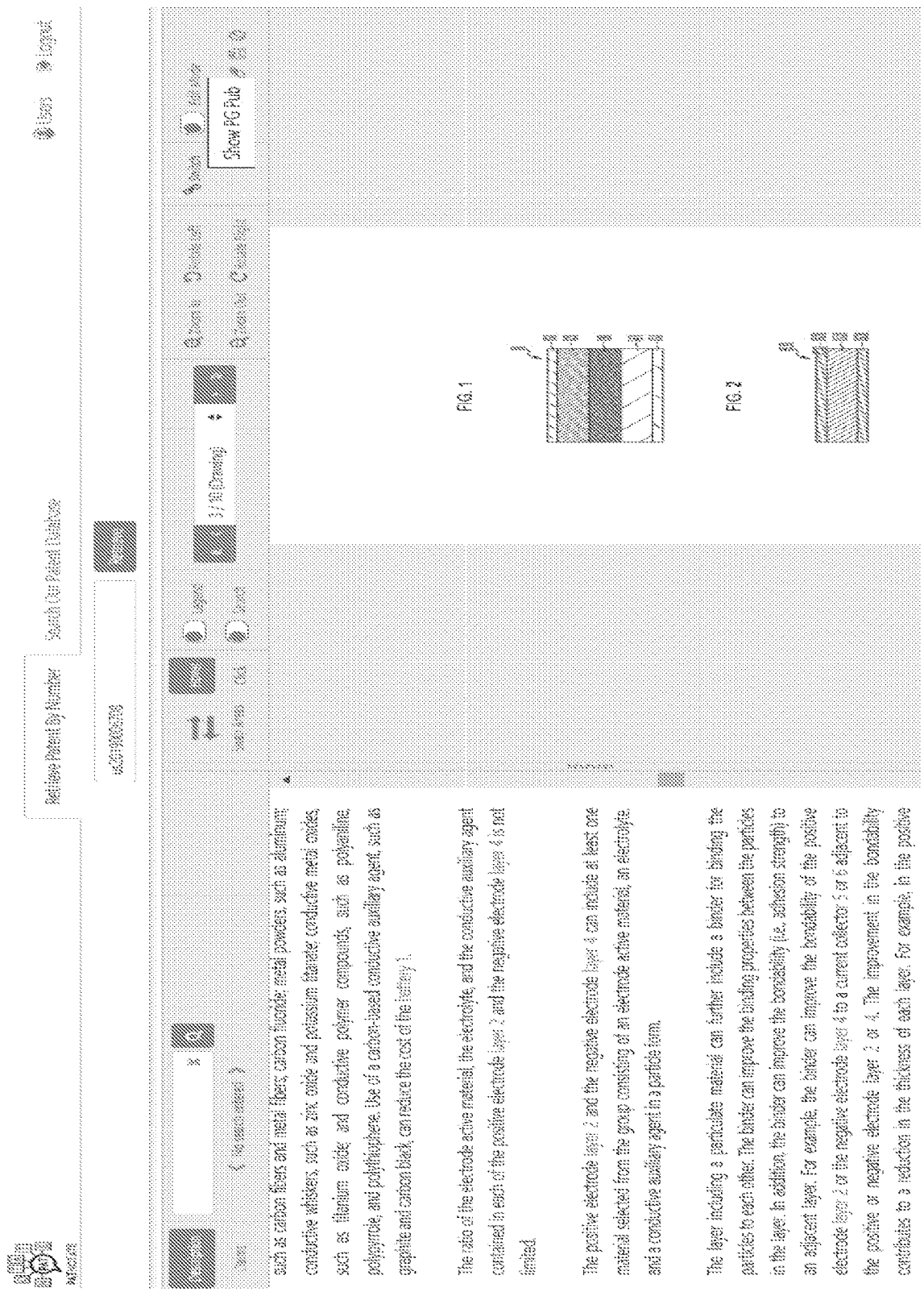
Figure 11A:
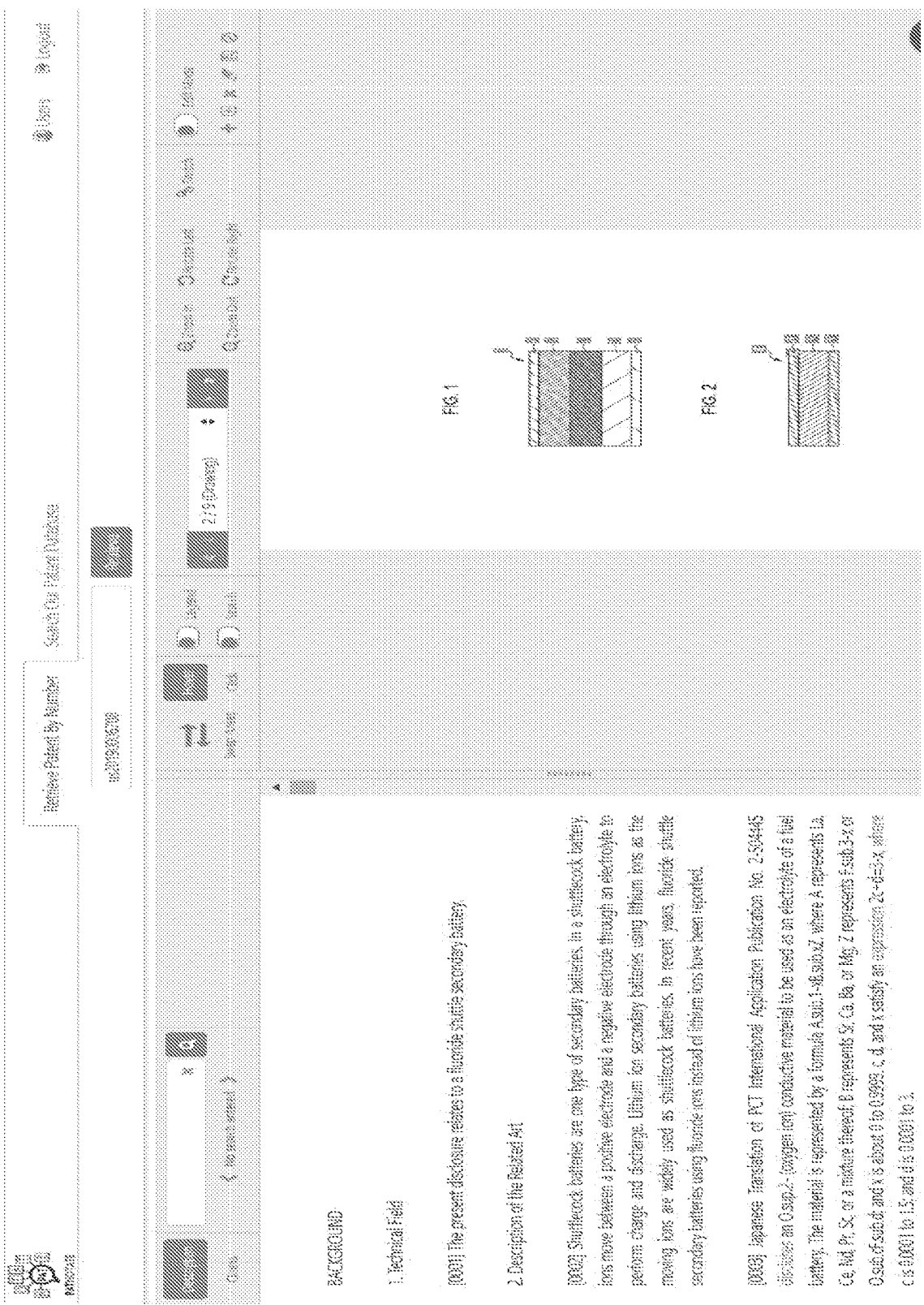
Figure 111:
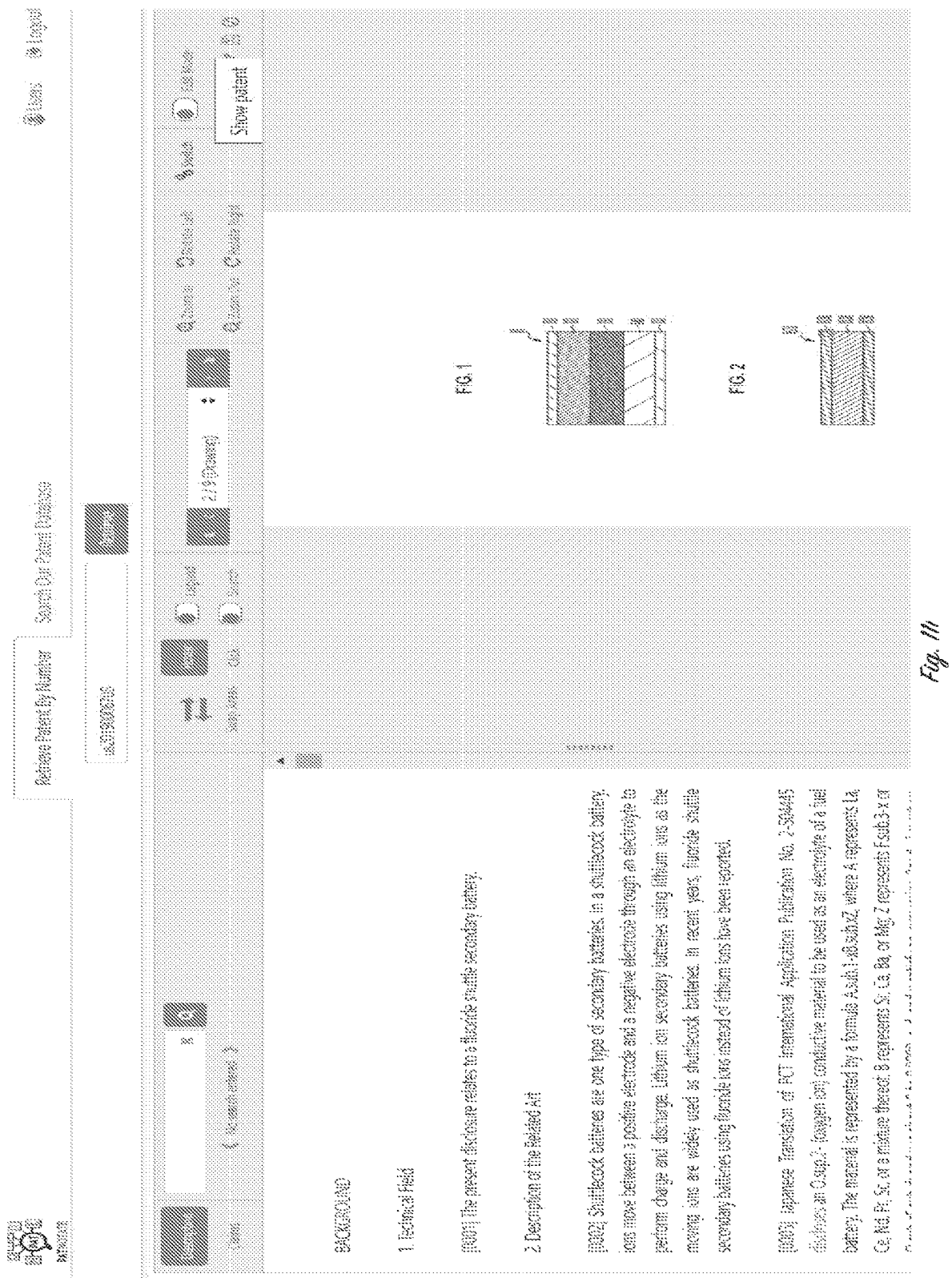

FIG. 11G illustrates a result of a user hovering over the "switch" button while the issued patent grant file is presented in a user interface according to this disclosure. The result includes a message that appears in proximity of the "switch" button. The message indicates that a corresponding patent application publication file will be presented in the user interface if the "switch" button is pressed.

FIG. 11H illustrates a result of the user pressing the "switch" button while the issued patent grant file is presented in a user interface according to this disclosure. The user interface (e.g., viewing panes or viewing areas) is automatically or responsively updated or refreshed and a corresponding patent application publication file is presented. The user can again press the "switch" button to cause the user interface to automatically or responsively update or refresh and thereby switch back to present the issued patent grant file.

FIG. 11I illustrates a result of a user hovering over the "switch" button while the patent application publication file is presented within the user interface according to this disclosure. The result includes a message that appears in proximity of the "switch" button. The message indicates that a corresponding issued patent grant file will be presented in the user interface if the "switch" button is pressed.

Figure 11J:
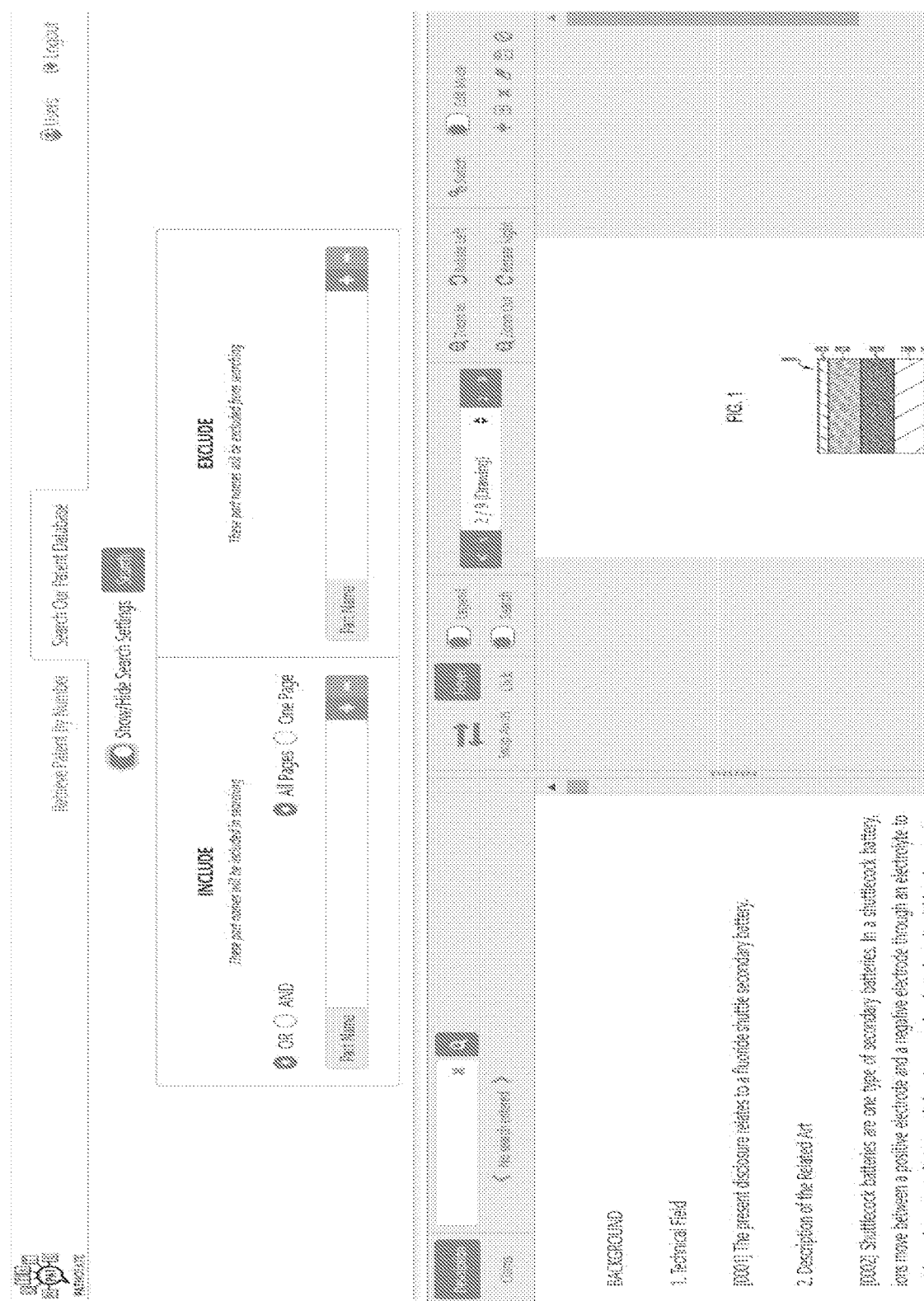

FIG. 11J illustrates a user interface of the search database tab showing a set of user input fields for searching the patent database according to this disclosure. The retrieve tab and the database search tab can be used interchangeably with content from one tab displayed while viewing another tab. The set of user input fields can be used for entry of a set of part names to search for a set of part numbers within a patent document file (or another content document file), as described herein.

In some embodiments, as described herein, a user interface may have a first viewing pane (or viewing area) presenting a first patent document file (e.g., issued patent grant file, published patent application file) and a second viewing pane (or viewing area) presenting a second patent document file (e.g., issued patent grant file, published patent application file), where the first viewing pane is side-by-side with the second viewing pane and where the first patent document file and the second patent document file are different from each other in publication number or content or type or format or jurisdiction. For example, the first patent document file may be an issued patent grant file and the second patent document file may be a patent application publication file, whether related or not related to the issued patent grant file. For example, the first patent document file may be a first issued patent grant file and the second patent document file may be a second issued patent grant file, where the first patent grant file is different from each other in publication number or content or type or format or jurisdiction. This mode of presentation may be used to compare these patent documents for differences in text, figures, claims, priority, and other patent characteristics. For example, this mode of presentation may enable a user comparison between a claim set of a published patent application file against a claim set of a resulting issued patent grant file. In this way, such comparison may assist, for example, with estoppel determination or intervening rights analysis.

In some embodiments, as described herein, there may be a hyperlink, a graphic, or another form of user guidance or visual menu that may associate a part name within a patent text or a patent figure to a relevant legal case involving the part name. For example, if the part name is "bolt," then there may be a search of a legal case database (e.g., Lexis, Westlaw, Google Scholar, Darts-IP) for a legal case (e.g., Supreme Court, Federal Circuit, district court, International Trade Commission, Patent Trial and Appeal Board, European district court, European patent opposition proceeding, German district court) involving the part name "bolt." The legal database can be remote or local. If there is a match, then the legal case may be linked or noted via the hyperlink, graphic, or form of user guidance or visual menu. Since there may be a group of legal cases that involve the part name "bolt," then the group of legal cases be sorted or ranked by relevance, court level, valid/overruled, or another legal criterion. As such, a top result may be linked or noted via the hyperlink, graphic, or form of user guidance or visual menu or a preset number of results may be linked or noted via the hyperlink, graphic, or form of user guidance or visual menu, where the preset number of results may be ranked or rated, as described herein. For example, the hyperlink, the graphic, or another form of user guidance or visual menu may be presented adjacent to or within a graphic or shape containing the part name when the graphic or shape is activated, whether within the patent text or the patent figure, as described herein. For example, the hyperlink, the graphic, or another form of user guidance or visual menu may link cases that relate to claim terms or specification terms when those terms appear in the patent figure. For example, decisions that include construction of claims terms may be linked to patent files or patent application files that similarly include such claim terms.

In some embodiments, responsive to recognizing various part numbers (or other figure content) in patent figures (or other content figures), including manual visual marker corrective association or tagging, or manual visual marker positioning and corresponding part number association or tagging, as described herein, there may be a collection of labeled or tagged figures formed, whether on a single number (or letter or grammar character) basis (e.g., 0, 1, 2, 3, 4, 6, 6, 7, 8, 9 of various fonts) or a part number basis (e.g., 100, 32a, 76X, 7-B of various fonts. As such, the collection may form a set of labeled data that may be used for training via a supervised learning technique. Therefore, various machine learning models can be applied to the set of labeled data so that new unlabeled data (e.g., patent figures) can be presented to the various machine learning models and a likely label (e.g., part number) can be guessed or predicted for that piece of unlabeled data, whether typed or handwritten. For example, a recognition function can be learned, where the recognition function maps an input (e.g., unrecognized part number in patent figure) to an output (e.g., recognized part number in patent figure) based on example input-output pairs (e.g., set of unlabeled patent figures and set of labeled patent figures). The recognition function can be learned with various learning algorithms (e.g., support vector machines, decision trees, linear regression, logistic regression, neural networks, distance function, K-nearest neighbor, naïve Bayes, linear discriminant analysis, multilayer perceptron, similarity learning). Some examples of these neural networks can include RNNs, CNNs, long-short term memory (LSTM), R-CNN, Fast R-CNN, Faster R-CNN, YOLO, stateful neural networks, non-stateful neural networks, or others. For example, some memory networks can learn based on remembering various character or object segments or features from patent figures. The recognition function can be inferred from the set of labeled data inclusive of a set of training examples. (e.g., set of unlabeled patent figures and set of labeled patent figures). There can be a set of example pairs including an input object (e.g., feature vector of unlabeled part number in patent figure) and a desired output value (e.g., labeled part number). This technique can allow for active learning to enable correct or more accurate determination of class labels for unseen instances (e.g., part numbers of unprocessed patent figures). As such, when a part number is not recognized in a figure sheet or is not correctly recognized in the figure sheet, then a user (e.g., editor profile) can label the part number that is not recognized or correct a label for the part number that is not correctly recognized, which can thereby further train a machine learning model, as described herein.

In some embodiments, the collection of labeled or tagged figures (and corresponding text) can be used for predictive analytics to enable electronic financial trading (e.g., stocks data, options data, bonds data, financial instruments data), especially when the collection is frequently updated. For example, since patent files are published on a periodic basis (e.g., several times per week), there can be a selection of a set of parameters to select a set of patent files (e.g., based on company name, assignee, inventor, technology class, abstract wording, patent title, filing date, publication date, issuance date), Then, the set of files is processed (or periodically updated) to identify various part names based on part numbers in patent figures. As such, based on frequency or timing of appearances of certain part names, various predictive analytics can enable to enable electronic financial trading, as described herein.

In some embodiments, patent claim text can be presented within a viewing pane or area, as described herein, Since issued patent grant document files and corresponding patent application publication document files can be computationally related or tracked, as described herein, then various textual differences between claim text, as published, and claim text, as issued, can be highlighted (or otherwise made visually distinct), as described herein. For example, if a patent application publication file has a claim text reciting "A car comprising a wheel and a seat" and a corresponding issued patent file has a claim text reciting "A car comprising a wheel and a seat and a trunk," then "and a trunk" can be highlighted, as described herein. This feature can be performed in various ways. For example, upon processing, as described herein, there can be a textual comparison and identification of textual differences.

In some embodiments, various recognition techniques (e.g., part number recognition) can include programming or teaching (for machine learning models) an OCR engine (e.g., Tesseract, Abbyy) not to look for or ignore or filter out or skip arrows, arrow heads (e.g., empty triangle, solid triangle, V-shaped, L-shaped, equilateral triangle, right triangle, acute triangle, isosceles triangle), exclamation points, broken or dashed lines (e.g., same character, alternating characters), hatching patterns, brackets, parentheses, question marks, @, #, %, &, *, grammatical symbols, flowcharts, X-Y plots (e.g., + shaped Cartesian plane diagrams, L-shaped diagrams), chevrons, arrows or arrow tails, bodies, or heads, solid circles, or other content or forms of content. For example, the OCR engine can be programmed or taught to not to look for or ignore or filter out or skip recognition within flowcharts (e.g., detect rectangular box shape or diamond box shape enclosing text therein where arrows or arrowheads or arrow tails externally extend to or from rectangular box shape or diamond box shape and then not recognize or ignore or skip or filter out within rectangular box shape or diamond box shape, if rectangular shaped boxes or diamond shaped boxes are same size or same shape while arrows in-between then ignore or skip or filter out). For example, broken or dashed lines or hatching can be ignored or filtered out after some threshold amount of that content (e.g., predefined set of consecutive dashes linearly extending in same plane or predefined set of parallel lines extending in same plane) has been detected over some preset image area, which can include geometrical plane identification of that content in order to ensure minimum impact on other figure content. For example, degrees of hatching or pattern or hatching can be used as factors in this form of processing. For example, more darker image areas (e.g., more frequent hatching) can be ignored. Likewise, the OCR engine be programmed or taught (for machine learning models) not to look for or ignore or filter out or skip characters over hatched or patterned areas (e.g., find hatched or patterned area and ignore that area or characters therein or do not analyze that area or characters therein). Also, the OCR engine be programmed or taught (for machine learning models) what recognized character is not. For example, if the OCR engine recognized 8, then the OCR engine can be taught that 8 is not B or Q. Additionally, the OCR engine can be programmed or taught (for machine learning models) that 1 or I corresponds to value of one if certain amount of white space surrounds that character (or vice versa if light-on-dark color scheme or night mode).

In some embodiments, when searching based on part names is performed, as described herein, then there can be text expander based searching. For example, the user can input a search query of "gear" and figure sheets that include part numbers corresponding to "planetary gear" or "bevel gear" can be matched accordingly.

In some embodiments, since there are situations when a same object can be called differently (e.g., car can be called vehicle or automobile), there can be computer vision-based searching, as described herein. For example, there can be a library of objects (e.g., car) that are identifiable based on computer vision (e.g., object detection) and each of such objects is associated with a name (e.g., "car,") and a set of synonyms for the name (e.g., "vehicle" and "automobile"), as described herein. Resultantly, a figure sheet can be processed, as described herein, and an object depicted therein can be detected (e.g., car), as described herein. Then, the figure sheet is associated with or tagged with the name of the object (e.g., car), as described herein. Such association or tagging also associates or tags the set of synonyms. Therefore, when the user submits a search query inclusive of "vehicle" or "automobile," as described herein, then a relevant figure sheet respectively associated with or tagged with a matching synonym is identified and a computing action can be taken. For example, the object within the figure sheet can be highlighted or made visually distinct, as described herein. For example, if the figure sheet includes a part number visually associated with the object and the part number is visually associated with a visual marker, as described herein, then the part number or the visual marker can be highlighted or made visually distinct, as described herein.

In some embodiments, an API may be used to download files for processing, as described herein. The API may be of a publicly operated API (e.g., government agency, patent authority, USPTO, EPO, JPO, SIPO) or a privately operated API (e.g., private company). For example, the API can be used to download files (e.g., patent files, PDF files, image files, JPEG files, text files, specification files, figure files, claim files, abstract files) via a wrapper library or client or shim to interface with the API.

In some embodiments, the user interface, as described herein, may enable an autosuggest or autocomplete functionality, whether as drop-down menu or inline, when a user is entering an alphanumeric content into the user interface, as described herein. For example, this functionality can be enabled fora user entry of a patent document number into a patent document retrieval text box, as described herein. The autosuggest or autocomplete can be populated based on various patent documents already processed and stored, as described herein. For example, this functionality can be enabled for a user entry of a part name for a search of a figure sheet having a part number associated with the part name, as described herein. The autosuggest or autocomplete can be populated based on an index of part names associated with a figure sheet, a patent document, a set of patent documents, or a database of patent documents.

In some embodiments, there can be a synonym-based search or a related concept-based search. For example, when a user enters a part name for a search (e.g., car), as described herein, then the search is conducted for the part name and a set of synonyms associated with the part name (e.g., vehicle, automobile) or a set of related concepts associated with the part name (e.g., steering wheel, internal combustion engine). For example, the set of synonyms or the set of concepts can be statically generated for a set of part names formed from a patent text, as described herein, before the part name is user entered for searching, as described herein, which can be when the patent text is initially processed, as described herein. For example, the set of synonyms or the set of concepts can be dynamically generated in real-time responsive to the part name being submitted for searching, as described herein. In such situation, there may be a corresponding query to a local or remote data source (e.g., generic or technology-specific dictionary, generic or technology-specific knowledge database) to obtain or form the set of synonyms or the set of concepts and then submit the set of synonyms or the set of concepts for searching along with the part name, as described herein. Since there may be false positives or less relevant results based on such searching, then these results may be further processed or filtered for ranking and thereby presenting most relevant search results on top. As such, for example, the user can search for automobile but car or automobile related concepts are also searched, as described herein. Likewise, for example, the user can search for surface but side or side related concepts are also searched, as described herein.

In some embodiments, there can be a summary formed from a patent content (or other document content type), whether based on text or figure, whether as a whole or on a section thereof or a segment thereof or a figure sheet thereof. For example, the summary can be formed from a process of shortening a set of data computationally in order to create a subset (the summary) that represents a most important or relevant information within the set of data. For example, a text summarization technique can find a most informative sentences in a document, an image summarization technique can find a most representative image within an image collection, or a video summarization technique can extract a most important frames from a video content. For example, the summary can be formed from an extraction-based summarization, an abstraction-based summarization, or an aided summarization, which can include referencing a patent classification associated with the patent text. For example, the abstraction-based summarization can be applied to a patent text in order to build an internal semantic representation of the patent text, and then use this representation to create a summary that is closer to what a human might express. For example, the abstraction-based summarization can transform at least some extracted content by paraphrasing sections of the patent text. Such transformation can include various NLP techniques and a deep understanding of a technical domain of the patent text. For example, a Pre-training with Extracted Gap-sentences for Abstractive Summarization Sequence-to-sequence (PEGASUS) can be used to generate the summary.

The summary can be generated from a patent text (e.g., specification, claims, abstract) and include a plurality of part numbers, as described herein. The summary can be presented within a viewing pane presenting the patent text, as described herein. The summary can be exclusively presented, which can be similar to the description button or the claims button, as described herein, although inclusive presentation is possible. For example, the user interface, as described herein, can present a button (or another user input element) to cause the summary to be presented within the viewing pane, similarly to how the user interface presents the specification or the claims, whether inclusively or exclusively, as described herein. For example, there can be a summary button presented over the text pane (e.g., adjacent to the claims button or the description button or adjacent to the search bar). Each of the part numbers can allow a user to navigate through a plurality of figure sheets from the summary, as described herein. For example, each of the part numbers can be visually associated with a plurality of navigational user input elements, as described herein.

There can be a selection of a figure sheet (or figures) from the figure sheets based on how representative of the summary the figure sheet is. For example, if the summary recites five different part numbers and one of the figure sheets has all five different part numbers recognized therein and one of the figure sheets has three of different part numbers recognized therein, whether in a same figure or different figures, then the selection is the figure sheet with all five different part numbers as being most representative of the summary due to presence of more recognized part numbers.

In some embodiments, there can be a conversion of an annotated figure sheet, with a part name (or analytic or other relevant information) being visible, as described herein, into a file format for a subsequent usage thereof, which can include a download thereof. For example, the file format can include PDF, PPT, DOC, JPEG, or others. For example, the conversion can result in the download of an image file (e.g., JPEG, PNG) that can be inserted into a word processing application (e.g., MS Word) or a presentation application (e.g., MS PowerPoint), which can be for legal purposes. For example, the conversion can include screenshotting or generating new image with annotations.

In some embodiments, there can be a dynamic adjustment or adaptation of colors or color schemes during display for (1) part numbers or part names or graphics or navigational user input elements within a text or within a viewing pane, (2) part numbers or part names or graphics or navigational user input elements within a figure sheet or within a viewing pane, (3) part numbers or part names or graphics or navigational user input elements within a legend, or (4) any other visual content, as described herein.

The dynamic adjustment or adaptation of colors or color schemes can be responsive to an activation or deactivation or an operation or non-operation or a detection or a non-detection of a light-on-dark color scheme, also called dark mode, dark theme, or night mode, that uses light-colored text, icons, and graphical user interface elements on a dark background (e.g., black). For example, a patent text can be presented white over a background that is presented black when the light-on-dark color scheme is active and then this configuration can remain indefinitely or be reversed when the light-on-dark color scheme is not active or the patent text can remain as originally presented regardless of the light-on-dark color mode. For example, an object depicted in a figure sheet and a plurality of part numbers in the figure sheet associated with the object in the figure sheet (or any other figure sheet content) can be presented white over a background that is presented black when the light-on-dark color scheme is active and then this configuration can remain indefinitely or be reversed when the light-on-dark color scheme is not active or the figure sheet can remain as originally presented. For example, a set of navigational user input elements within the patent text or the figure sheet can be presented yellow over a background that is presented dark blue when the light-on-dark color scheme is active and then this configuration can remain indefinitely or be reversed when the light-on-dark color scheme is not active or the set of navigational user input elements can remain as originally presented.

The dynamic adjustment or adaptation of colors or color schemes can be responsive to an activation or deactivation or an operation or non-operation or a detection or a non-detection of a blue light filter. For example, at least some blue content or content including blue color within a patent text or a figure sheet can be dynamically adjusted or adapted when the blue light filter is activated and then this configuration can remain indefinitely or be reverse when the blue light filter not active or remain as originally presented. For example, if a visual marker (e.g., bounding box) presented within a viewing pane over a figure sheet is colored blue or includes blue color or if a part name and a part number presented within a viewing pane is colored blue or includes blue color, then the visual marker or the part name and the part number can be colored another color or colorably adapted that still maintains visual distinctness (e.g., green, orange, red).

Note that a visual distinction (e.g., coloring) scheme, as disclosed herein, of a bounding box or other visual markers, as disclosed herein can be adjusted for colorblind, user accessibility, grayscale mode, night mode, or blue light mode. For example, an internal or external coloring or highlighting scheme of a bounding box can be adjusted for colorblind or legally blind. For example, for colorblind, an internal or external coloring or highlighting scheme of a bounding box can be set to a preset or customized scheme (e.g., hatching, dashing, font size or type changing), as disclosed herein, whether during a regular operation mode, a dark mode, or a blue light mode. For example, for colorblind, a preset or customized scheme can be based on a potential absence of a predetermined or customized color (e.g., use different shapes or place dots or some other form of non-color based notices).

Whether the light-on-dark color scheme or the blue light filter is active or not active can be determined in various ways. For example, this information (e.g., setting, semaphore, flag, system call) can be obtained from an operating system (e.g., Windows, Mac OS) on which a user is currently viewing the patent text or the figure sheet, where the operating system itself activates or deactivates the light-on-dark color scheme or the blue light filter for itself or for applications running thereon. For example, this information can be obtained from an application (e.g., browser, Firefox, Safari, Chrome, Silk, IE, non-browser application) running on an operating system, where the application itself activates or deactivates the light-on-dark color scheme or the blue light filter for itself or for other applications or where the application merely informs of the light-on-dark color scheme or the blue light filter being active or not active, whether the light-on-dark color scheme or the blue light filter is activated or deactivated by other applications or the operating system.

In some embodiments, there can be a screenshot button (or another user input element) presented on a user interface (e.g., over viewing pane presenting figure sheet). The screenshot button can be activated by a user to capture a screenshot of a figure sheet showing a part name. The screenshot can be preset in shape or size or can be user adjustable (e.g., shape drawing, freeform, resize or reshape default shape). The screenshot can be downloaded or saved, whether automatically or responsive to a user prompt informative of such action and a user confirmation of such action. The screenshot can be of various file formats, which can be preset or user-selected (e.g., PDF, image, JPG, PNG, DOC, PPT).

In some embodiments, there can be a print button (or another user input element) presented on a user interface (e.g., over viewing pane presenting figure sheet). The print button can be activated by a user to print a figure sheet showing a part name or a selection or a group of figure sheets presenting a plurality of part names. This printing can be to a hardware printer or a software printer. For example, the hardware printer can include a printing device with an ink or a laser printing cartridge. For example, the software printer can include a driver to print to a file format (e.g., PDF).

In some embodiments, via a user interface, a user can select or upload a listing of patent document numbers and then have those corresponding patent documents retrieved and processed en masse, as described herein. For example, the user can upload a text file or a spreadsheet with 1,000 patent document numbers. As such, these corresponding documents can be retrieved and processed en masse, as described herein.

In some embodiments, there can be an error button (or another user input element) presented on a user interface (e.g., over viewing pane presenting figure sheet, over viewing area presenting text). The error button can be activated (e.g., clicked, touched) by a user to submit a current patent document number (e.g., U.S. Pat. No. 1,234,567) of a currently presented figure sheet (e.g., sheet 2 out of 3) or the currently presented figure sheet itself (e.g., PDF file, JPEG file) or an identifier of the figure sheet (e.g., image 4) or an entire currently presented patent document (e.g., PDF file, JPEG file) for secondary review (e.g., editor profile). For example, responsive to the activation of the error button, the editor profile can be informed (e.g., email) of the current patent document number (e.g., EP1234567) of a patent document that was viewed, as described herein, when the error button was activated and the identifier of the figure sheet (e.g., JPEG identifier) that was presented, as described herein, when the error button was activated. This review may be needed when a part number in the figure sheet is not correctly recognized in the figure sheet or not recognized at all in the figure sheet or not associated or incorrectly associated with a part name in a patent text. As such, the user associated with the editor profile can correct the part number in the figure sheet or the patent text or label the part number in the figure sheet or the patent text, as described herein. Based on various machine learning algorithms described herein, these actions can enable automatic or responsive machine learning model improvement/finetuning (e.g., supervised learning) to improve various image processing techniques, as described herein, or text processing techniques, as described herein.

The error button can remain activated for that patent document during that user session for that user or while the user is viewing that patent document. During such state, the error button can change visual appearance (e.g., first content to second content, blue to red, first graphic to second graphic, first text to second text, first hatching to second hatching) to inform the user of that patent document has been submitted for the secondary review. This state can persist for another user viewing same patent document (the error button can remain activated) or can avoid persisting for another user viewing same patent document (the error button can be activated again by another user)

Whether additional or alternative to the error button, there can be a form for a user to complete, where the form includes a user input element (e.g., text field, checkbox) programmed to receive a user input informative of an error with a currently viewed patent document (or another patent document). For example, the form can include a plurality of text fields for the user to textually specify the error.

In some embodiments, various forms of part number (or detected content) navigation (back and forward), as described herein, can be consecutive, as described above, or non-consecutive, as described below. For example, there can be end user programming to enable iterative navigation, as described herein, by selectively skipping or for every other iteration (or every two or more iterations however programmed). For example, there can be end user programming to iteratively navigate based on part number when that part number is positioned within proximity of some other part number or part name (or some other condition) but skip otherwise. This type of end user programming can vary based on various text searching operators (e.g., and, or, near, within) or figure sheet conditions or parameters (e.g., iteratively navigate through figure sheets where 35 appears once per figure sheet and skip others). This type of end user programming can be on a per patent document basis or a per patent family basis or a per patent document search or for all processed patent documents. For example, the user interface can present a graphic to cause a presentation of a user input element (e.g., text field for user entry of text searching operators, form for user entry figure sheet conditions or parameters) through which such end user programming can take place.

In some embodiments, the user interface can present a user input element (e.g., button, toggle, switch, checkbox) to request re-processing of a specific patent document (or another document type), whether this document is being currently viewed or not.

In some embodiments, the user interface can include a patent document expiration or abandonment notice. For example, this notice can include graphics, text, or other content. This notice can be visually distinct (e.g., colored, bolded, italicized, underscore, capitalized, different font type or size) or focus user attention thereon (e.g., colored, bolded, italicized, underscore, capitalized, different font type or size). For example, the notice can include a graphic for an expired or abandoned patent document and a graphic for a non-expired or non-abandoned patent document. For example, the notice can include a graphic for an expired or abandoned patent document. This expiration or abandonment information can be sourced from a data source, whether local or remote (e.g., Google Patents website, USPTO website), or determined upon initial processing of a particular patent document type or upon presentation of a particular patent document (allows for more accuracy to potential revivals).

In some embodiments, for generation of a list of mappings of a plurality of part names to a plurality of part numbers (or vice versa), as described herein, there can be a lexical analysis of the part names in order to filter out those part names that are unlikely to be patentably valid. The lexical analysis can employ an NLP computational tool (e.g., Spacy, Amazon Comprehend, Stanford NLP library) and include identifying a sentence in a patent text from which a part name is sourced, where the sentence includes the part name and the part number being lexically proximate to each other (e.g., within 4 words, within 3 words, within 2 words, within 1 word). Then, the sentence can be analyzed to determine all nouns therein. If the part name is one of such nouns or includes one of such nouns, then the part name is likely to be patentably valid and kept or flagged for keeping within the list of mappings. If the part name is not one of such nouns or does not include one of such nouns, then the part name is unlikely to be patentably valid and removed or flagged for removal from within the list of mappings.

In situations where the part name includes a non-noun (e.g., adjective, verb, adverb) and a noun (e.g., heating element 20, red chair 5, movable device 3.4, digital signature Y), then the analysis can include identifying the non-noun lexically associated with the noun (e.g., preceding that noun) and then taking an action based on the non-noun as programmed. For example, the action can include keeping the non-noun up to a certain number of words from the noun (e.g., first device heating element is filtered to heating element) and flagging the non-noun, as kept, and the noun as a part name that is likely patentably valid. For example, the action can include dropping the non-noun and flagging the noun, as remaining, as a part name that is likely patentably valid. For example, the action can include querying the non-noun and the noun against a generic dictionary or a technical dictionary selected based on a patent classification or a patent text analysis, as described herein, in order to determine if the non-noun and the noun together are a single lexical entry in the generic dictionary or the technical dictionary (e.g., heating element, digital signature). If yes, then the non-noun and the noun are flagged as a part name that is likely to be patentably valid and kept or flagged for keeping within the list of mappings. If not, then the non-noun and the noun are flagged as a part name that is not likely patentably valid and removed or flagged for removal from within the list of mappings. Note that such noun analysis can include a regular expression (or other forms or programmatic logic) or an NLP engine (e.g., Spacy, Amazon Comprehend) to perform an entity recognition process in order to determine a part of speech and then filter from there, as disclosed herein.

In some embodiments, when the user interface allows for an access (e.g., retrieval) of a patent document one-by-one based on an entry of a patent document number, as described herein, then the user interface can be programmed to allow the user to navigate between those patent documents, without using a back browser button or a forward browser button. The user interface can present a back next button (or another user input element) and a forward next button (or another user input element) for such functionality.

The back next button or the forward next button can be presented within a patent document number entry box, as described herein. For example, the back next button and the forward next button can be presented within the patent document number entry box such that a patent document number is positioned therebetween when entered. For example, the back next button and the forward next button can be presented within the patent document number entry box such that a patent document number is positioned lateral to or on top or bottom of the back next button or the forward next button when entered, whether left or right or top or bottom thereof.

The back next button or the forward next button can be presented outside a patent document number entry box, as described herein, but yet visually associated therewith. For example, the back next button and the forward next button can be presented outside the patent document number entry box such that the patent document number entry box is positioned therebetween, whether the back next button and the forward next button are positioned on a horizontal plane (e.g., respective left and right of patent document number entry box) or a vertical plane (e.g., respective top and bottom of patent document number entry box). For example, the back next button and the forward next button can be presented outside the patent document number entry box such that the back next button or the forward next button is positioned lateral to or on top or bottom of the patent document number entry box, whether left or right or top or bottom thereof.

The back next button and the forward next button can be presented outside a patent document number entry box, as described herein, and not visually associated therewith. For example, the back next button and the forward next button can be presented in a ribbon over a viewing pane, whether presenting a figure sheet or a text.

The back next button or the forward next button can be presented inside or outside of a patent document number entry box. For example, the back next button can be outside (or inside) the patent document number entry box and the forward next button can be presented inside (or outside) the patent document number entry box.

The back next button and the forward next button can operate relative to a plurality of patent documents similar to the back browser button and the forward browser button relative to a plurality of web pages. For example, the forward next button can be inactive or disabled or visually distinct (e.g., highlighted, colored differently relative to back next button) when the user is viewing a latest patent document in a user session. For example, the back next button can be inactive or disabled or visually distinct (e.g., highlighted, colored differently relative to forward next button) when the user is viewing a first patent document in a user session. For example, the forward next button and the back next button can be active or enabled when the user is viewing a patent document between a first patent document and a latest patent document in a user session. For example, the user can iterate forward next or back next one patent document-by-one patent document to access a respective back or forward patent document.

Note that this navigational functionality can be based on a user history or log of patent documents sequentially requested during a user session based on a user login and a user logout. For example, upon the user login, there is a data structure (e.g., array, table, vector, tree) created for a user profile, where the data structure is associated with the user session and where the data structure is populated (e.g., writing) to track (e.g., sequentially, by date or time requested) all patent documents sequentially requested by the user during the user session. For example, upon the user logout, the data structure can be deleted. However, note that this functionality can be enabled for a time period (e.g., two months, three hours, forty minutes) or for the user profile regardless of user sessions or time periods (e.g., indefinitely). For example, there may be a history user input element (e.g., a button) positioned adjacent to a document number entry bar adjacent to a retrieve user input element (e.g., a button), which is shown on FIG. 11F. Upon activation of the history user input element, there may be a dropdown menu (or a popup or another window) presented, which can extend over a figure menu (or a text menu) with an itemized list of patent documents requested during this user session (or a preset time period or a preset number of documents). The itemized list (e.g., vertical table) may present a plurality of document identifiers (e.g., patent numbers) that are each hyperlinked and can lead to any of those document identifiers upon hyperlink activation, which can allow for skipping of patent documents. Alternatively or additionally, there can be a back user input element or forward user input element presented next to the document number entry bar adjacent to the retrieve user input element, which can allow the user to navigate among those patent documents (history) one-by-one, in a browser-like manner.

In situations where a plurality of patent documents can be simultaneously entered for processing, as described herein, then this navigational functionality can be enabled for the patent documents in a predetermined order. For example, the predetermined order can be an order as entered, an order as entered but reversed, an order as sorted by a date (e.g., filing, priority, publication, issuance) or a document attribute (e.g., alphabetically by title or first inventor, numerically less to more inventors or more to less inventors), or others.

Some embodiments may or may not involve knowledge discovery using synonyms or entity linking or entity mapping based on certain predefined knowledge, which can be used validation. For example, using various search functions (e.g., search within a patent document by part name, search a database of patent documents by a part name) may involving searching by a part name or by a synonym of a part name. For example, if a search part name is a "car" then a synonym of "automobile" or "vehicle" can be used as well, which can be selectively enabled or disabled by the user.

Some embodiments may have or avoid having a user interface (e.g., a menu) with a user input element (e.g., a toggle, a button) that is programmed to present a patent family tree having a plurality of nodes based on the user input element being selectively activated or deactivated, where one of those nodes corresponds to a patent document that is currently being presented. This tree can be presented based on a priority claim relationship between various patent documents, whether US or foreign. This tree can be presented in a separate pane or a popup window or a new page.

Some embodiments may have or avoid having an integration with a government database (e.g., USPTO PAIR, Espace, Pacer) where a legal history of a patent document being currently viewed can be accessible. For example, there can be a user interface (e.g., a menu) with a user input element (e.g., a toggle, a button) that can link to a file history, file wrapper, litigation history, or other procedural history of the patent document being currently viewed based on the user input element being selectively activated or deactivated. These procedural history can be presented in a separate pane or a popup window or a new page.

Some embodiments can have or avoid having an annotated figure sheet, as disclosed herein, presented (e.g., popup, slideout, hoverover, new page) off another or unrelated search engine results page (e.g., Google, Bing, Prior Art archive, Wayback Machine) based on a patent number of a patent identified in a search results page being present in a database of annotated documents, as disclosed herein. The annotated figure sheet can be first, random, last, or containing any of searched terms or most of search terms or all of search term, whether those terms are textual or image patterns (e.g., Google Reverse Image search). However, the rest of this patent document can be viewed via subscription. This functionality enables a teaser or a trial or a preview version of a subscription of the database of annotated documents, as disclosed herein.

Some embodiments can have or can avoid having an advertisement (e.g., text, image, video, JPEG, GIF) being presented over a margin area of a figure or an advertisement can follow or avoid following a cursor over a text segment or an image segment being currently presented. For example, in a patent figure, there may be a left, right, top, or bottom margin, whether empty or have some standardized content (e.g., sheet numbers, document type, document identifier). As such, an advertisement, whether static or dynamic, can be selected or generated to target based on user information, patent classification code of that patent document being viewed, patent text or patent figure of that patent document being viewed, IP address, geographic location, computing device type, browser type, cookies, network connection type, network connection quality, presence or absence of dark mode or blue light mode, or other advertising criteria or parameters. For example, the advertisement can follow or can avoid following the cursor while the cursor is over a figure pane or a figure presented in a figure pane or can be configured or not be configured not to block or overlay a part number or an object being depicted (e.g., selective ad hiding or selective ad changing or selective ad disabling), which can occur based on pixel (e.g., a black pixel) or pattern detection (e.g., a group of pixels corresponding to a predetermined pattern) or a predetermined area detection (e.g., a cursor is not over a margin area). For example, an advertisement can be selected or changed in real-time based on what part number or part name is activated or deactivated in real-time, whether in patent figure, patent text, or patent legend, as disclosed herein. These selection or changes can occur involving or supplemented with user information, patent classification code of that patent document being viewed, patent text or patent figure of that patent document being viewed, IP address, geographic location, computing device type, browser type, cookies, network connection type, network connection quality, presence or absence of dark mode or blue light mode, or other advertising criteria or parameters.

Some embodiments may allow for detection of flowcharts or diagrams on figures or figure sheets (e.g., based on arrow presence, text analysis, box detection, diamond detection) and exclude those flowcharts from at least some annotation, as disclosed herein. For example, such exclusion can include box numbers from being hyperlinked or labeled, as disclosed herein. However, if one figure sheet depicts an object and a flowchart, then the object can be not excluded but the flowchart can be excluded.

Some embodiments may include tagging (e.g., metadata) or marking a figure sheet or a patent text or a patent document with an algorithm version identifier (e.g., text algorithm, image processing algorithm, OCR algorithm, character recognition algorithm, label placement algorithm) or a processing date at a processing time. As such, when the user subsequently retrieves this patent document and something is identified as incorrect (e.g., manual visual inspection, heuristic algorithm), then the user has an option (e.g., a button in a user interface) to reprocess this patent document or just some text or some figures, as disclosed herein, with a newest available algorithm version if a currently viewed content has been processed by an algorithm or date at time of retrieval that is versioned or dated earlier than the newest algorithm version or processing date. This can happen with figures or text.

Some embodiments may include supervised learning where non-recognition of part numbers in figures or incorrect recognition of part numbers in figures can be identified by the user upon figure sheet review. Then, the user can instruct to have a pixel pattern (e.g., part number) enclosed within an overlaid visual marker or green (or another color to indicate presence of part number in text) bounding box to be associated with a set of pixel coordinates, whether new or different from original, (e.g., moving via dragging visual marker or bounding box) and inserted into a learning model for training, which can teach what something is or what something is not, which can learn from corrections or deletions or additions, which can look for black pixel color over white or gray in terms of part numbers. Note that red bounding boxes (or another color to indicate absence of part number in text) can be ignored whereas green cab be used for learning. Sometimes, some red bounding boxes can be sent to the user for manual tagging as to what content is enclosed even though not described (e.g., associated with part name) and this can also improve model learning or OCR. For example, if a patent figure shows a part number 12 and 12 is not described in patent text, then the user can still tag or associate the part number 12 in the patent figure with a number 12 and the model or OCR can learn from that even though 12 is not associated with any part names or absent from the patent text.

Some embodiments may allow delayed or deferred annotation, as disclosed herein. For example, figure sheets can be annotated in real-time, as disclosed herein, and some may be available for user viewing while others are processing, which can be useful when patents have large number of figure sheets. For example, the user may submit a set of patent documents for processing and some of those documents may be processed and available for user review while others are still processing. For example, some patent documents can be presented for user review on completion. For example, some patent documents can be user viewed when a graphic or a user input element (e.g., a button, a toggle) indicates (e.g., changing appearance, color change) that document processing, as disclosed herein, is completed and the user input element is activated (e.g., when serially or parallel processing a set of patent documents, when serially or parallel processing an issued patent and a corresponding patent application publication based on figure quality).

Some embodiments may allow for text expansion. In particular, when a patent text describes a part name and a part number in an abbreviated manner (e.g., cars 110*a*-110*f* or spoons 102*a*-*c*), then this abbreviation can be expanded and annotated in a patent figure accordingly even if those part number-part name pairs are not individually present in the patent text. For example, if the patent text states a plurality of boats 104*a*-*c*, then this can be parsed as a boat 104*a*, a boat 104*b*, and a boat 104*c* for recordation in a data structure, as disclosed herein, and if 104*a* or 104*b* or 104*c* are individually recognized as part numbers in a corresponding patent figure, then those part numbers in the patent figure can be linked to a plurality of boats 104*a*-*c* even if the patent text does not describe a boat 104*a*, a boat 104*b*, and a boat 104*c*. Note that similar can occur with other forms of expansion (e.g., housings 102-108). In those situations, expansion can be programmed only for whole values (e.g., 102, 103, 104, 105, 106, 107, 108) or programmed for preset decimal values if necessary (e.g., 102, 102.1, 102.2) while avoiding infinity. Further, note that expansion can occur based on preset increments. For example, cars 102-106 can be expanded into car 102, car 104, car 106. Some contextual information for determining whether this analysis is appropriate is to see if any member within that range is independently discuss and infer from that. For example, cars 102-106 can include car 102, 103, 104, 105, 106 if car 103 or car 105 is independently mentioned.

Note that other forms of text handling can be used. For example, if a patent text recites "2-2" then such recital can be handled as a cross-sectional line reference (e.g., where opposing characters or values are equal in value with a dash in-between). Therefore, in this situation, "2-2" can be tokenized, segmented, hyperlinked, or otherwise processed as a single unit and then recognized or handled similarly in a patent figure or vice versa (from the patent figure to the patent text). For example, if a patent text recites "10-2" then such recital can be handled as a part reference (e.g., where a left character or value is higher in value with a dash in-between). Therefore, in this situation "10-2" can be tokenized, segmented, hyperlinked, or otherwise processed as a single unit and then recognized or handled similarly in a patent figure or vice versa (from the patent figure to the patent text).

These types of logic or inferral type fuzzy logic can be used to estimate with other contexts. For example, if a part name and a part number pair is "an engine 102," and this pair has been identified in a patent text, especially if validated by frequent repetition, but 102 is not recognized as a part number in a patent figure and part numbers 10 or 12 are recognized in the patent figure, then an inference can be made, whether alone or with other contextual information, as disclosed herein, that one of those part number is likely to be 102, especially since engine 102 may be used multiple times in the patent text (e.g., likely intended part name and part number pair). Note that this can be inversed where a part number 102 appears frequently in a plurality of patent figures but the patent text has 10 or 12, which are not as common than what is identified in the patent figure, especially if with high confidence or validated by a user review (e.g., editor) by a non-correction thereof. Another form of inferral type logic can occur when a part number (e.g., 83) is not identified to be present in a patent text but 83*a* is and a figure sheet has 83 recognized, then 83 in the figure sheet can be linked to 83*a* in text or vice versa, especially if 83*a* occurs multiple times in the patent text. Similar vice versa processing, especially if validated over several figure sheets, is possible as well.

Some embodiments enable a legend or a parts list, as disclosed herein, to printed or presented over a margin area of a figure sheet, whether the margin area contains or does not contain standardized information (e.g., sheet number, document identifier, barcode). The margin area can be top, right, bottom, or left. The legend or the parts list can be user customizable (e.g., a button in a user interface) in terms of part name size, font type, font size, font color, format, layout, presentation, or other presentation criteria. The legend or the parts list can be static or interactive (e.g., hyperlinked to part numbers in figure sheet or patent text).

Some embodiments include a patent text being focused, moved, refreshed, updated, or otherwise presented, as disclosed herein, to a paragraph containing a sentence with a part name and a part number pair based on a visual marker of a corresponding part number of a patent figure being activated, as disclosed herein. If the part number repeats in the paragraph, whether in the sentence or outside the sentence, then a visual emphasis on the repeating part number or its corresponding part name, as disclosed herein, iteratively moves onto a repeating part number within the paragraph, while still presenting the paragraph or without moving the text (unless screen size limits or viewport size or browser window size negatively impacts on text view) in order to provide the user with some textual context and without the user having to scroll up every time to see just above the sentence containing the part name and the part number pair. For example, instead of a patent text moving to a pane edge up to the sentence containing the part name and the part number pair, as disclosed herein, the patent text moves to the paragraph containing that sentence and then highlighting of the part name and the part number pair iteratively occurs in the paragraph based on activating the navigational arrows presented in a figure sheet. Note that other text presentation ways for simpler contextual understanding are possible, such as presenting a preset amount of sentences (e.g., one, two, three) before the sentence with the part name and the part number pair based on the visual marker of the corresponding part number of the patent figure being activated, as disclosed herein. Alternatively, there may be a user input element (e.g., a button, a toggle) for providing an option for the user to have either.

Some embodiments enable the user to select a section of a patent text (e.g., selecting the section by a cursor) and then highlight or otherwise visually emphasize the section that has been selected. This highlighting or visual emphasis can be based on color (e.g., yellow highlighting like MS Word), whether this coloring is preset or user customizable (e.g., list of color boxes or color pallete presented or popped up responsive to an activation of a user input element). This highlighting can include a bounding box or a highlighting box being presented enclosing the section of the patent text. The bounding box or the highlighting box can be made visually distinct, as disclosed herein with respect to a patent figure, and can be adaptive based on dark mode or blue light mode or other visual modes, as disclosed herein. These forms of visual distinction can be based on color, font type, font size, italicization, bolding, or other ways of textual emphasis. This highlighting or visual emphasis can persist for a user session or per document, which can be customized by the user. Note that when the section of the patent text is highlighted, as disclosed herein, there may be a visual contrast with a selection of a part name and a part number pair in the patent text, as disclosed herein, based on activating a visual marker of a corresponding patent number from a patent figure or an activation of a part name from a legend, as disclosed herein.

Some embodiments enable a distributed image processing technology. In particular, if a patent document has a plurality of figure sheets, then some of the figure sheets can be distributed to some available servers or computing instances for processing, as disclosed herein, and other figure sheets can be distributed to other available servers or cloud computing instances for processing, as disclosed herein, in order to speed up processing, as disclosed herein. Then, each of those servers or computing instances sends back its processing results to a requesting server, which then combines them into a single patent document for user presentation, as disclosed herein. This distribution can be based on current user load, currently estimated processing wait time, history of processing based on dates or times or IP addresses or user logins, anticipated load based on dates or times or IP addresses or user logins.

Some embodiments may present some visual indicator (e.g., text, image) that can be dynamic and indicative of how frequently cited a currently viewed patent document is based on periodic communication (e.g., daily, weekly, several times a week, on Tuesdays, monthly) with a governmental patent database (e.g., USPTO, Espace). This visual indicator may be clickable to present links to those references that cite the currently viewed patent document. Those references can be similarly processed and presented, as disclosed herein.

Some embodiments may have an area outside of a visual marker (e.g., bounding box) in a patent figure being clickable, as disclosed herein, even though not visually apparent that the area is clickable. In particular, when a cursor is bigger (e.g., longer, wider, thicker) than a bounding box (or another visual marker) enclosing a part number (e.g., 1 or i) in a patent figure over which the cursor is positioned, then a preset amount of area (e.g., a preset number of pixels on all sides of the bounding box) externally past the bounding box from the bounding box over the patent figure can be made clickable even if that area is not readily visible for clicking.

Some embodiments enable a presentation of a patent text (e.g., specification or claims) in a plurality of defined rows, like lined paper, so scrolling can occur on a row-by-row basis. Rectilinear lines between the rows may be shown and be solid or broken or colored. No lines can be shown too. This functionality may tie to a cursor or touchscreen scrolling to force line-by-line scrolling. Note that this functionality can allow for snapping back to previous row, which can be to enable row overinclusion than row under inclusion. If scrolling too fast (as preset in advance), then such scrolling can stop with a upper row of text being fully visible. This can prevent partial row view (e.g., when scrolling always stop or refresh to show full upper row or avoid showing partial upper row with characters cut-off).

Some embodiments enable linking of figure identifiers (e.g., FIG. 3 or FIG. 4 or F5) in a figure sheet and a figure identifier (e.g., FIG. 3 or FIG. 4 or F5) in a patent text, as disclosed herein, whether those figure identifiers are identical or non-identical to each other in terms of how a particular figure is identified, whether in format or value. For example, FIG. 4 in a figure sheet can be linked to FIG. 4 in a patent text. For example, FIG. 4 in figure sheet can be linked to FIG. 4 or f4 in a patent text. This linking can be uni-directional or bi-directional. This linking can occur similar to part number linking, as disclosed herein. When selected, those figure identifiers can be made visually distinct, whether in figure sheets or patent text, as disclosed herein. Note that text expansion analysis, as disclosed herein, can be performed. For example, if a patent text recites FIGS. 1-3, then that can be textually processed FIG. 1, FIG. 2, and FIG. 3 and then linked to relevant patent figures. For example, if a figure sheet recites FIG. 1, then the figure sheet can be linked to FIGS. 1-3 in a patent text.

Some embodiments enable a frequency analysis, whether of identified part names in text or recognized part names in figure sheets, for presenting part names in figure sheets or enable a frequency analysis for hyperlinking in text (e.g., tokenization). For example, more frequent part names identified in a patent text can be used to present over a patent figure as user requested, as disclosed herein. For example, if a patent text recites car 5 ten times and car 6 one time, then the part name shown over a figure sheet when user requested, as disclosed herein, will be car under a part number 5. Note that such label may also inform or indicate (e.g., by visual distinction) that there may be a part numbering discrepancy with respect to this particular part name. Similar approach can be applied from patent figures to patent text.

Some embodiments enable a presentation of a processed content, as disclosed herein, on a rolling basis, whether sheet sequential or sheet non-sequential, which can be in real-time or on-demand. For example, when a patent document with a plurality of figure sheets is requested to be processed, as disclosed herein, then processing of one sheet may be completed before another sheet or other sheets, especially if distributed over a group of servers for processing. As such, one of the sheets (e.g., first completed one) may be presented immediately upon completion, while another sheet or other sheets are still processing. This immediately presented sheet may be sheet 1 (or first sequential sheet containing FIG. 1 if order is requested or if order is not requested if that sheet was first to finish) or sheet 15 (or more or less) if the patent document has that many drawings (e.g., sometimes out of order). Sometimes, order may be prioritized such that sheet 1 (or first sequential sheet containing FIG. 1) may be processed first so that the user can consecutively review the figure sheets. This form of processing may be helpful when dealing with a patent document with a large number of figures and the user may not need to wait until the patent document, as a whole, is completed, at least in terms of part number recognition in patent figures. For example, upon completion of processing on sheet 1, this sheet is immediately presented to the user while sheet 2 and sheet 3 are still processing. When sheet 2 is completed to processed, then the user may be notified that the user can now view sheet 2 or the user may not be notified at all or sheet 2 may be automatically presented or made available for viewing (e.g., stitched to sheet 1). Note that order may matter or may not matter, depending on need. For example, sheet 1 may be presented upon competition and then sheet 3 may finish processing before sheet 2. As such, sheet 3 may be presented after sheet 1 but before sheet 2 is presented. When sheet 2 is finished processing, then sheet 2 may be inserted into pane (e.g., between sheet 1 and sheet 3 or stitched in-between) or ready for user review when user navigates between figures. The user may be notified of such in a user interface or may not be notified at all. Note that sometimes text processing may affect what part numbers are recognized in figure sheets or vice versa. As such, processing of the text, as disclosed herein, may be prioritized over processing of the figure sheets or vice versa or the text or the figure sheets may be updated in real-time based on processing of its respective other. When the user wants to access a figure sheet that is still processing, then the user may be prompted to inform of how much waiting time is left or that next sheet is still processing.

Some embodiments enable an indexing and searching engine (e.g., Lucene, NoSQL), which can include a fuzzy search based on an edit distance. For example, when searching by part names, a search query "table" can include "tables" and "tablets" although this can be excluded as well (e.g., strict searching).

Some embodiments enable a machine learning (e.g., deep learning) technique, where there is a plurality of pixel (or voxel) coordinates (e.g., x-y, x-y-z) associated with a plurality of values corresponding to a plurality of character patterns (e.g., part numbers shown as black pixels over white background) depicted in a plurality of figure sheets, whether in a single patent document or a plurality of patent documents. These values and the character patterns correspond to a plurality of part numbers recited in a text or a plurality of texts of the single patent document or the patent documents. As such, due to this correspondence (e.g., validation), which can include validation by an editor profile, whether by a corrective action or a non-correction, which can add more weight to that correspondence, then the pixel coordinates, the values, and the character patterns form a set of labeled data, which can be used to train or enhance training or supplement training of an OCR engine or supplement an OCR engine, which can be supervised or unsupervised. This is so because the pixel coordinates correspond to the character patterns which correspond to the part numbers as the character patterns depicting the part numbers. For example, if there are 100,000 figure sheets (or less or more), and each of these sheets has 5 part numbers, and each of those 5 part numbers is validated as being present by a respective correspondence to a respective part number in a respective patent document (e.g., shown as a green bounding box in a figure sheet), then there are 500,000 labels validated labels, which can be used in an artificial neural network (e.g., CNN) to train or enhance training or supplement training of an OCR engine or supplement an OCR engine. If some of those 500,000 validated labels have been further validated by a corrective or non-correction by an editor profile, then those labels may have more weight in those neural networks than those labels which are not similarly validated or not validated at all or against other data, which may be non-patent data. Note that this process occurs in real-time and as more data (e.g., more patent documents are annotated) is added or validated or corrected then a number of validated labels correspondingly grows, which itself makes character recognition (or text recognition) more accurate.

Some embodiments enable analytics or computing actions based on validated (e.g., green bounding box) and not validated (e.g., red bounding box) part numbers, whether on a per figure sheet or a per document basis, as disclosed herein. For example, a law firm or agent name can be extracted from a patent document (e.g., field 74 on a first page of a US patent) and then a determination can be made based on how many matched (e.g., green bounding box) and non-matched (e.g., red bounding box) part numbers there are in figure sheets, whether on a per figure sheet basis or per document basis. Then, a ranking or some other data action can be performed based on such determination. Note that this is not limited to the law firm or agent name, but can include, whether additionally or alternatively, a patent examiner name, a legal entity name, an inventor name, a geographical area, a patent classification code, a type of filing, a priority claim, or other patent document attributes. For example, there can be a determination of a common or popular or most common or most popular part numbers numbering schemes or density of non-white or black pixels per sheet.

Some embodiments enable a reader profile to correct a preexisting label of a part number depicted in a figure sheet (e.g., incorrect recognition) or add a new label to a part number depicted in a figure sheet (e.g., non-recognition) or remove a preexisting label from a figure sheet (e.g., artifact recognition) or perform some other editing action, as disclosed herein. However, since this configuration may lead to potential data integrity issues, these editing actions can be made temporary, until validated by an editor profile. While these edits are temporary, these edits can or can avoid persisting for that user session or to that reader profile or to other users or not persist to other users. If persisting for that user session or to that reader profile or to other users, then those labels may be made visually distinct informative of such temporary status or visually distinct if validated by the editor profile. During such temporary status, other functionality that depends on such labels (e.g., searching by part names) can work based on such temporary edits or can ignore those temporary edits until validated by the editor profile or can flag those search results that are impacted by this temporary status. For example, searching based on part names can occur based on such temporary edits or only validated edits where temporary edits are not indexed or ignored or filtered out. There can be a user interface for the editor profile with a list of potential validations to be validated or edited or rejected. Note that there can be a master profile (e.g., administrator) which supersedes the editor profile and the reader profile in computing privileges (e.g., read, write, delete) can override any edits made by the editor profile or the reader profile.

Some embodiments enable a docketing system (e.g., Inprotech) can include a patent annotation functionality, as disclosed herein, or can be in communication with a system having such functionality.

Some embodiments enable a training of a text processing model (e.g., via using an NLP engine) based on manually associating (e.g., labeling via keyboard or cursor) a part number in a patent text with a part name in the patent text or vice versa, regardless of how close in the patent text they are to each other. These actions can include forming a new part name and part number pair, correcting an incorrect part name and part number pair, or unassociating a part name from a part number (e.g. remove pair relationship). These actions can be implemented in various ways. For example, the user can select (e.g., highlight) a part name in a patent text and then select (e.g., highlight) a desired part number in the patent text. Then, the user can click a suitable user input element (e.g., a button) which programmatically causes this relationship to be formed. Upon such action, if there is a bounding box associated with the part number now paired to the part name, then the bounding box can present the part name when activated, as disclosed herein. Likewise, if the part name is unassociated from the part number in the patent text, then the bounding box will not present the part name when activated, as disclosed herein.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

This disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method comprising:
recognizing, by a processor, a first number in a figure;
identifying, by the processor, a second number in a text corresponding to the figure;
identifying, by the processor, a word corresponding to the second number in the text;
forming, by the processor, an association between the first number and the word based on the first number and the second number being identical to each other in value; and
taking, by the processor, an action based on the association, wherein the action includes: requesting, by the processor, a presentation of a first pane and a second pane side-by-side such that (a) the first pane contains the figure, (b) the second pane contains the text, (c) the text is focused or moved to the word within the second pane responsive the first number being activated within the first pane, and (d) the first number is made visually distinct within the first pane responsive to the second number or the word being activated within the second pane, and at least one of:
(a) wherein the first pane presents a back navigation user input element and a forward navigation user input element over the figure spaced apart from the first number responsive to the first number being activated within the first pane, wherein the text contains a plurality of second numbers including the second number in the text, wherein the second numbers are identical to each other in value, wherein the text is interactively navigated within the second pane based on the second numbers responsive to the back navigation user input element or the forward navigation user input element being activated within the first pane, or (b) wherein the second pane presents a back navigation user input element and a forward navigation user input element over the text or within the text in proximity of the word or the second number responsive to the word or the second number being activated within the second pane, wherein the figure is contained within a plurality of figures corresponding to the text, wherein each of the figures contains the first number, wherein the figures are interactively navigated within the first pane based on the first numbers responsive to the back navigation user input element or the forward navigation user input element being activated within the second pane.

2. The method of claim 1, wherein the action includes: requesting, by the processor, a presentation of a legend concurrent with the figure and the text, wherein the legend includes the first number or the second number and the word, wherein the legend includes a legend back navigation user input element and a legend forward navigation user input element, wherein the legend back navigation user input element and the legend forward navigation user input element are visually associated with the first number or the second number and the word, wherein the text contains a plurality of second numbers including the second number in the text, wherein the second numbers are identical to each other in value, wherein the text is interactively navigated based on the second numbers responsive to the legend back navigation user input element or the legend forward navigation user input element being activated while the figure is presented.

3. The method of claim 1, wherein the action includes: identifying, by the processor, a noun in a claim text; matching, by the processor, the noun to the word; identifying, by the processor, the second number based on the noun matching the word; identifying, by the processor, the figure containing the first number based on the second number; and causing, by the processor, the first number to be presented in a visually distinct manner.

4. The method of claim 1, wherein the action includes: identifying, by the processor, a standardized upright reference point in the figure and the first number not being upright in the figure relative to the standardized upright reference point before the figure is presented to a user; rotating, by the processor, the figure based on the first pact number not being upright relative to the standardized upright reference point before the figure is presented to the user such that the first number is upright and the standardized upright reference point is not upright; causing, by the processor, a presentation of the figure to the user such that the first number is upright and the standardized upright reference point is not upright; and allowing, by the processor, a presentation of the word over the figure not over the first number while in preset proximity of the first number responsive to a cursor event caused by the user.

5. The method of claim 1, wherein the action includes: requesting, by the processor, a presentation of a swap user input element programmed such that the first pane swappably presents the text based on activation of the swap user input element and the second pane swappably presents the figure based on activation of the swap user input element.

6. The method of claim 1, wherein the action includes: causing, by the processor, an adjustment of a presentation of the figure or the text based on a dark mode or a blue light mode.

7. The method of claim 1, wherein the action includes: causing, by the processor, a presentation of a translation of the word over the figure not over the first number while in preset proximity of the first number responsive to a cursor event caused by a user.

8. The method of claim 1, wherein the action includes: causing, by the processor, a presentation of a menu bar above the first pane, wherein the menu bar includes a first user input element and a second user input element, wherein the first user input element is programmed to cause the word to be presented over the figure not over the first number while in preset proximity of the first number responsive to a click cursor event caused by a user while the first user input element is activated, wherein the second user input element is programmed to cause the word to be presented over the figure not over the first number while in preset proximity of the first number responsive to a hover cursor event caused by the user while the second user input element is activated, wherein the first user input element and the second user input element are activated exclusive to each other.

9. The method of claim 1, wherein the action includes: receiving, by the processor, a textual search term from a user, wherein the figure is included in a plurality of figures corresponding to the text, wherein each of the figures includes the first number; matching, by the processor, the textual search term to the word; identifying, by the processor, the second number corresponding to the word; and causing, by the processor, a presentation of at least one of the figures to the user based on the second number matching the first number, wherein the presentation includes the first number being visually distinct.

10. The method of claim 1, wherein the action includes: receiving, by the processor, a textual search term from a user, wherein the figure and the text form a document; matching, by the processor, the textual search term to the word in a data structure storing a plurality of words sourced from a plurality of texts of a plurality of documents including the document, wherein the texts describe a plurality of figures of the documents, wherein the words are identical to each other; identifying, by the processor, the documents containing the word; and causing, by the processor, a presentation of at least one of the documents to the user based on the textual search term matching the word.

11. The method of claim 1, wherein the action includes: causing, by the processor, a presentation of a user interface including a user input element programmed to switch between an issued patent published document having a serial number and a patent application publication document having the serial number, wherein each of the issued patent published document and the patent application publication document has the figure and the text.

12. The method of claim 1, wherein the figure and the text is an unfiled patent application.

13. The method of claim 1, wherein the action includes: causing, by the processor, a bounding box to be presented over the figure such that the bounding box encloses the first number, wherein the bounding box is presented in a first visually distinct manner based on first number matching the second number and a second visually distinct manner based on the first number not matching the second number, wherein the first visually distinct manner is distinct from the second visually distinct manner.

14. The method of claim 1, wherein the first pane presents a back navigation user input element and a forward navigation user input element over the figure spaced apart from the first number responsive to the first number being activated within the first pane, wherein the text contains a plurality of second numbers including the second number in the text, wherein the second numbers are identical to each other in value, wherein the text is interactively navigated within the second pane based on the second numbers responsive to the back navigation user input element or the forward navigation user input element being activated within the first pane.

15. The method of claim 1, wherein the second pane presents a back navigation user input element and a forward navigation user input element over the text or within the text in proximity of the word or the second number responsive to the word or the second number being activated within the second pane, wherein the figure is contained within a plurality of figures corresponding to the text, wherein each of the figures contains the first number, wherein the figures are interactively navigated within the first pane based on the first numbers responsive to the back navigation user input element or the forward navigation user input element being activated within the second pane.

16. The method of claim 1, wherein (a) wherein the first pane presents a back navigation user input element and a forward navigation user input element over the figure spaced apart from the first number responsive to the first number being activated within the first pane, wherein the text contains a plurality of second numbers including the second number in the text, wherein the second numbers are identical to each other in value, wherein the text is interactively navigated within the second pane based on the second numbers responsive to the back navigation user input element or the forward navigation user input element activated within the first pane and (b) wherein the second pane presents a back navigation user input element and a forward navigation user input element over the text or within the text in proximity of the word or the second number responsive to the word or the second number being activated within the second pane, wherein the figure is contained within a plurality of figures corresponding to the text, wherein each of the figures contains the first number, wherein the figures are interactively navigated within the first pane based on the first numbers responsive to the back navigation user input element or the forward navigation user input element being activated within the second pane.

17. A system comprising:
a processor programmed to:
recognize a first number in a figure;
identify a second number in a text corresponding to the figure;
identify a word corresponding to the second number in the text;
form an association between the first number and the word based on the first number and the second number being identical to each other in value; and take an action based on the association, wherein the action includes: request a presentation of a first pane and a second pane side-by-side such that (a) the first pane contains the figure, (b) the second pane contains the text, (c) the text is focused or moved to the word within the second pane responsive the first number being activated within the first pane, and (d) the first number is made visually distinct within the first pane responsive to the second number or the word being activated within the second pane, and at least one of:
- (a) wherein the first pane presents a back navigation user input element and a forward navigation user input element over the figure spaced apart from the first number responsive to the first number being activated within the first pane, wherein the text contains a plurality of second numbers including the second number in the text, wherein the second numbers are identical to each other in value, wherein the text is interactively navigated within the second pane based on the second numbers responsive to the back navigation user input element or the forward navigation user input element being activated within the first pane, or
- (b) wherein the second pane presents a back navigation user input element and a forward navigation user input element over the text or within the text in proximity of the word or the second number responsive to the word or the second number being activated within the second pane, wherein the figure is contained within a plurality of figures corresponding to the text, wherein each of the figures contains the first number, wherein the figures are interactively navigated within the first pane based on the first numbers responsive to the back navigation user input element or the forward navigation user input element being activated within the second pane.

18. The system of claim 17, wherein the first pane presents a back navigation user input element and a forward navigation user input element over the figure spaced apart from the first number responsive to the first number being activated within the first pane, wherein the text contains a plurality of second numbers including the second number in the text, wherein the second numbers are identical to each other in value, wherein the text is interactively navigated within the second pane based on the second numbers responsive to the back navigation user input element or the forward navigation user input element being activated within the first pane.

19. The system of claim 17, wherein the second pane presents a back navigation user input element and a forward navigation user input element over the text or within the text in proximity of the word or the second number responsive to the word or the second number being activated within the second pane, wherein the figure is contained within a plurality of figures corresponding to the text, wherein each of the figures contains the first number, wherein the figures are interactively navigated within the first pane based on the first numbers responsive to the back navigation user input element or the forward navigation user input element being activated within the second pane.

20. The system of claim 17, wherein (a) wherein the first pane presents a back navigation user input element and a forward navigation user input element over the figure spaced apart from the first number responsive to the first number being activated within the first pane, wherein the text contains a plurality of second numbers including the second number in the text, wherein the second numbers are identical to each other in value, wherein the text is interactively navigated within the second pane based on the second numbers responsive to the back navigation user input element or the forward navigation user input element being activated within the first pane and (b) wherein the second pane presents a back navigation user input element and a forward navigation user input element over the text or within the text in proximity of the word or the second number responsive to the word or the second number being activated within the second pane, wherein the figure is contained within a plurality of figures corresponding to the text, wherein each of the figures contains the first number, wherein the figures are interactively navigated within the first pane based on the first numbers responsive to the back navigation user input element or the forward navigation user input element being activated within the second pane.

* * * * *